US012743290B2

(12) United States Patent
Zhang et al.

(10) Patent No.: US 12,743,290 B2
(45) Date of Patent: Sep. 22, 2026

(54) SYSTEM AND METHOD FOR DISPLAYING AND CONTROLLING TASK OF REMOTE DEVICE

(71) Applicant: HUAWEI TECHNOLOGIES CO., LTD., Shenzhen (CN)

(72) Inventors: Yanan Zhang, Shenzhen (CN); Hongjun Wang, Shenzhen (CN); Zhiyan Yang, Shenzhen (CN); Chao Xu, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 127 days.

(21) Appl. No.: 18/600,792

(22) Filed: Mar. 11, 2024

(65) Prior Publication Data

US 2024/0211282 A1 Jun. 27, 2024

Related U.S. Application Data

(63) Continuation of application No. PCT/CN2022/117047, filed on Sep. 5, 2022.

(30) Foreign Application Priority Data

Sep. 9, 2021 (CN) ......................... 202111057294.8

(51) Int. Cl.
*G06F 3/048* (2013.01)
*G06F 3/0482* (2013.01)
(Continued)

(52) U.S. Cl.
CPC ............ *G06F 9/451* (2018.02); *G06F 3/0482* (2013.01); *G06F 9/4856* (2013.01)

(58) Field of Classification Search
None
See application file for complete search history.

(56) References Cited

U.S. PATENT DOCUMENTS

2012/0084713 A1* 4/2012 Desai ...................... G06F 9/452 715/788
2014/0359637 A1 12/2014 Yan
(Continued)

FOREIGN PATENT DOCUMENTS

CN 108958867 A 12/2018
CN 109729199 A 5/2019
(Continued)

OTHER PUBLICATIONS

Wu Yadong et al., Human Computer Interaction Technology and Application, Aug. 31, 2020, total 14 pages.
(Continued)

*Primary Examiner* — Thanh T Vu

(57) ABSTRACT

This application provides a system and method for displaying and controlling a task of a remote device. The system includes N devices, and the N devices include a first terminal and a second terminal. Icons of the N devices and at least one task card are displayed on a recent tasks screen of the first terminal. A user may perform various convenient operations on any card, to implement migration of the task card and running of an application corresponding to the task card on different devices. This can be suitable for a variety of different user requirements, and applicable to almost all applications. In addition, task cards can be flexibly arranged on the first terminal, and the first terminal can display task cards of different devices.

20 Claims, 154 Drawing Sheets

(51) Int. Cl.

| | |
|---|---|
| ***G06F 9/451*** | (2018.01) |
| ***G06F 9/48*** | (2006.01) |

(56) References Cited

U.S. PATENT DOCUMENTS

| | | | | |
|---|---|---|---|---|
| 2017/0168667 | A1* | 6/2017 | Jeon | H04N 21/4131 |
| 2017/0188213 | A1* | 6/2017 | Nirantar | H04L 67/564 |
| 2020/0233548 | A1* | 7/2020 | Baker | G06F 3/0482 |
| 2020/0272484 | A1* | 8/2020 | Kunene | G06F 3/0482 |
| 2022/0188132 | A1* | 6/2022 | Yue | G06F 3/0482 |
| 2023/0026782 | A1* | 1/2023 | Sha | H04L 67/10 |

FOREIGN PATENT DOCUMENTS

| | | | |
|---|---|---|---|
| CN | 111240547 | A | 6/2020 |
| CN | 112286612 | A | 1/2021 |
| CN | 112416277 | A | 2/2021 |
| CN | 115202834 | A | 10/2022 |
| CN | 117980882 | A | 5/2024 |
| WO | 2015096137 | A1 | 7/2015 |
| WO | 2019128923 | A1 | 7/2019 |

OTHER PUBLICATIONS

Liu Huanzhong et al., Computer programming design Practical Tutorial, Jun. 30, 2001, total 18 pages.

* cited by examiner

CONT. FROM FIG. 3(c)

TO FIG. 7(h)

CONT. FROM FIG. 7(h)

CONT. FROM FIG. 7(l)

CONT. FROM FIG. 7(p)

P40 (remote device)

P40 (remote device)

TO FIG. 8(j)-2

P40 (local device, adaptively displayed in full screen)

CONT. FROM FIG. 8(r)-1

CONT. FROM FIG. 8(u)-1

5G
5G
08:00
Local device
MatePad1
MatePad2
APP 1
APP 2
APP 3
Finger touch location

APP 2
APP 3

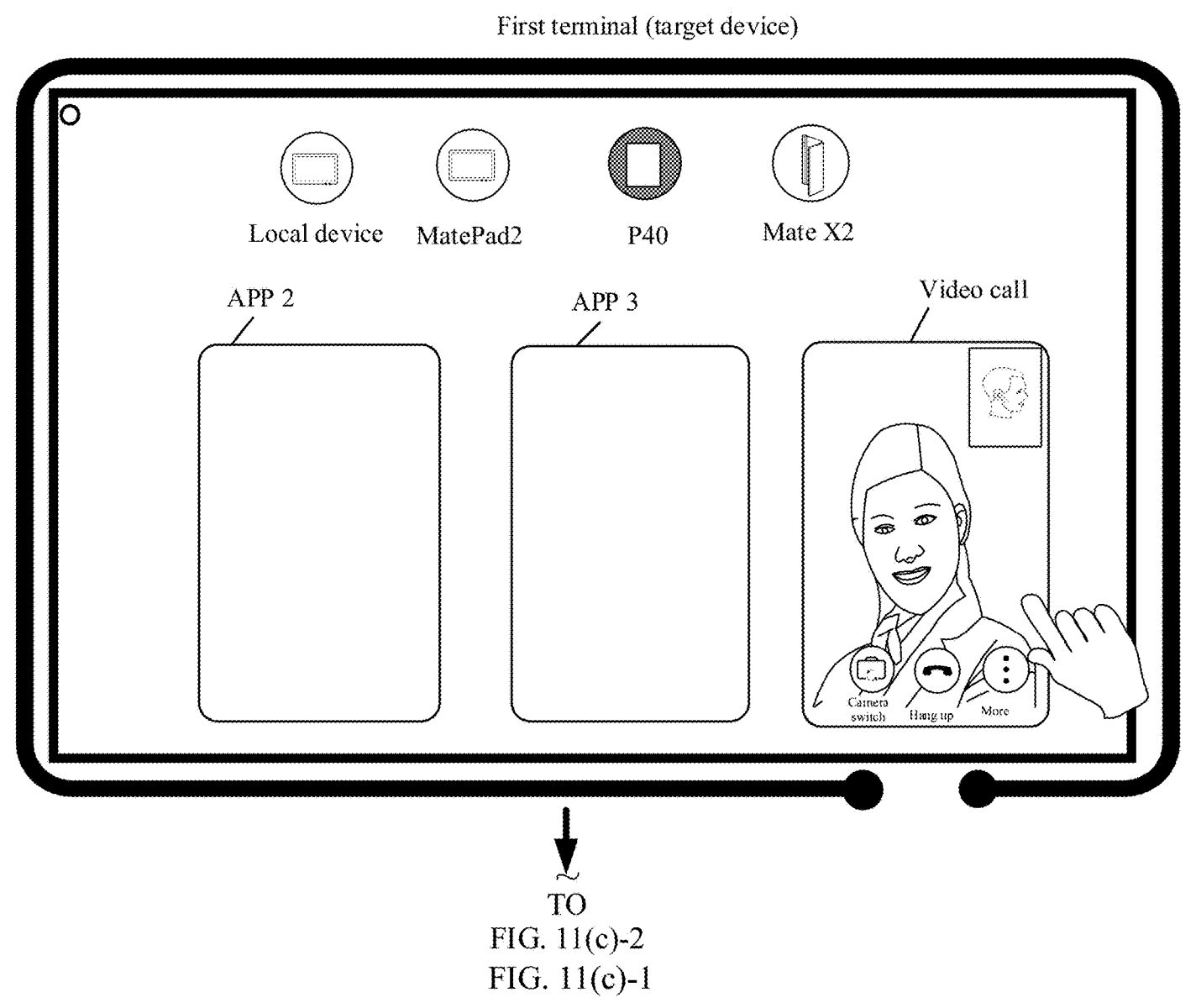

First terminal (target device)

Local device

MatePad2

P40

Mate X2

APP 2

APP 3

Video call

Camera switch

Hang up

More

TO FIG. 11(c)-2 FIG. 11(c)-1

CONT. FROM FIG. 11(c)-1

CONT. FROM FIG. 11(h)-1

TO FIG. 11(h)-4

CONT. FROM FIG. 11(h)-3

CONT. FROM FIG. 11(i)-1

TO FIG. 11(i)-4

CONT. FROM FIG. 11(i)-3

CONT. FROM FIG. 11(j)-1

TO FIG. 11(j)-4

CONT. FROM FIG. 11(k)-1

TO FIG. 11(k)-4

CONT. FROM FIG. 11(k)-3

TO FIG. 12(b)-2

CONT. FROM FIG. 13B

Third terminal (Mate X2)

CONT. FROM FIG. 15(a)

TO FIG. 15(c)

CONT. FROM FIG. 15(b)

CONT. FROM FIG. 16(f)

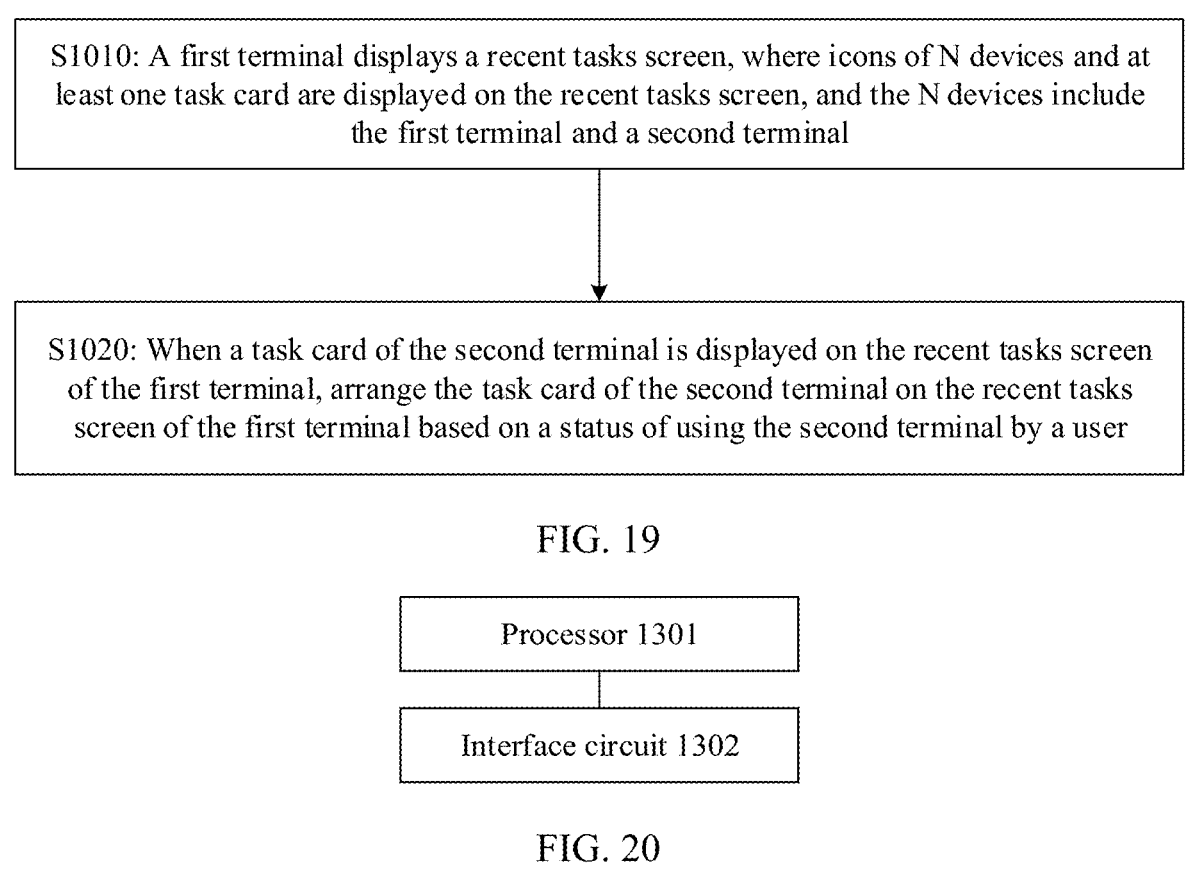

S1010: A first terminal displays a recent tasks screen, where icons of N devices and at least one task card are displayed on the recent tasks screen, and the N devices include the first terminal and a second terminal S1020: When a task card of the second terminal is displayed on the recent tasks screen of the first terminal, arrange the task card of the second terminal on the recent tasks screen of the first terminal based on a status of using the second terminal by a user

FIG. 19

Processor 1301

Interface circuit 1302

FIG. 20

SYSTEM AND METHOD FOR DISPLAYING AND CONTROLLING TASK OF REMOTE DEVICE

CROSS-REFERENCE TO RELATED APPLICATIONS

This application is a continuation of International Application No. PCT/CN2022/117047 filed on Sep. 5, 2022, which claims priority to Chinese Patent Application No. 202111057294.8 filed on Sep. 9, 2021. The disclosures of the aforementioned applications are hereby incorporated by reference in their entireties.

TECHNICAL FIELD

This application relates to the field of terminal technologies, and in particular, to a system and method for displaying and controlling a task of a remote device.

BACKGROUND

For a terminal like a mobile phone or a tablet currently used by a user, the user may usually swipe up from the bottom of a touchscreen of the terminal or tap a "multi-task" button to enter a recent tasks screen of the terminal. On the recent tasks screen, the user can query and manage recently used applications of the terminal and another terminal, to implement cross-device migration of an application.

However, currently, in a process of managing, on a recent tasks screen of a device, recently used applications of the terminal and another terminal, different cross-device operation manners (or referred to as cross-device entries) are provided for different applications (APPs), and the applications need to perform adaptation. As a result, there are various cross-device entries, third-party application adaptation is difficult, and adaptation costs are high. In addition, for an application that needs to be migrated, user operations are complex and user experience is poor in a migration process.

SUMMARY

This application provides a system and method for displaying and controlling a task of a remote device, which can help a user conveniently view and manage a historical task of another device on a device, and can be applied to almost all applications. Task cards can be flexibly arranged, task cards of different devices can be displayed, there is no need to perform adaptation by an application, and a requirement of the user for managing and controlling tasks of a plurality of devices is met. In addition, a user operation procedure during task migration is simplified, user operations are simplified, and user experience is improved.

According to a first aspect, a method for displaying and controlling a task of a remote device is provided. The method is applied to a communication system, the communication system includes N devices, and the N devices include a first terminal and a second terminal. The method includes: The first terminal displays a recent tasks screen, where icons of the N devices and at least one task card are displayed on the recent tasks screen; and when a task card of the second terminal is displayed on the recent tasks screen of the first terminal, the task card of the second terminal on the recent tasks screen of the first terminal is arranged based on a status of using the second terminal by a user, where the status of using the second terminal by the user includes any one of a landscape-mode use state, a portrait-mode use state, a portrait-mode use state in an unfolded state of a foldable screen, a landscape-mode use state in an unfolded state of a foldable screen, a landscape-mode use state in a folded state of a foldable screen, or a portrait-mode use state in a folded state of a foldable screen.

According to the method for displaying and controlling a task of a remote device provided in the first aspect, the task card of the second terminal is displayed in the single row or the plurality of rows on the recent tasks screen of the first terminal based on the status of using the second terminal by the user, a status of using the first terminal by the user, and a screen size of the first terminal. This can improve efficiency of displaying the task card of the second terminal, help the user view and manage a historical task of another device on a device, and improve user experience.

For example, the N devices may include a mobile phone, a large-screen device, a tablet computer, a PC, a head unit, a foldable screen device, and the like.

In a possible implementation of the first aspect, the first terminal displays the task card of the second terminal in a single row or a plurality of rows on the recent tasks screen of the first terminal according to any one of the following: when the second terminal is used in landscape mode, when the second terminal is used in portrait mode, when the second terminal is used in portrait mode in an unfolded state of a foldable screen, when the second terminal is used in landscape mode in an unfolded state of a foldable screen, when the second terminal is used in landscape mode in a folded state of a foldable screen, or when the second terminal is used in portrait mode in a folded state of a foldable screen. In this implementation, the task card of the second terminal is displayed in the single row or the plurality of rows on the recent tasks screen of the first terminal based on the status of using the second terminal by the user, the status of using the first terminal by the user, and the screen size of the first terminal. This can improve the efficiency of displaying the task card of the second terminal, help the user view and manage the historical task of the another device on the one device, and improve user experience.

In a possible implementation of the first aspect, when the task card of the second terminal is displayed on the recent tasks screen of the first terminal, the task card of the second terminal includes a task card of a first home screen snapshot of the second terminal. In this implementation, a home screen snapshot of the second terminal may be displayed on the recent tasks screen of the first terminal, to help the user view the home screen snapshot and improve user experience.

In a possible implementation of the first aspect, the method further includes: The first terminal receives a first operation performed by the user on the task card of the first home screen snapshot of the second terminal; and the first terminal displays a task card of a second home screen snapshot of the second terminal on the recent tasks screen of the first terminal based on the first operation of the user. In this implementation, the user may view different home screen snapshots of the second terminal, thereby improving user experience.

In a possible implementation of the first aspect, the method further includes: The first terminal receives a second operation performed by the user on the task card of the first home screen snapshot of the second terminal or the task card of the second home screen snapshot of the second terminal; and the first terminal displays an interface of a first home screen of the second terminal or an interface of a second home screen of the second terminal based on the second operation, or the first terminal runs an application on the interface of the first home screen of the second terminal or an application on the interface of the second home screen of the second terminal. In this implementation, the user may operate applications on the different home screen snapshots of the second terminal, to quickly display or open the applications on the first terminal. The operations are simple, and user experience is improved.

In a possible implementation of the first aspect, there is at least one of an FA card, a floating window, or a floating bubble on the task card of the first home screen snapshot of the second terminal and/or the task card of the second home screen snapshot of the second terminal. In this implementation, the FA card, the floating window, or the floating bubble may be displayed on the home screen snapshot of the second terminal, and the task card of the second terminal may be flexibly displayed on the recent tasks screen of the first terminal in different manners. This improves user experience.

In a possible implementation of the first aspect, the method further includes: The first terminal receives a third operation performed by the user on the FA card, the floating window, or the floating bubble; and based on the third operation, the first terminal displays the interface of the first home screen of the second terminal or the interface of the second home screen of the second terminal on the first terminal, or runs an application corresponding to the FA card, the floating window, or the floating bubble on the first terminal. In this implementation, the user may perform an operation on the FA card, the floating window, or the floating bubble on the home screen snapshot of the second terminal, to quickly display or open the application on the first terminal. The operations are simple, and user experience is improved.

In a possible implementation of the first aspect, when the task card of the second terminal is displayed on the recent tasks screen of the first terminal, the task card of the second terminal includes a snapshot of a control device configured to control the second terminal. In this implementation, a task card related to the second terminal may be flexibly displayed on the recent tasks screen of the first terminal. This improves user experience.

In a possible implementation of the first aspect, the method further includes: The first terminal receives a fourth operation performed by the user on the snapshot of the control device; and based on the fourth operation, the first terminal displays a details interface of the control device on the first terminal, or remotely controls the second terminal. In this implementation, the user may view, on the first terminal, a task card of the control device configured to control the second device, and may perform an operation on the task card, to quickly control the second terminal device on the first terminal. The operations are simple, and user experience is improved.

For example, the second terminal is a large-screen device, and the control device is a remote control.

In a possible implementation of the first aspect, when the task card of the second terminal is displayed on the recent tasks screen of the first terminal, the task card of the second terminal includes a task card of a home screen application of the second terminal.

In a possible implementation of the first aspect, the method further includes: The first terminal receives a fifth operation performed by the user on the task card of the home screen application of the second terminal; and the first terminal manages the home screen application of the second terminal on the first terminal based on the fifth operation. In this implementation, the user may view an icon of the home screen application of the second terminal on the first terminal, and may perform an operation on the icon of the home screen application. This helps the second terminal manage applications (sorting, creating a folder, deleting, and the like), and quickly help the second terminal manage the applications on the first terminal. The operations are simple, and user experience is improved.

In a possible implementation of the first aspect, the N devices include a lite device. The lite device includes a wearable device or a smart home device used by the user. When a task card of the lite device is displayed on the recent tasks screen of the first terminal, the task card of the lite device includes task cards respectively corresponding to ongoing tasks of different lite devices. In this implementation, the task card of the lite device can be displayed on the recent tasks screen of the first terminal. This enriches types of task cards displayed on the recent tasks screen of the first terminal, and is user-friendly.

For example, the lite device is a general term for devices such as an IoT device, a wearable device, and a smart home device. For example, the lite device may include a smart refrigerator, a smart air conditioner, a smart cooking pot, a smart range hood, a smart sound box, a smartwatch, and the like.

In a possible implementation of the first aspect, the method further includes: The first terminal receives a sixth operation performed by the user on the task card of the device; and on the first terminal based on the sixth operation, the first terminal displays a details interface of an ongoing task of the lite device, or remotely controls an ongoing task of the lite device. In this implementation, the user may view, on the first terminal, a task card corresponding to an ongoing task of a related lite device, and may perform an operation on the card corresponding to the ongoing task of the lite device, to remotely control the ongoing task of the lite device. The operations are simple, and user experience is improved.

In a possible implementation of the first aspect, the N devices include a third terminal, and the method further includes: The first terminal receives a seventh operation performed by the user on the task card of the lite device; the first terminal shares the task card of the lite device with the third terminal based on the seventh operation; and the third terminal displays the task card of the lite device on a recent tasks screen. In this implementation, the task card of the lite device may be pushed to the third terminal for display, so that the user can control the ongoing task of the lite device on the third terminal. This improves user experience.

In a possible implementation of the first aspect, the method further includes: A task card corresponding to an ongoing task of a second lite device is displayed on a display interface of a first lite device, where the lite device includes the first lite device and the second lite device; the first lite device receives an eighth operation performed by the user on the task card corresponding to the ongoing task of the second lite device; and the first lite device remotely controls the ongoing task of the second lite device based on the eighth operation. In this implementation, the user may remotely control an ongoing task of another lite device on a lite device. The operations are simple, and user experience is improved.

In a possible implementation of the first aspect, the method further includes: verifying an identity of the user by using the first lite device and/or a device related to the first lite device; and after verification on the identity of the user succeeds, displaying a task card of the first terminal and/or the second terminal on the display interface of the first lite device.

In a possible implementation of the first aspect, the method further includes: The first lite device receives a ninth operation performed by the user on the task card of the first terminal and/or the second terminal; and the first lite device remotely controls, based on the ninth operation, an application corresponding to the task card of the first terminal and/or the second terminal. In this implementation, the user may remotely control a historical task card and a foreground task card of another smart terminal on the lite device. The operations are simple, and user experience is improved.

In a possible implementation of the first aspect, the method further includes: When the task card of the second terminal is displayed on the recent tasks screen of the first terminal, the first terminal receives a tenth operation performed by the user on a first task card in the task card of the second terminal, where the tenth operation is used to start a first application corresponding to the first task card on the first terminal; the first terminal runs the first application on the first terminal based on the tenth operation; and the first terminal and the second terminal determine a running status of the first application based on different modes of migrating the first application to the first terminal. In this implementation, after starting an application of another terminal, the first terminal may determine, based on different modes of migrating the application to the first terminal, to display a running status of the application on the first terminal. This ensures efficiency of running the application on the first terminal, and improves user experience.

In a possible implementation of the first aspect, that the first terminal and the second terminal determine a running status of the first application based on different modes of migrating the first application to the first terminal includes: When the first application is migrated to the first terminal in a copying mode, the first terminal and the second terminal separately and independently run the first application, where data and operation statuses of the first application on the first terminal and the second terminal are synchronized; and the first terminal and the second terminal separately adaptively display the first application based on respective screens.

In a possible implementation of the first aspect, the method further includes: The second terminal receives an eleventh operation performed by the user on the first application, where the eleventh operation is used to pull back the first application from the first terminal; and after the second terminal receives the eleventh operation, the first terminal continues to run the first application. In this implementation, normal running of the first application can be ensured.

In a possible implementation of the first aspect, that the first terminal and the second terminal determine a running status of the first application based on different modes of migrating the first application to the first terminal includes: When the first application is migrated to the first terminal in a window projection technology-based migration mode, and the first application supports a plurality of instances, the first terminal and the second terminal separately and independently run the first application, where data of the first application on the first terminal and the second terminal is synchronized, but operation statuses are not synchronized; and the first terminal and the second terminal separately adaptively display the first application based on respective screens.

In a possible implementation of the first aspect, the method further includes: The second terminal receives a twelfth operation performed by the user on the first application, where the twelfth operation is used to pull back the first application from the first terminal; and after the second terminal receives the twelfth operation, the first terminal continues to run the first application.

In a possible implementation of the first aspect, that the first terminal and the second terminal determine a running status of the first application based on different modes of migrating the first application to the first terminal includes: When the first application is migrated to the first terminal in a window projection technology-based migration mode, and the first application does not support a plurality of instances, the first terminal or the second terminal runs the first application in a same time period.

In a possible implementation of the first aspect, the method further includes: The second terminal receives a thirteenth operation performed by the user on the first application, where the thirteenth operation is used to pull back the first application from the first terminal; and after the second terminal receives the thirteenth operation, the first terminal exits running of the first application, and the second terminal runs the first application. For example, refer to descriptions corresponding to Example 15. For brevity, details are not described herein again.

In a possible implementation of the first aspect, that the first terminal and the second terminal determine a running status of the first application based on different modes of migrating the first application to the first terminal includes: When the first application is migrated to the first terminal in an FA technology-based migration mode, before the terminal runs the first application, the first terminal installs the first application or an FA of the first application; the first terminal and the second terminal separately and independently run the first application, where data of the first application on the first terminal and the second terminal is synchronized, but operation statuses are not synchronized; and the first terminal and the second terminal separately adaptively display the first application based on respective screens.

In a possible implementation of the first aspect, the method further includes: The second terminal receives a fourteenth operation performed by the user on the first application, where the fourteenth operation is used to pull back the first application from the first terminal; and after the second terminal receives the fourteenth operation, the first terminal continues to run the first application. In this implementation, normal running of the first application can be ensured, and user experience is improved.

In a possible implementation of the first aspect, an area of a screen of the first terminal is greater than an area of a screen of the second terminal, and the running the first application on the first terminal after the first application is started on the first terminal includes: automatically displaying and running the first application on the first terminal in a floating window or in a full-screen manner. In this implementation, the first application may be displayed and run on the first terminal in a floating window or in a full-screen manner. This improves user experience. For example, the first terminal may be a PC device.

In a possible implementation of the first aspect, the area of the screen of the first terminal is greater than the area of the screen of the second terminal, and after the first application is started on the first terminal, the method further includes: Prompt information is displayed on an interface of the first terminal, where the prompt information is used to prompt the user to display the first application in a floating window or in a full-screen manner; and the first terminal displays the first application on the first terminal in a floating window or in a full-screen manner based on a selection of the user. In this implementation, the first application may be displayed and run on the first terminal in a floating window or in a full-screen manner based on the selection of the user. This improves user experience. For example, the first terminal may be a PC device.

In a possible implementation of the first aspect, after the first application is started on the first terminal, the method further includes: when a screen width of the first terminal is greater than a screen width of the second terminal, displaying the first application on the first terminal in an APP Multiplier manner, and displaying the first application on the second terminal in a manner different from the APP Multiplier manner; or when a screen width of the first terminal is less than a screen width of the second terminal, displaying the first application on the first terminal in a manner different from an APP Multiplier manner, and displaying the first application on the second terminal in the APP Multiplier manner; or when the first application is displayed on the second terminal in landscape mode, displaying the first application on the first terminal in landscape mode; or when the first application is displayed on the second terminal in portrait mode, displaying the first application on the second terminal in portrait mode. In this implementation, the first application may be flexibly displayed and run in different modes based on screen sizes of the first terminal and the second terminal, to improve user experience.

In a possible implementation of the first aspect, in a process in which the first terminal runs the first application, the method further includes: After a distance between the first terminal and the second terminal is greater than a preset first distance, displaying first prompt information and second prompt information on an interface of the first terminal, where the first prompt information notifies the user that the first terminal and the second terminal are to release a communication connection, and the second prompt information notifies the user that the first application is from the second terminal. In this implementation, the prompt information is displayed to the user, so that the user can learn of a communication connection status. In this way, user experience is improved.

In a possible implementation of the first aspect, in the process in which the first terminal runs the first application, the method further includes: After the communication connection between the first terminal and the second terminal is released, the first terminal displays the first application by using a mask, and displays one piece of third prompt information, fourth prompt information, and fifth prompt information on an interface of the first terminal, where the third prompt information prompts the user that the communication connection between the first terminal and the second terminal is released, the fourth prompt information prompts the user to exit the first application, and the fifth prompt information prompts the user to reconnect the first terminal to the second terminal.

In a possible implementation of the first aspect, the method further includes: After the first terminal and the second terminal meet a preset condition, the first terminal is automatically reconnected to the second terminal; and after reconnection succeeds, the first terminal restores normal display and runs the first application. In this implementation, connection status prompt information, automatic reconnection prompt information, and application exit prompt information are displayed to the user, and automatic reconnection is performed after the condition is met, thereby ensuring that tasks are migrated in sequence and improving user experience.

In a possible implementation of the first aspect, the method further includes: The first terminal receives a fifteenth operation performed by the user on a second task card on the recent tasks screen of the first terminal, where the fifteenth operation is used to migrate a second application corresponding to the second task card to a target device for running, and the N devices include the target device; the first terminal determines the target device based on the fifteenth operation; and the target device runs the second application. In this implementation, the user can conveniently determine the target device to which the task card needs to be migrated. Operations are simple and easy to implement, and user experience is improved.

In a possible implementation of the first aspect, that the first terminal determines the target device based on the fifteenth operation includes: When the user touches and holds the second task card, a task card other than the second task card and an icon of a device that cannot run the second application are hidden on the recent tasks screen of the first terminal; and the first terminal determines, based on an operation of the user, the target device from device icons displayed on the recent tasks screen of the first terminal. In this implementation, an icon of an unavailable device and another task card are hidden, so that the user determines the target device to which the task card needs to be migrated, and efficiency of determining the target device by the user is improved.

In a possible implementation of the first aspect, that the first terminal determines the target device based on the fifteenth operation includes: when the user drags the second task card, and the second task card overlaps an identifier of a fourth terminal, determining that the fourth terminal is the target device, where the N devices include the fourth terminal.

In a possible implementation of the first aspect, that the first terminal determines the target device based on the fifteenth operation includes: when the user drags the second task card, and the second task card overlaps identifiers of both a fourth terminal and a fifth terminal, determining a terminal device indicated by a device icon having a largest overlapping area as the target device, where the N devices include the fourth terminal and the fifth terminal. In this implementation, operations are simple and easy to implement, and accuracy of determining the target device can be improved.

In a possible implementation of the first aspect, that the first terminal determines the target device based on the fifteenth operation includes: after the user drags the second task card to slide up, and a movement distance of the second task card is greater than a preset distance, determining a device indicated by a device icon right above the second task card as the target device. In this implementation, operations are simple and easy to implement, and accuracy of determining the target device can be improved.

In a possible implementation of the first aspect, that the first terminal determines the target device based on the fifteenth operation includes: after the user drags the second task card to slide up, and a distance between the second task card and the top of the screen of the first terminal is less than a preset distance, determining a device indicated by a device icon right above the second task card as the target device. In this implementation, operations are simple and easy to implement, and accuracy of determining the target device can be improved.

In a possible implementation of the first aspect, after the target device is determined, in a process in which the user drags the second task card to slide up to the target device, an area of the second task card decreases as a distance between the second task card and an icon of the target device decreases. In this implementation, operations are simple and easy to implement, and accuracy of determining the target device can be improved.

In a possible implementation of the first aspect, after the target device is determined, the method further includes: when the second task card does not overlap the icon of the target device, moving the icon of the target device downward by a preset distance, or changing a display status of the icon of the target device to a selected state. In this implementation, it may be convenient for the user to view the selected target device, and user experience is improved.

In a possible implementation of the first aspect, after the target device is determined, the method further includes: When the second task card dragged by the user does not overlap the icon of the target device, the user releases the second task card, so that the second task card automatically migrates to the target device; and the target device runs the second application. In this implementation, after the target device is determined, but a task card does not reach an icon touch target of the target device, if the user releases the task card, the task card automatically fly to the device icon, to complete cross-device interaction. This improves cross-device interaction efficiency of the task.

In a possible implementation of the first aspect, after the target device is determined, the method further includes: The first terminal receives a sixteenth operation performed by the user on the second task card on the recent tasks screen of the first terminal, where the sixteenth operation is used to select a new target device. In this implementation, the selected target device is changed by performing an operation on the task card by the user. This improves efficiency of changing the target device.

In a possible implementation of the first aspect, before the target device runs the second application when a screen of the target device is off, the method further includes: The target device automatically turns on the screen; the target device displays an unlock interface after the target device automatically turns on the screen; and the target device receives an unlock operation of the user. In this implementation, the target device automatically turns on the screen, and triggers unlocking after the screen is turned on, and then the user manually unlocks the screen, so that the target device can normally run a migration task, and task migration efficiency is ensured.

In a possible implementation of the first aspect, before the target device runs the second application when a screen of the target device is off, the method further includes: The target device automatically turns on the screen and displays an unlock interface; and the target device receives an unlock operation of the user. In this implementation, the target device automatically turns on the screen, and after the screen is turned on, the target device automatically triggers the user to manually unlock the screen. This improves task migration efficiency in the premise of ensuring that the target device can normally run a migration task.

In a possible implementation of the first aspect, before the target device runs the second application when a screen of the target device is off, the method further includes: The target device automatically turns on the screen and automatically unlocks the screen. In this implementation, the target device automatically turns on the screen and automatically unlocks the screen. This improves task migration efficiency in the premise of ensuring that the target device can normally run a migration task.

In a possible implementation of the first aspect, a source device corresponding to the second application is the first terminal, and that the target device runs the second application includes: The target device runs the second application on the target device by using a hardware capability of the first terminal; or the target device runs the second application on the target device by using hardware capabilities of the first terminal and the target device; or the target device runs the second application on the target device by using a hardware capability of the target device, and the first terminal releases a hardware capability occupied by the first terminal; or the target device runs the second application on the target device by using a hardware capability of the target device, and the first terminal does not release a hardware capability occupied by the second application. In this implementation, different allocation rules are used for the hardware capability of the first terminal and the hardware capability of the target device, to ensure that a migrated task can be normally run on the target device, and improve task migration efficiency.

In a possible implementation of the first aspect, the method further includes: In a process in which the target device runs the second application by using the hardware capability of the target device, the target device receives an instruction for running a third application, where a hardware capability used to run the third application on the target device conflicts with the hardware capability used to run the second application; the target device runs the third application by using the hardware capability of the target device; and the second application is switched back to the first terminal device, and the second application continues to be run by using the hardware capability of the first terminal. In this implementation, after a task is migrated from a source device to a target device, when a new task from the target device preempts hardware, a hardware capability of the source device may be used through coordination, to ensure that the task of the target device is preferentially executed. This can ensure that the task of the target device is preferentially executed.

In a possible implementation of the first aspect, the method further includes: In a process in which the target device runs the second application by using the hardware capability of the target device, the target device receives an instruction for running a third application, where a hardware capability used to run the third application on the target device conflicts with the hardware capability used to run the second application; and the target device simultaneously runs the second application and the third application by using the hardware capability of the target terminal. In this implementation, after a task is migrated from a source device to a target device, when a new task from the target device preempts hardware, a hardware capability of the target device may be separated based on the tasks to support a plurality of tasks at the same time. This can ensure that both the task of the target device and the migrated task can be run normally, and improve running efficiency of the task of the target device.

In a possible implementation of the first aspect, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; the target device suspends running the second application; the first terminal runs the fourth application by using the hardware capability of the first terminal; and after the first terminal finishes running the fourth application, the target device continues to run the second application by using the hardware capability of the first terminal. In this implementation, after a task is migrated from a source device to a target device, when a new task from the source device preempts hardware, the migrated task on the target device is suspended. After the new task is ended on the source device, the migrated task on the target device automatically continues. This can ensure that a new task on the source device is preferentially executed.

In a possible implementation of the first aspect, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; and the target device switches to continue to run the second application by using the hardware capability of the target device, and the first terminal runs the fourth application by using the hardware capability of the first terminal. In this implementation, after a task is migrated from a source device to a target device, when a new task from the source device preempts hardware, the source device executes the new task by using a hardware capability of the source device, and the target device executes, by using a hardware capability of the target device, the task migrated from the source device. This can ensure that both the task on the source device and the migrated task can be run normally, and improve task running efficiency.

In a possible implementation of the first aspect, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; and the target device continues to run the second application by using the hardware capability of the first terminal, and the first terminal runs the fourth application by using the hardware capability of the first terminal. In this implementation, after a task is migrated from a source device to a target device, when a new task from the source device preempts hardware, a hardware capability of the source device may be separated based on the tasks to support a plurality of tasks at the same time. This can ensure that both the task of the source device and the migrated task can be run normally, and improve running efficiency of the task of the source device.

In a possible implementation of the first aspect, the method further includes: The first terminal receives a seventeenth operation performed by the user on a fifth task card on the recent tasks screen of the first terminal, where the seventeenth operation is used to install a fifth application corresponding to the fifth task card on the first terminal or another device in the N devices; and the first terminal or the another device in the N devices installs the fifth application based on the seventeenth operation. In this implementation, a multi-device task center is used to help the another device or the first terminal install an application. Operations are convenient, application installation efficiency is improved, and user experience is improved.

In a possible implementation of the first aspect, the method further includes: The first terminal receives an eighteenth operation performed by the user on a sixth task card and a seventh task card on the recent tasks screen of the first terminal, where the eighteenth operation is used to display applications corresponding to the sixth task card and the seventh task card on the first terminal or another device in the N devices in a first display manner; and the first terminal or the another device in the N devices displays the applications corresponding to the sixth task card and the seventh task card in the first display manner.

For example, the first display manner is a split-screen display manner; or the application corresponding to the sixth task card is displayed in full screen, and the application corresponding to the seventh task card is displayed in a floating window; or the application corresponding to the sixth task card is displayed in a floating window, and the application corresponding to the seventh task card is displayed in a floating window. In this implementation, by using a multi-device task center, the user quickly performs split-screen viewing or establishes a floating window on the first terminal or cross devices. Operations are convenient, and a new task card is convenient to form. In addition, the new task card may be displayed in different manners. This improves diversity and flexibility of the task card.

According to a second aspect, a system for displaying and controlling a task of a remote device is provided. The system includes N devices, and the N devices include a first terminal and a second terminal. The first terminal is configured to display a recent tasks screen, where icons of the N devices and at least one task card are displayed on the recent tasks screen; and when a task card of the second terminal is displayed on the recent tasks screen of the first terminal, the first terminal is further configured to display the task card of the second terminal in a single row or a plurality of rows on the recent tasks screen of the first terminal according to any one of the following: when the second terminal is used in landscape mode, when the second terminal is used in portrait mode, when the second terminal is used in portrait mode in an unfolded state of a foldable screen, when the second terminal is used in landscape mode in an unfolded state of a foldable screen, when the second terminal is used in landscape mode in a folded state of a foldable screen, or when the second terminal is used in portrait mode in a folded state of a foldable screen.

According to the system for displaying and controlling a task of a remote device provided in the second aspect, the task card of the second terminal is displayed in the single row or the plurality of rows on the recent tasks screen of the first terminal based on a status of using the second terminal by a user, a status of using the first terminal by the user, and a screen size of the first terminal. This can improve efficiency of displaying the task card of the second terminal, help the user view and manage a historical task of another device on a device, and improve user experience.

In a possible implementation of the second aspect, the task card of the second terminal includes a task card of a first home screen snapshot of the second terminal and a task card of a second home screen snapshot of the second terminal.

In a possible implementation of the second aspect, there is at least one of a feature ability FA card, a floating window, or a floating bubble on the task card of the first home screen snapshot of the second terminal and/or the task card of the second home screen snapshot of the second terminal.

In a possible implementation of the second aspect, the N devices include a lite device. The lite device includes a wearable device or a smart home device used by the user, and the first terminal is further configured to display a task card of the lite device on the recent tasks screen of the first terminal, where the task card of the lite device includes task cards respectively corresponding to ongoing tasks of different lite devices.

In a possible implementation of the second aspect, a source device corresponding to a first application is the second terminal, and in a process of migrating the first application to the first terminal for running, the first terminal and the second terminal are further configured to determine a running status of the first application based on different modes of migrating the first application to the first terminal, where the different modes of migrating the first application to the first terminal include a copying mode, a window projection technology-based migration mode, and a feature ability FA technology-based migration mode.

In a possible implementation of the second aspect, a source device corresponding to a second application is the first terminal, and in a process of migrating the second application to the second terminal for running, the second terminal is further configured to: run the second application on the second terminal by using a hardware capability of the first terminal; or run the second application on the second terminal by using hardware capabilities of the first terminal and the second terminal; or run the second application on the second terminal by using a hardware capability of the second terminal, where the first terminal releases a hardware capability occupied by the second application; or run the second application on the second terminal by using a hardware capability of the second terminal, where the first terminal does not release a hardware capability occupied by the second application.

According to a third aspect, a method for displaying and controlling a task of a remote device is provided, where the method is applied to a first terminal, and the method includes: The first terminal displays a recent tasks screen, where icons of N devices and at least one task card are displayed on the recent tasks screen, and the N devices include the first terminal and a second terminal; and when a task card of the second terminal is displayed on the recent tasks screen of the first terminal, displaying the task card of the second terminal in a single row or a plurality of rows on the recent tasks screen of the first terminal according to any one of the following: when the second terminal is used in landscape mode, when the second terminal is used in portrait mode, when the second terminal is used in portrait mode in an unfolded state of a foldable screen, when the second terminal is used in landscape mode in an unfolded state of a foldable screen, when the second terminal is used in landscape mode in a folded state of a foldable screen, or when the second terminal is used in portrait mode in a folded state of a foldable screen.

According to the method for displaying and controlling a task of a remote device provided in the third aspect, the task card of the second terminal is displayed in the single row or the plurality of rows on the recent tasks screen of the first terminal based on a status of using the second terminal by a user, a status of using the first terminal by the user, and a screen size of the first terminal. This can improve efficiency of displaying the task card of the second terminal, help the user view and manage a historical task of another device on a device, and improve user experience.

In a possible implementation of the third aspect, the task card of the second terminal includes a task card of a first home screen snapshot of the second terminal and a task card of a second home screen snapshot of the second terminal.

In a possible implementation of the third aspect, there is at least one of a feature ability FA card, a floating window, or a floating bubble on the task card of the first home screen snapshot of the second terminal and/or the task card of the second home screen snapshot of the second terminal.

In a possible implementation of the third aspect, the N devices include a lite device, the lite device includes a wearable device or a smart home device used by the user, and the method further includes:

displaying a task card of the lite device on the recent tasks screen of the first terminal, where the task card of the lite device includes task cards respectively corresponding to ongoing tasks of different lite devices.

In a possible implementation of the third aspect, a source device corresponding to a first application is the second terminal, and in a process of migrating the first application to the first terminal for running, the method further includes: The first terminal determines a running status of the first application based on different modes of migrating the first application to the first terminal, where the different modes of migrating the first application to the first terminal includes a copying mode, a window projection technology-based migration mode, and a feature ability FA technology-based migration mode.

In a possible implementation of the third aspect, a source device corresponding to a second application is the first terminal, and in a process of migrating the second application to the second terminal for running, the method further includes: The first terminal releases a hardware capability that is of the first terminal and that is occupied by the second application; or the first terminal does not releases a hardware capability that is of the first terminal and that is occupied by the second application.

According to a fourth aspect, a communication apparatus is provided. The communication apparatus includes units configured to perform the steps performed by the first terminal or the second terminal in any one of the first aspect or the possible implementations of the first aspect, or the communication apparatus includes units configured to perform the steps in any one of the third aspect or the possible implementations of the third aspect.

According to a fifth aspect, a communication apparatus is provided. The communication apparatus includes at least one processor and a memory, the processor is coupled to the memory, the memory stores program instructions, and when the program instructions stored in the memory are executed by the processor, the steps performed by the first terminal or the second terminal in any one of the first aspect or the possible implementations of the first aspect are performed, or the steps in any one of the third aspect or the possible implementations of the third aspect are performed.

According to a sixth aspect, a communication apparatus is provided. The communication apparatus includes at least one processor and an interface circuit. The at least one processor is configured to perform the steps performed by the first terminal or the second terminal in any one of the first aspect or the possible implementations of the first aspect, or the steps in any one of the third aspect or the possible implementations of the third aspect.

According to a seventh aspect, a terminal device is provided. The terminal device includes any communication apparatus provided in the third aspect, the fourth aspect, or the fifth aspect.

According to an eighth aspect, a system for displaying and controlling a task of a remote device is provided. The system includes the first terminal and the second terminal in the first aspect.

Optionally, the system may further include the third terminal and the fourth terminal in the first aspect.

According to a ninth aspect, a computer program product is provided. The computer program product includes a computer program, and when the computer program is executed by a processor, the computer program is used to perform the steps performed by the first terminal or the second terminal in any one of the first aspect or the possible implementations of the first aspect, or is used to perform the steps in the third aspect or any possible implementation of the third aspect.

According to a tenth aspect, a computer-readable storage medium is provided. The computer-readable storage medium stores a computer program, and when the computer program is executed, the computer program is used to perform the steps performed by the first terminal or the second terminal in any one of the first aspect or the possible implementations of the first aspect, or is used to perform the steps in the third aspect or any possible implementation of the third aspect.

According to an eleventh aspect, a chip is provided. The chip includes: a processor, configured to invoke a computer program from a memory and run the computer program, so that a communication device on which the chip is installed performs the steps performed by the first terminal or the second terminal in any one of the first aspect or the possible implementations of the first aspect, or performs the steps in any one of the third aspect or the possible implementations of the third aspect.

BRIEF DESCRIPTION OF DRAWINGS

FIG. 3(*c*) and FIG. 3(*d*) are schematic diagrams of interfaces for establishing a trust relationship between devices according to this application;

FIG. 7(*r*) and FIG. 7(*s*) are schematic diagrams of interfaces for displaying a task card of another device on a lite device according to this application;

FIG. 8(*b*)-1 to FIG. 8(*n*) are schematic diagrams of interfaces of running statuses of a first application on different devices based on different migration modes according to this application;

FIG. 8(*o*) and FIG. 8(*p*) are schematic diagrams of interfaces for performing an operation on a task card on a recent tasks screen of a first terminal to help another device install an application according to this application;

FIG. 8(*q*) to FIG. 8(*u*)-2 are schematic diagrams of interfaces in which different task cards are operated on a recent tasks screen of a first terminal to establish different display forms of a plurality of task cards according to this application;

FIG. 8(*v*) and FIG. 8(*w*) are schematic diagrams of interfaces displayed after a connection between a source device and a target device is interrupted after task migration according to this application;

FIG. 12(*b*)-1 and FIG. 12(*b*)-2 are a schematic diagram of an interface of displaying a task card of a PC device on a recent tasks screen of a head unit according to this application;

FIG. 12(*c*)-1 and FIG. 12(*c*)-2 are a schematic diagram of an interface of displaying a task card of a mobile phone on a recent tasks screen of a PC device according to this application;

FIG. 19 is a schematic flowchart provided by an embodiment of this application; and FIG. 20 is a schematic diagram of a chip system according to an embodiment of this application.

DESCRIPTION OF EMBODIMENTS

Figure 1:
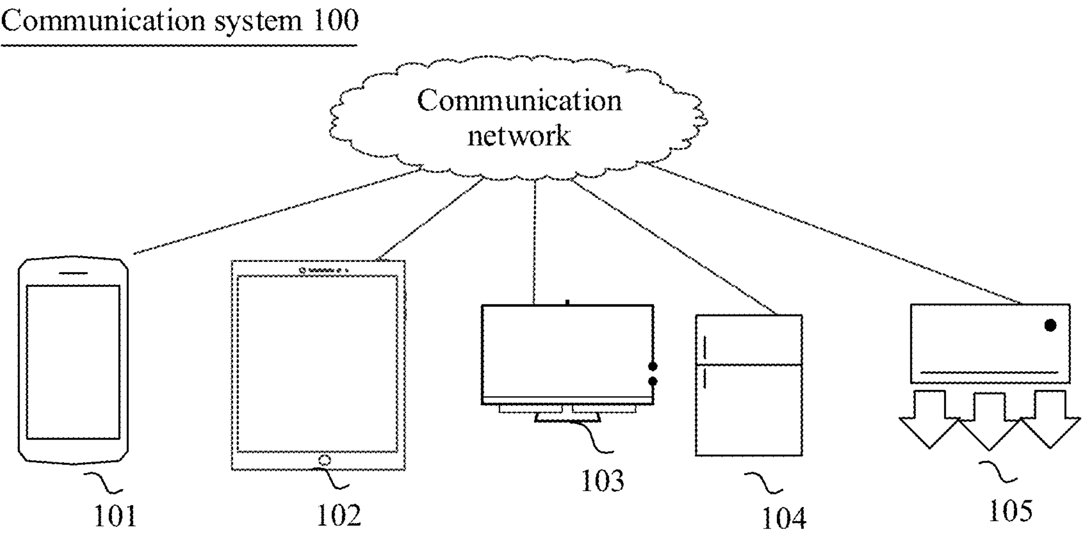
FIG. 1 is a schematic diagram of a communication system applicable to an embodiment of this application.
Figure 2A:
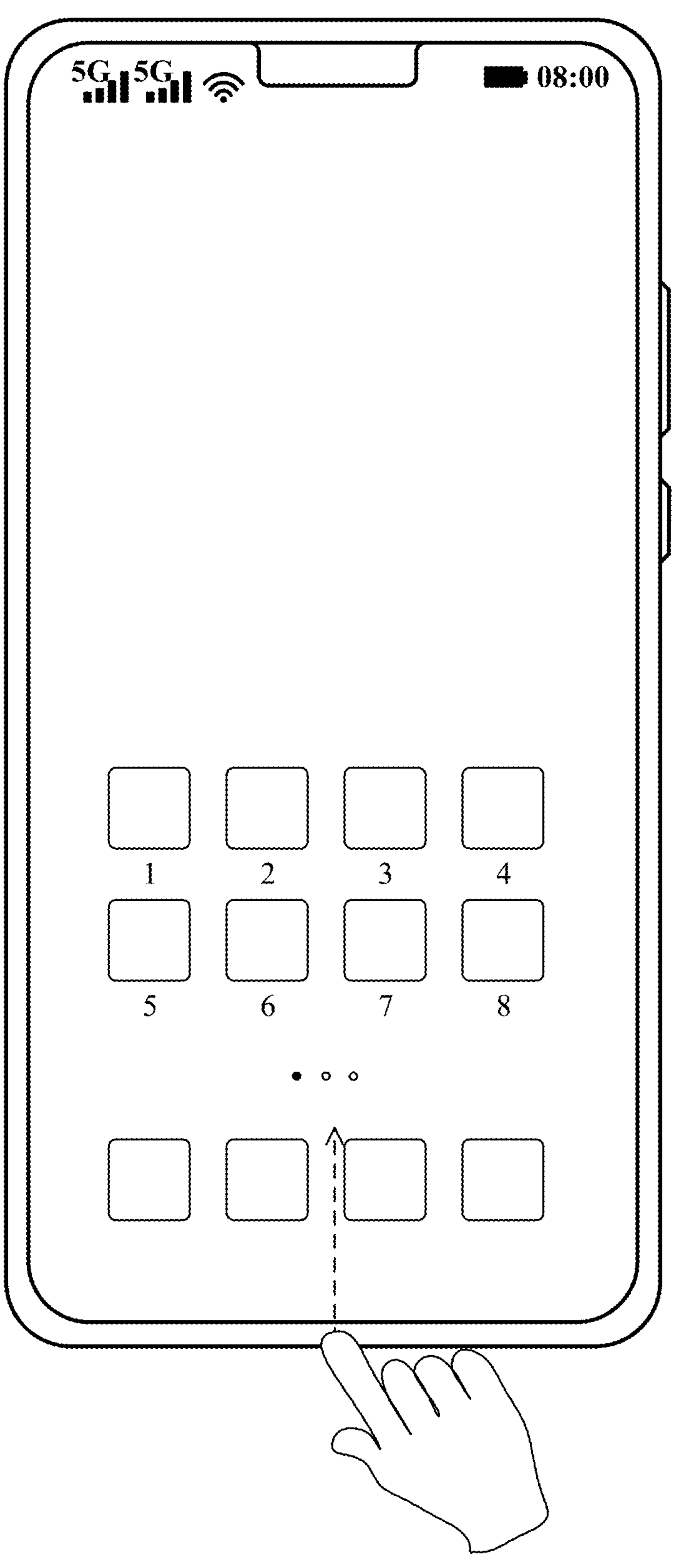
FIG. 2(*a*) to FIG. 2(*c*) are schematic diagrams of interfaces for displaying a recent tasks screen and performing a swipe operation on the recent tasks screen according to this application.
Figure 2B:
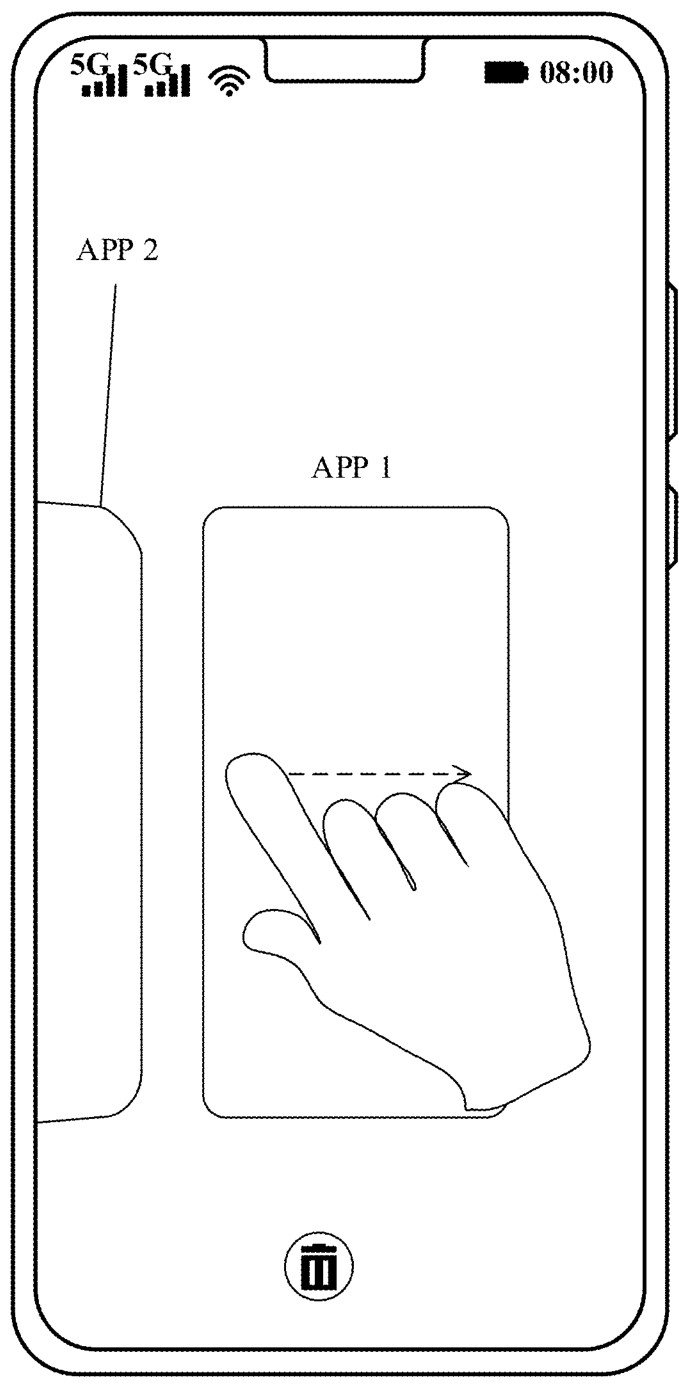
Figure 2C:
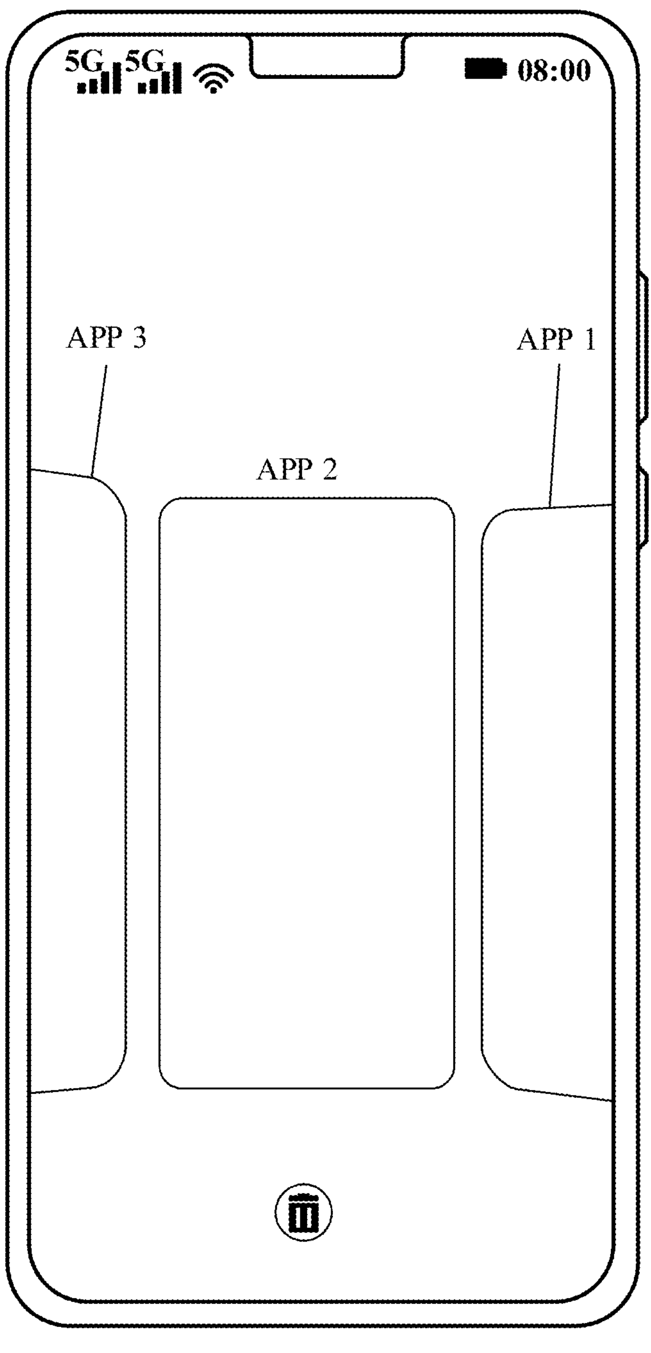
Figure 3A:
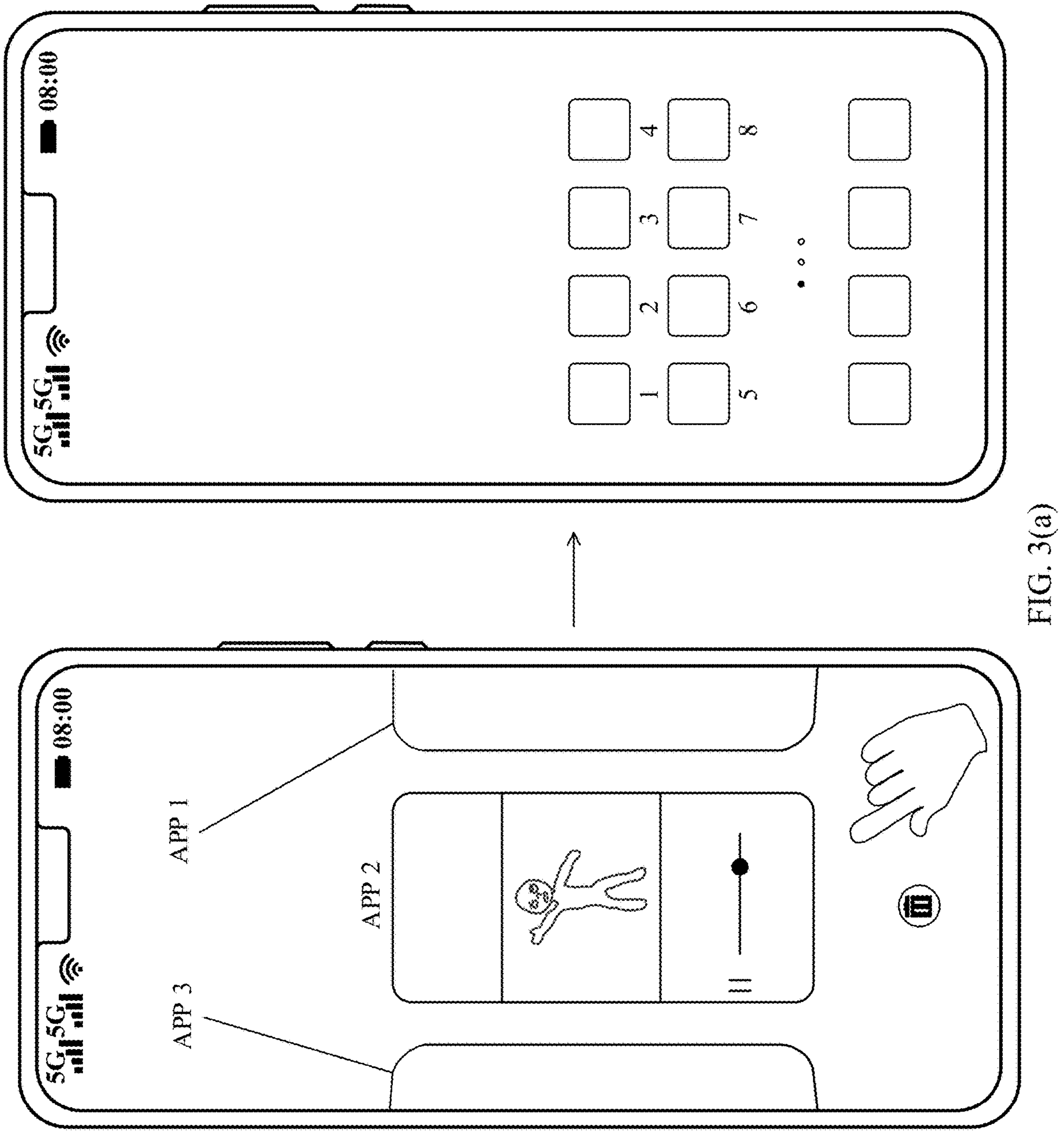
FIG. 3(*a*) and FIG. 3(*b*) are schematic diagrams of interfaces for performing a touch operation on a recent tasks screen according to this application.
Figure 3B:
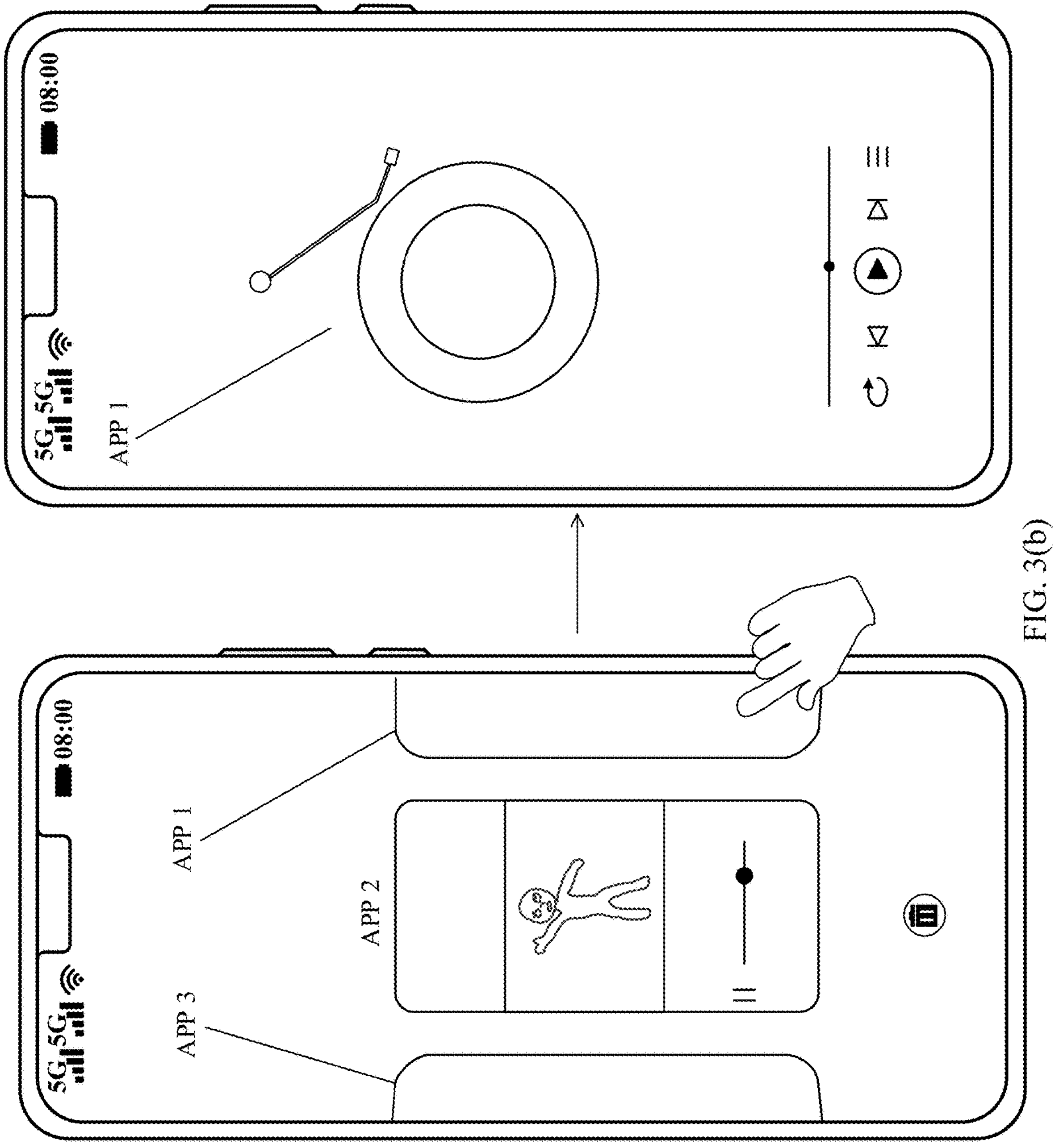
Figure 3C:
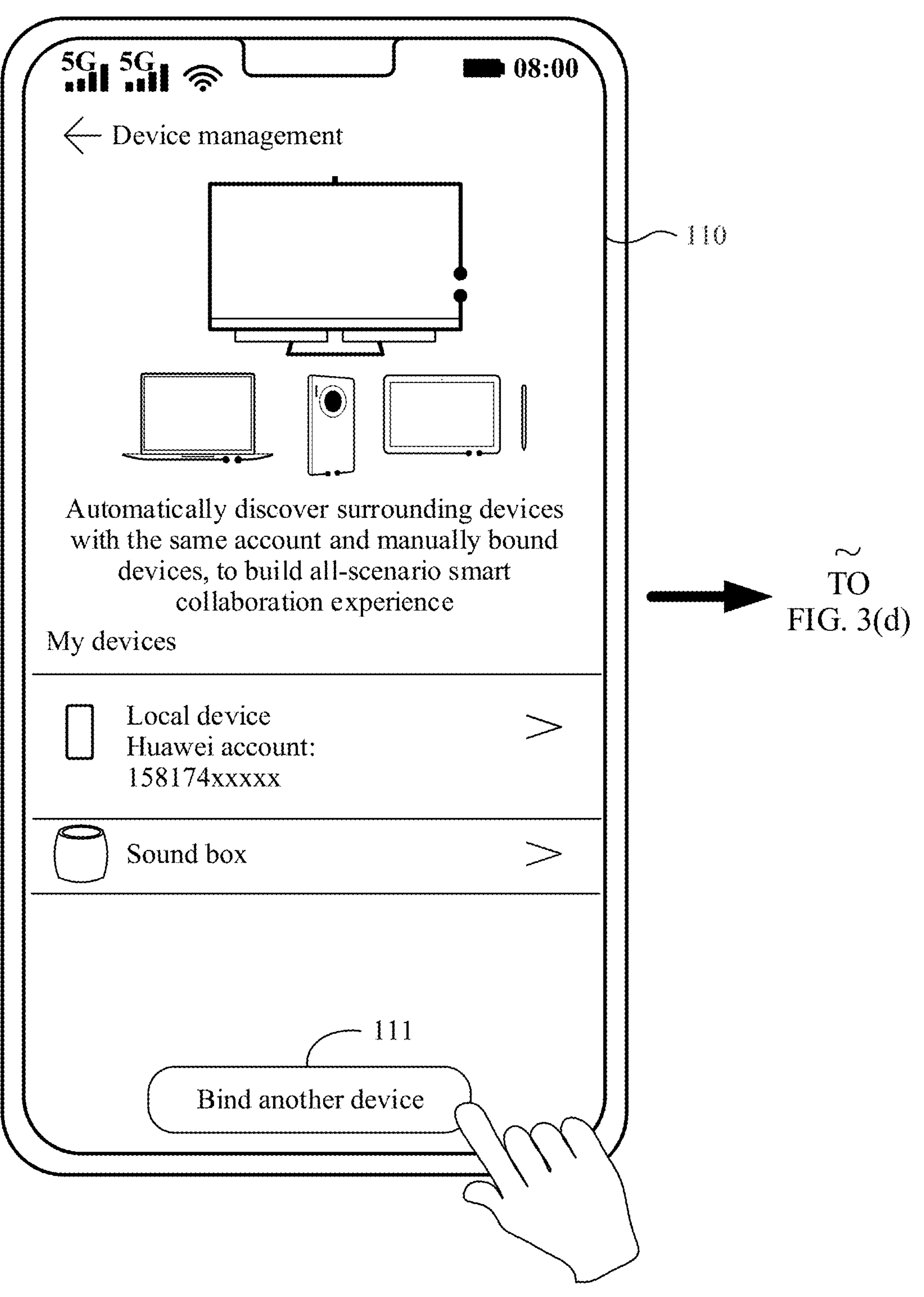
Figure 3D:
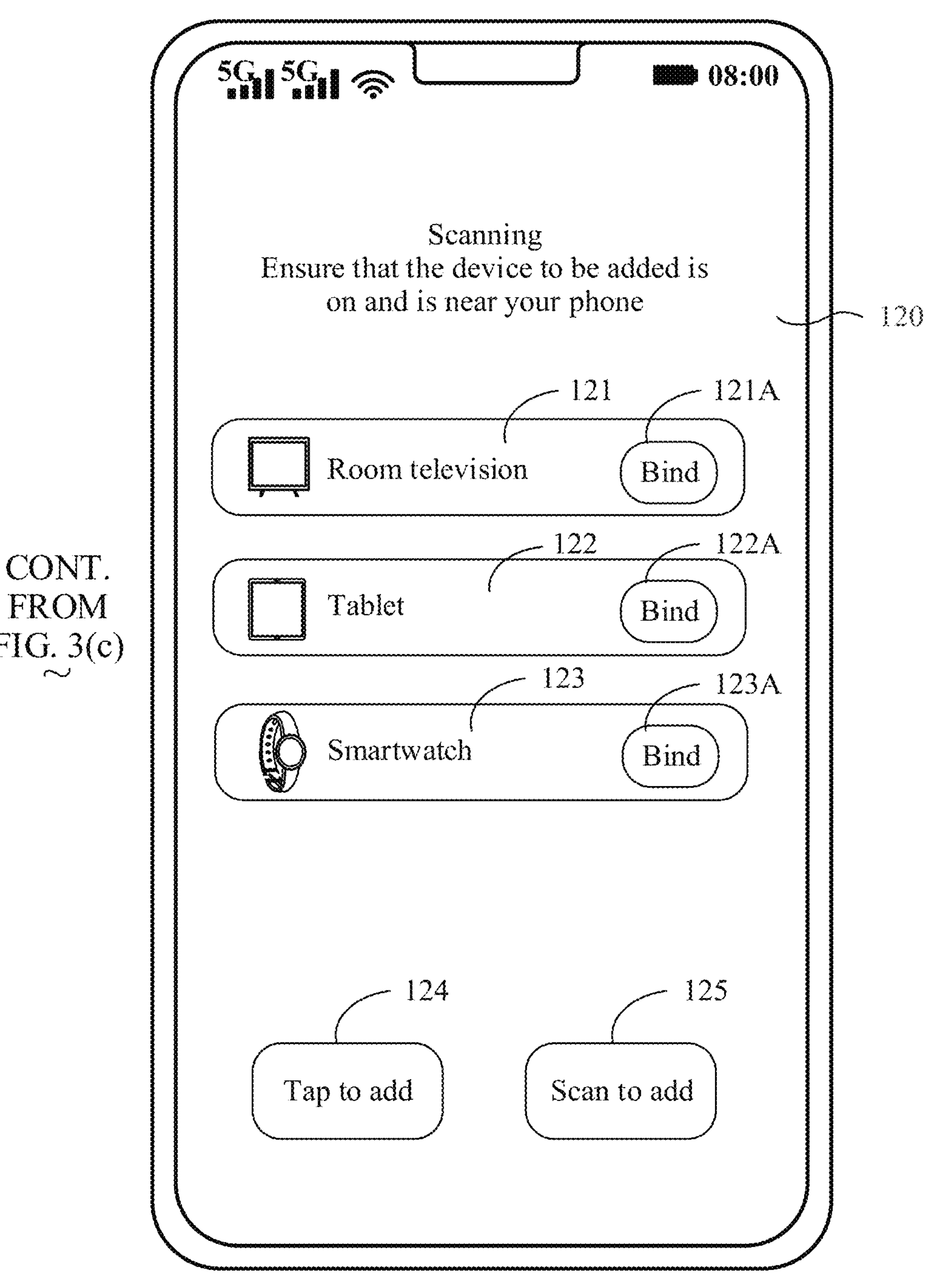
Figure 4A:
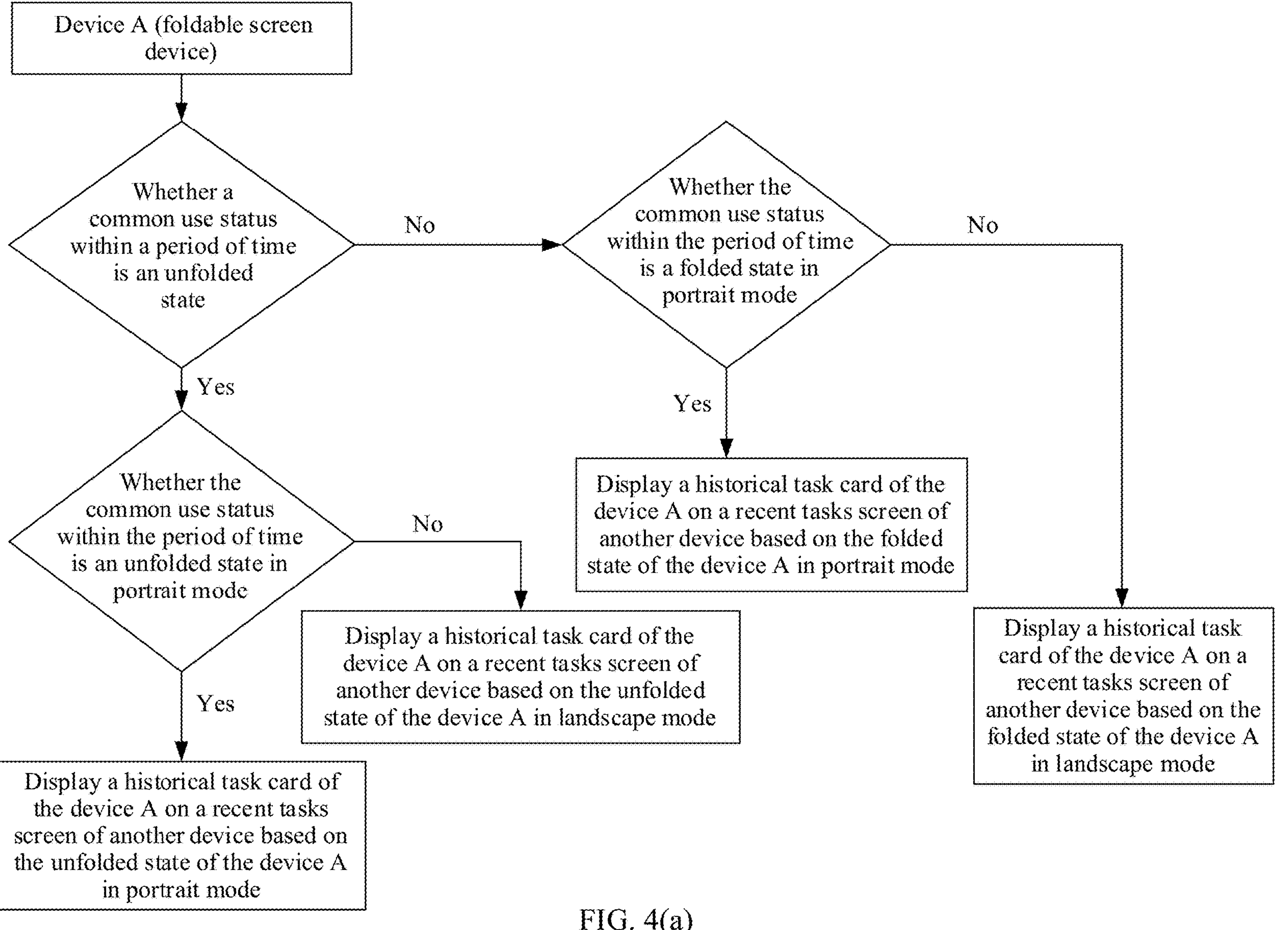
FIG. 4(*a*) and FIG. 4(*b*) are schematic flowcharts of determining a layout of a task card of another terminal displayed on a recent tasks screen of a first terminal according to this application.
Figure 4B:
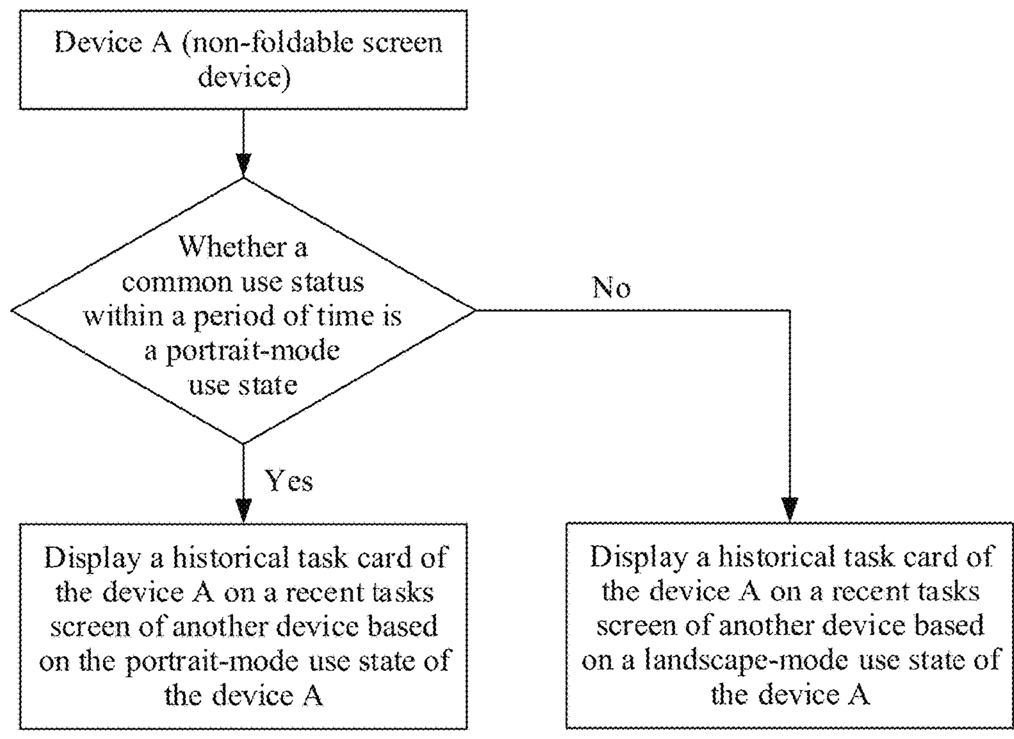
Figure 5A:
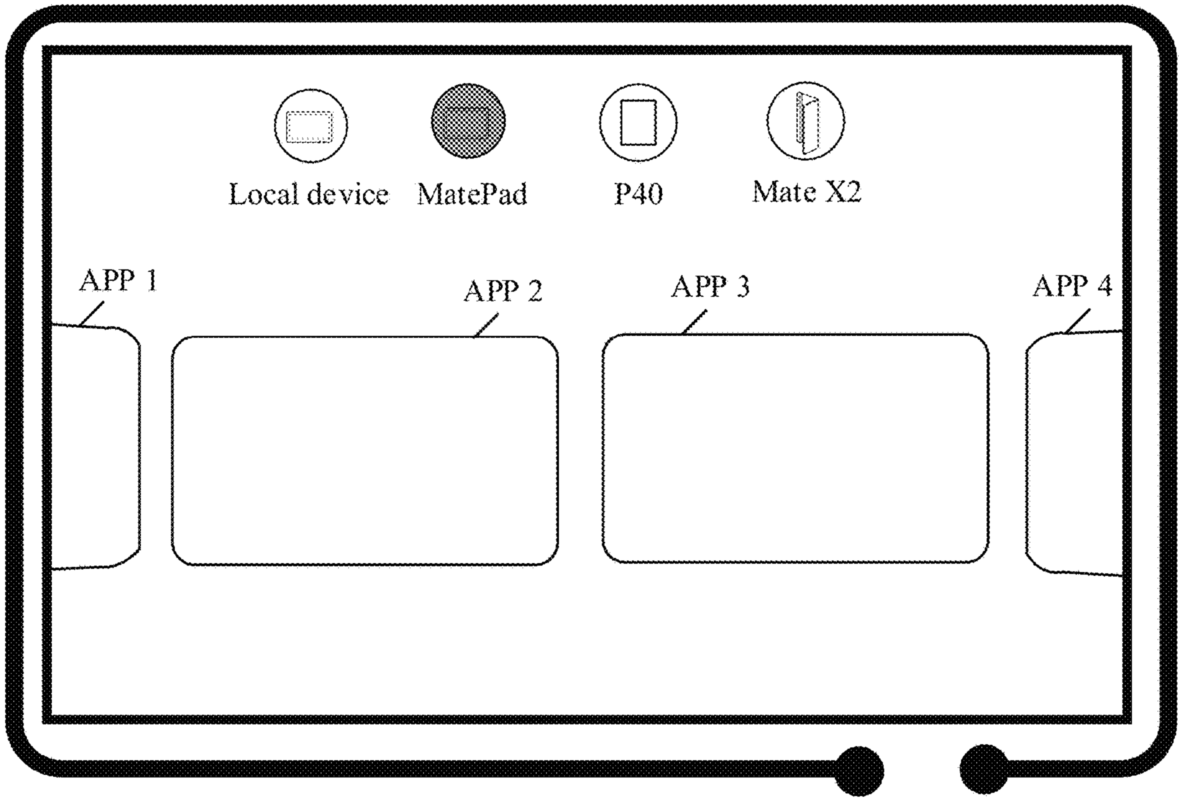
FIG. 5(*a*) to FIG. 6(*e*) are schematic diagrams of interfaces for displaying different layouts of task cards of other different terminals on a recent tasks screen of a first terminal according to this application.
Figure 5B:
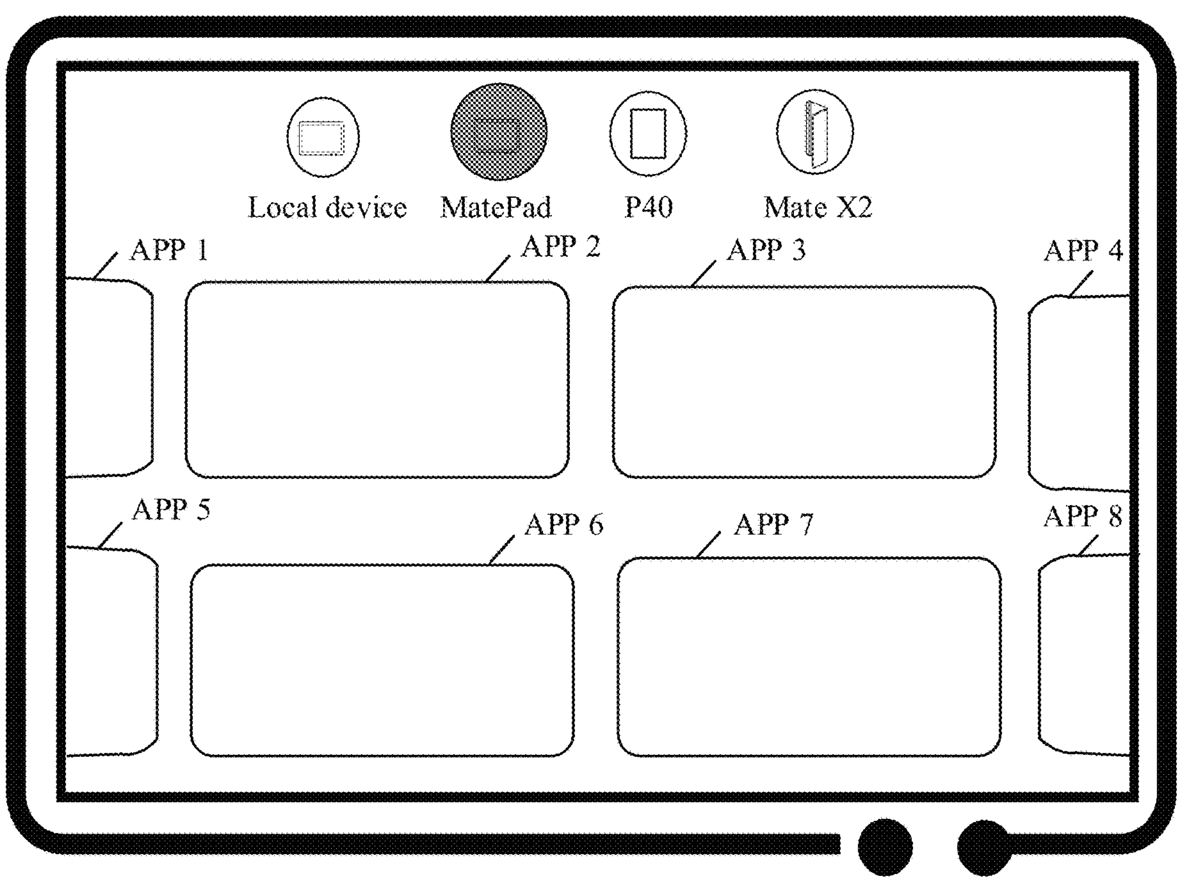
Figure 5C:
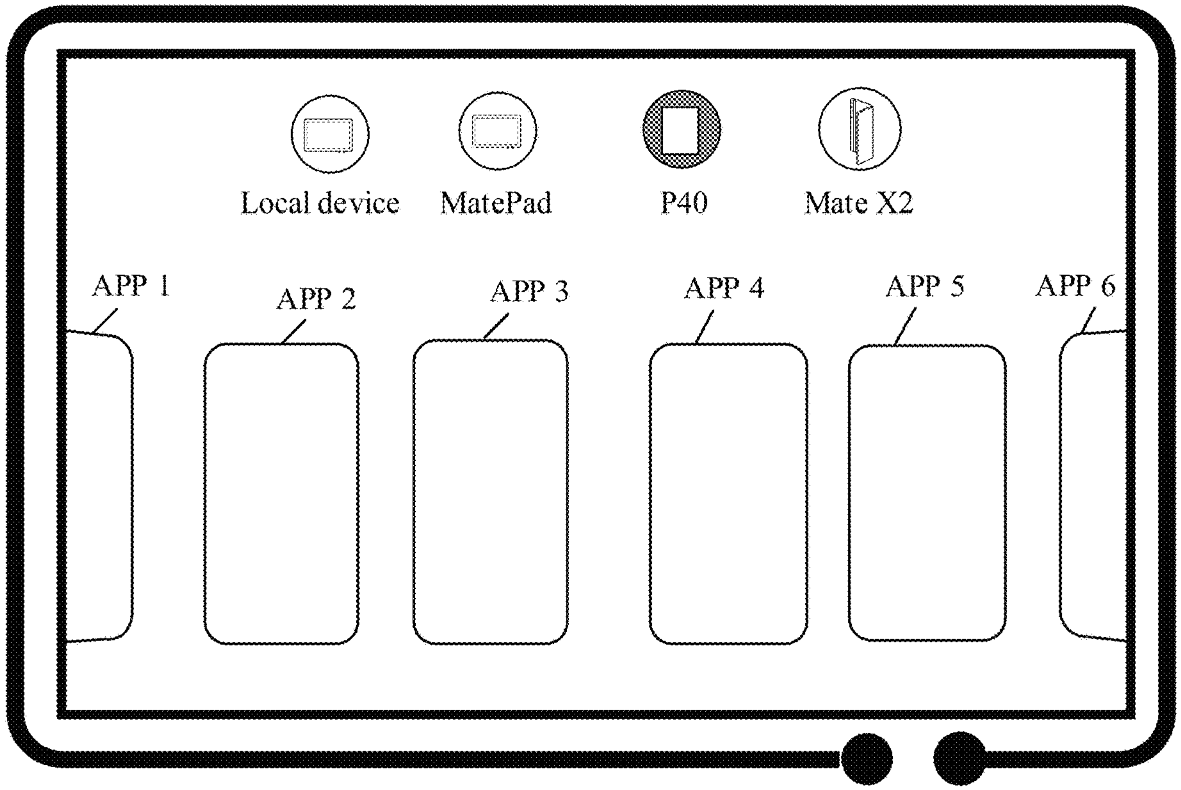
Figure 5D:
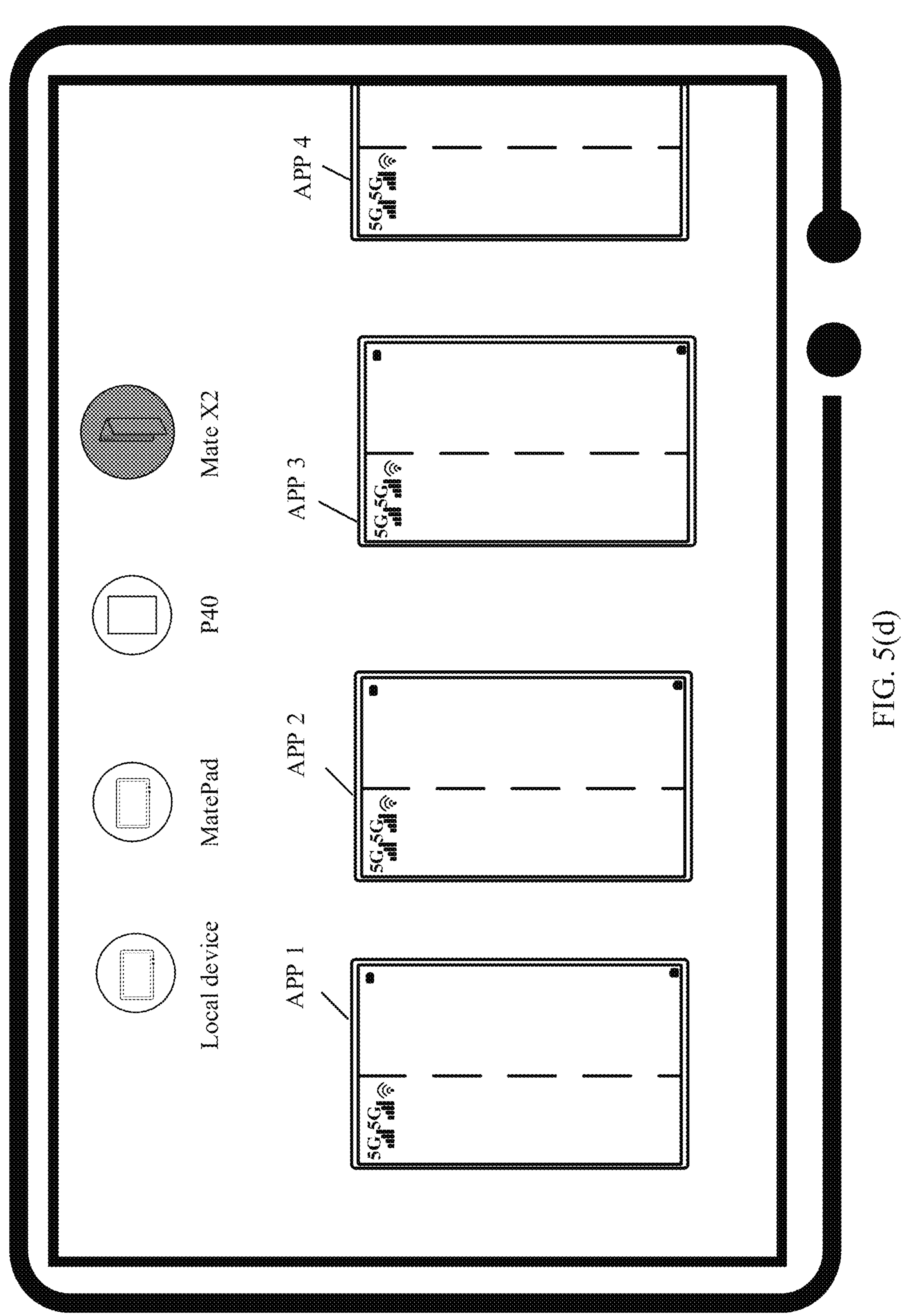
Figure 6A:
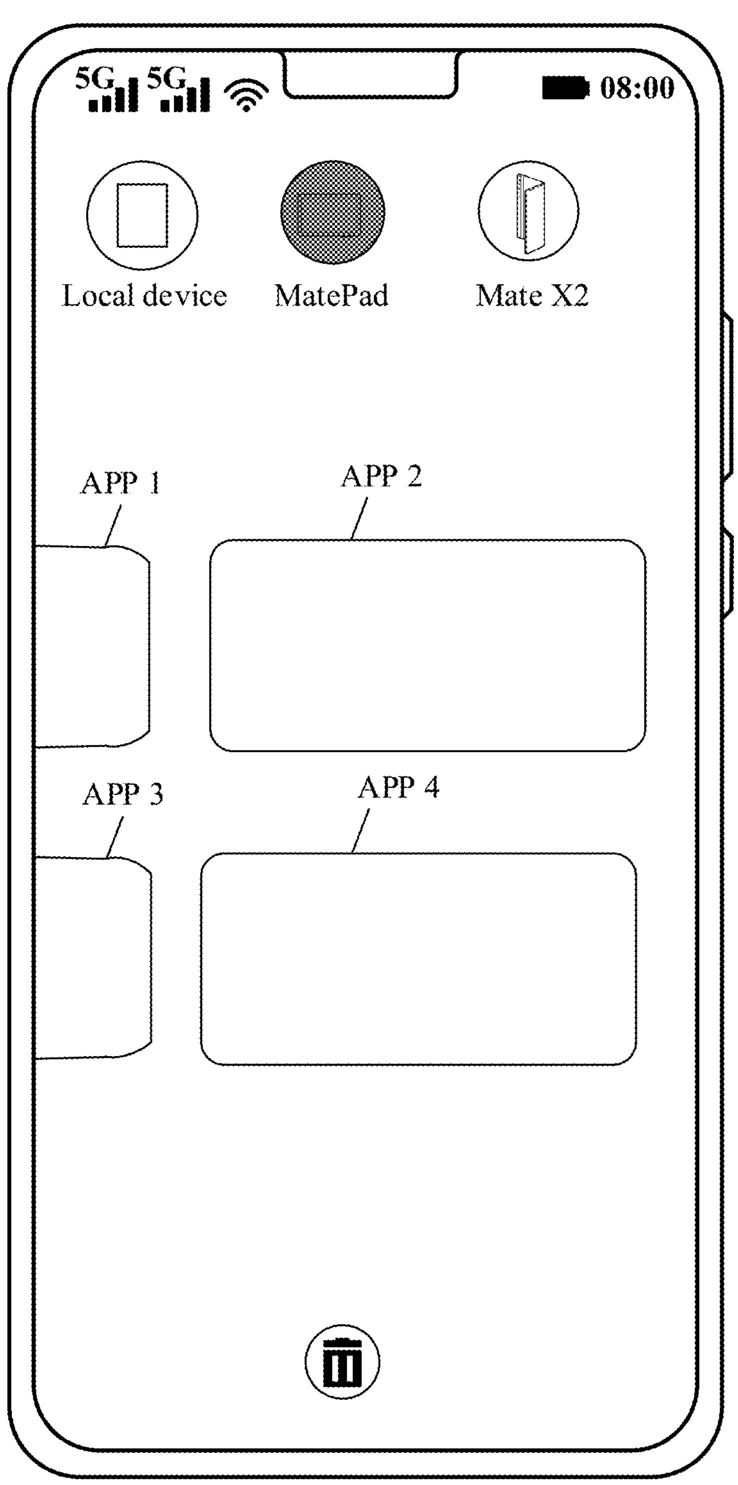
Figure 6B:
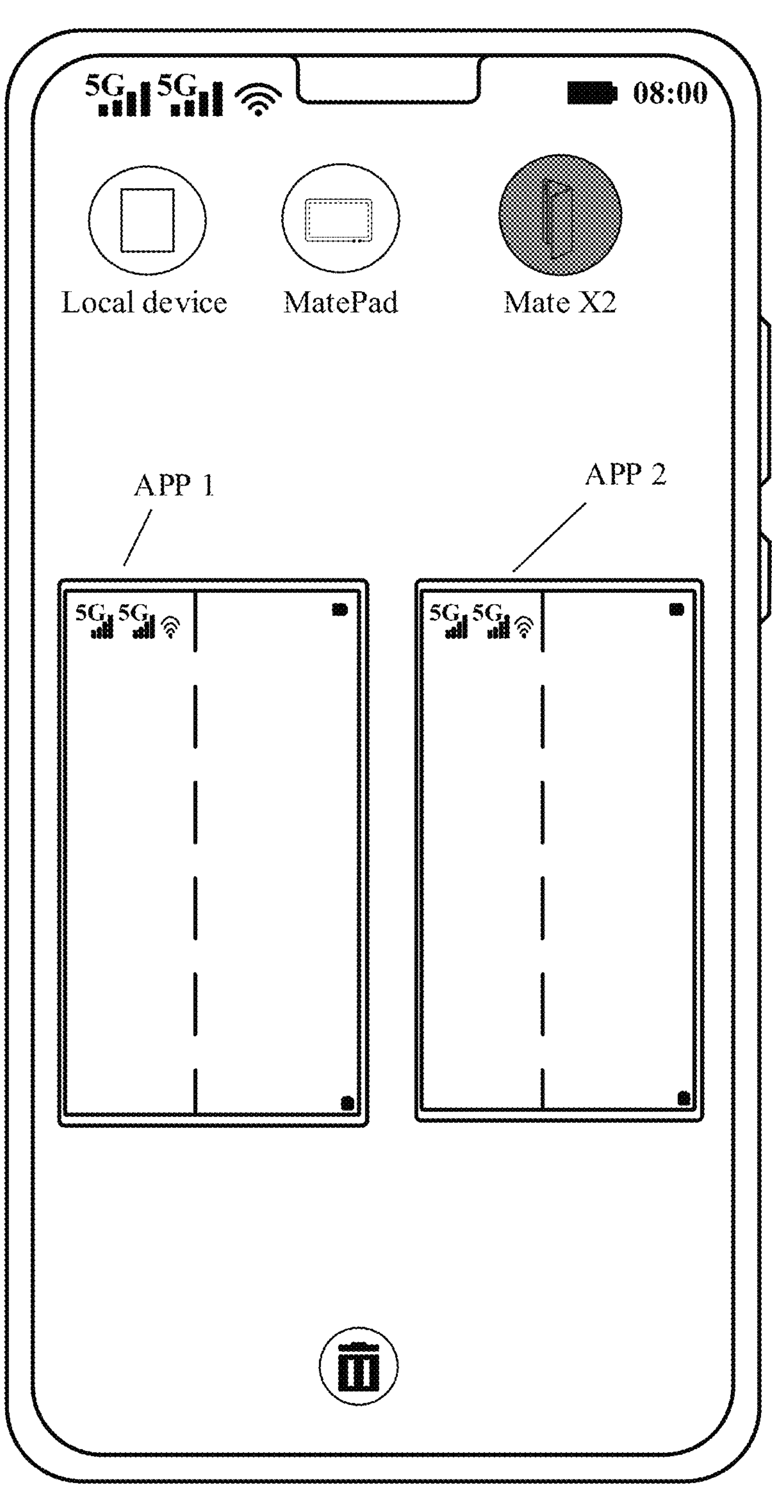
Figure 6C:
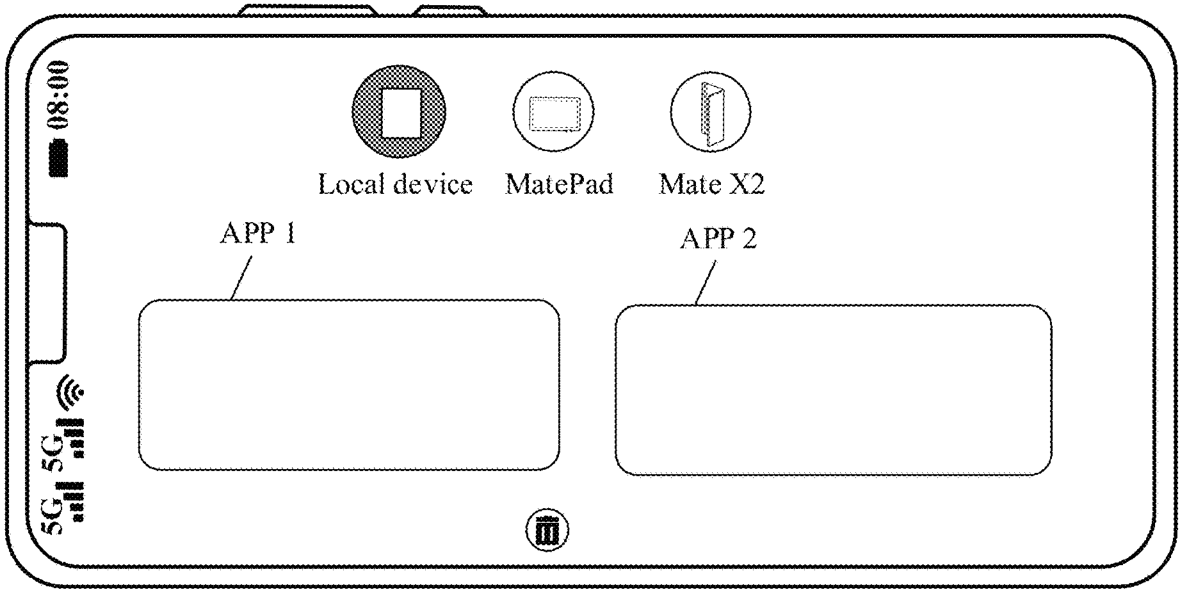
Figure 6D:
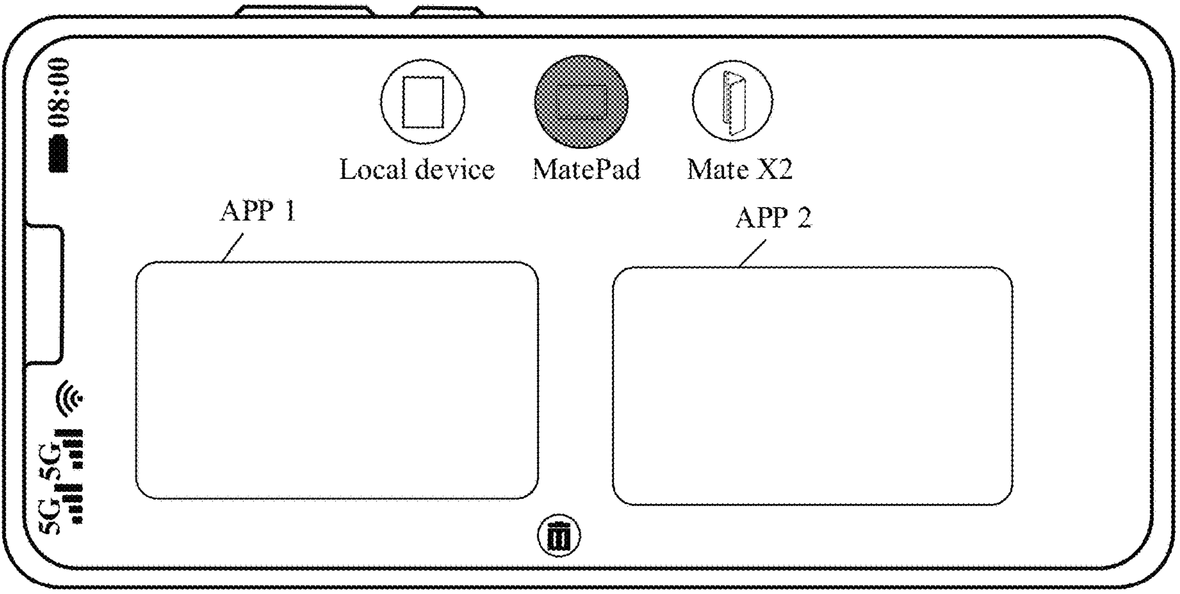
Figure 6E:
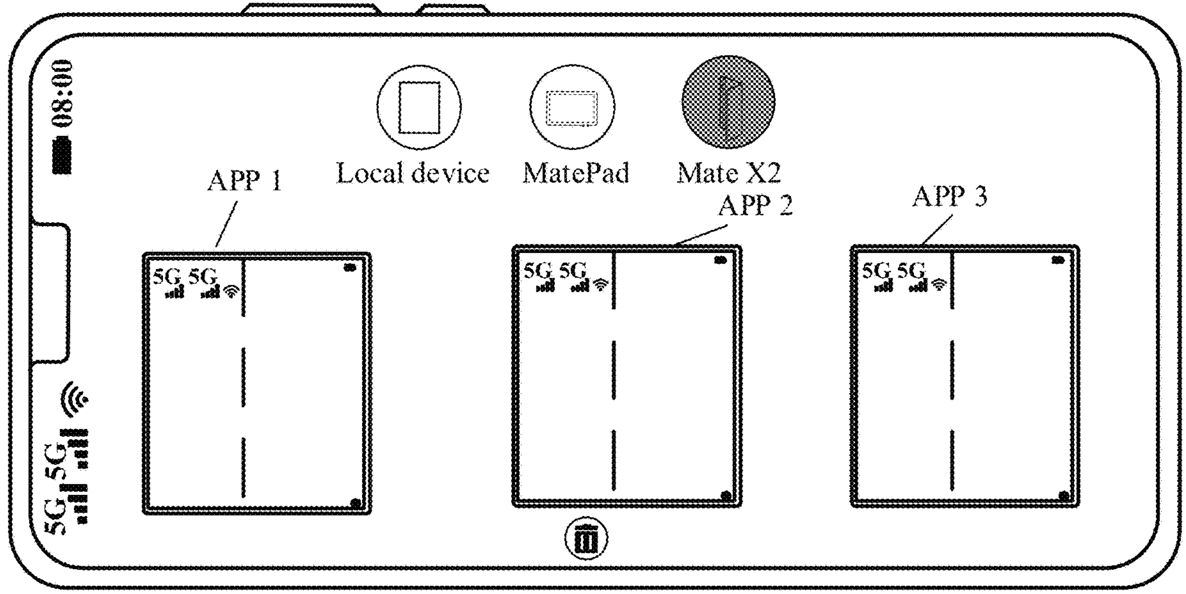
Figure 7A:
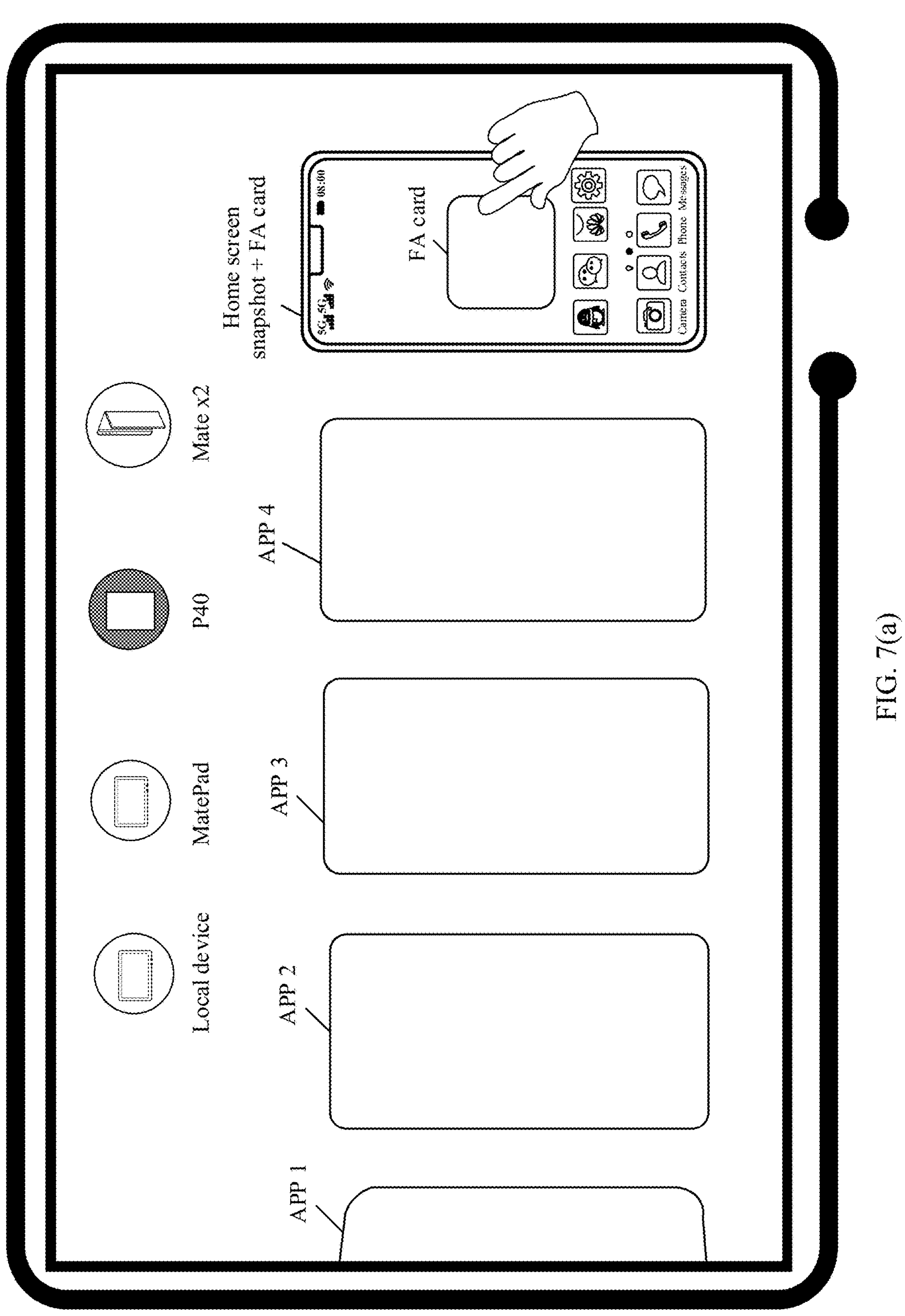
FIG. 7(*a*) to FIG. 7(*q*) are schematic diagrams of interfaces of different content displayed on the last task card on a recent tasks screen of a first terminal according to this application.
Figure 7B:
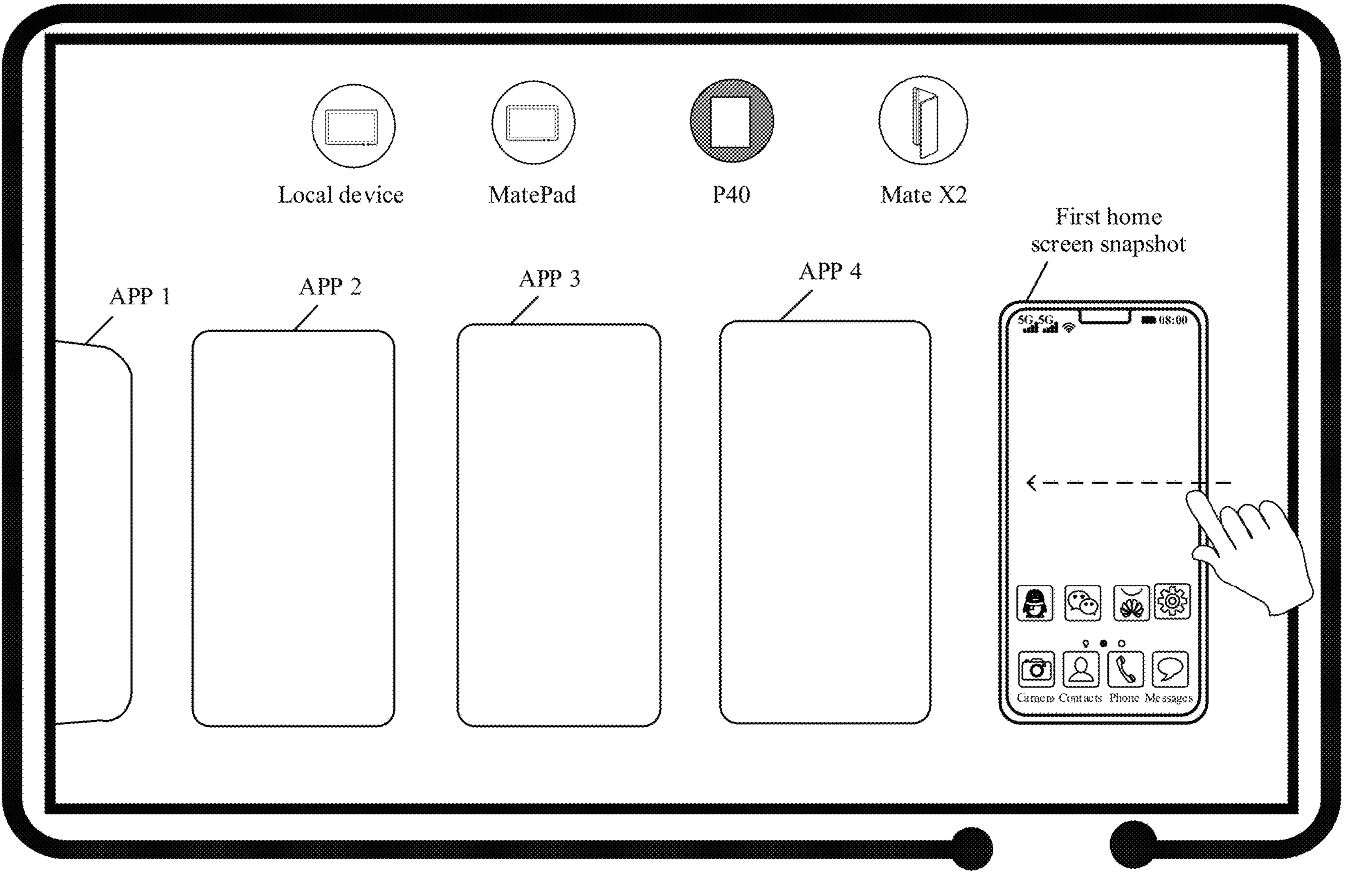
Figure 7C:
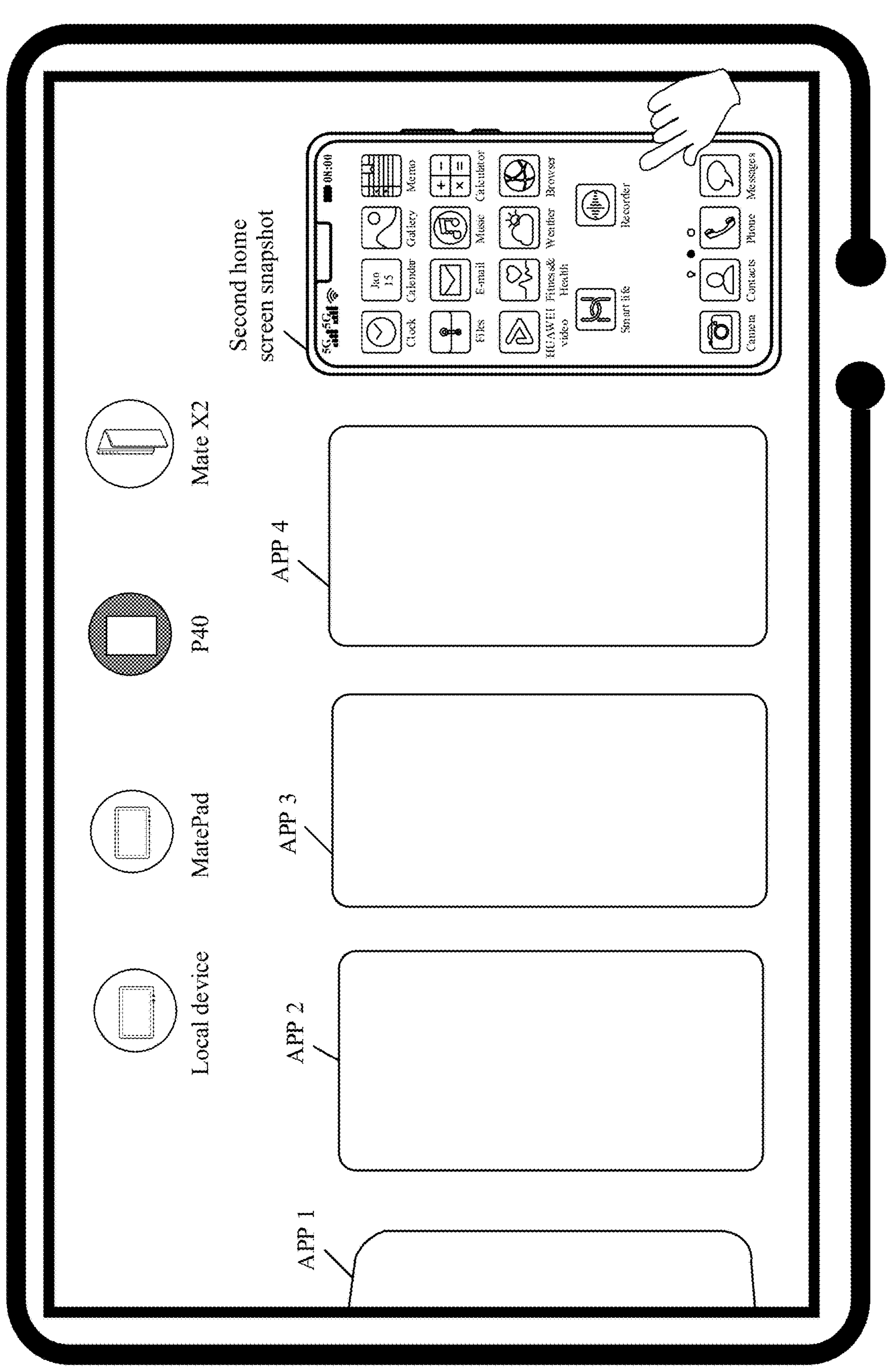
Figure 7D:
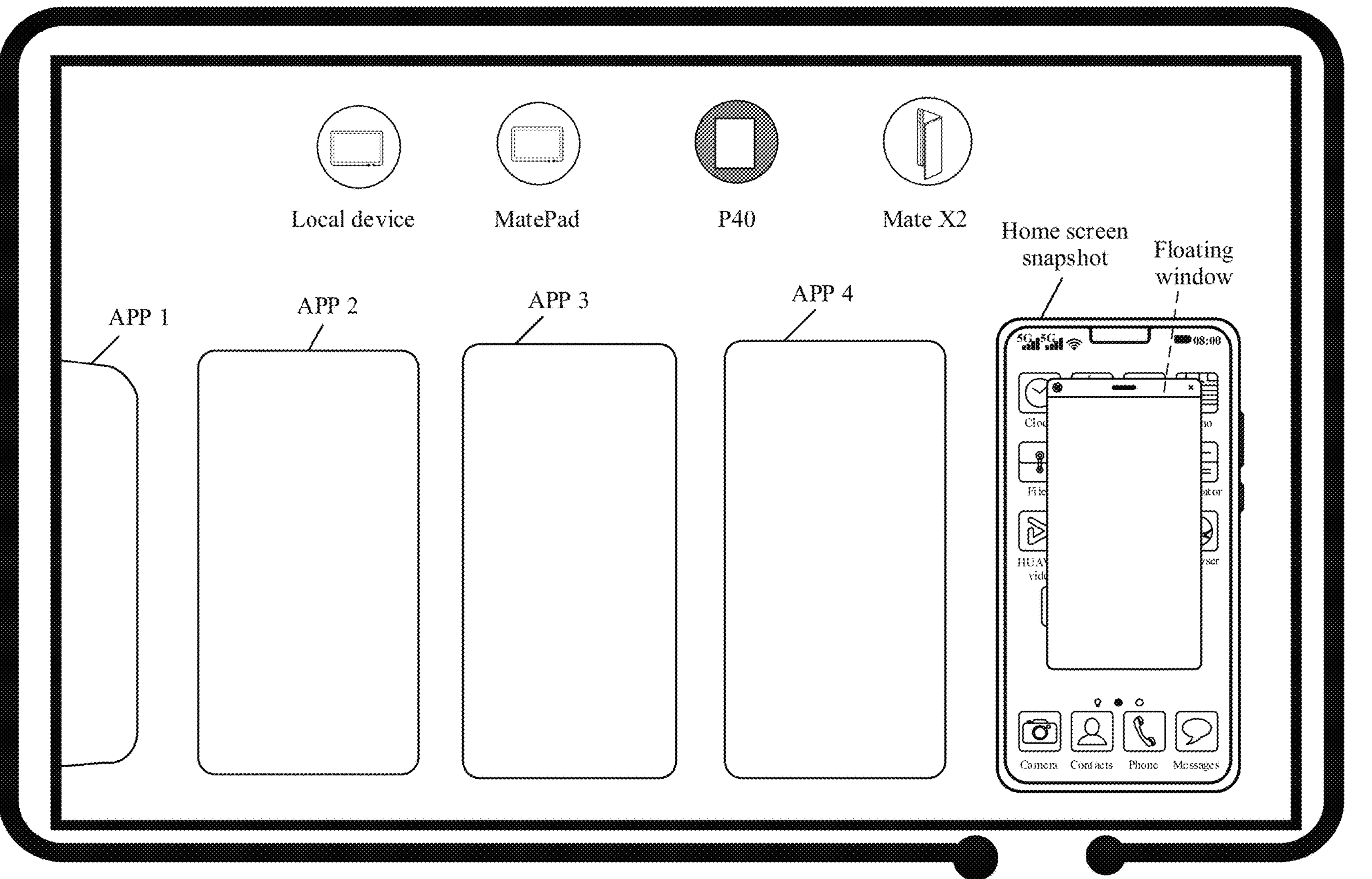
Figure 7E:
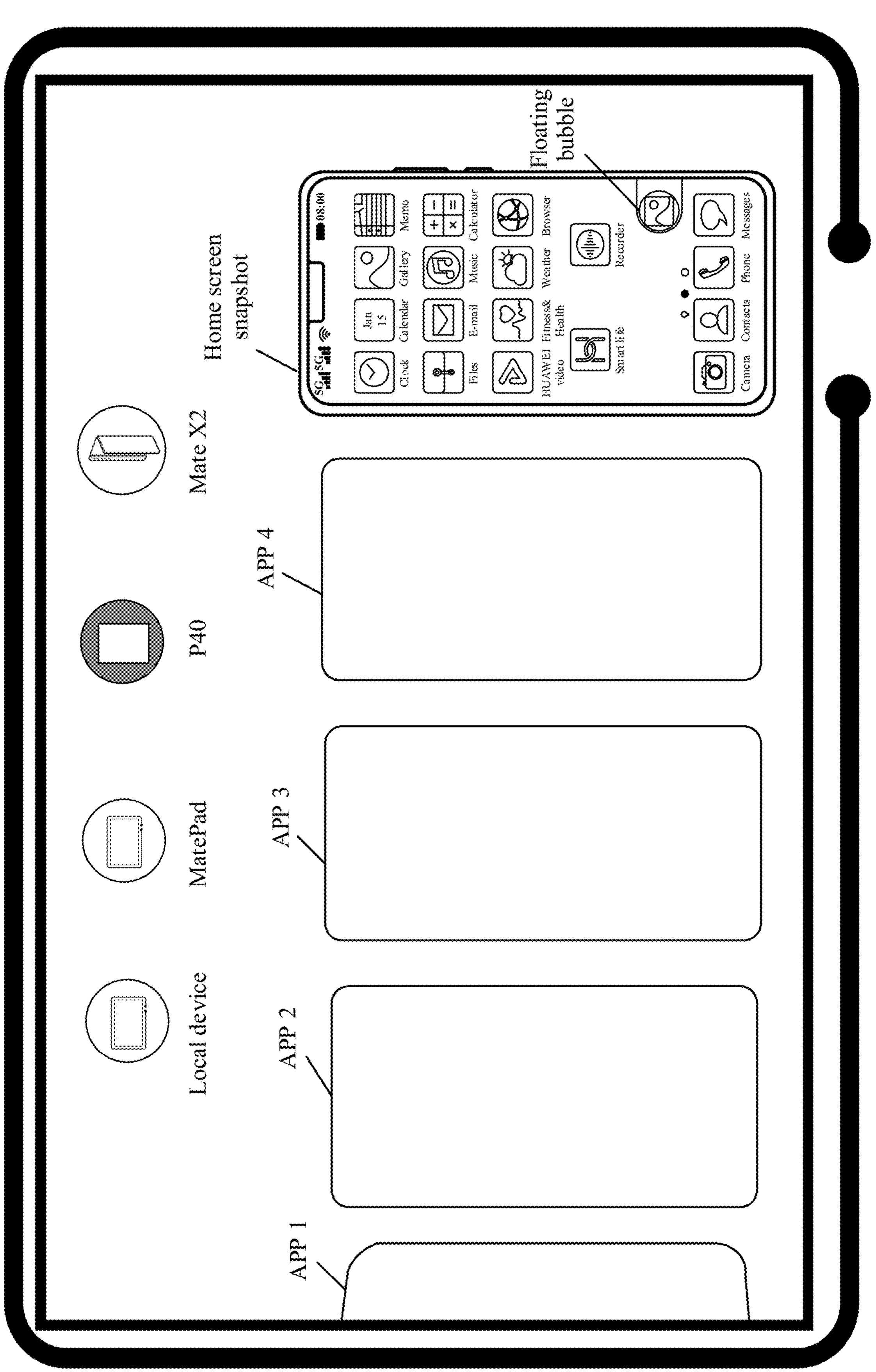
Figure 7F:
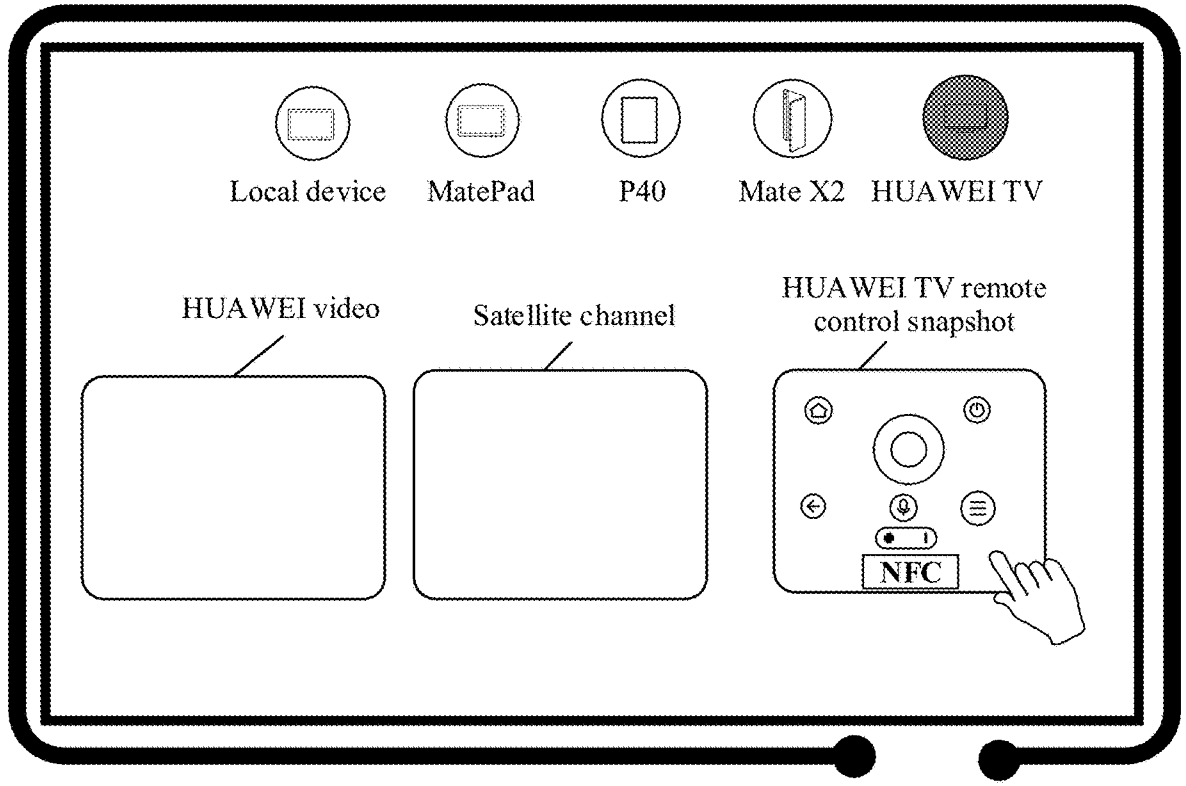
Figure 7G:
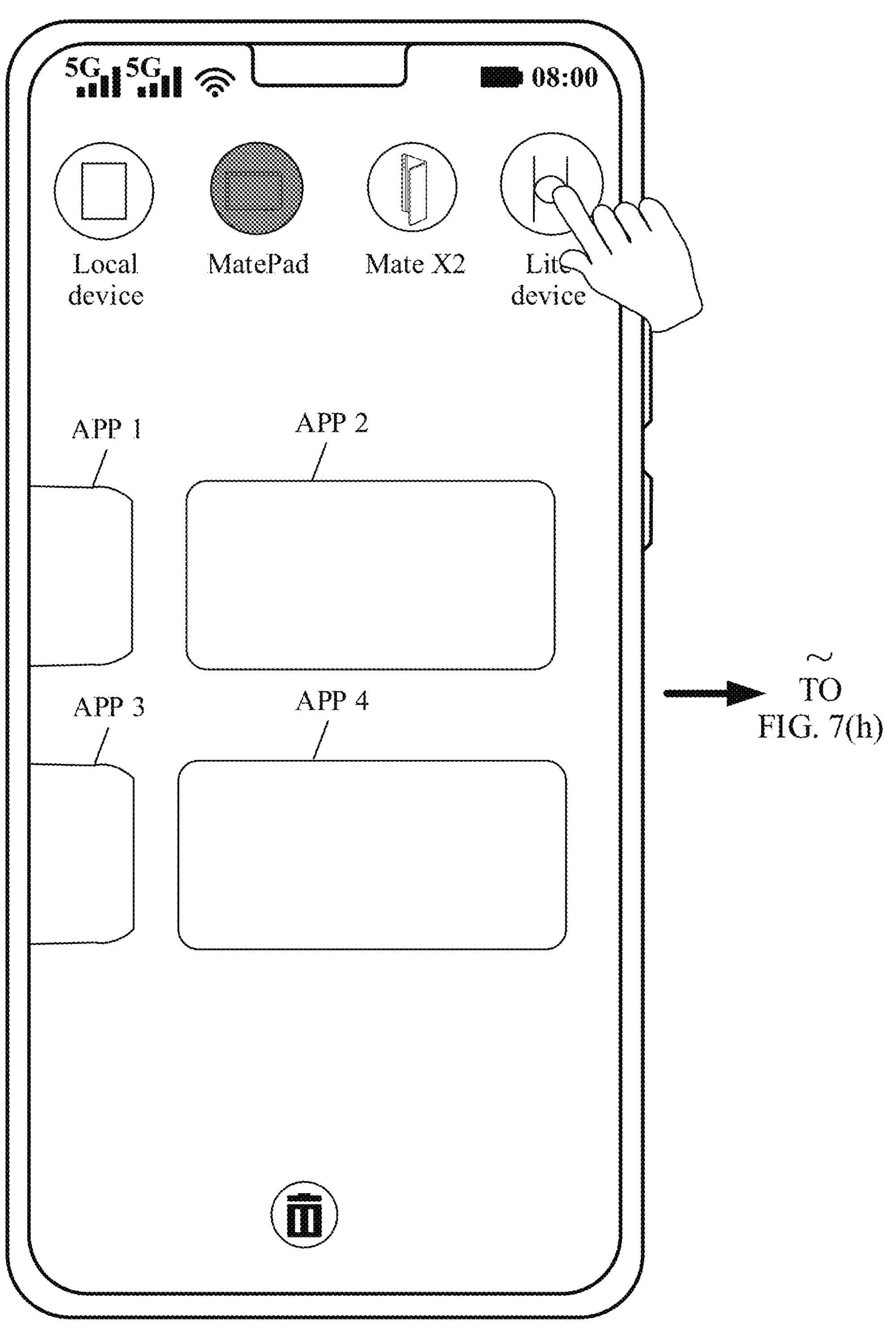
Figure 7H:
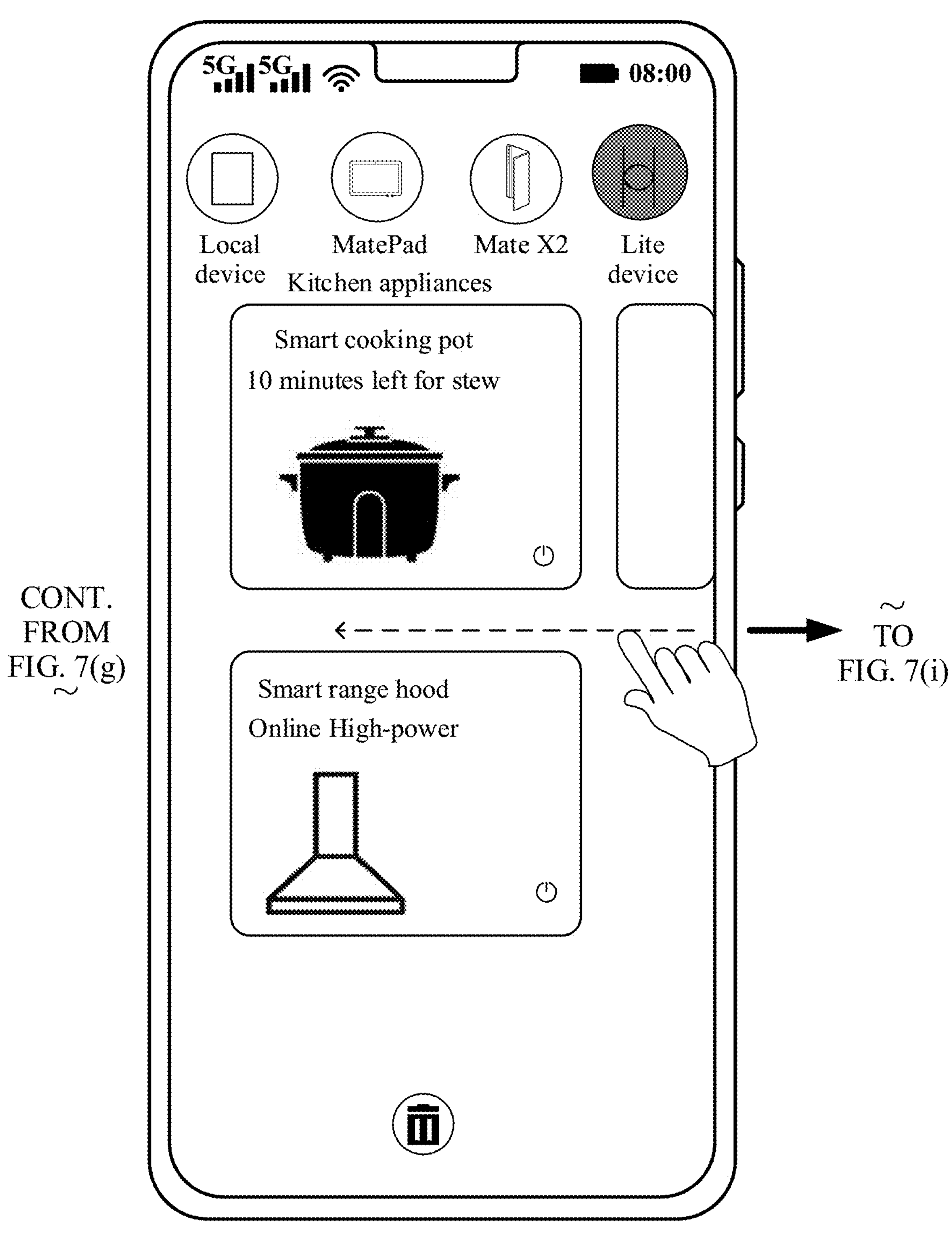
Figure 7I:
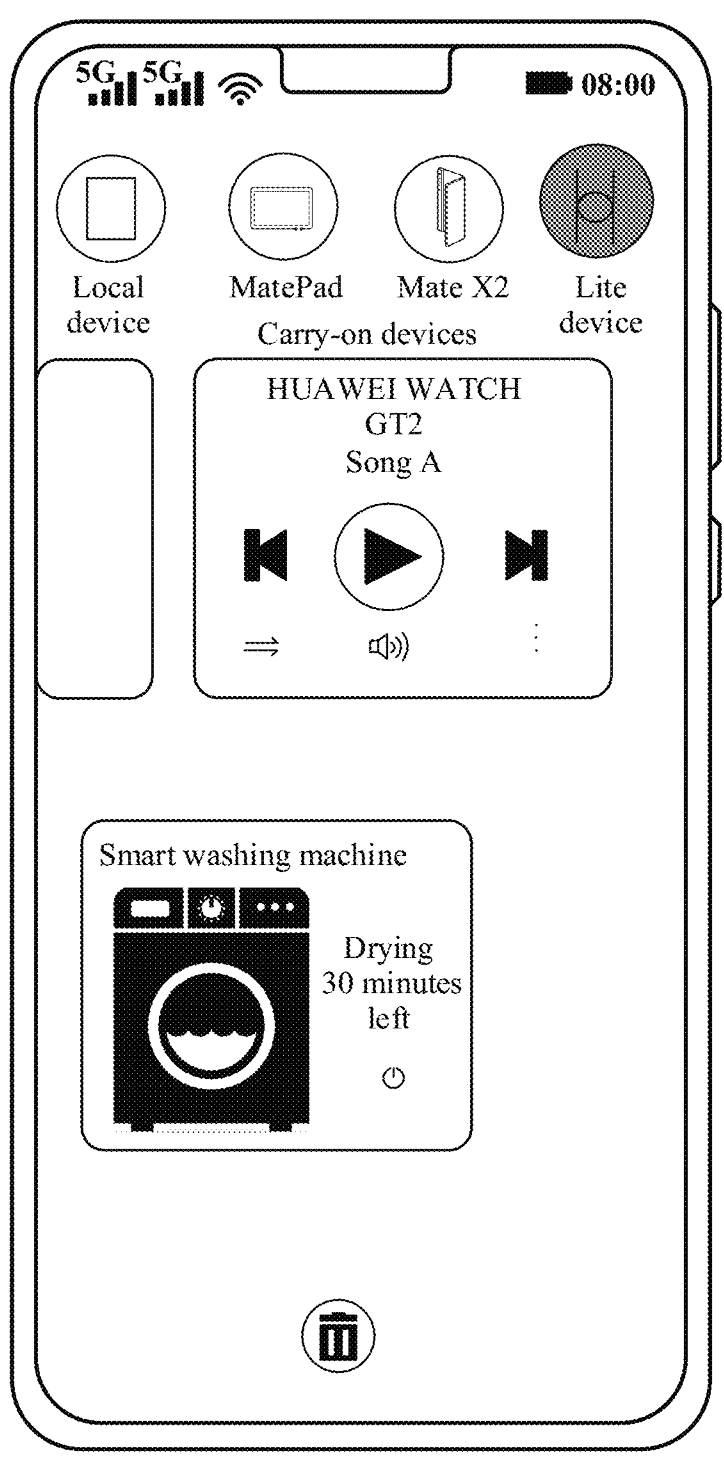
Figure 7J:
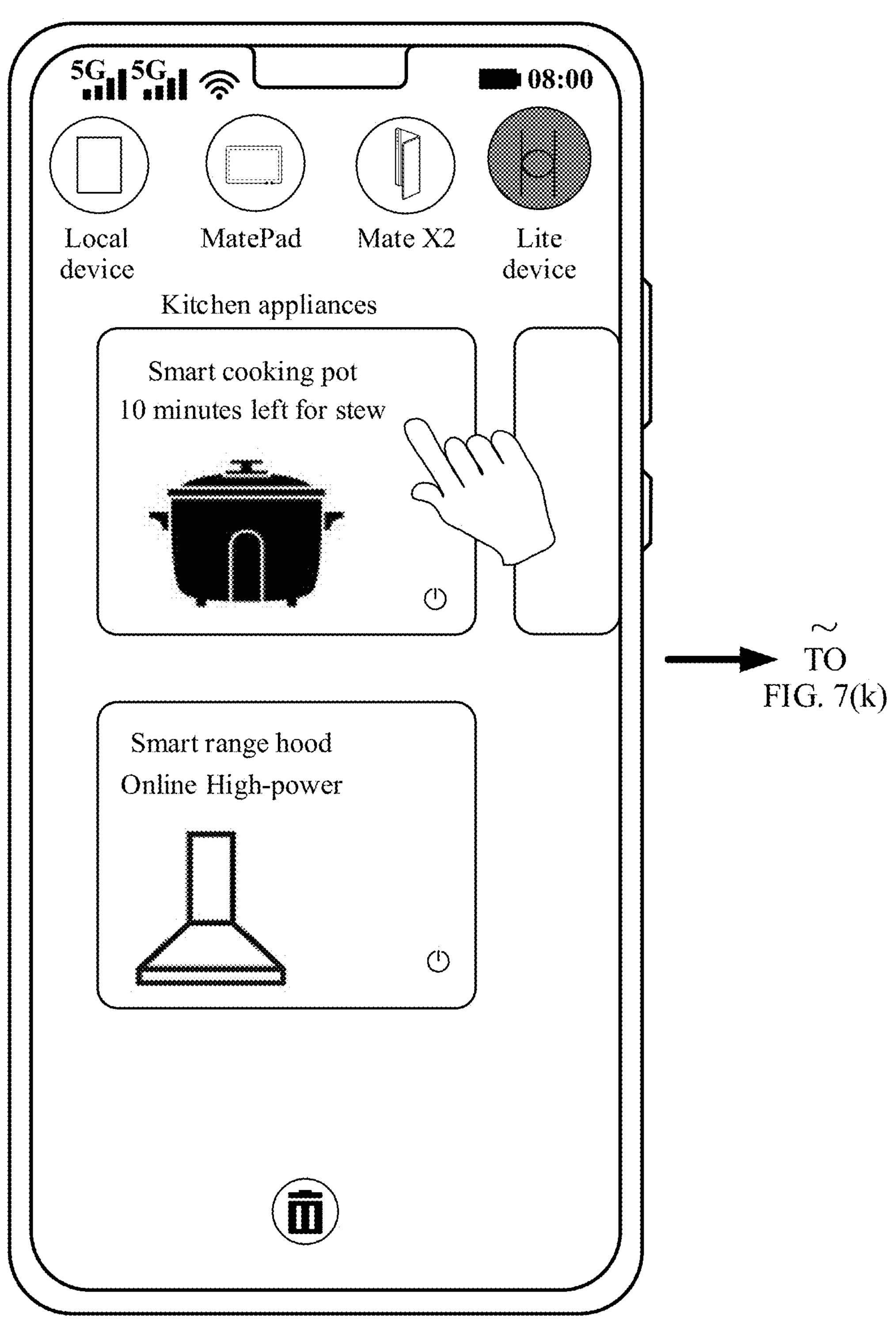
Figure 7K:
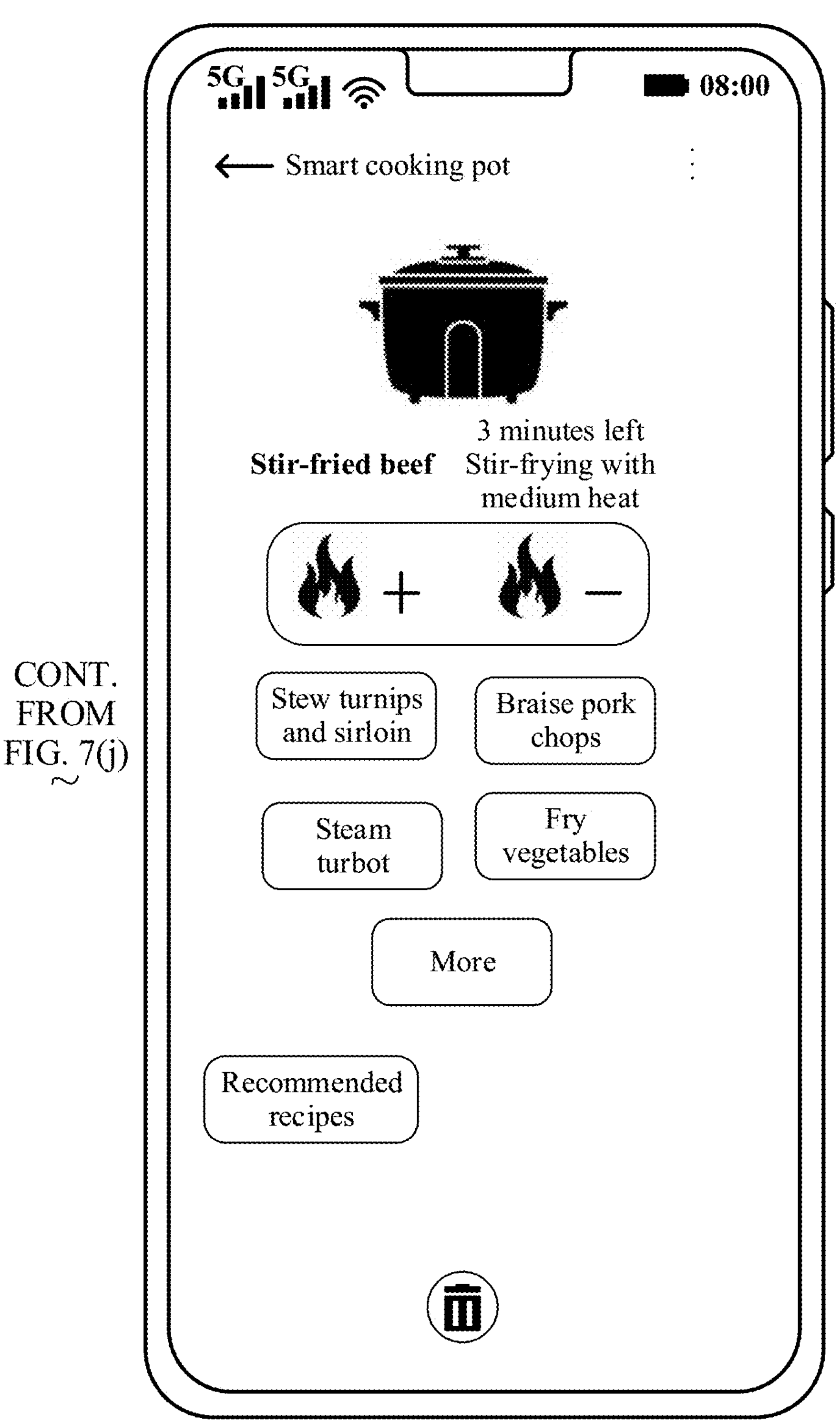
Figure 7L:
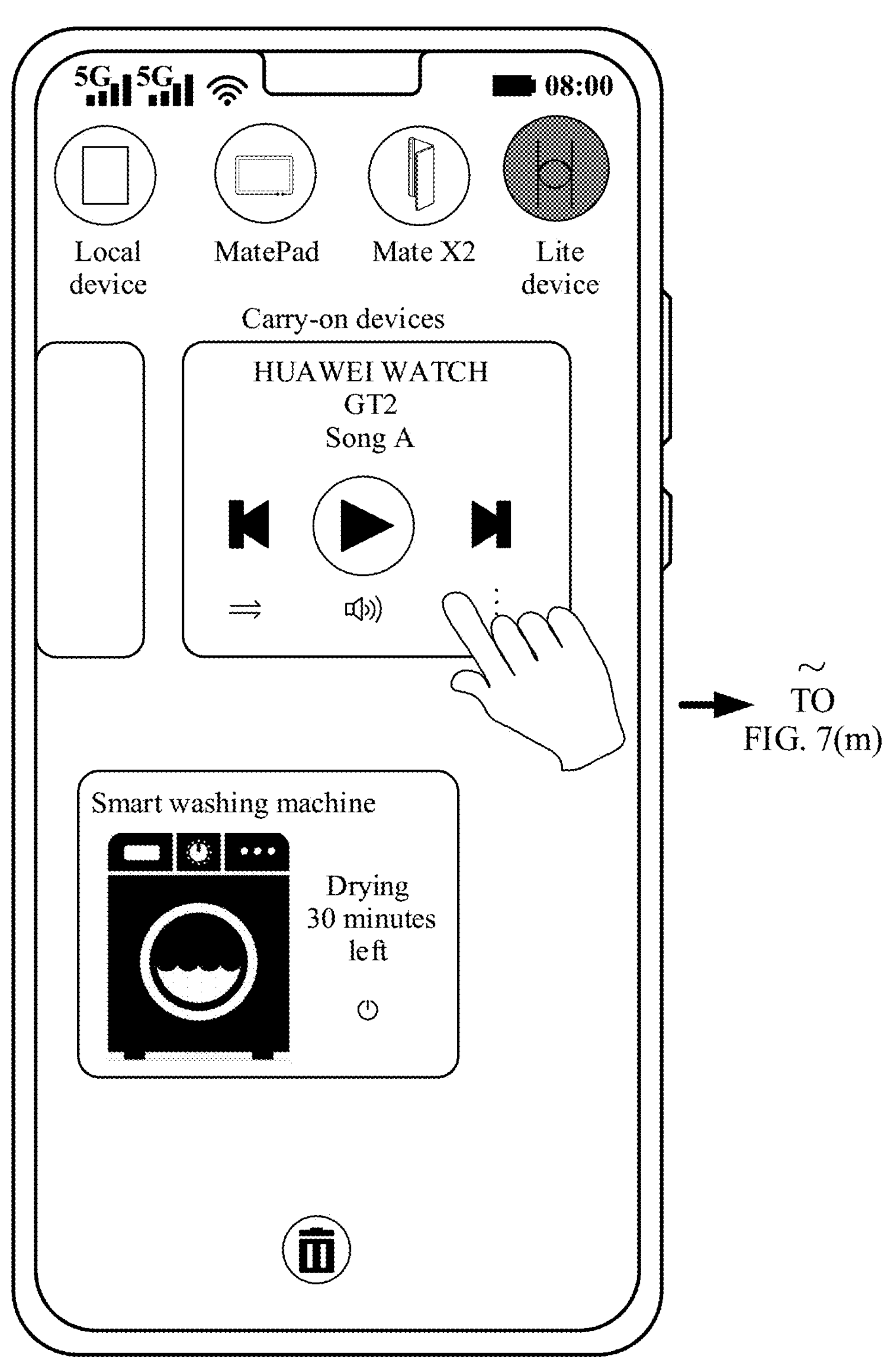
Figure 7M:
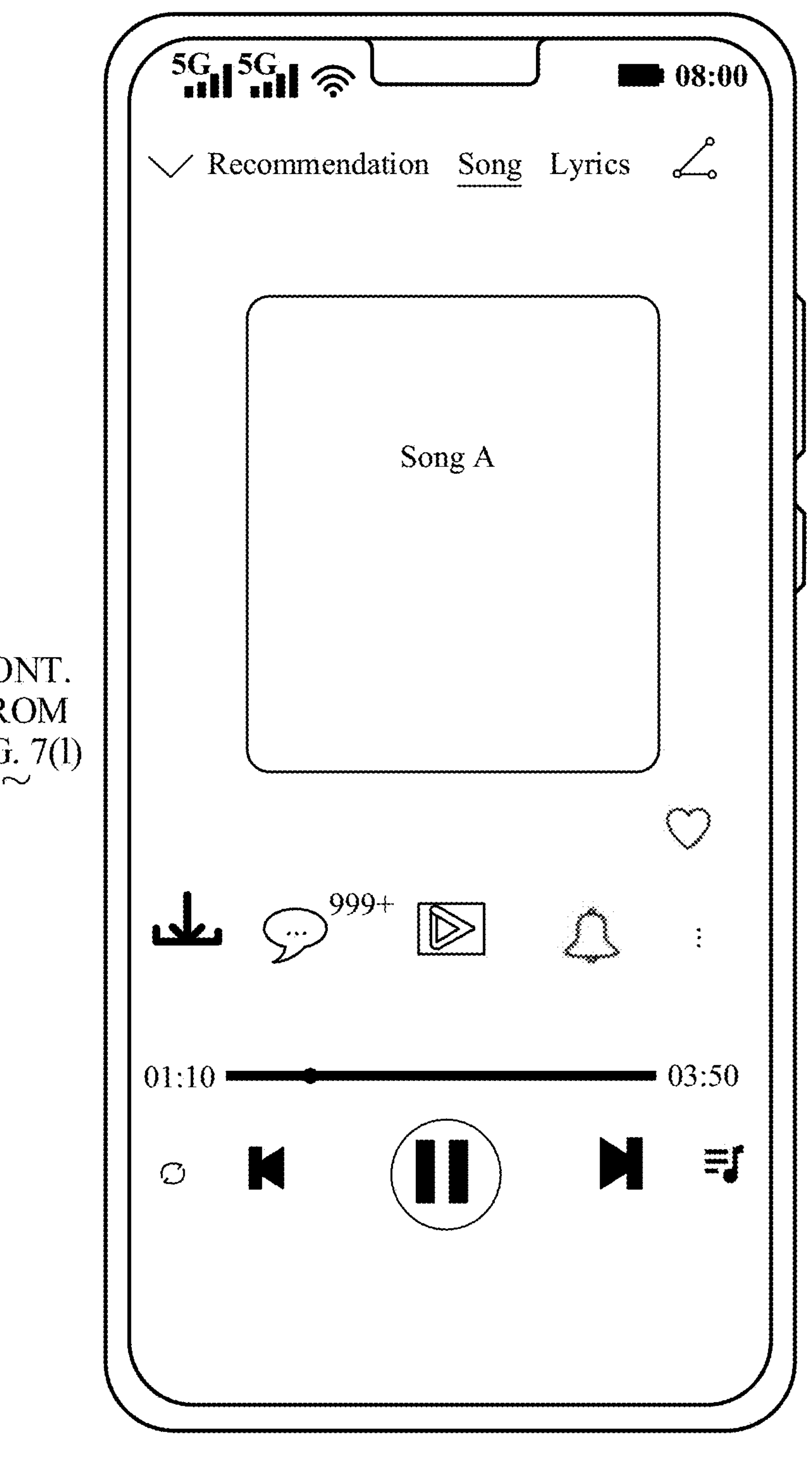
Figure 7N:
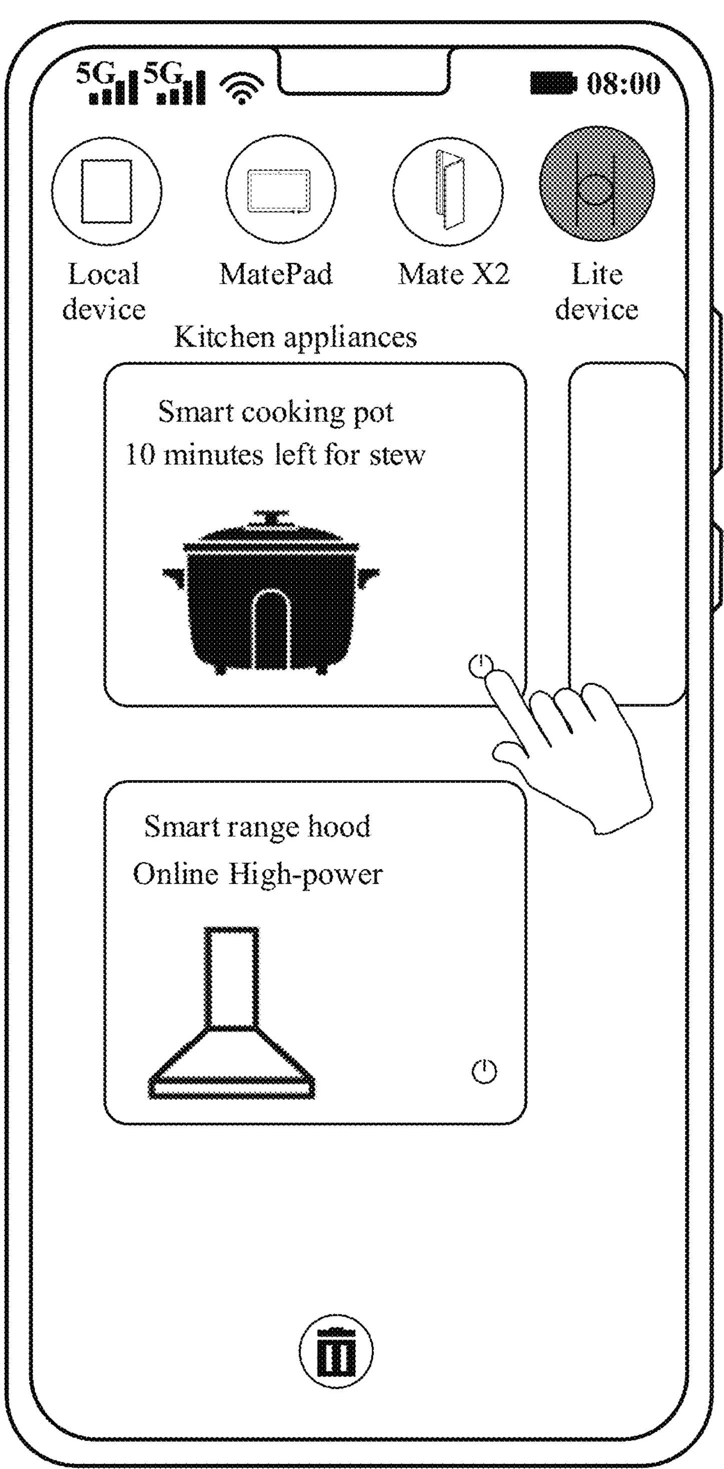
Figure 7O:
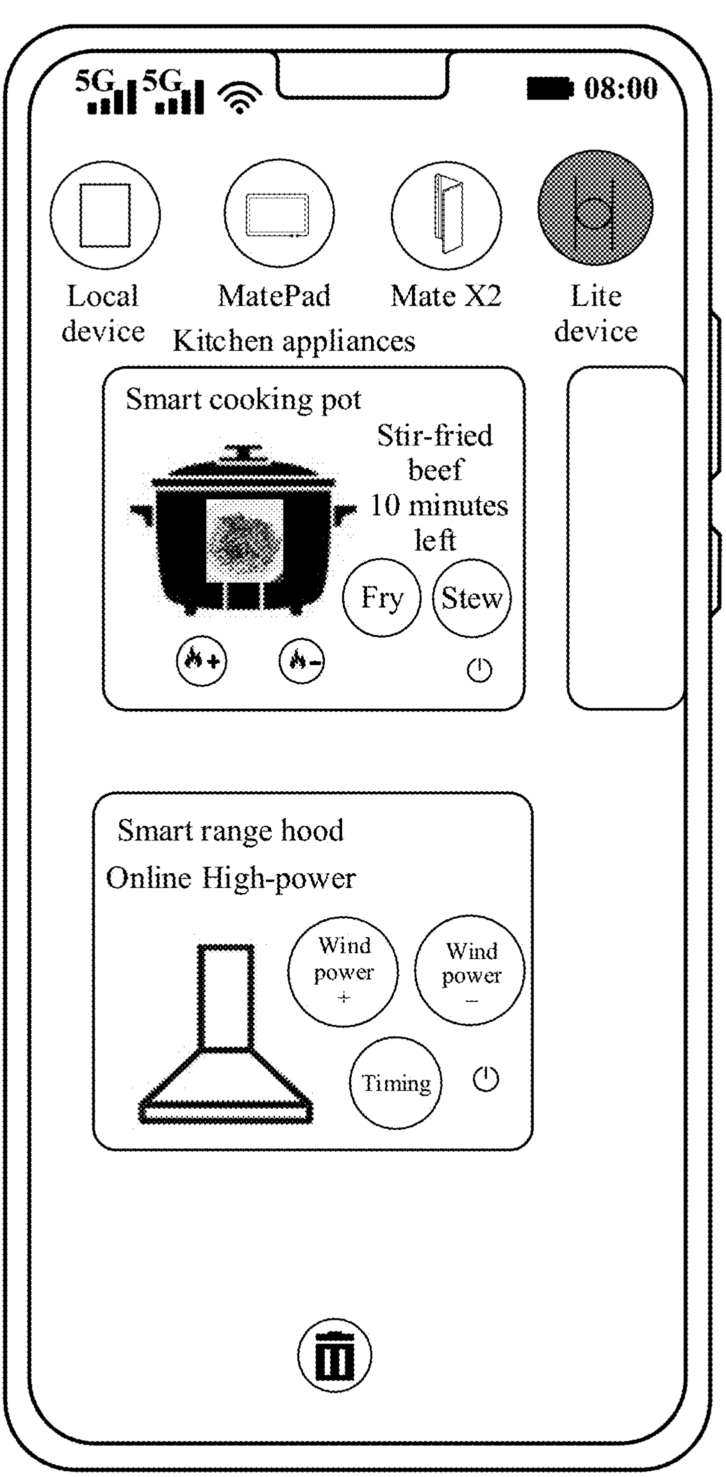
Figure 7P:
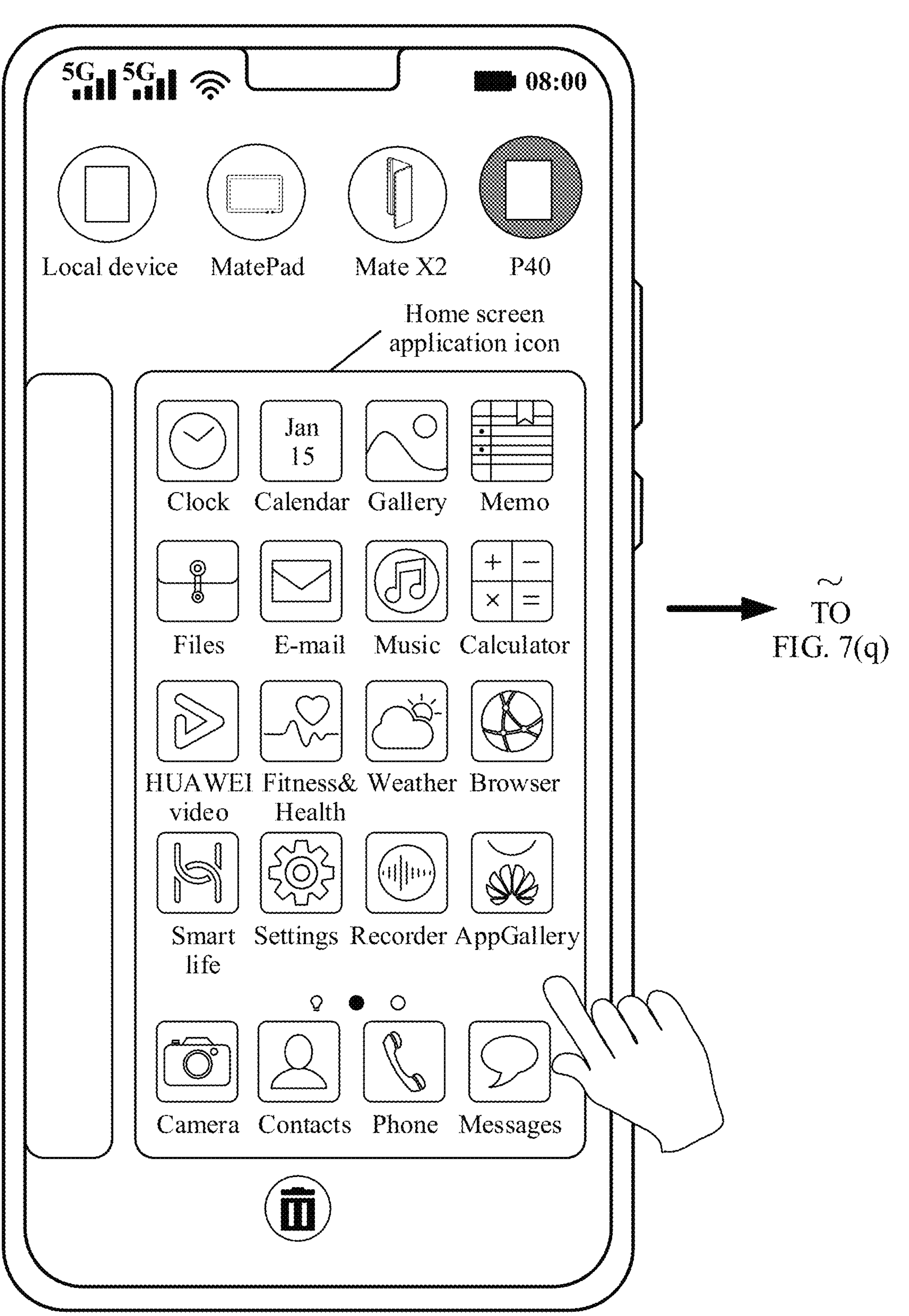
Figure 7Q:
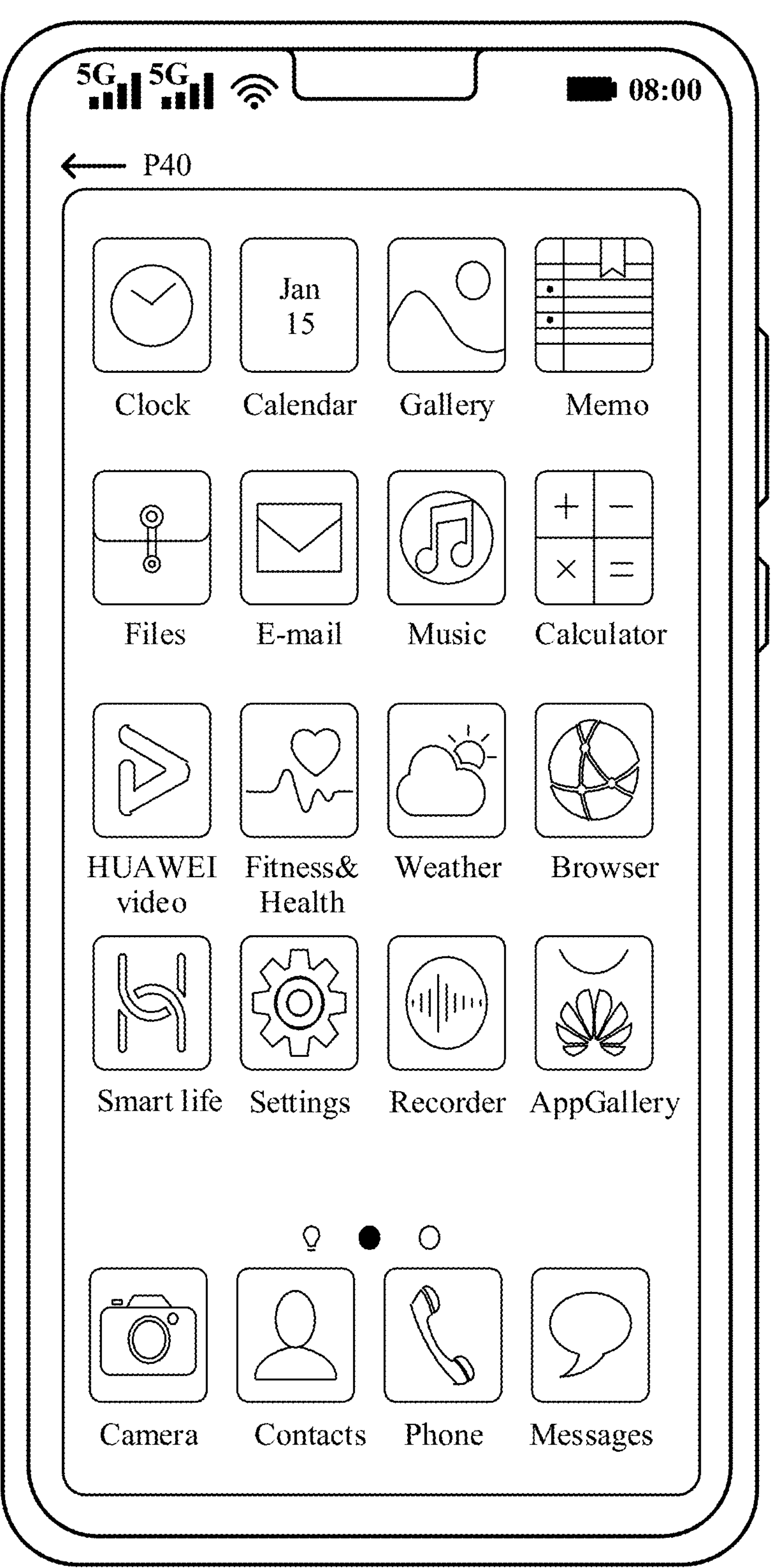
Figure 7R:
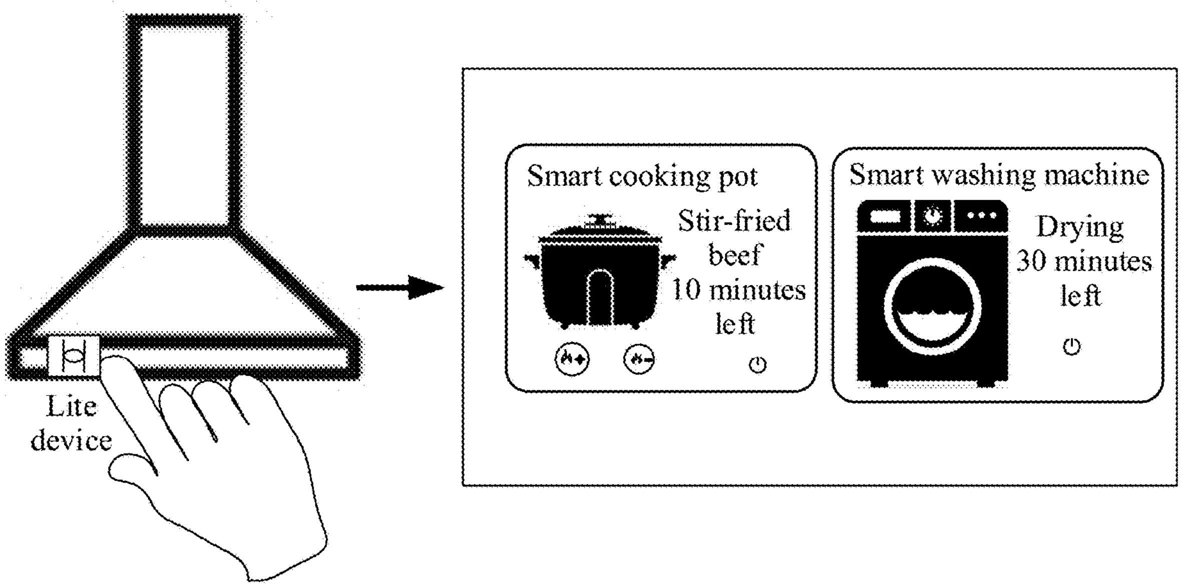
Figure 7S:
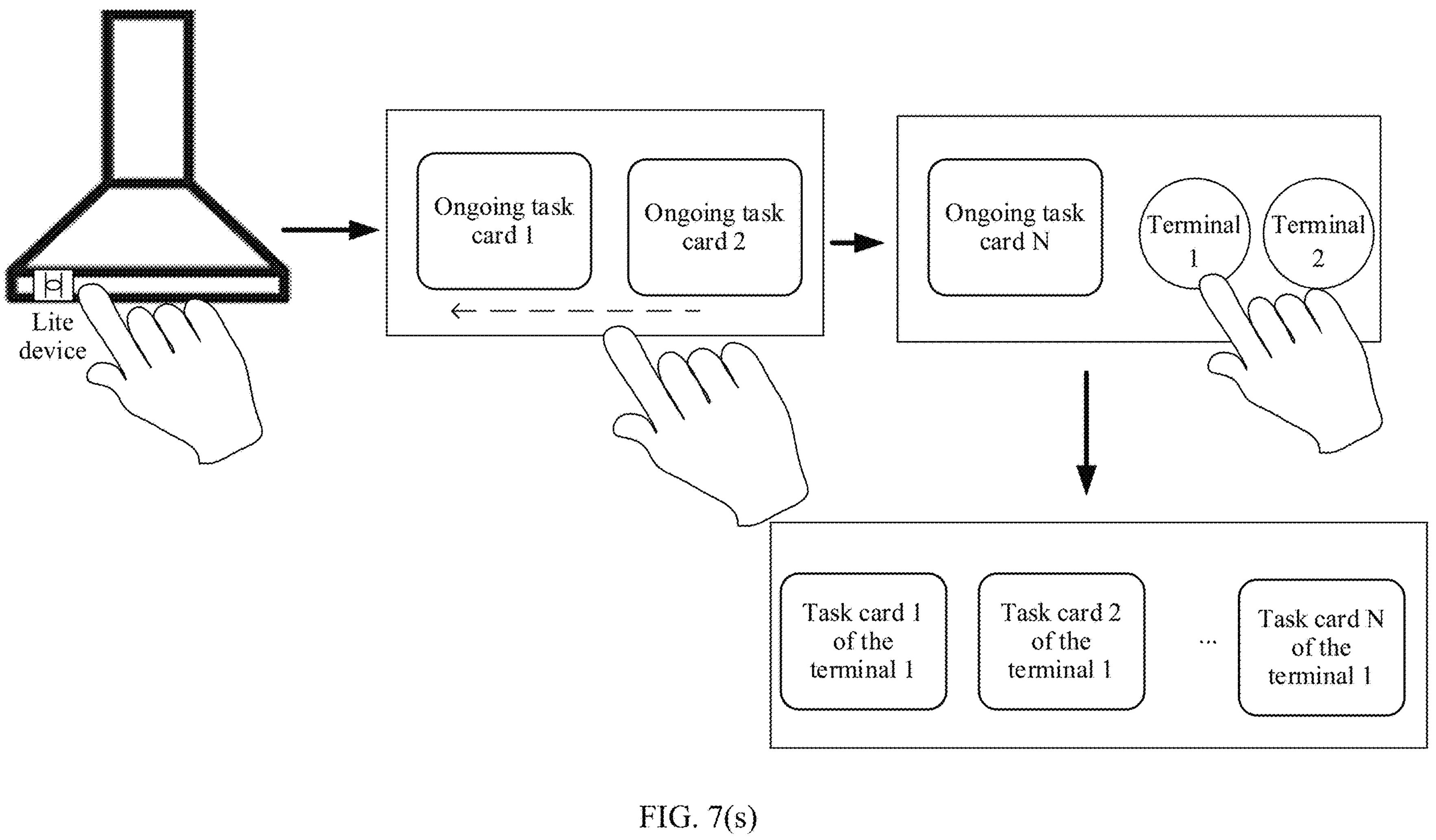

Currently, a user has more and more types of smart terminals. Therefore, many new user requirements are generated.

For example, when the user uses a mobile phone to play a video or edit a document, because a screen of the mobile phone is relatively small and is inconvenient to use, and it is more convenient to play a video or edit a document on a large-screen device, the video played on the mobile phone or the document edited on the mobile phone need to be seamlessly migrated to another large-screen device.

For another example, the user often concurrently performs a plurality of tasks on a mobile phone, for example, concurrently performs shopping and chatting, or concurrently watches a video and performs chatting. In a scenario in which the plurality of tasks are concurrently performed on the mobile phone, an image may be blocked due to the plurality of tasks. Therefore, these different tasks may be separately and concurrently run on a plurality of devices used by the user. In this way, the plurality of tasks can be continuously and concurrently run, and a case in which the image is blocked due to the plurality of tasks can be avoided.

For still another example, sometimes a device used by the user needs to be charged, but the user wants to continue a task that is not completed on the device. In this case, the task on the device may be handed off to another device for continuously running, so that the user can continue to process, on the another device, the task that is just not completed on the device.

In the foregoing scenarios, migration (or may also be referred to as handoff) of an application or a task to an unused device is involved.

Currently, for a migration solution applied to different devices, the following is mentioned in the conventional technology:

A user logs in to a device 1 and a device 2 that use a same account, and the user is using an application (for example, an application A) that is run on the device 1. After the device 1 and the device 2 approach each other, corresponding prompts are displayed on both the device 1 and the device 2. For example, an icon of the device 1 is displayed at an upper right corner of an icon of the application A at the bottom of a Dock of the device 2 (for example, a personal computer PC), or a prompt is displayed at the bottom of a multi-task interface of the device 1 (for example, a mobile phone/tablet), to prompt the user to migrate the application A to the device 2. The user may open, for handoff, the application A on the device 2 by tapping the icon of the device 1 at the bottom of the Dock of the device 2 or by tapping the prompt at the bottom of the multi-task interface of the device 1.

However, in the foregoing solution, for different applications (APPs), different cross-device operation manners (or referred to as cross-device entries) are provided, and the applications need to perform adaptation. For example, for call applications and information applications, migration is performed in a notification message manner; and for photographing applications, cross-device migration is performed in a device icon manner. In addition, applications that support migration are mainly native applications (for example, office applications and image-editing applications) of a device. As a result, there are various cross-device entries, third-party application adaptation is difficult, and adaptation costs are high. In addition, for an application that needs to be migrated, user operations are complex, causing poor user experience.

In view of this, this application provides a method for displaying and controlling a task of a remote device, which can help a user conveniently view and manage a historical task of another device on a device, and can be applied to almost all applications. There is no need to perform adaption by an application, a requirement of the user for managing and controlling tasks of a plurality of devices is met, an application handoff procedure is further simplified, user operations are simplified, and user experience is improved.

The following describes in detail the method for displaying and controlling a task of a remote device provided in this application.

The Android system is used as an example. This system provides a system-level interface, configured to display a list of recently accessed tasks. The user may perform an operation of closing a recently run application or all recently run applications. By using this method, a local application (APP) of a terminal can be closed. In a distributed scenario, a recently used application of another terminal needs to be further presented and closed.

FIG. 1 is a schematic diagram of a communication system that is applicable to an embodiment of this application and that is provided in this application.

For example, as shown in FIG. 1, a communication system 100 may include various terminal devices (in this application, the terminal device may also be referred to as an electronic device) such as a mobile phone 101, a tablet computer 102, and a large-screen device 103. Optionally, the communication system 100 may further include smart home devices such as a smart refrigerator 104 and a smart air conditioner 105. When smart terminals are the smart home devices such as the smart refrigerator and the smart air conditioner, recently used applications may be tasks currently or recently executed by these smart home devices.

Certainly, the communication system 100 may further include more other terminal devices, for example, IOT (internet of things, internet of things) devices such as a smart sound box, an in-vehicle device (which may also be referred to as a head unit), a notebook computer, an ultra-mobile personal computer (UMPC), a handheld computer, a netbook, a personal digital assistant (PDA), a wearable electronic device, and a virtual reality device, which are not shown in FIG. 1.

A type of the terminal device (for example, the mobile phone 101, the tablet computer 102, or the large-screen device 103) is not specifically limited in this embodiment of this application. In some embodiments, the terminal device in this embodiment of this application may be a mobile phone, a wearable device (for example, a smart band, a smartwatch, or a headset), a tablet computer, a laptop, a handheld computer, a notebook computer, an ultra-mobile personal computer (UMPC), a cellular phone, a personal digital assistant (PDA), an augmented reality (AR)/virtual reality (VR) device, or the like, and may also be a television, a large screen, a sound box, a refrigerator, an air conditioner, an in-vehicle device, a printer, a projector, or the like. An example embodiment of an electronic device includes but is not limited to an electronic device using iOS®, Android®, Microsoft®, Harmony, or another operating system.

Terminals in the communication system 100 may be interconnected by using a communication network. For example, the communication network may be a wired network, or may be a wireless network. For example, the communication network may be a local area network (local area network, LAN), or may be a wide area network (WAN), for example, the internet. The communication network may be implemented by using any known network communication protocol. The network communication protocol may be various wired or wireless communication protocols such as Ethernet, a universal serial bus (USB), a firewire, a global system for mobile communications (GSM), a general packet radio service (GPRS), code division multiple access (CDMA), wideband code division multiple access (WCDMA), time-division code division multiple access (TD-CDMA), long term evolution (long term evolution, LTE), Bluetooth, wireless fidelity (Wi-Fi), NFC, a voice over Internet protocol (VoIP), a communication protocol that supports a network slicing architecture, or any other suitable communication protocol.

In other words, the terminals in the communication system 100 may establish a network (namely, networking) according to a specific communication protocol and networking policy, so that the terminals in the communication system can communicate with each other.

For example, electronic devices in the communication system 100 may access a Wi-Fi network provided by an access point (AP) like a router, so that a Wi-Fi connection is established between the electronic devices. For another example, the terminals in the communication system 100 may log in to a same account (for example, a HUAWEI account), and then interconnect with each other by using one or more servers.

A recent tasks screen is an interface configured to display a recently run task of a terminal on a system user interface (UI). When the terminal is triggered to open the recent tasks screen, a display of the terminal may display the recently run task of the terminal, or a recently run application of the terminal. For a plurality of interfaces of a same application, each interface of the plurality of interfaces may be displayed as an independent task on the recent tasks screen. For example, when the terminal opens two Word documents, if the recent tasks screen is displayed, two task cards may be separately used to display interfaces corresponding to the two Word documents. For ease of description, a difference between a task and an application is not specially distinguished in this application, and whether a plurality of interfaces of the application are displayed as one task card or a plurality of task cards is not limited in this application.

For example, after the user triggers the terminal to open a first application, the terminal is back to a home screen by using a gesture or a button. In this case, the first application is switched to the background for running. Then the user opens a second application, and when the second application is run, the user triggers the terminal to open the recent tasks screen. It may be understood that because a system function of the terminal is currently used to run a program corresponding to the recent tasks screen on the foreground, the second application is also switched to the background for running. In this case, both the first application and the second application are recently run applications, and information about the first application and the second application appears on the recent tasks screen.

Information about a plurality of recently run applications is displayed on the recent tasks screen. Generally, an identifier and a task card corresponding to an application are displayed on the recent tasks screen. The identifier of the application may be an application name represented by text or an icon of the application. The task card is a rectangular box, and content in the box is a snapshot of the application. For example, the system captures an interface used when the application is switched to the background for running as a snapshot. The identifier and the task card of the application may be a whole. For example, the identifier is embedded in the task card as a part of the task card. Alternatively, the identifier and the task card of the application are in a separated state. This is not limited in this application. When there are a plurality of applications that are recently run on the terminal, there are a plurality of task cards. Due to factors such as interface display or interface settings, some task cards are completely displayed on the recent tasks screen, some task cards are partially displayed on the recent tasks screen, and some task cards may be hidden (not displayed) on the recent tasks screen.

Figures 1, 8A:
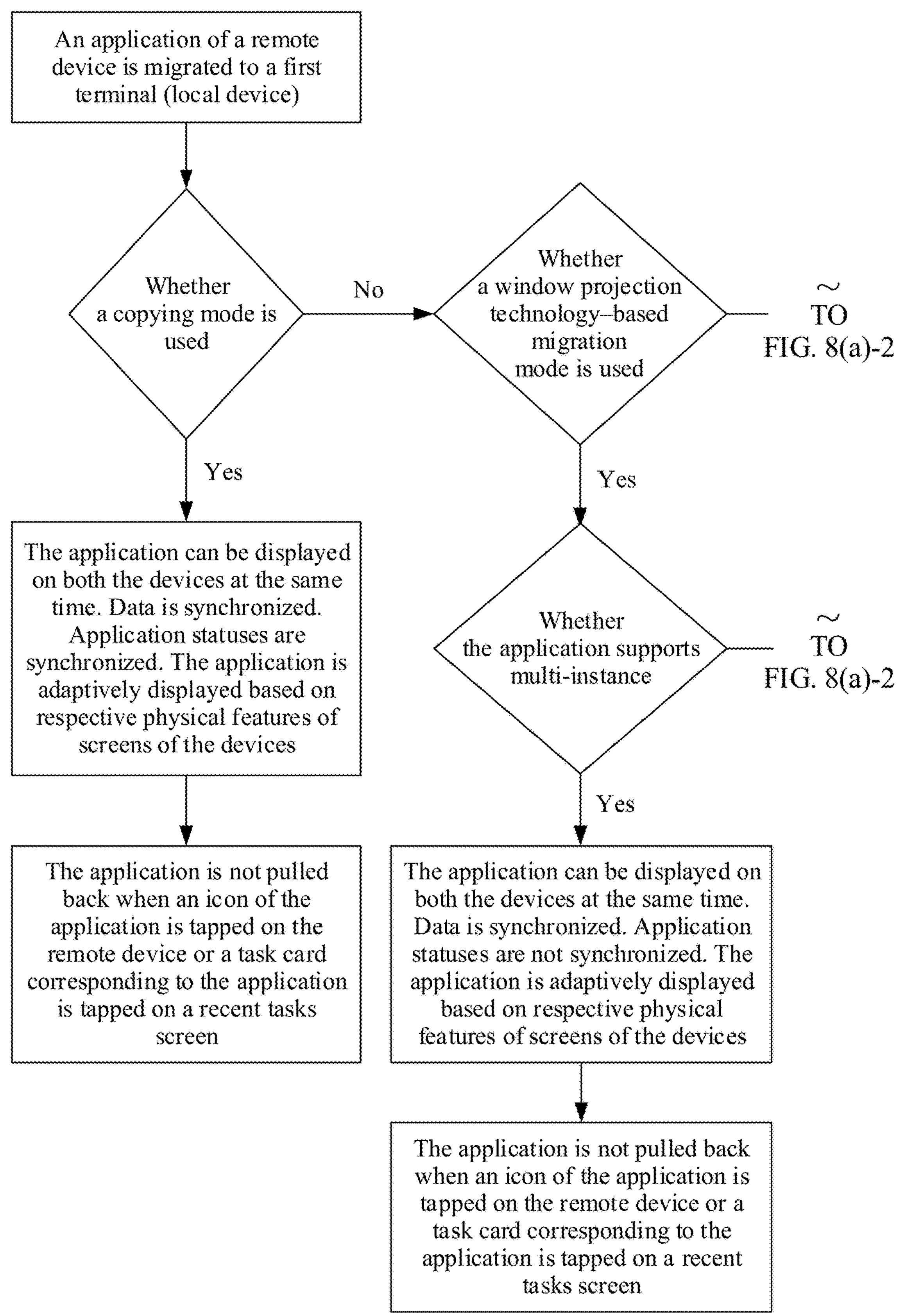
Figures 2, 8A:
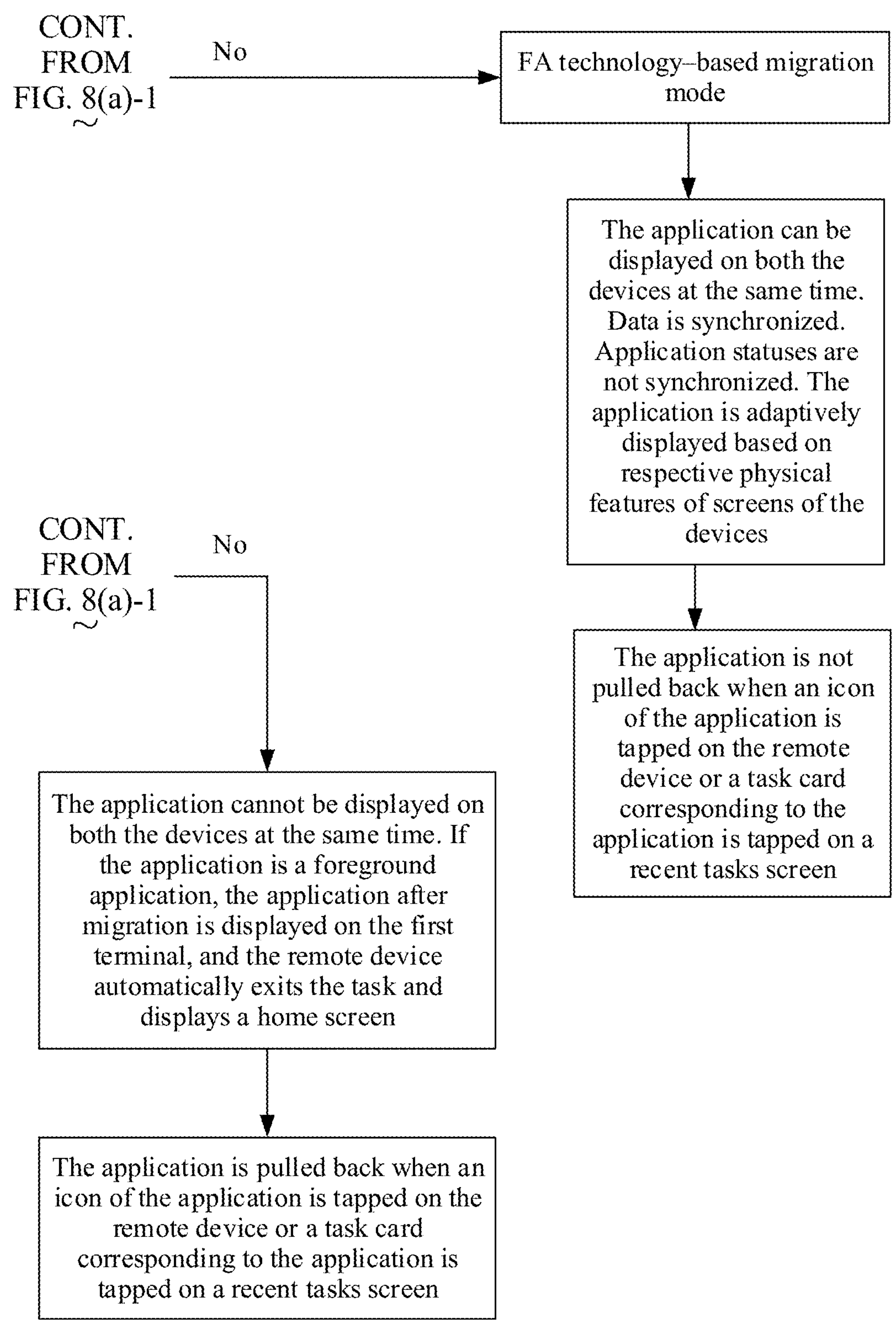
Figures 1, 8B:
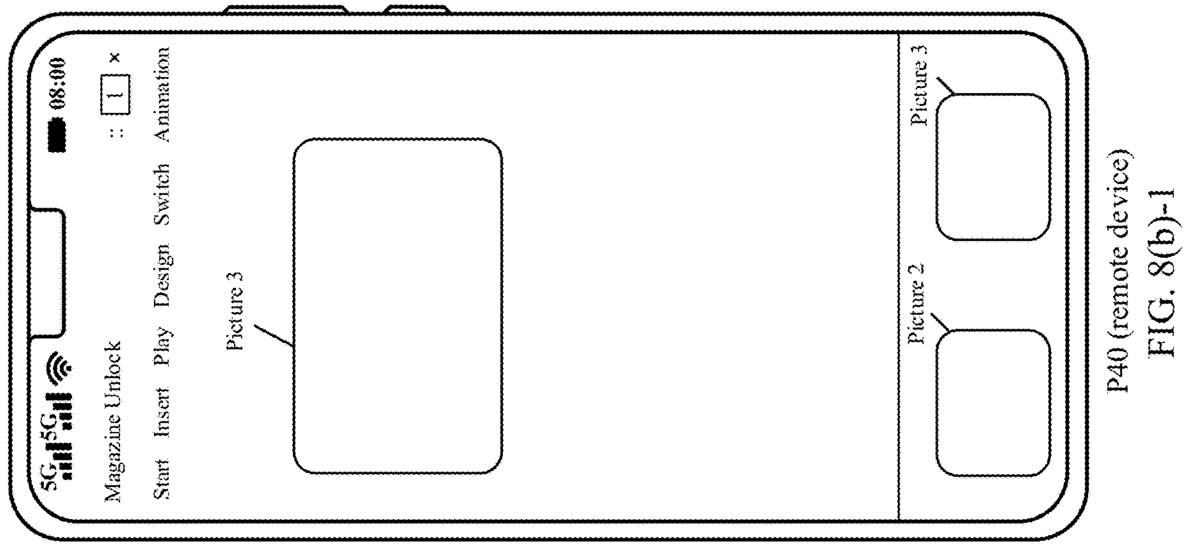
Figures 2, 8B:
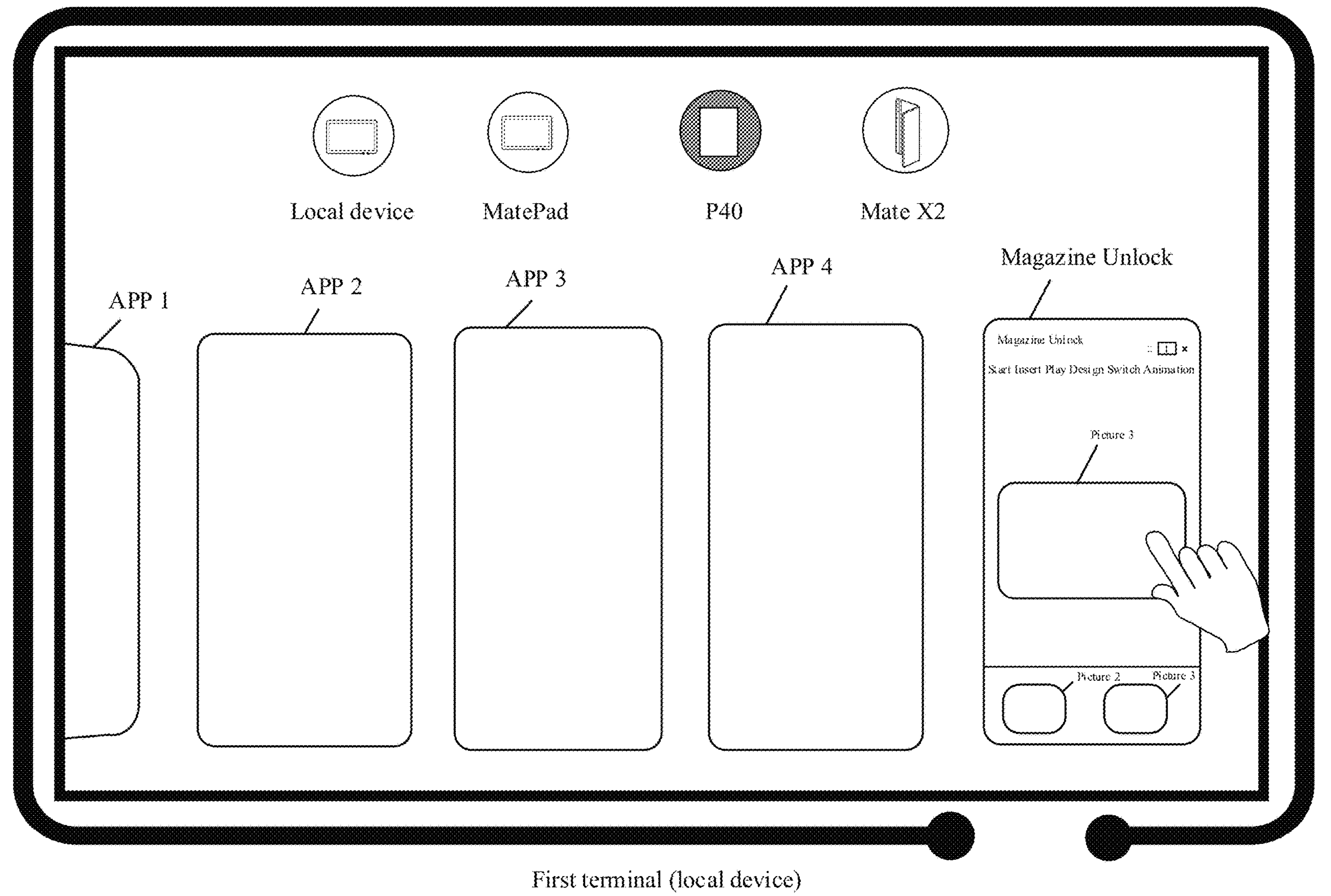
Figure 8C:
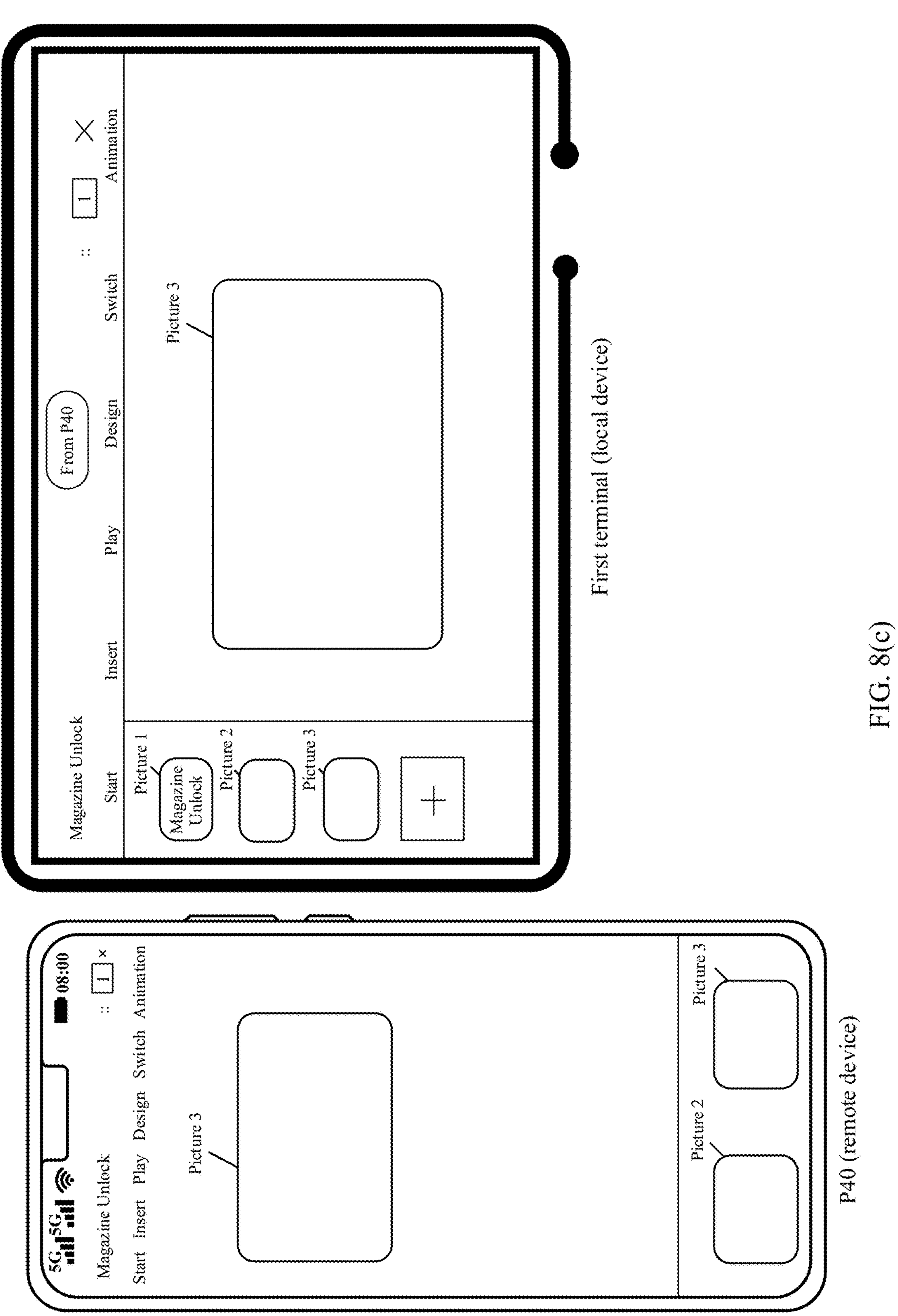
FIG. 8(*a*)-1 and FIG. 8(*a*)-2 are a schematic flowchart of determining, based on different migration modes, a status displayed when a task card of a remote device is pulled up on a recent tasks screen of a first terminal, and a running status of an application according to this application.
Figures 1, 8D:
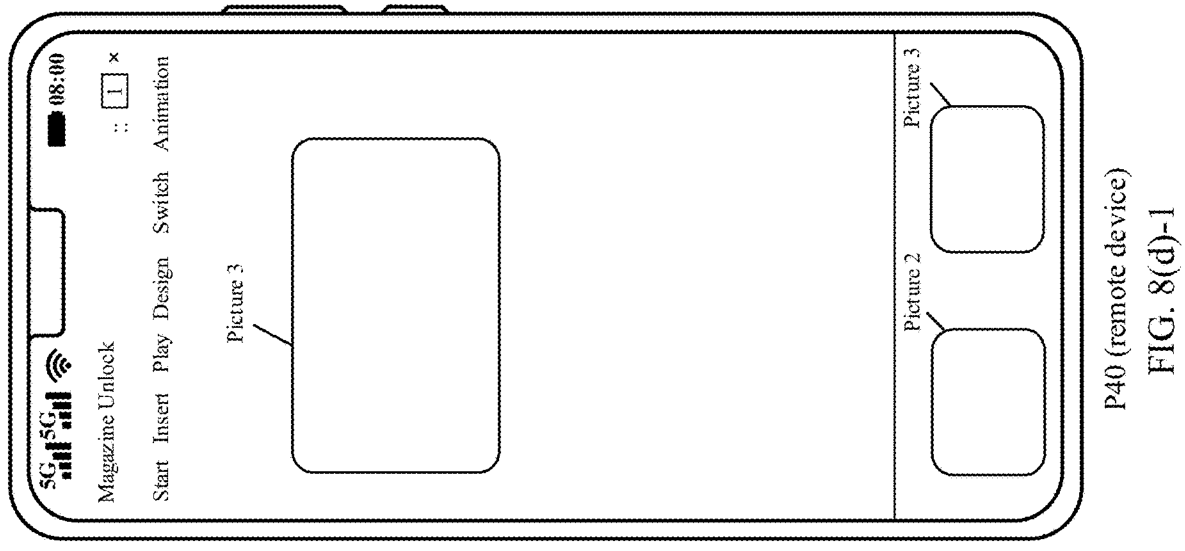
Figures 2, 8D:
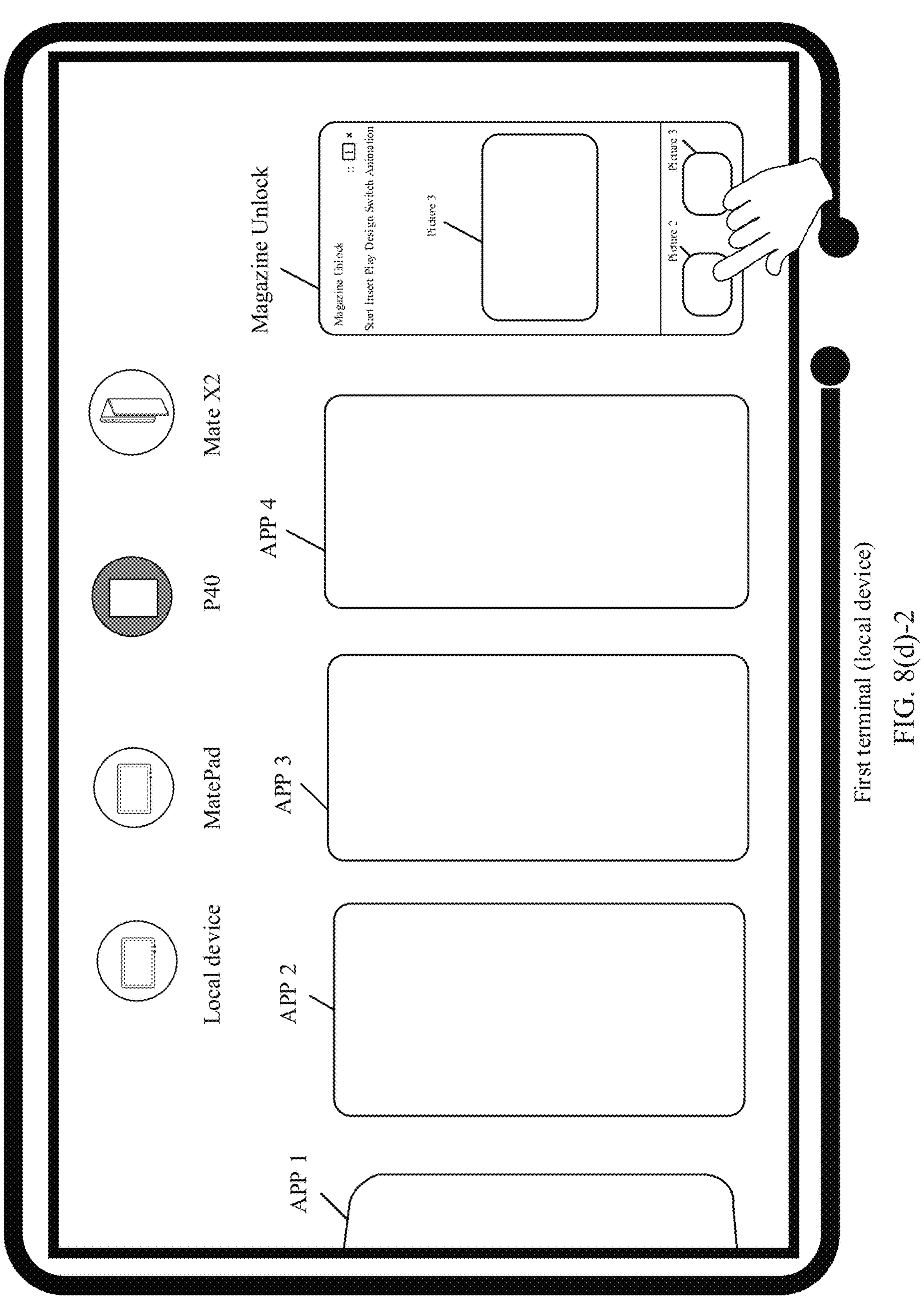
Figure 8E:
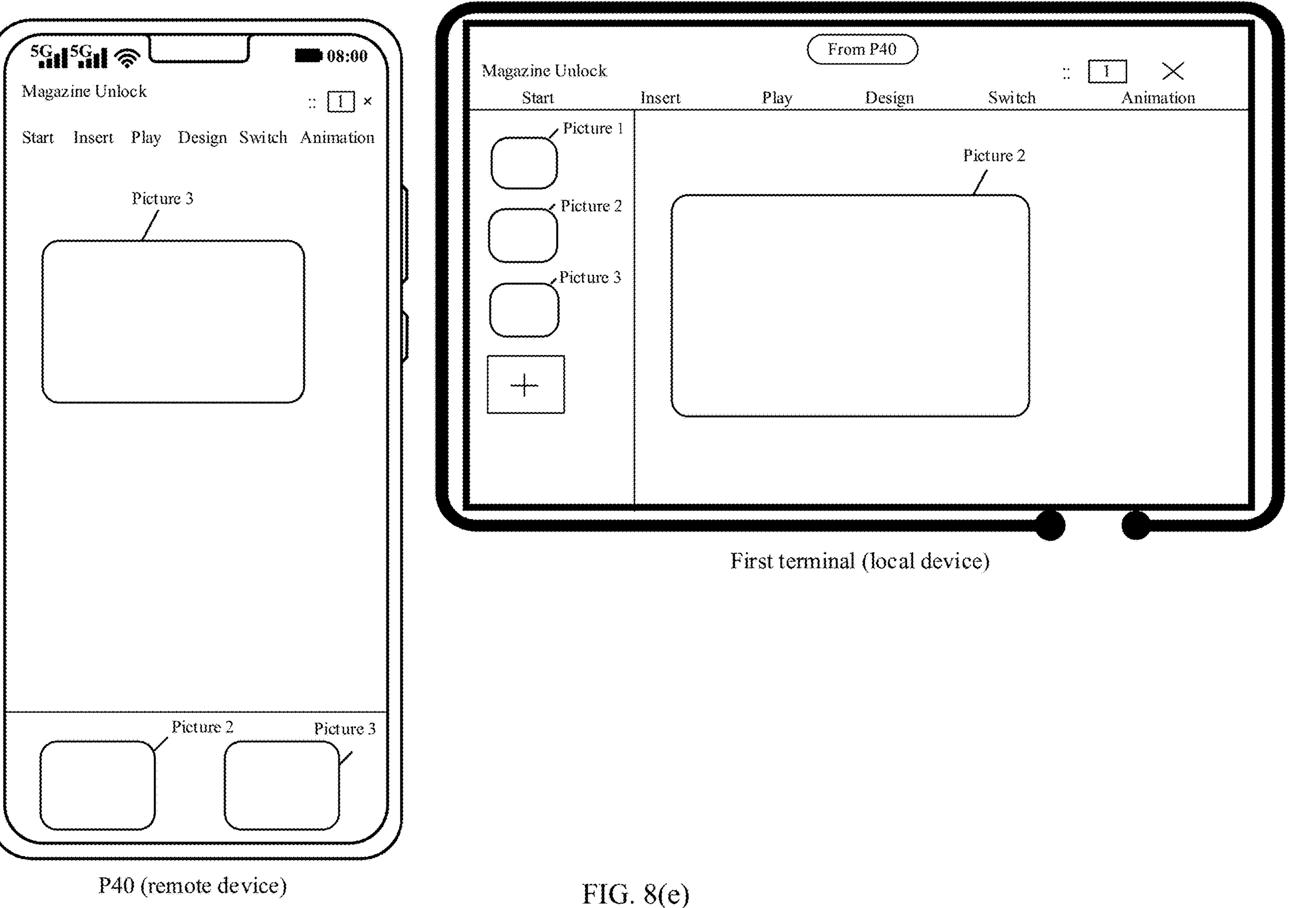
Figure 8F:
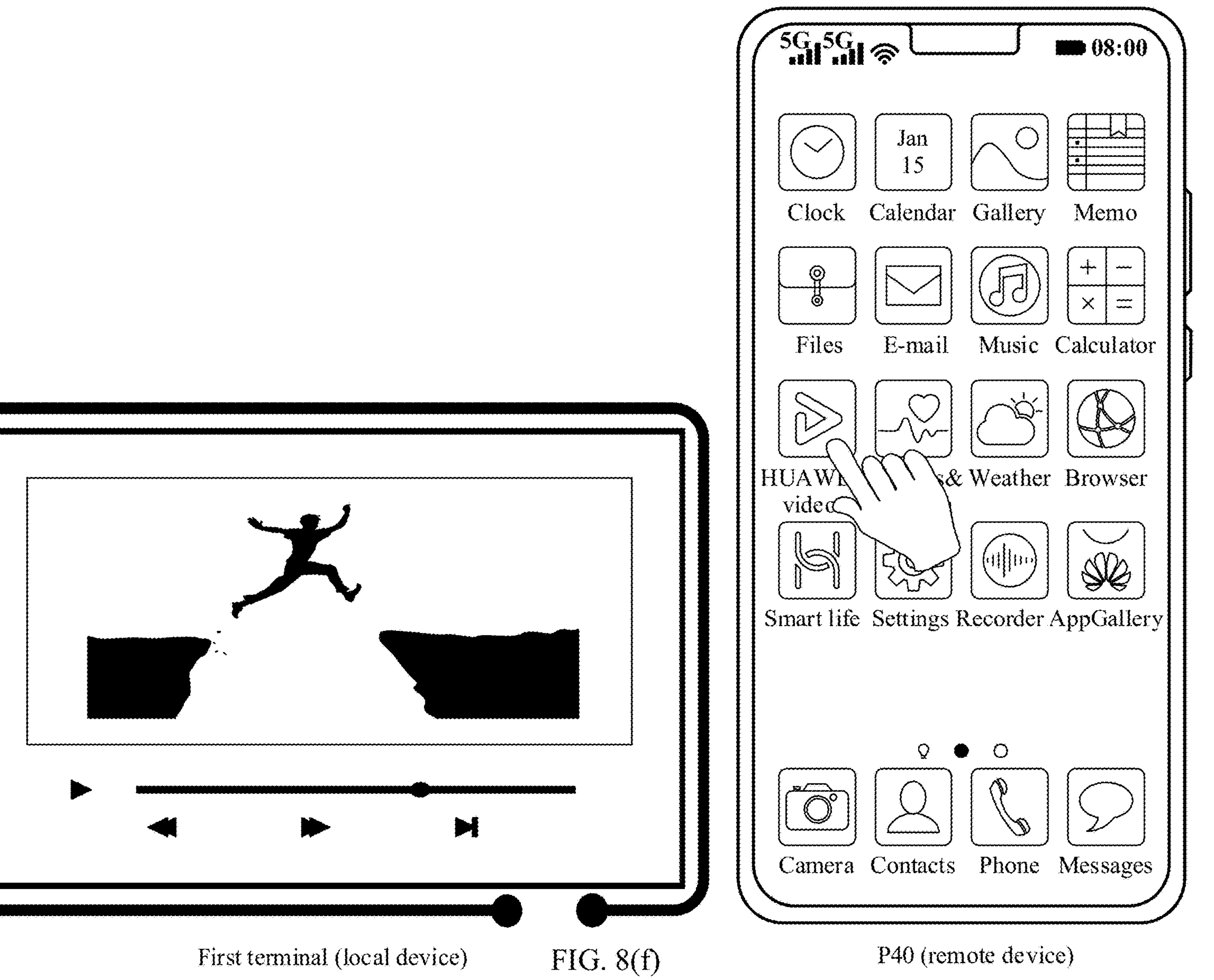
Figure 8G:
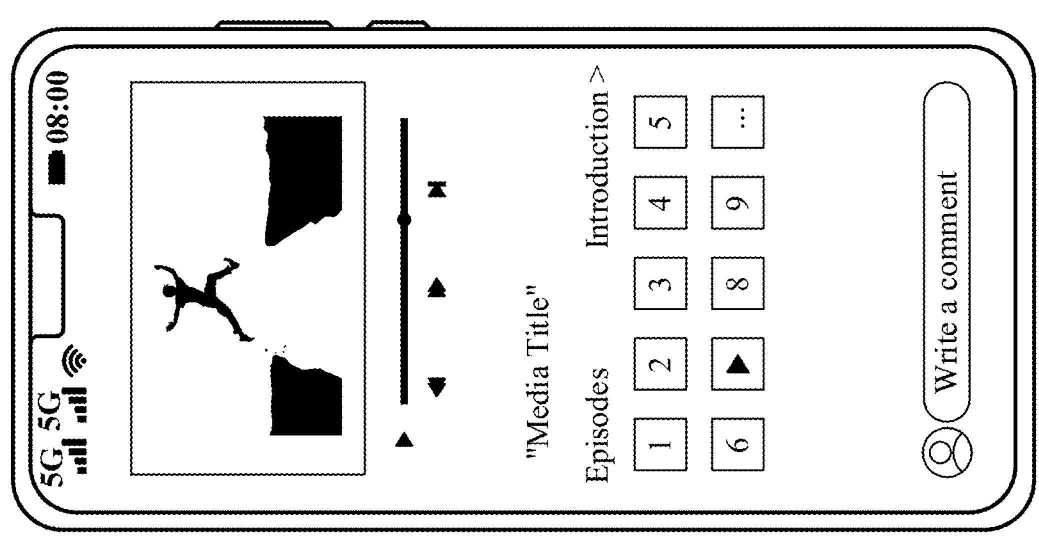
Figure 8G:
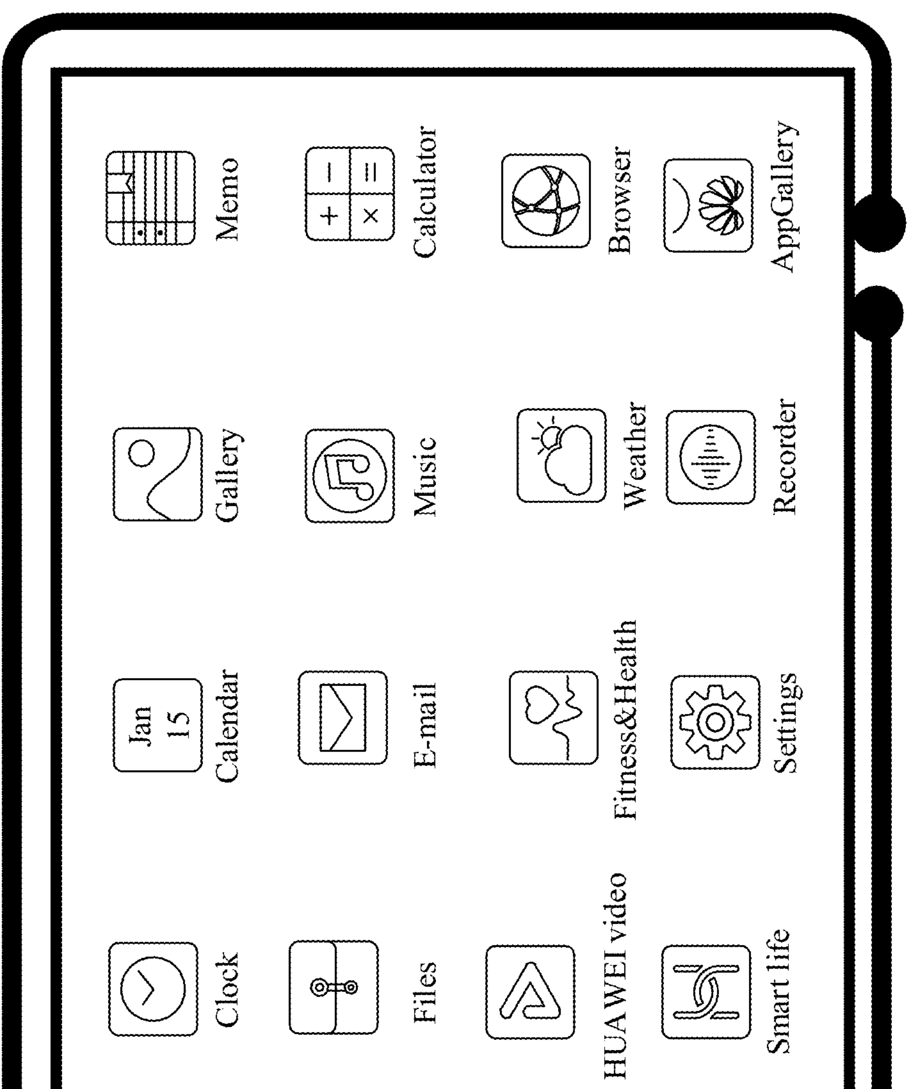
Figure 8H:
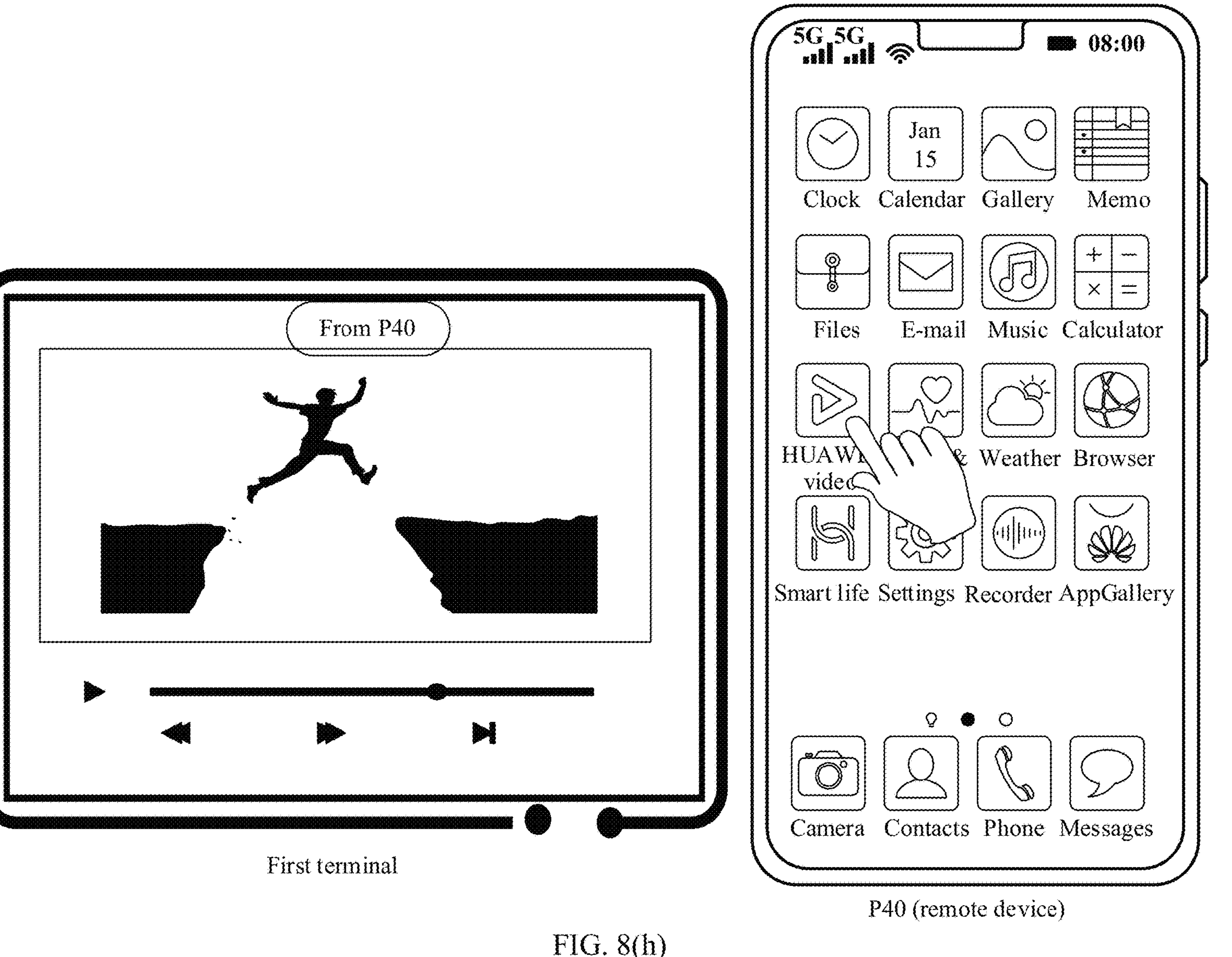
Figure 8I:
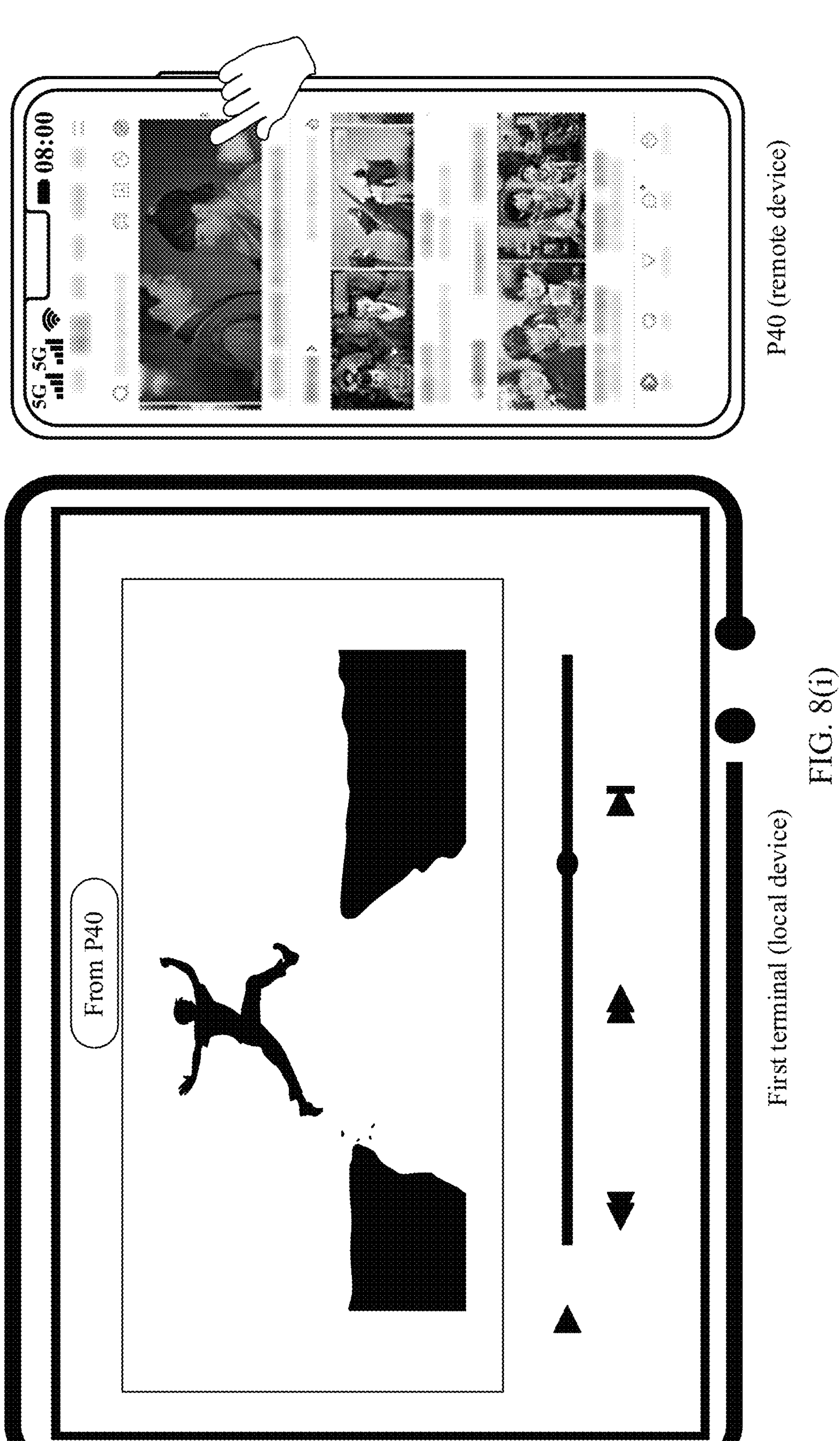
Figures 1, 8J:
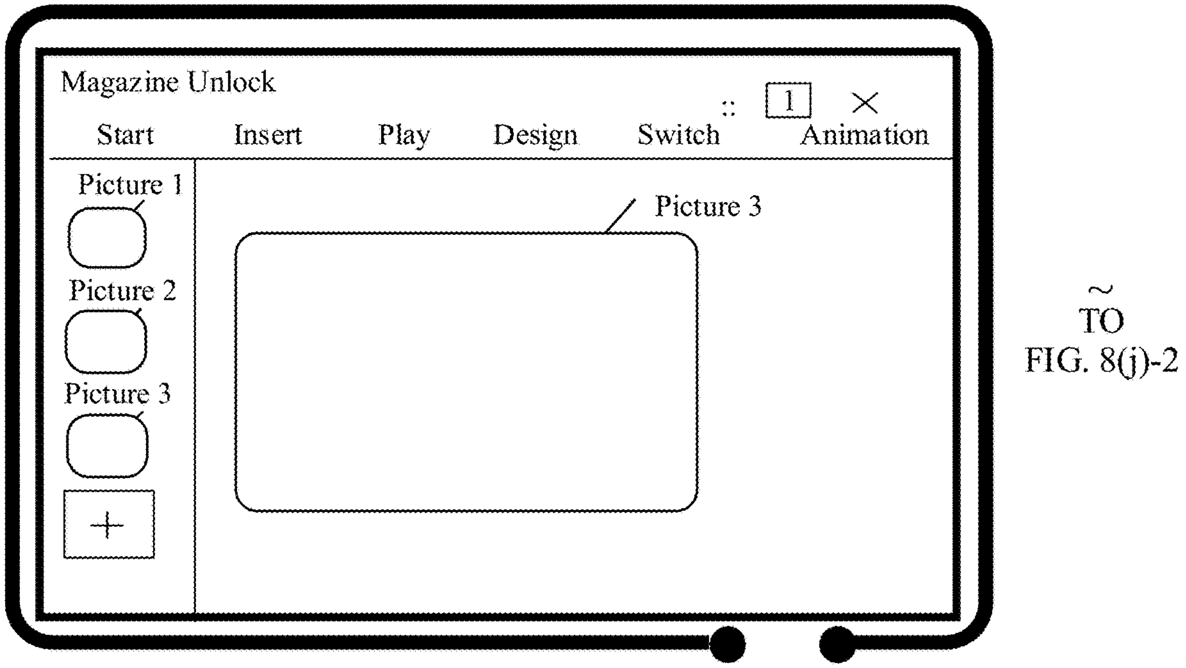
Figures 2, 8J:
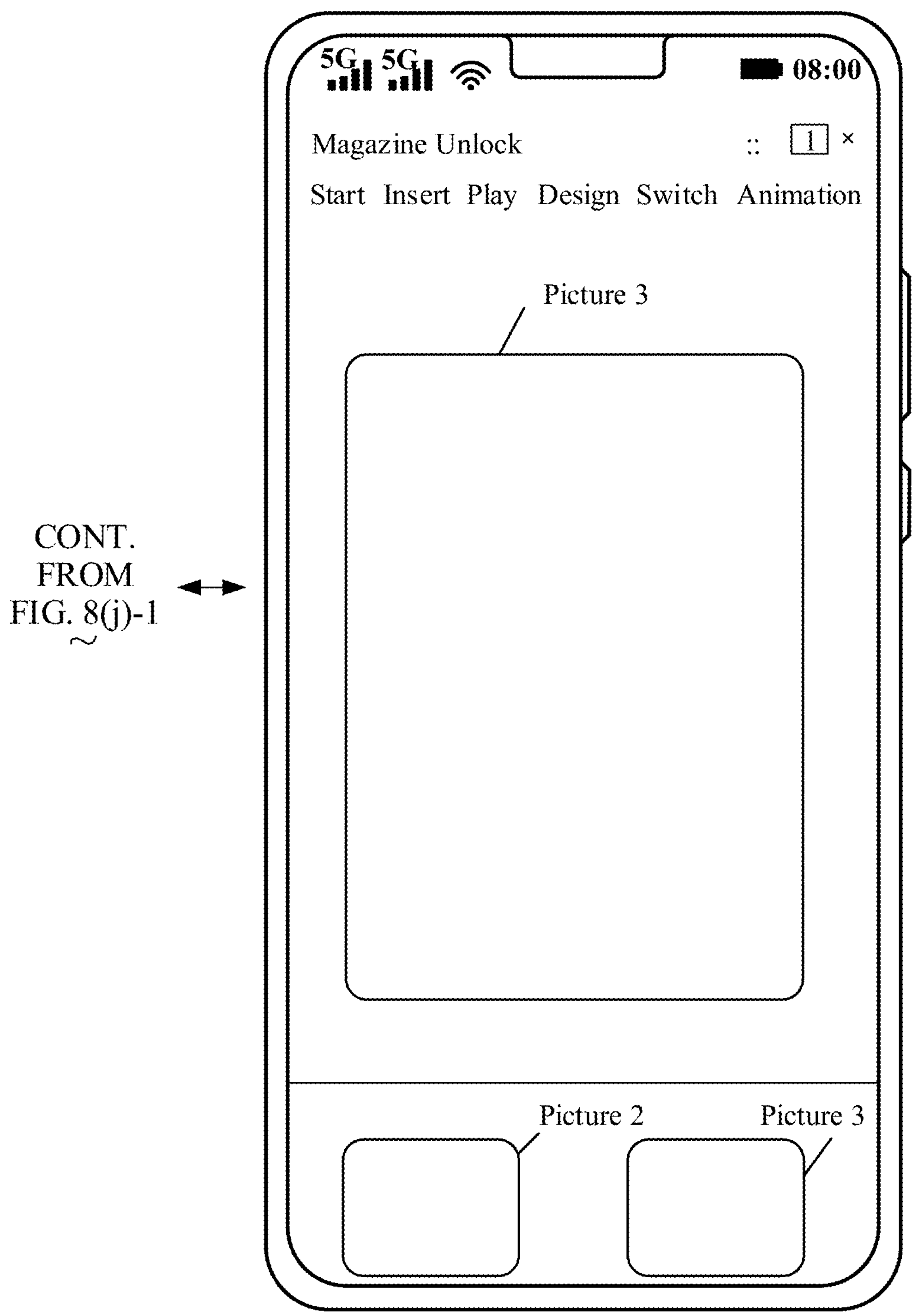
Figure 8K:
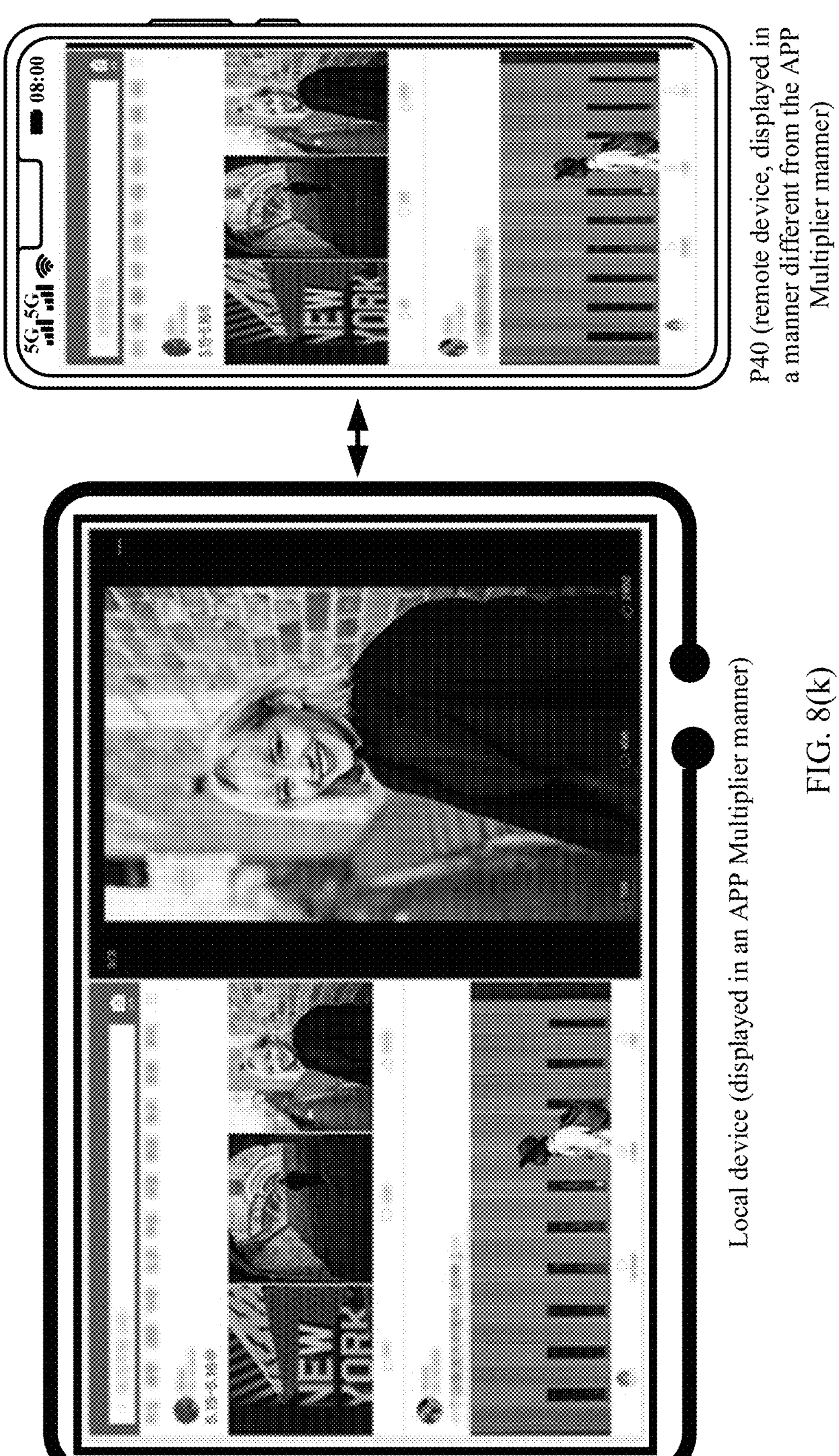
Figure 8L:
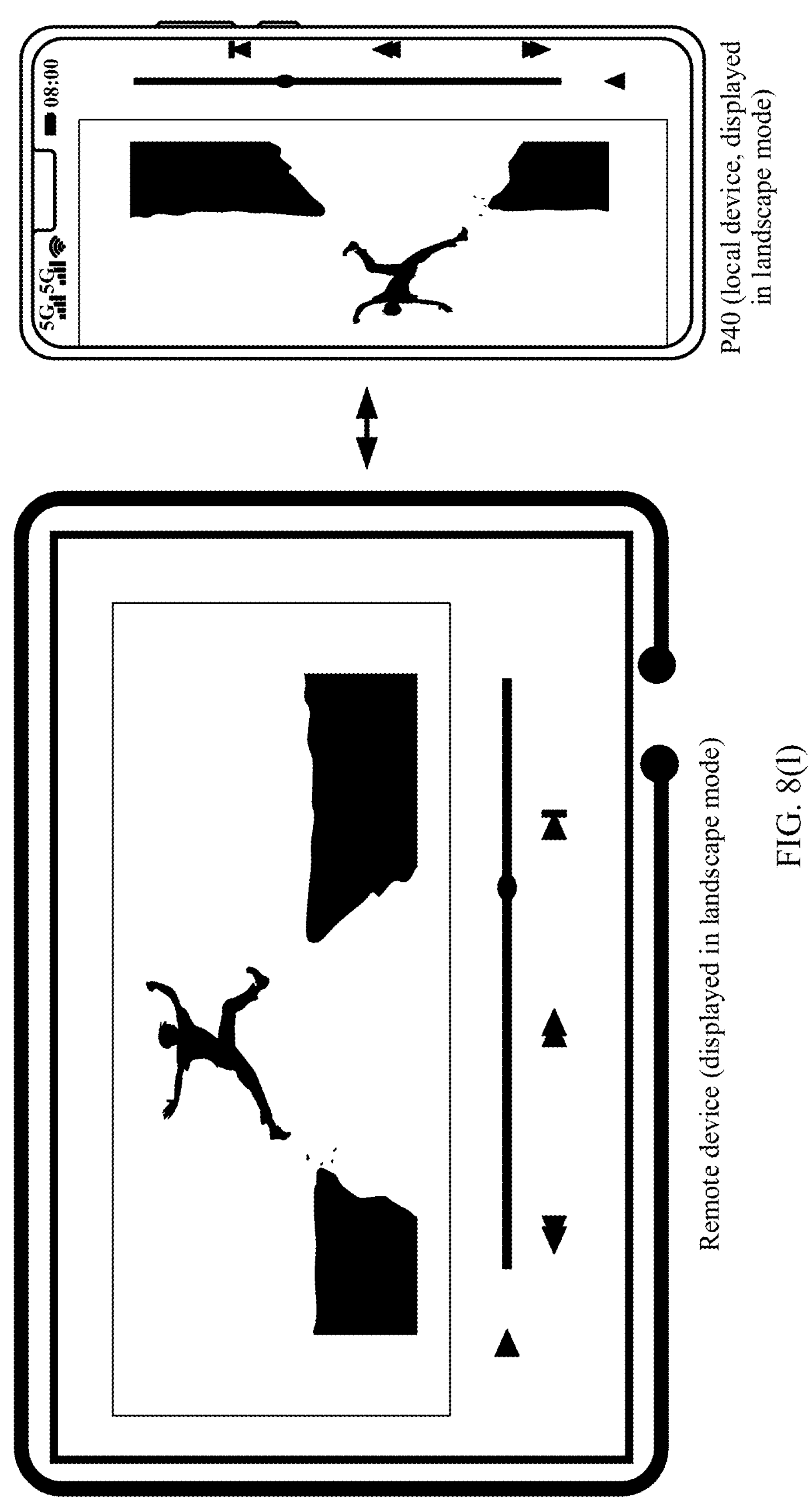
Figure 8M:
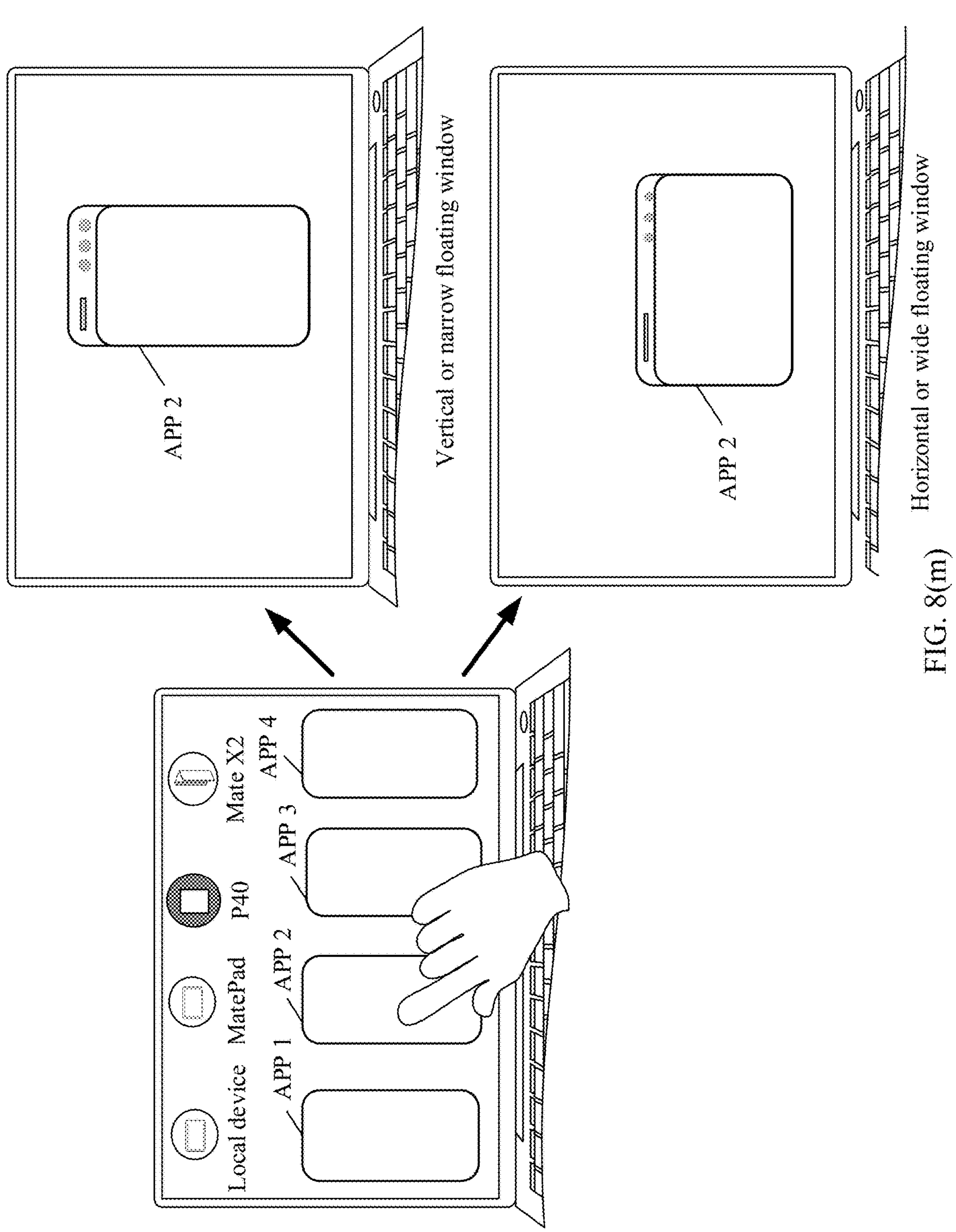
Figure 8N:
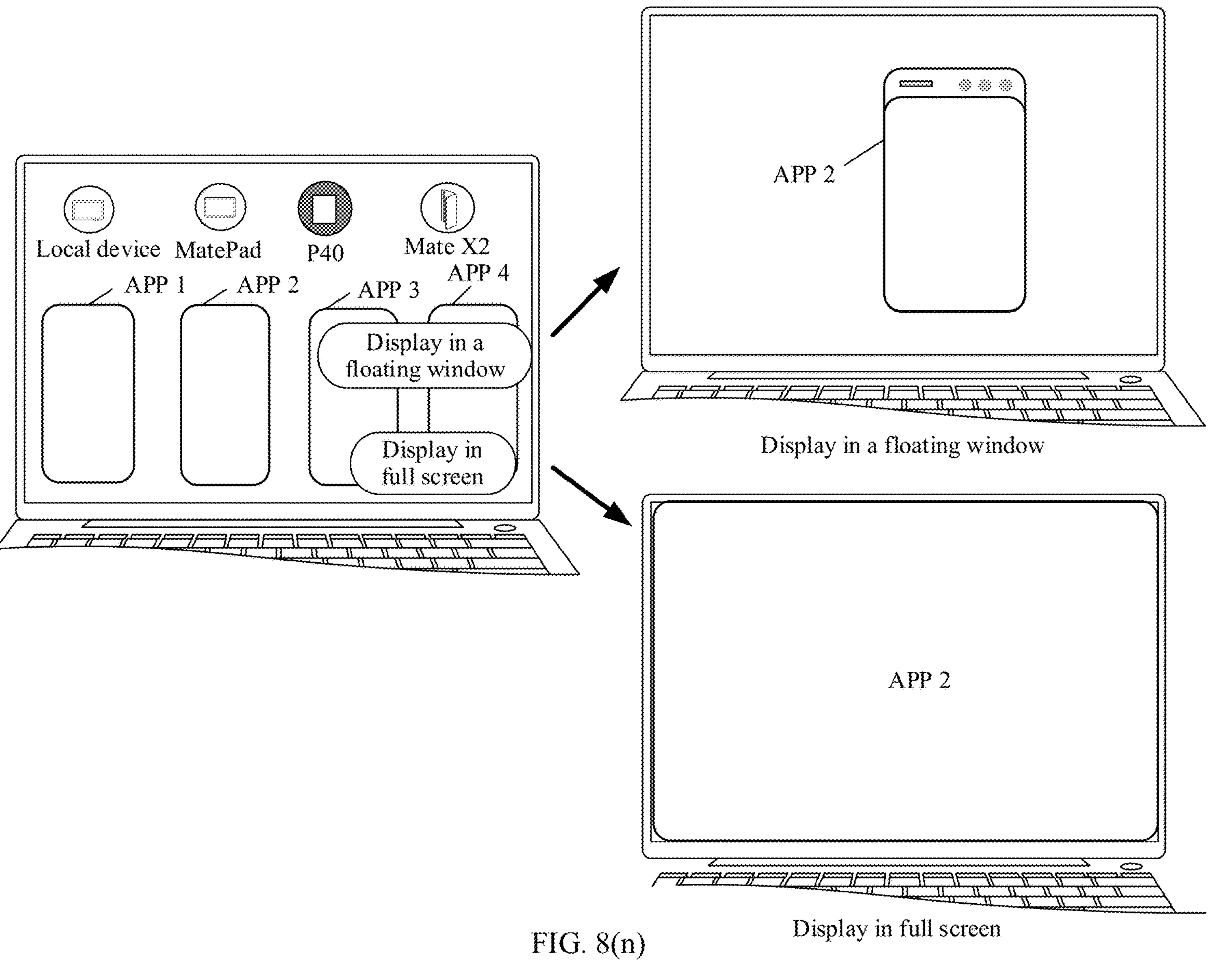
Figure 8O:
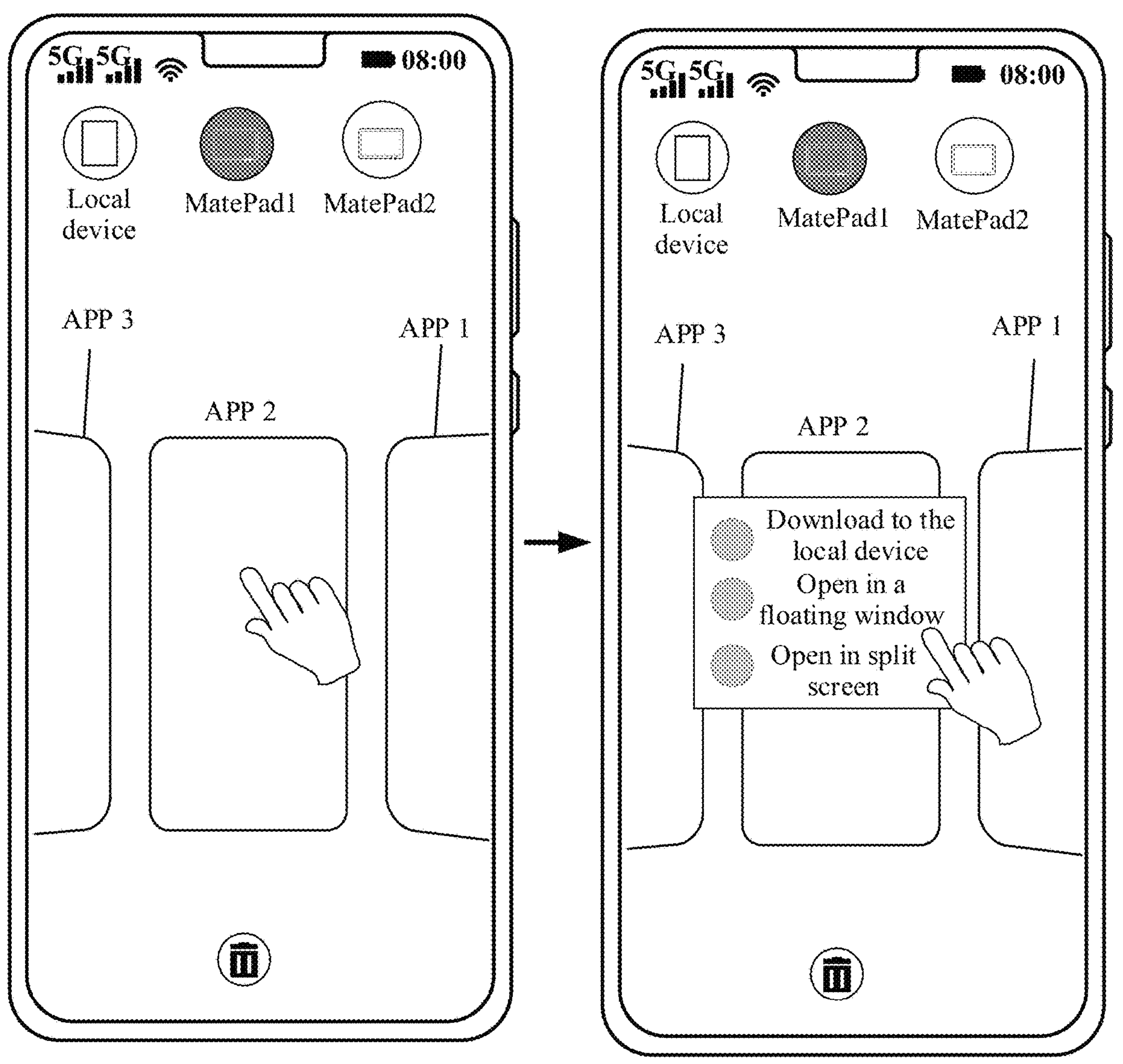
Figure 8P:
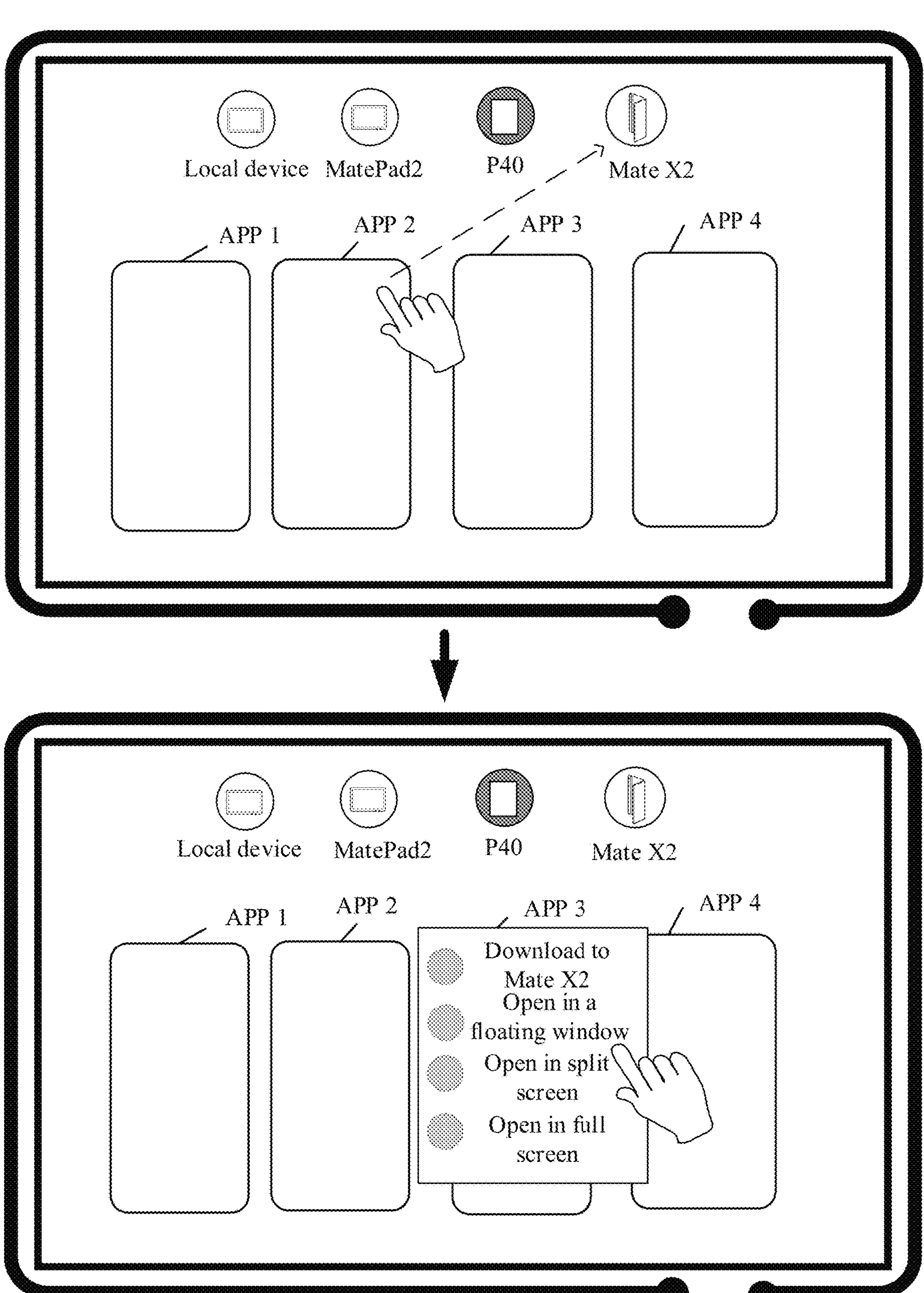
Figure 8Q:
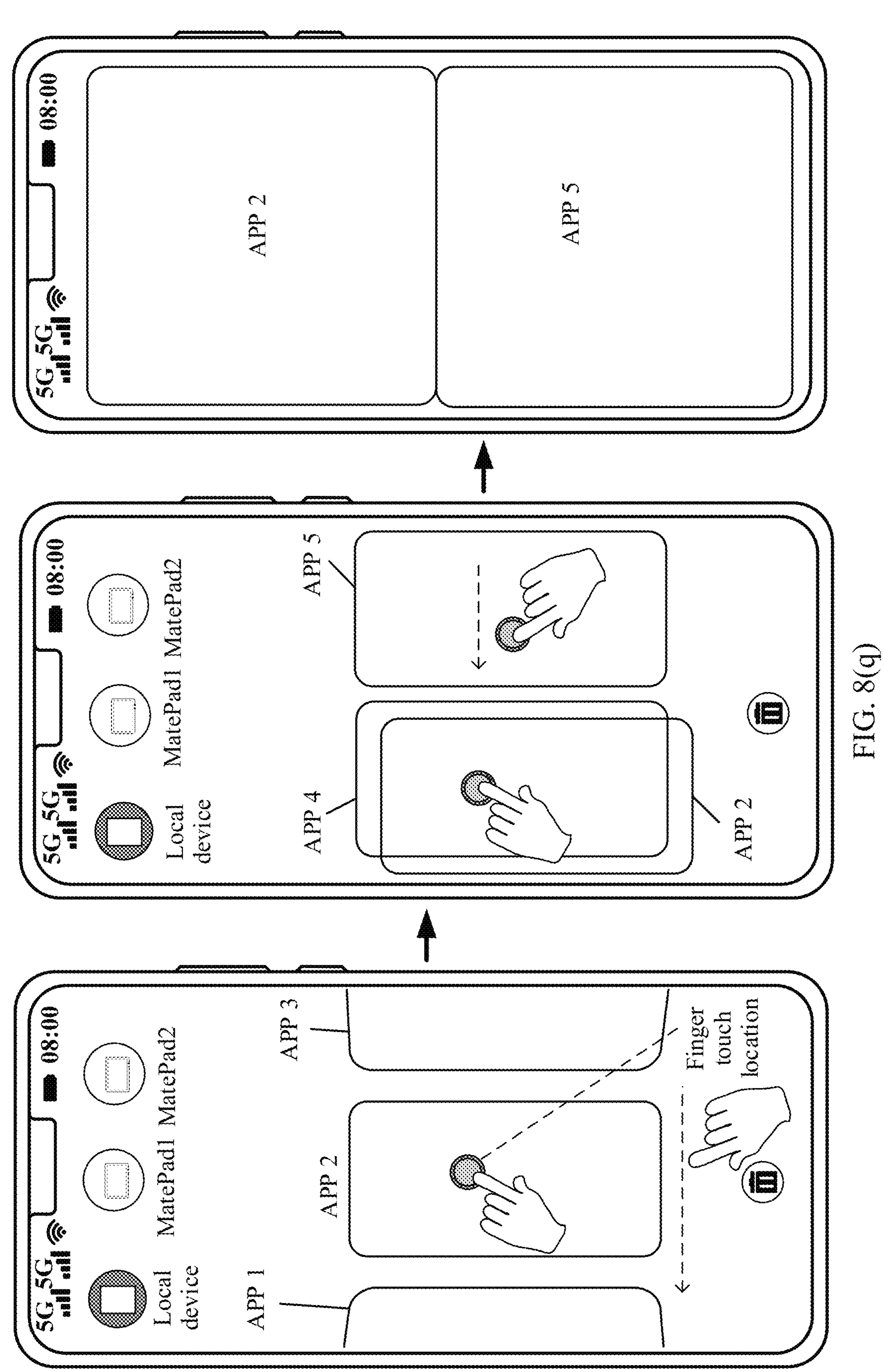
Figures 1, 8R:
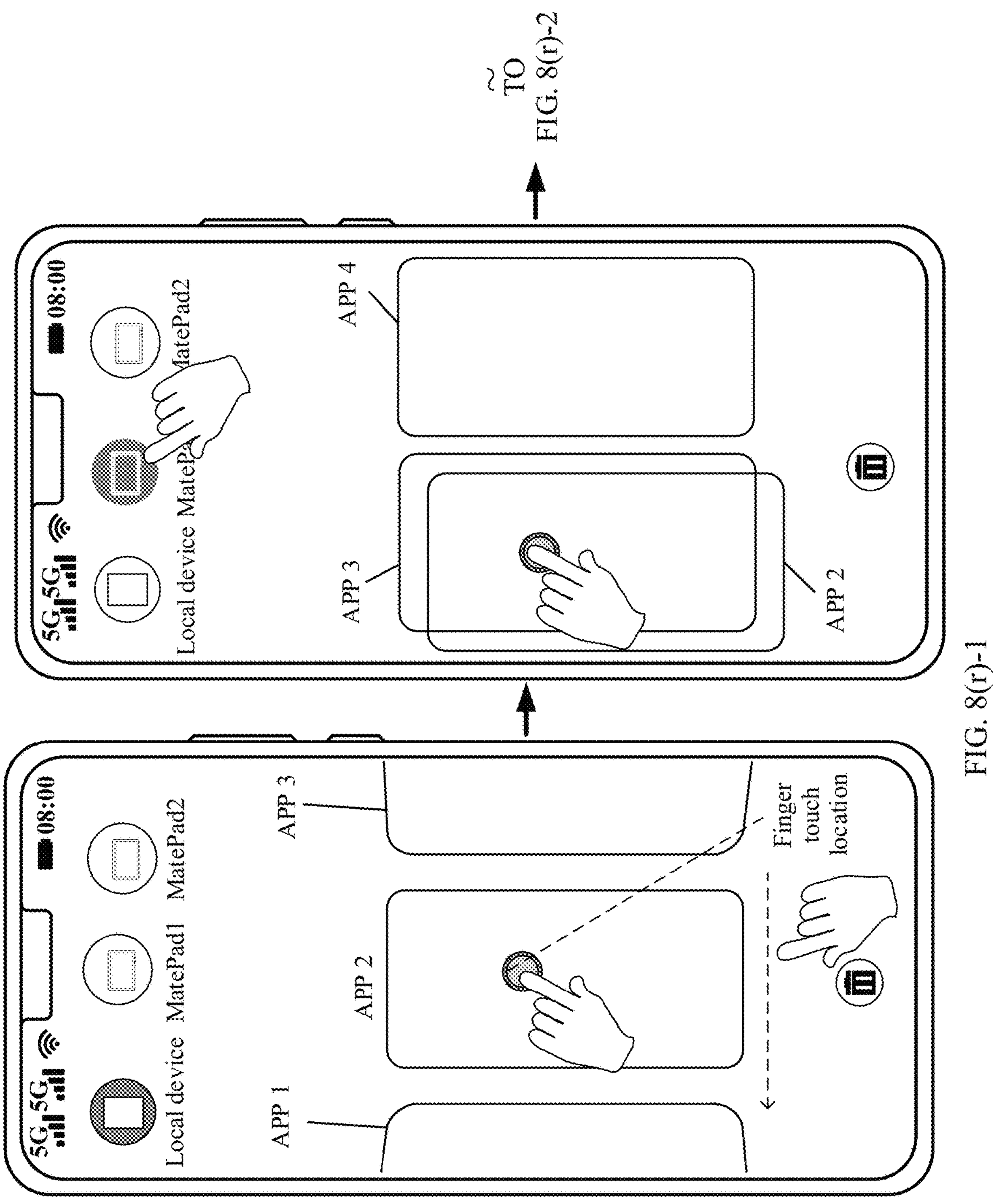
Figures 2, 8R:
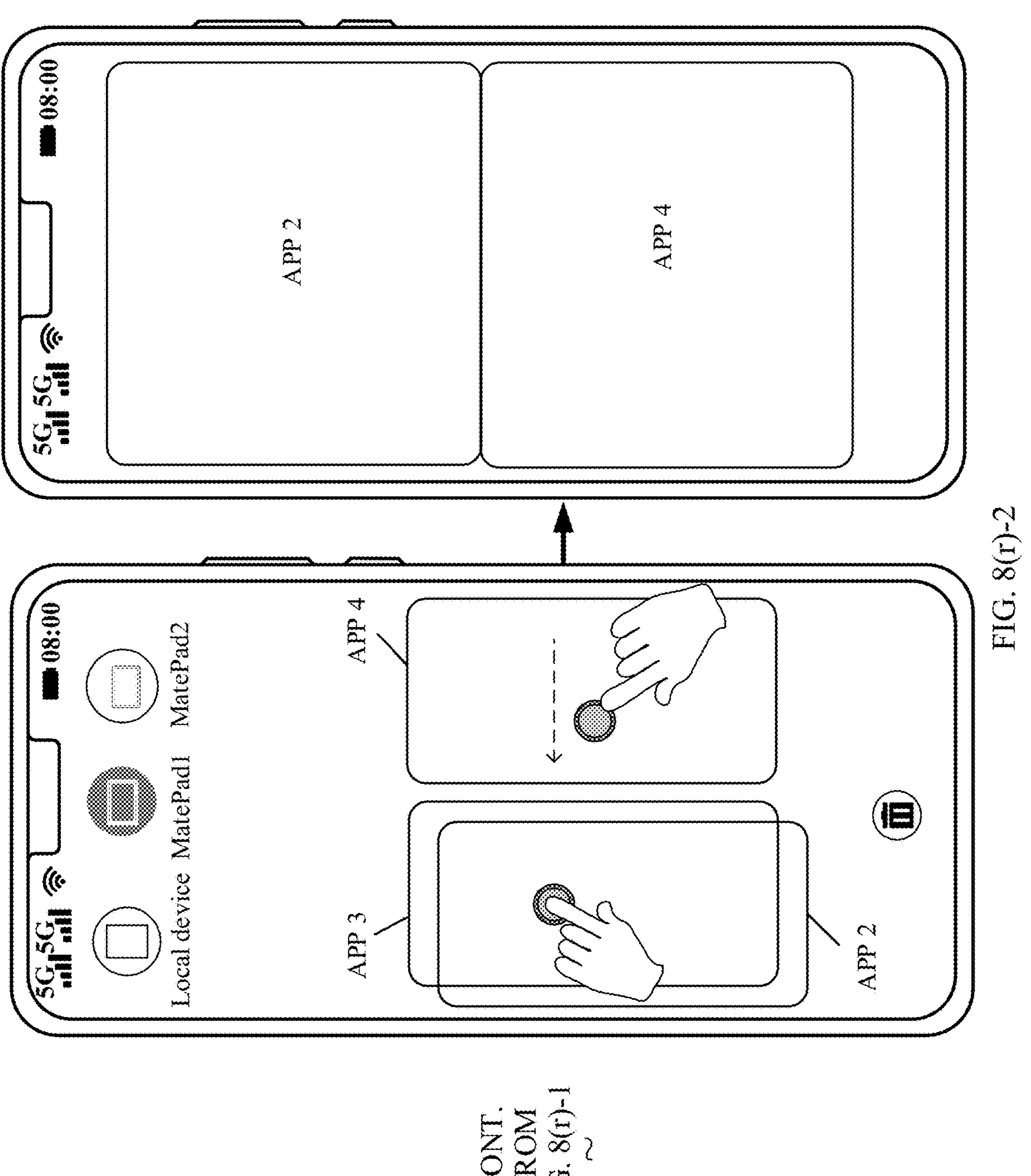
Figure 8S:
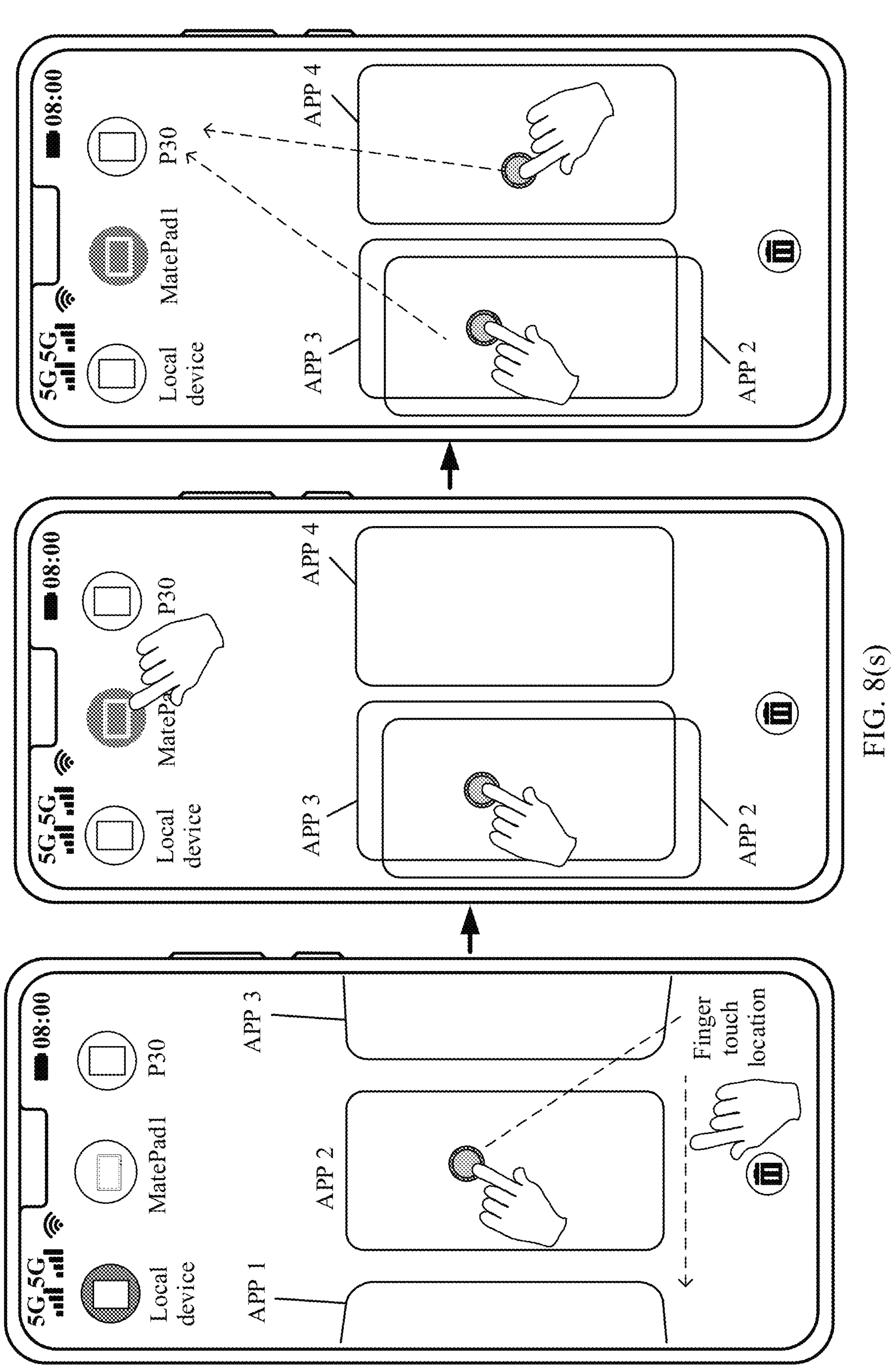
Figure 8T:
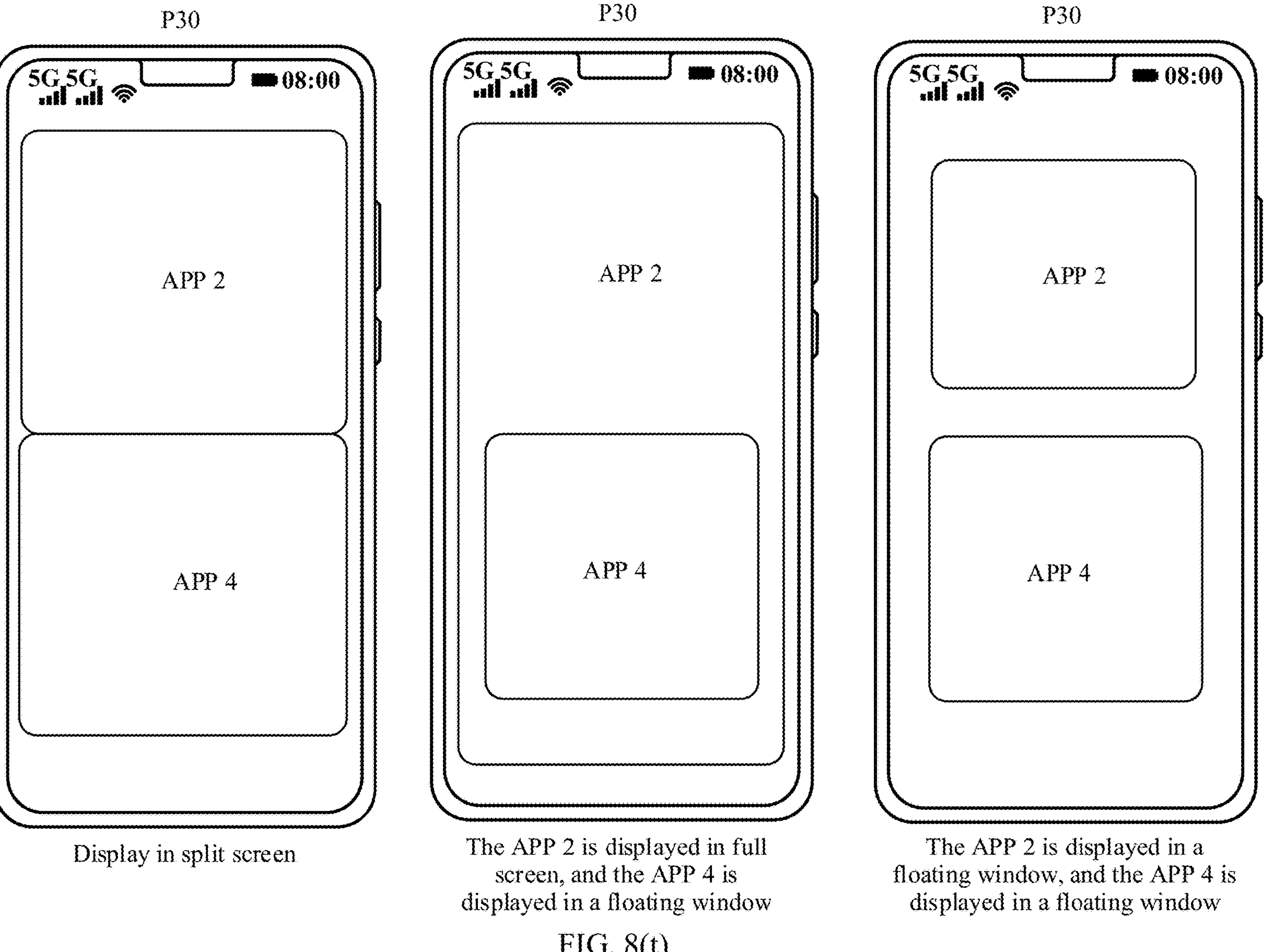
Figures 1, 8U:
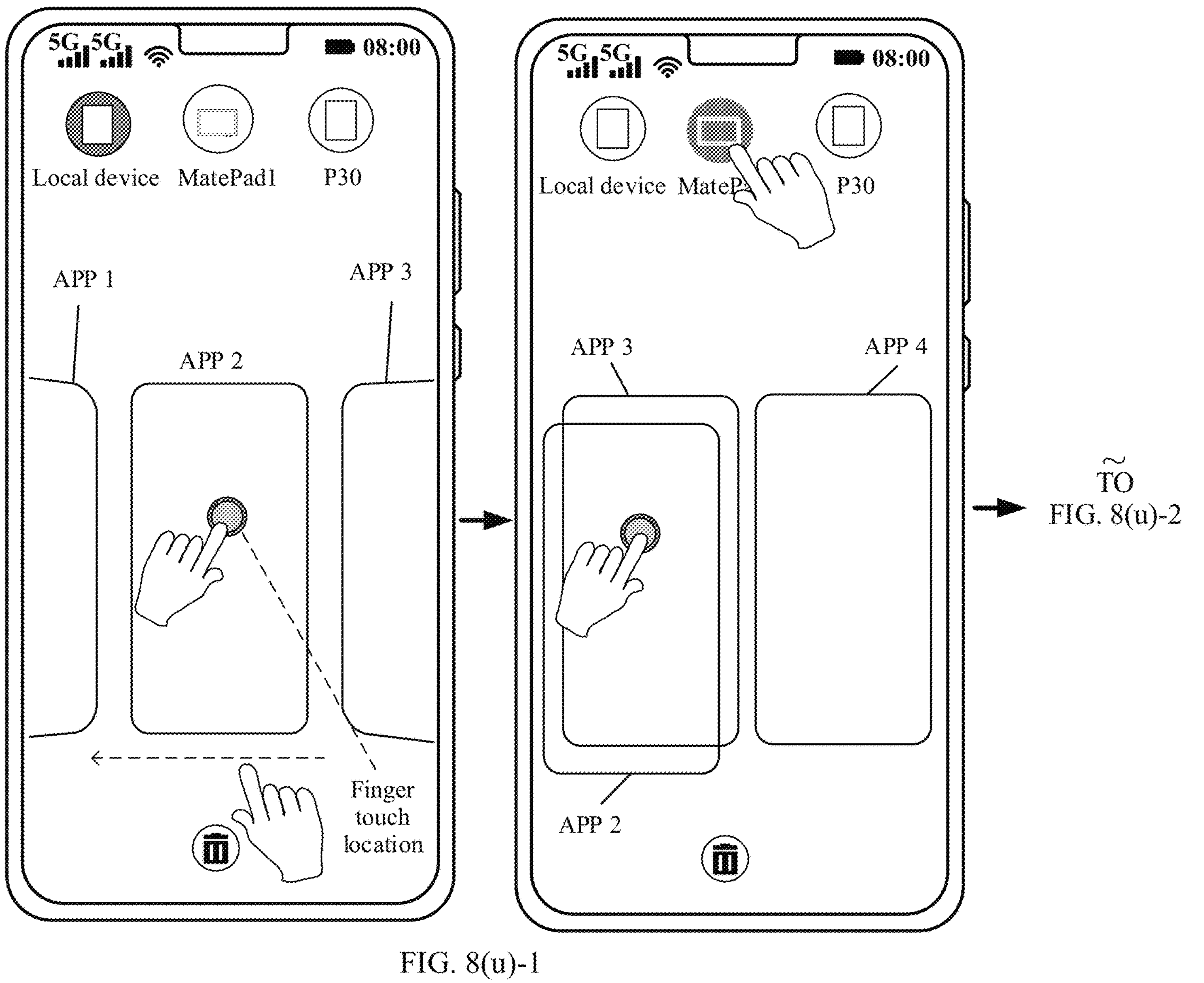
Figures 2, 8U:
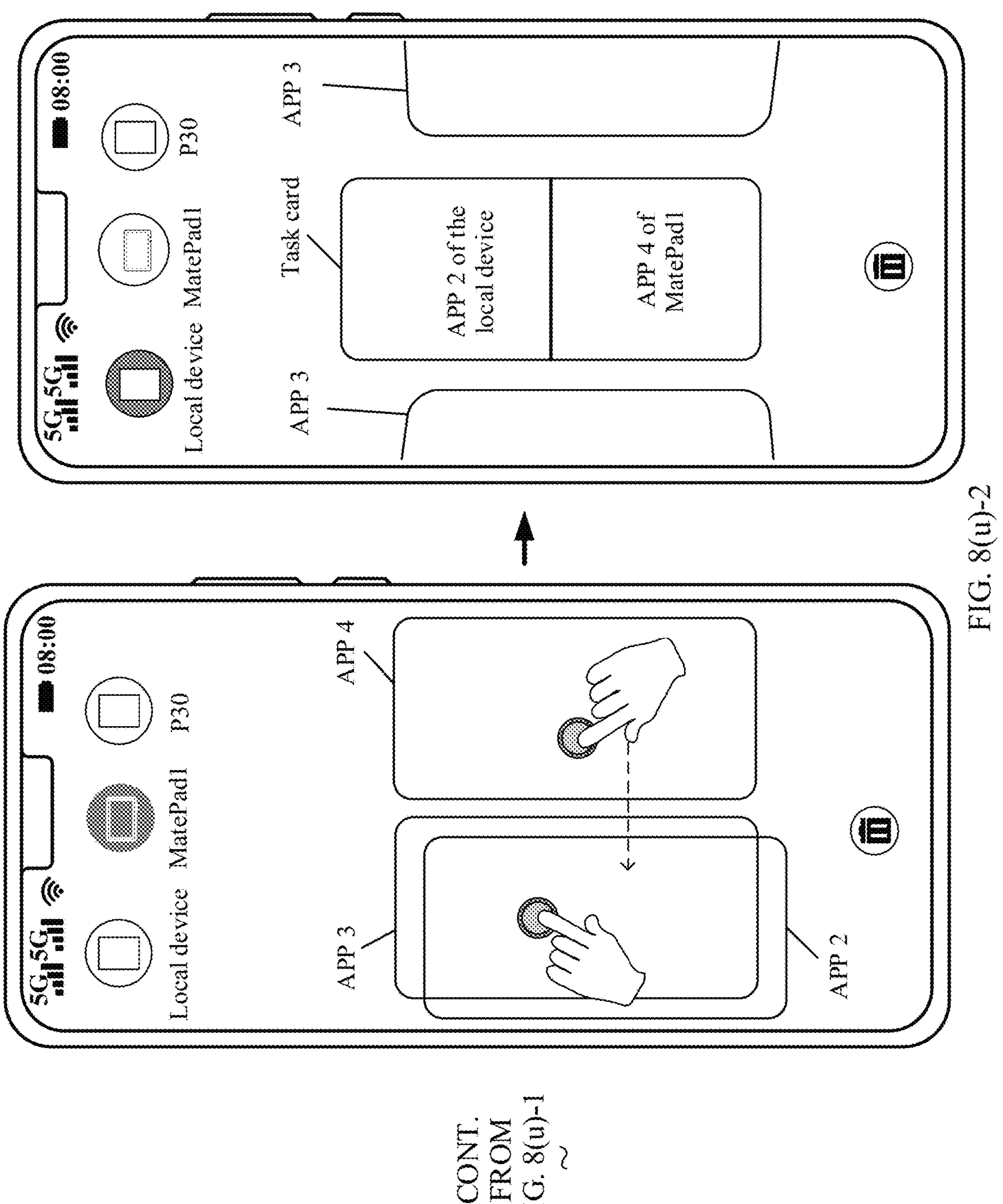
Figure 8V:
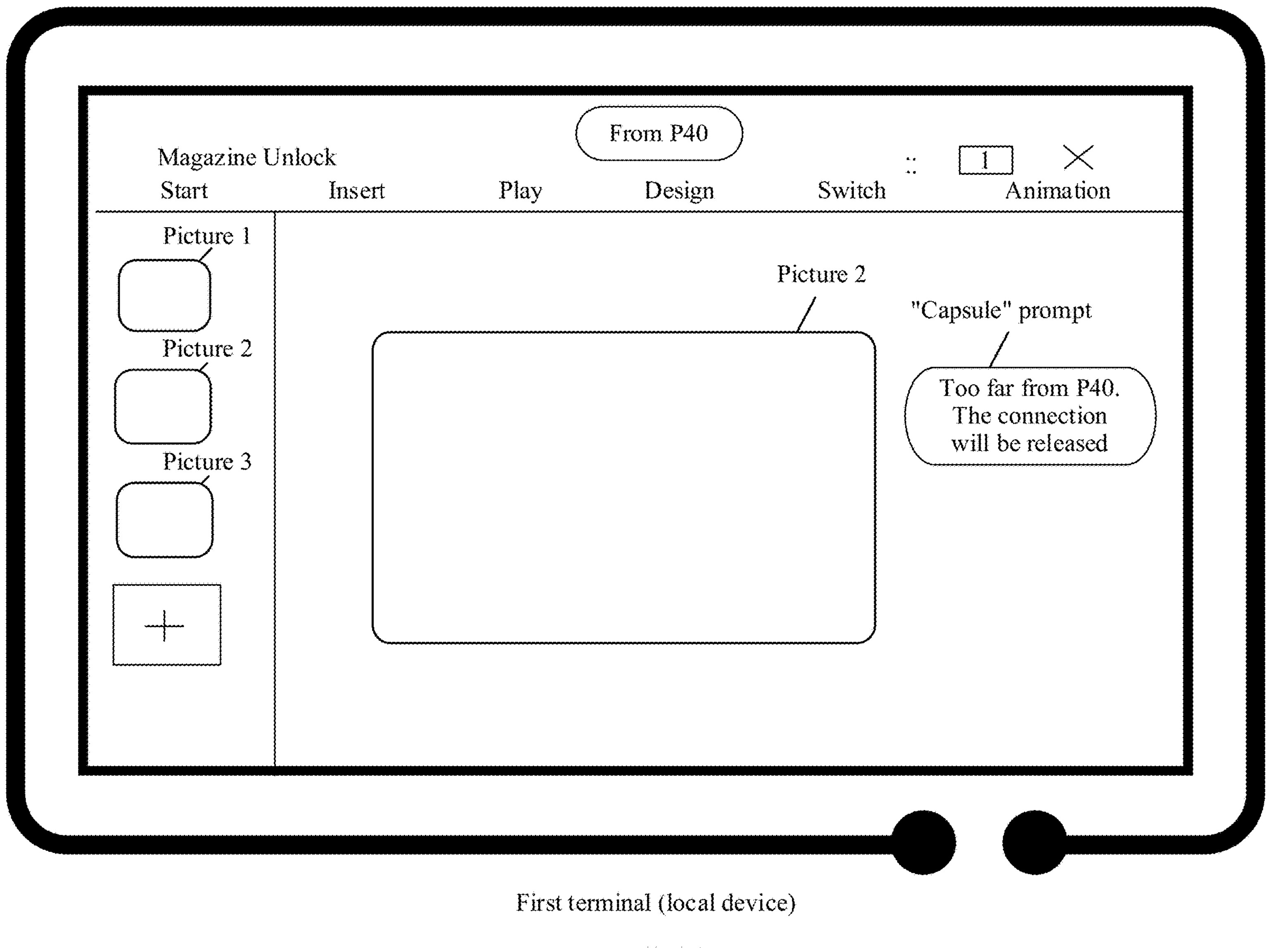
Figure 8W:
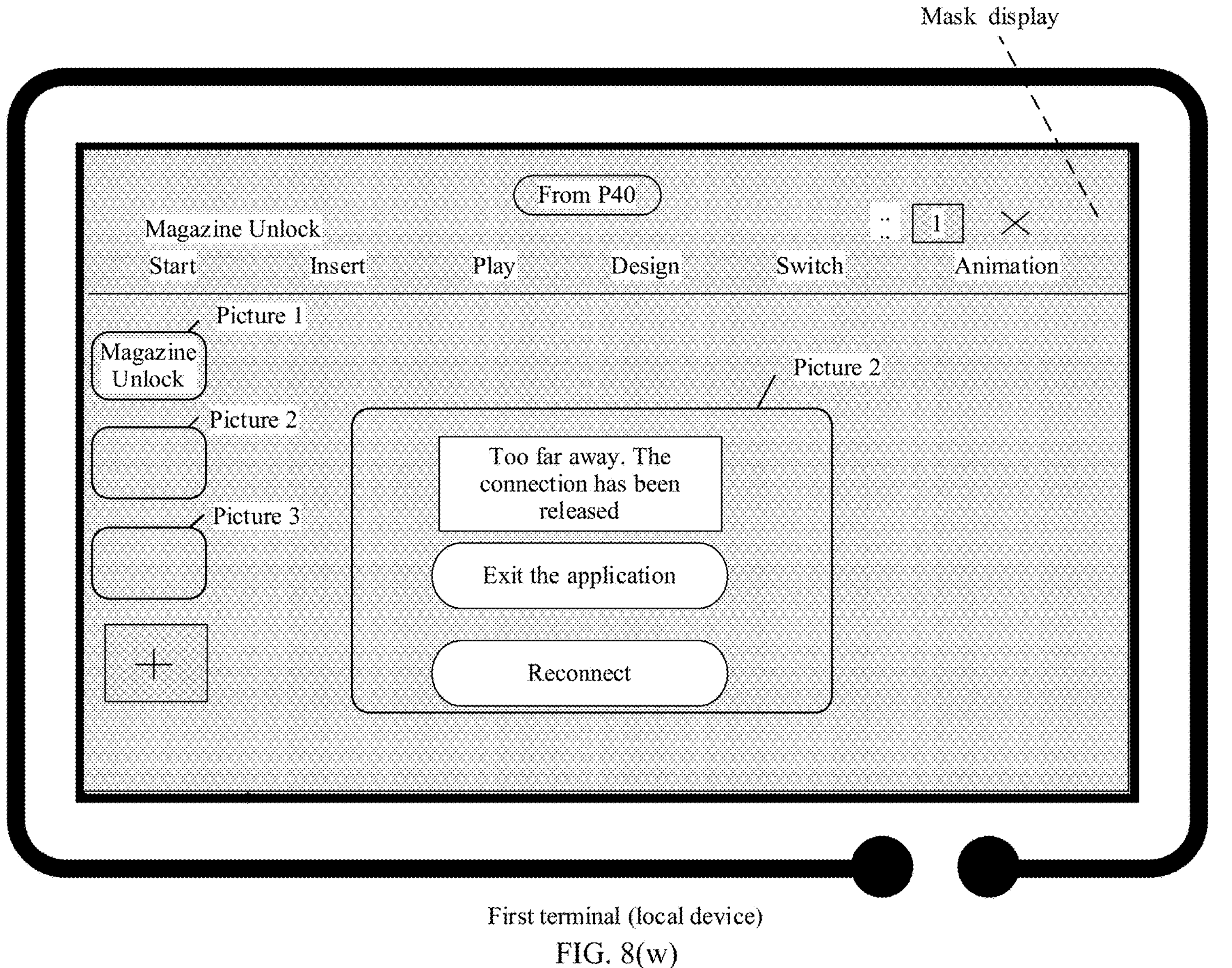
Figure 9A:
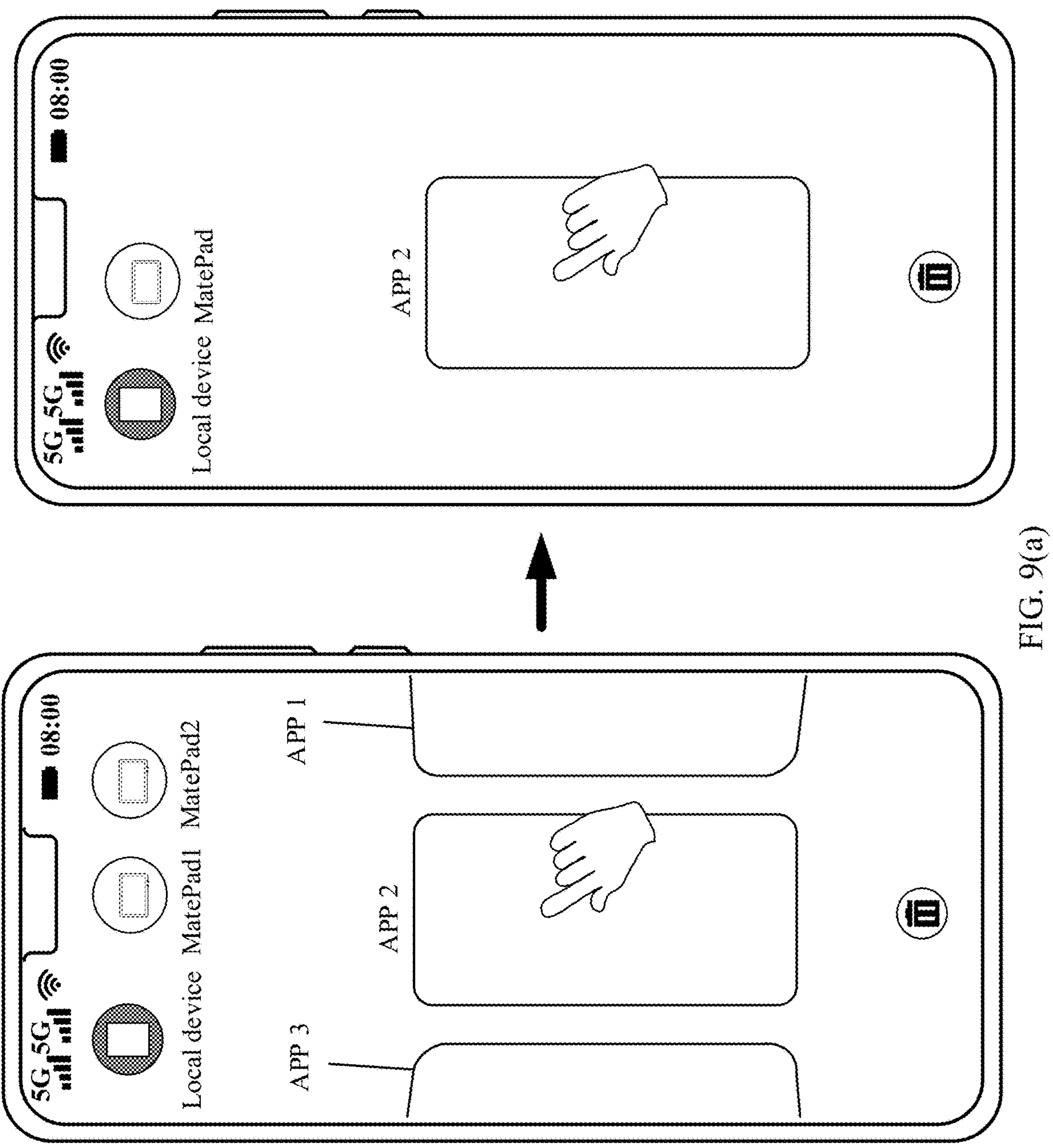
FIG. 9(*a*) to FIG. 9(*v*) are schematic diagrams of interfaces for migrating a task card by performing an operation on the task card on a recent tasks screen of a first terminal according to this application.
Figure 9B:
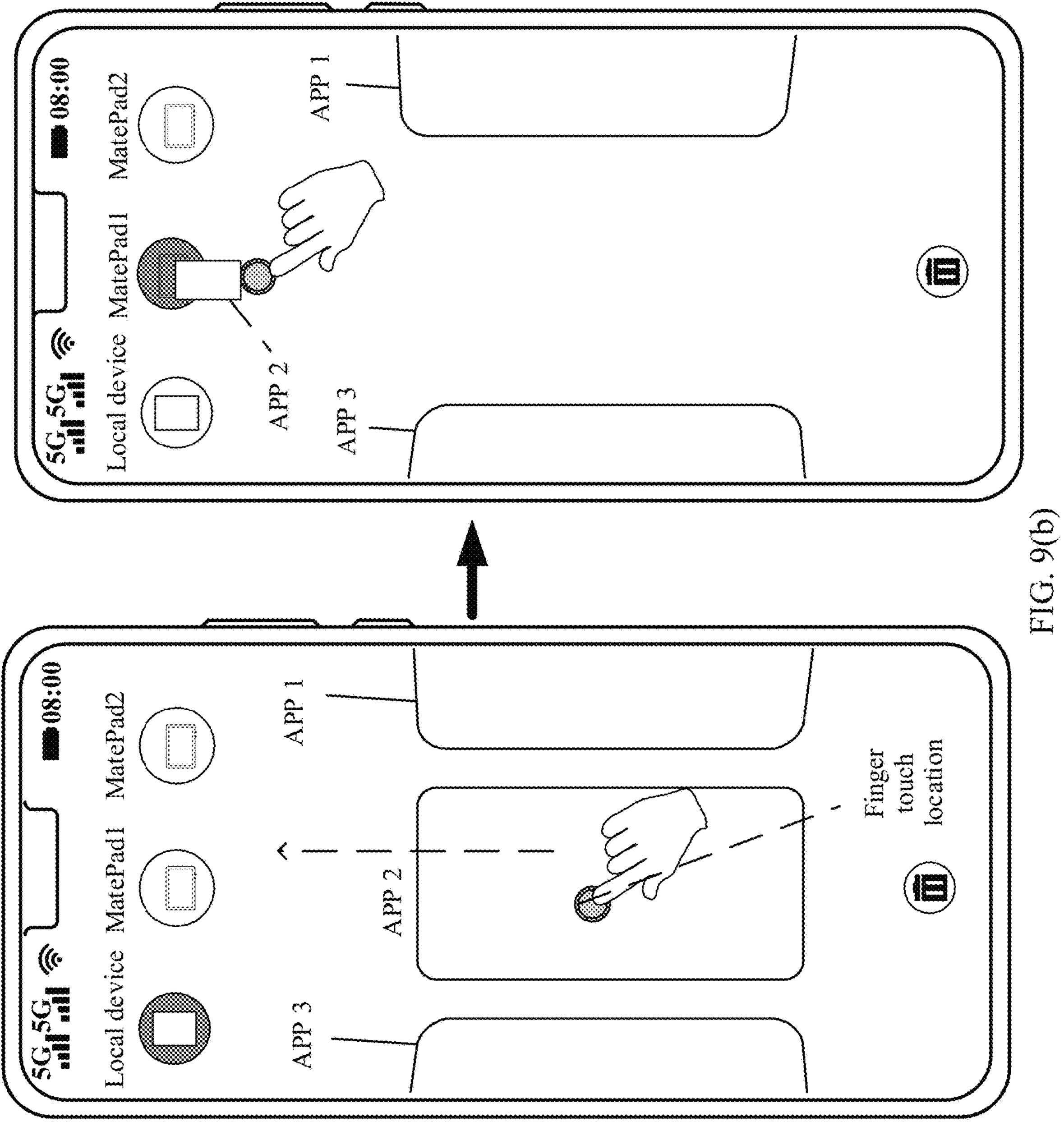
Figure 9C:
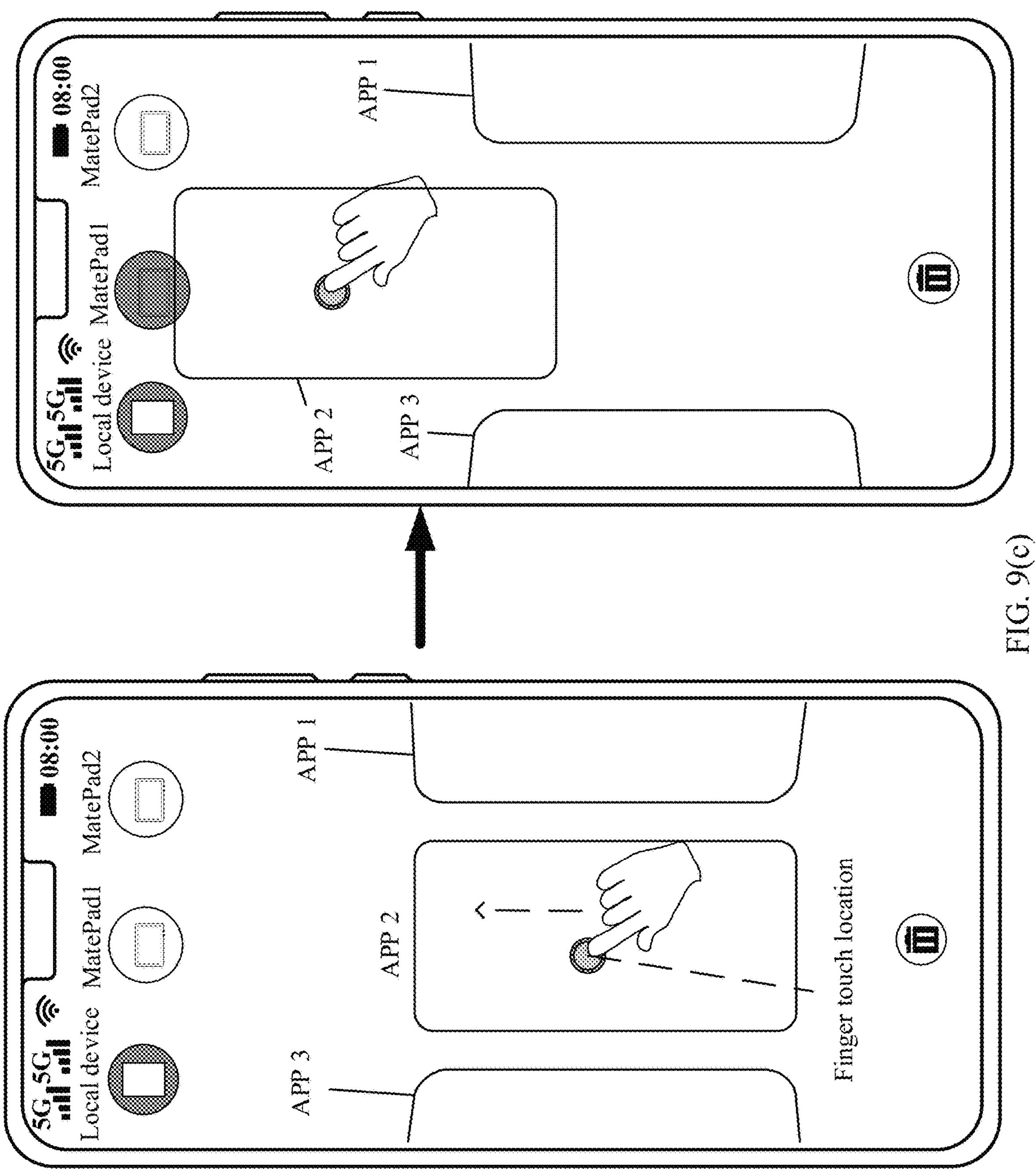
Figure 9D:
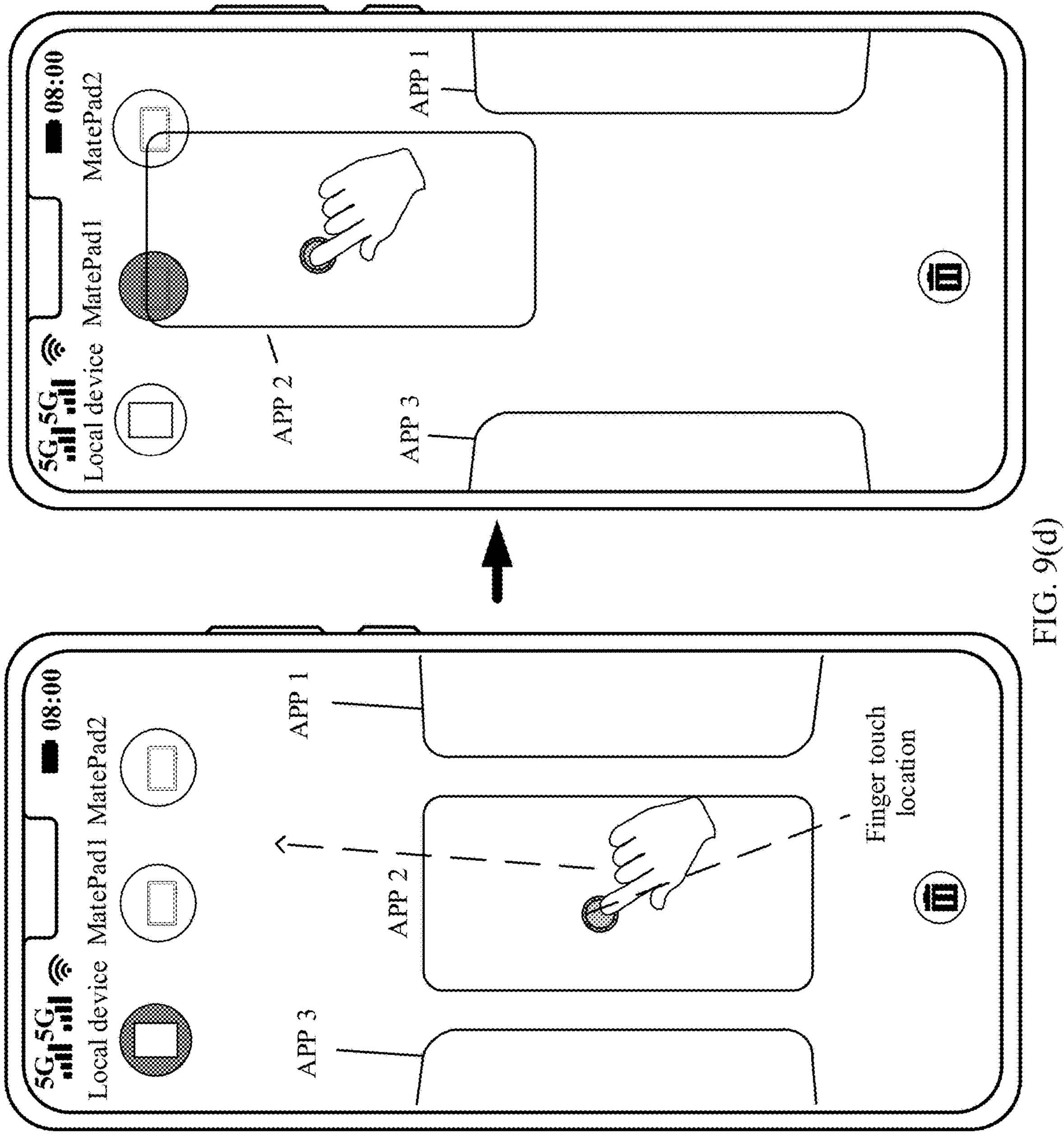
Figures 9E, 9F:
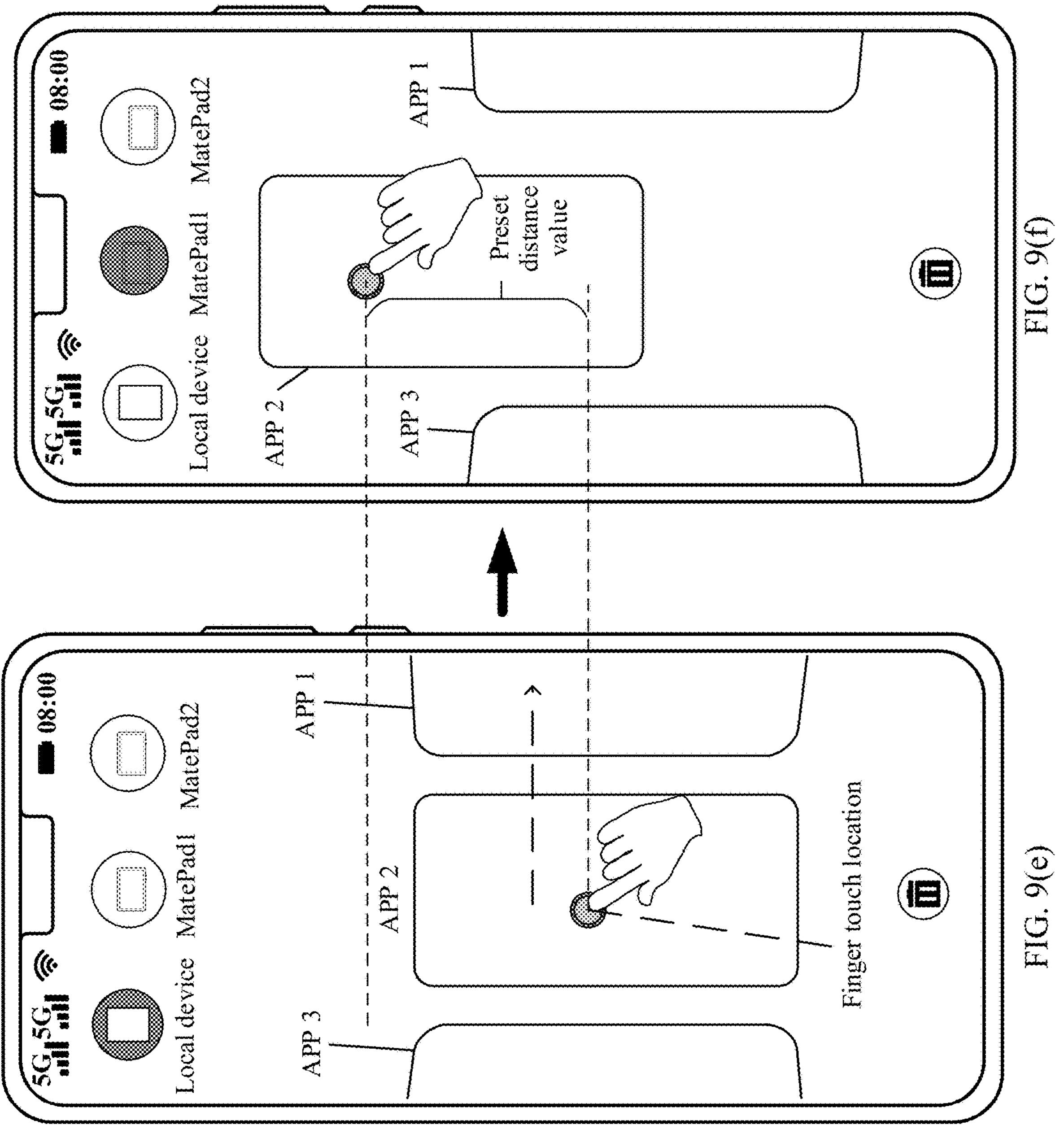
Figures 9G, 9H:
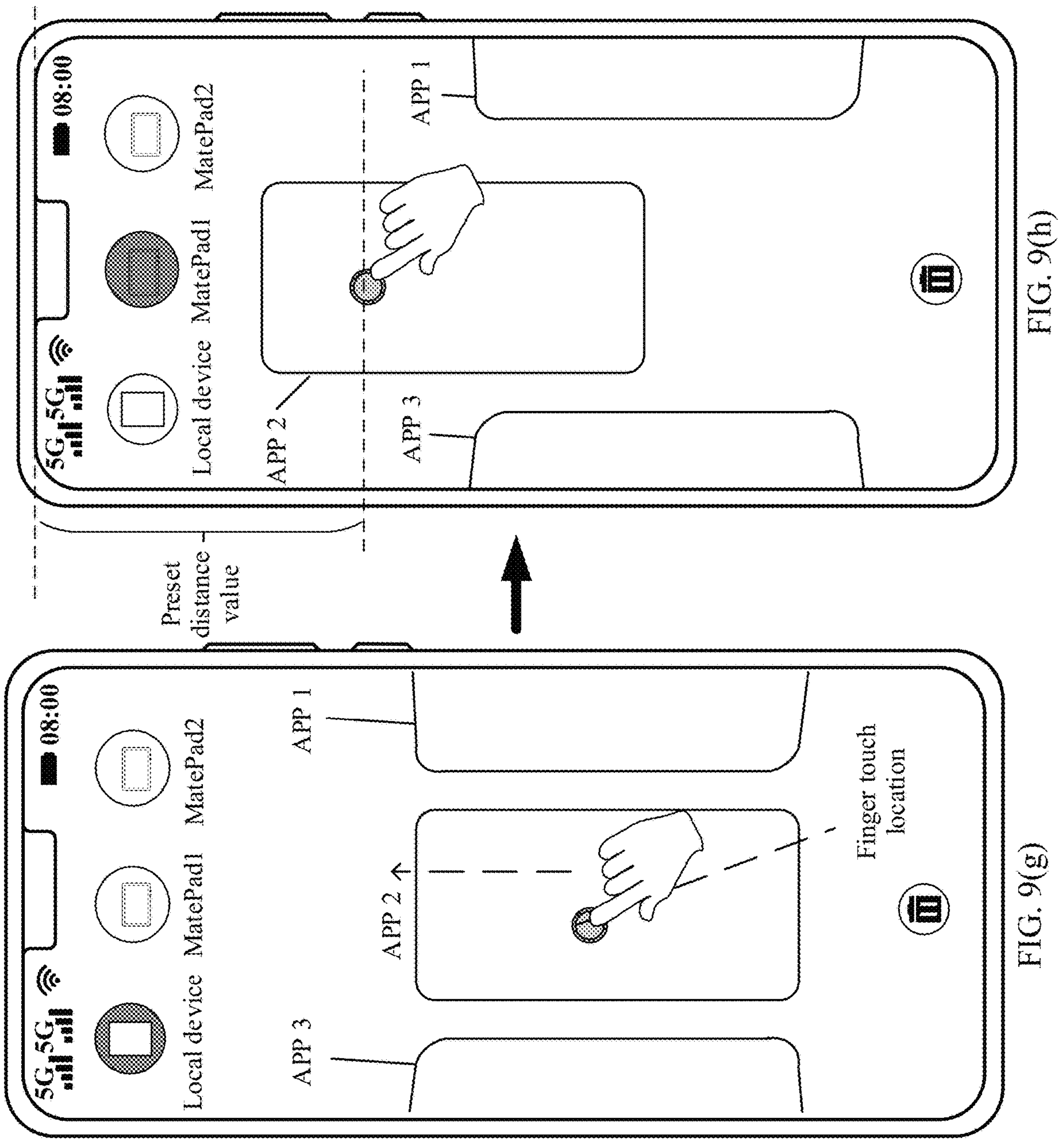
Figures 9I, 9J:
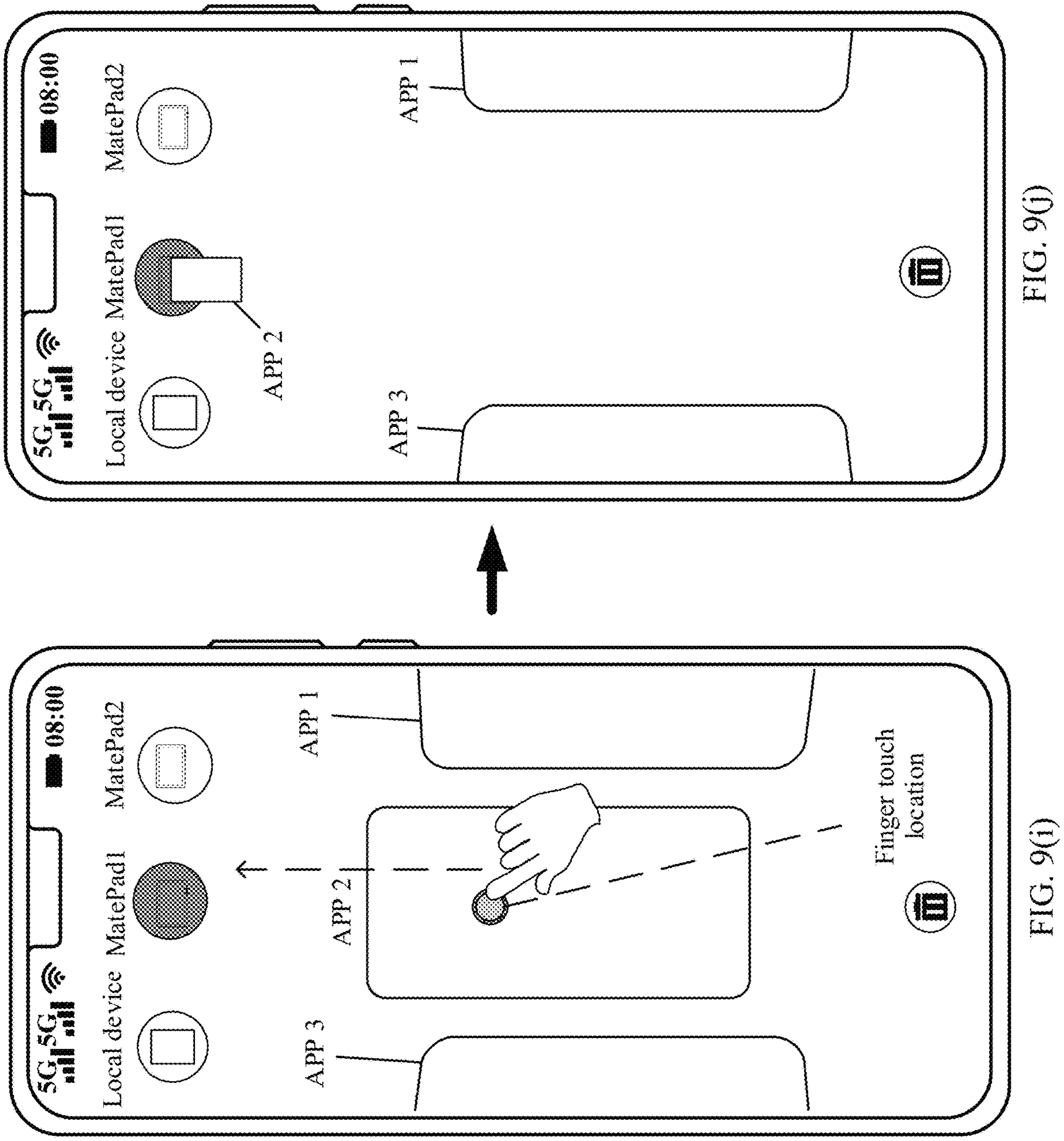
Figure 9K:
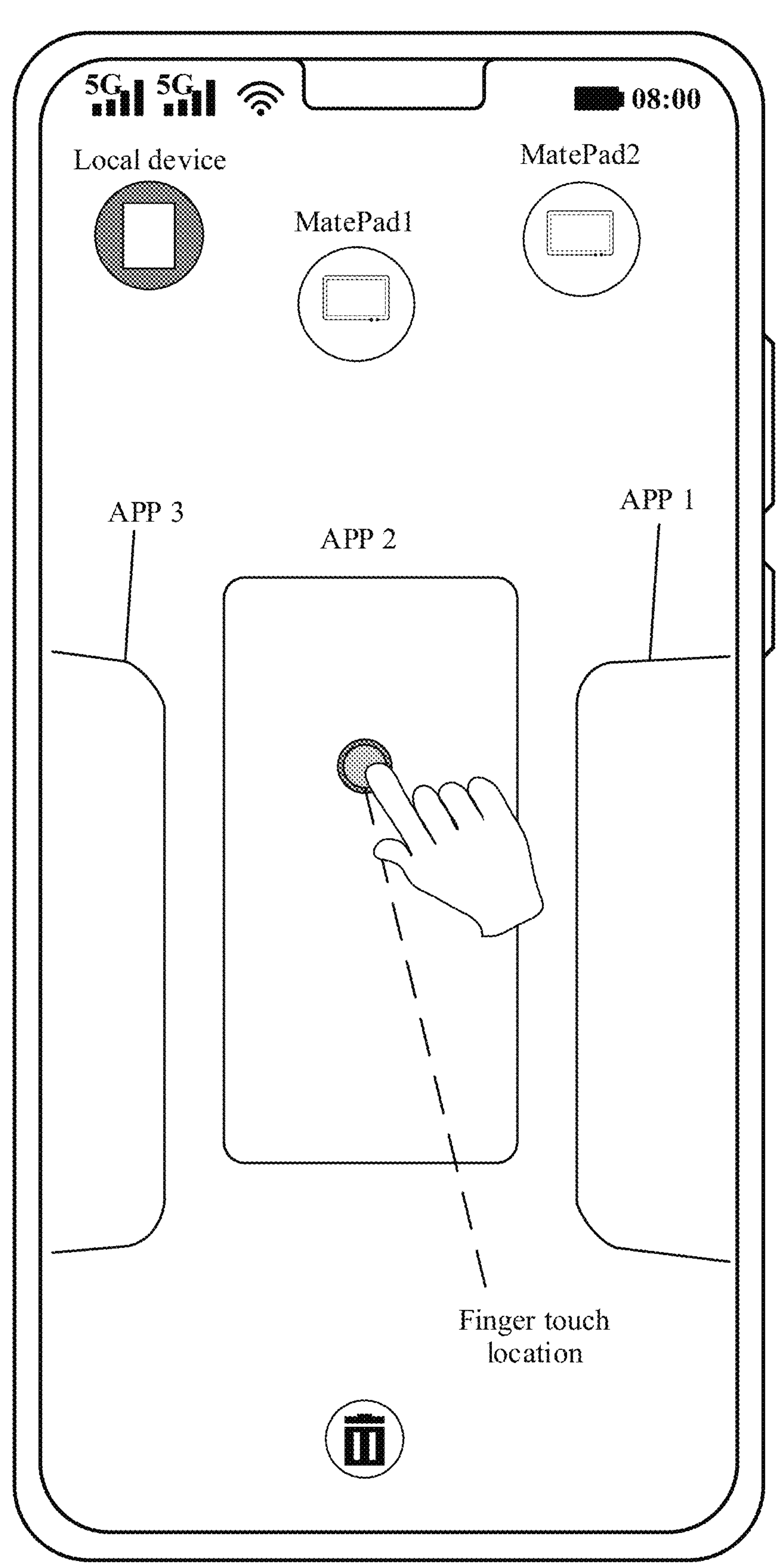
Figure 9L:
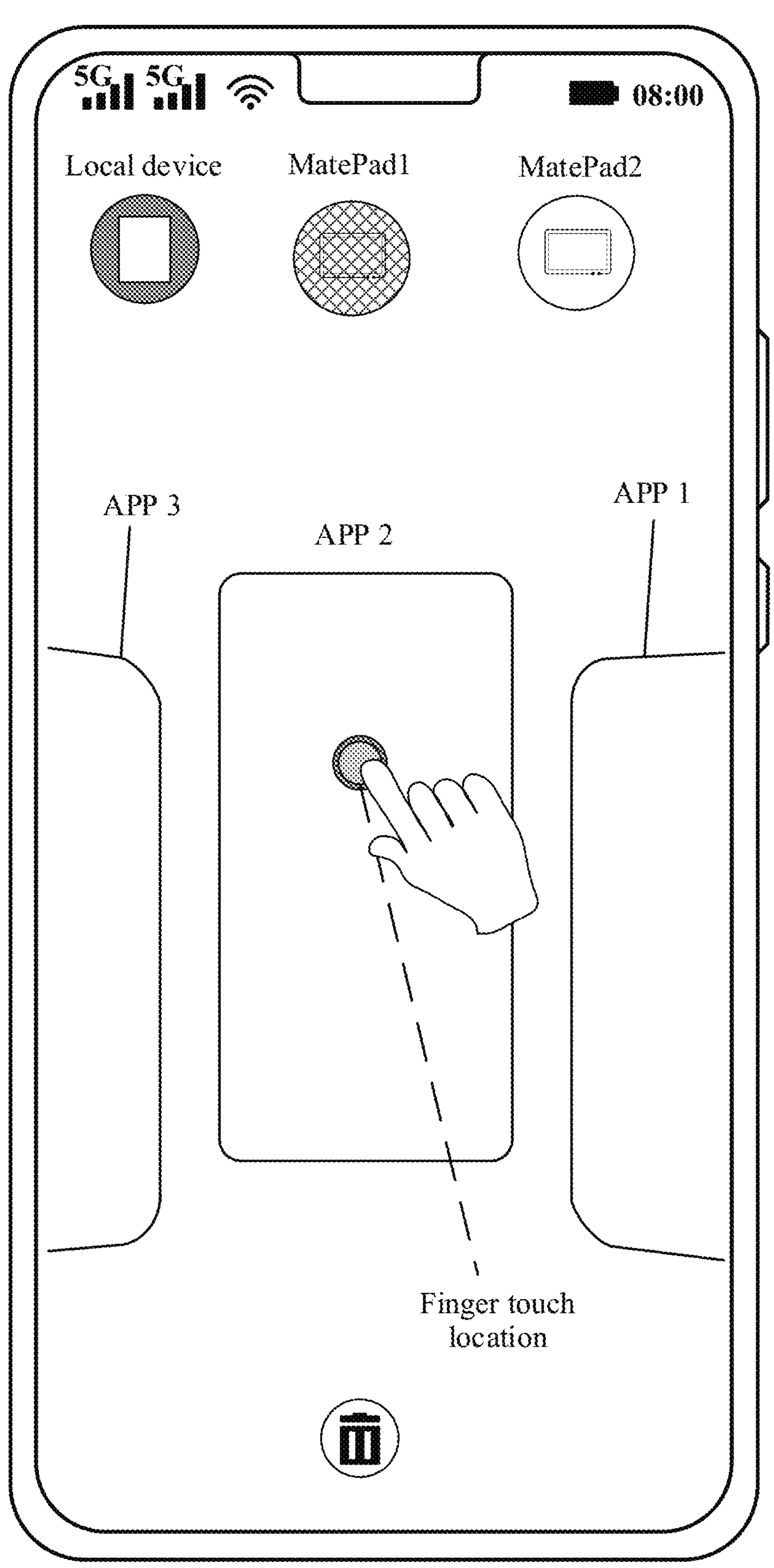
Figures 9M, 9N:
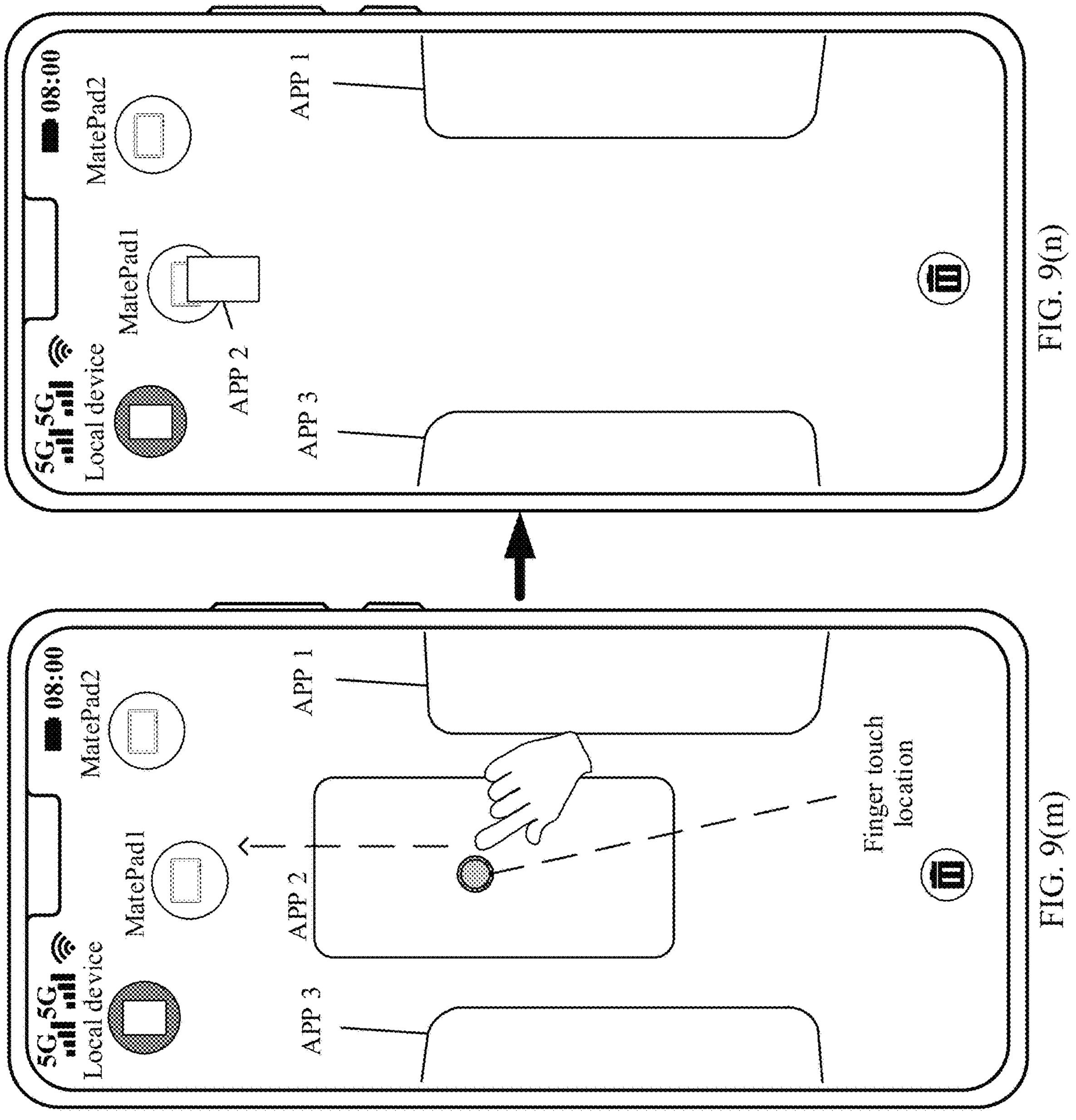
Figures 9O, 9P:
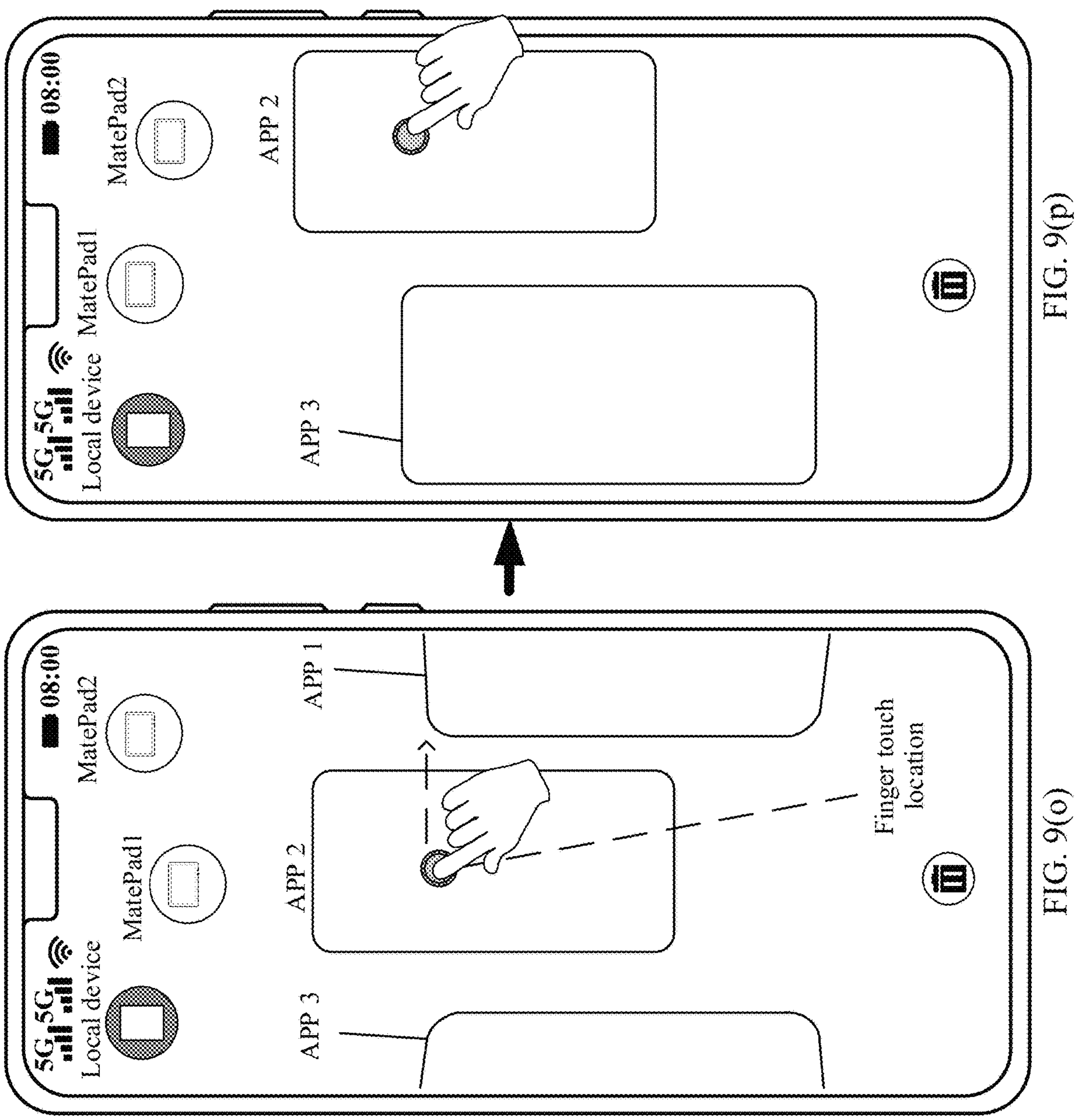
Figures 9Q, 9R:
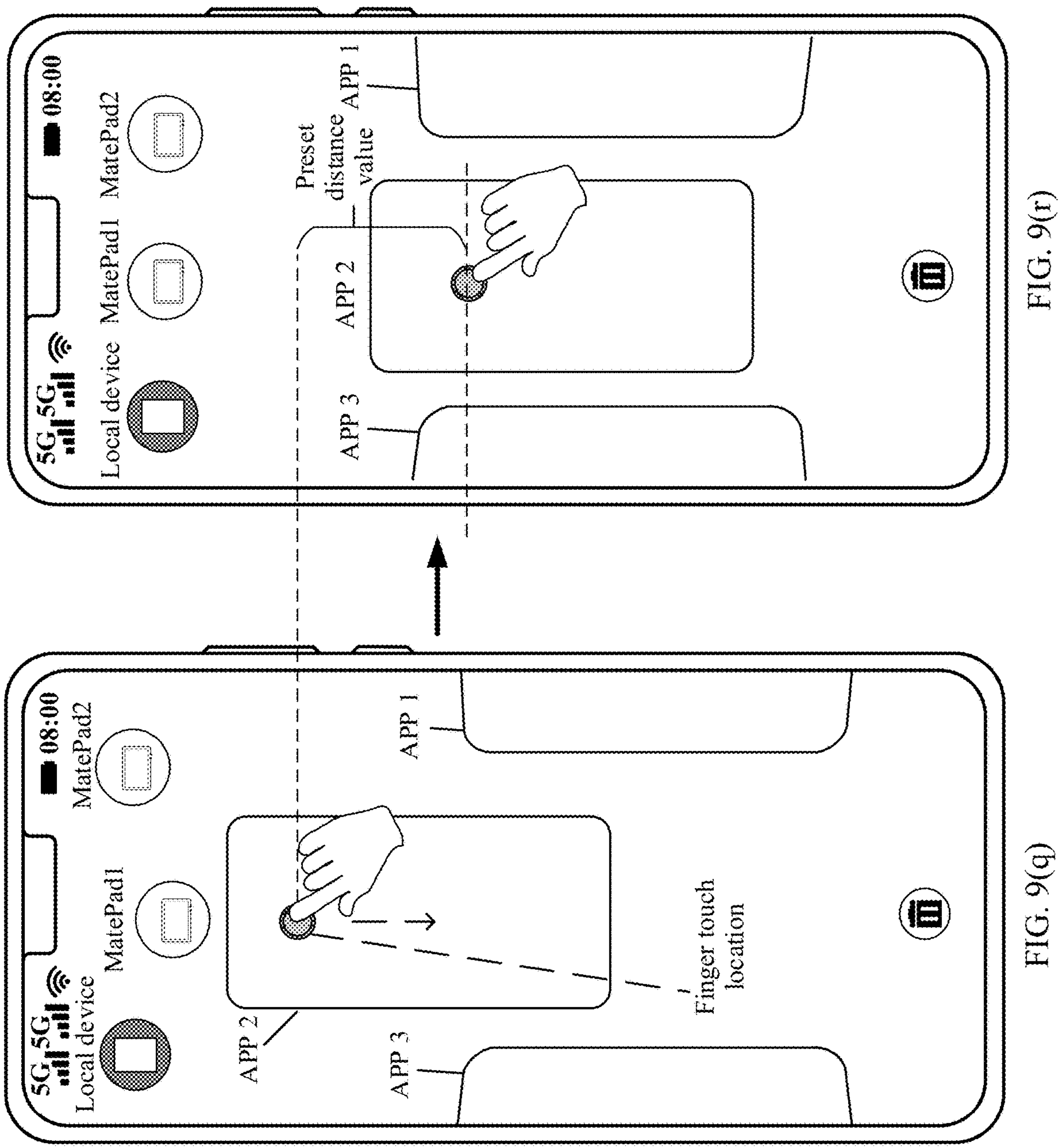
Figures 9S, 9T:
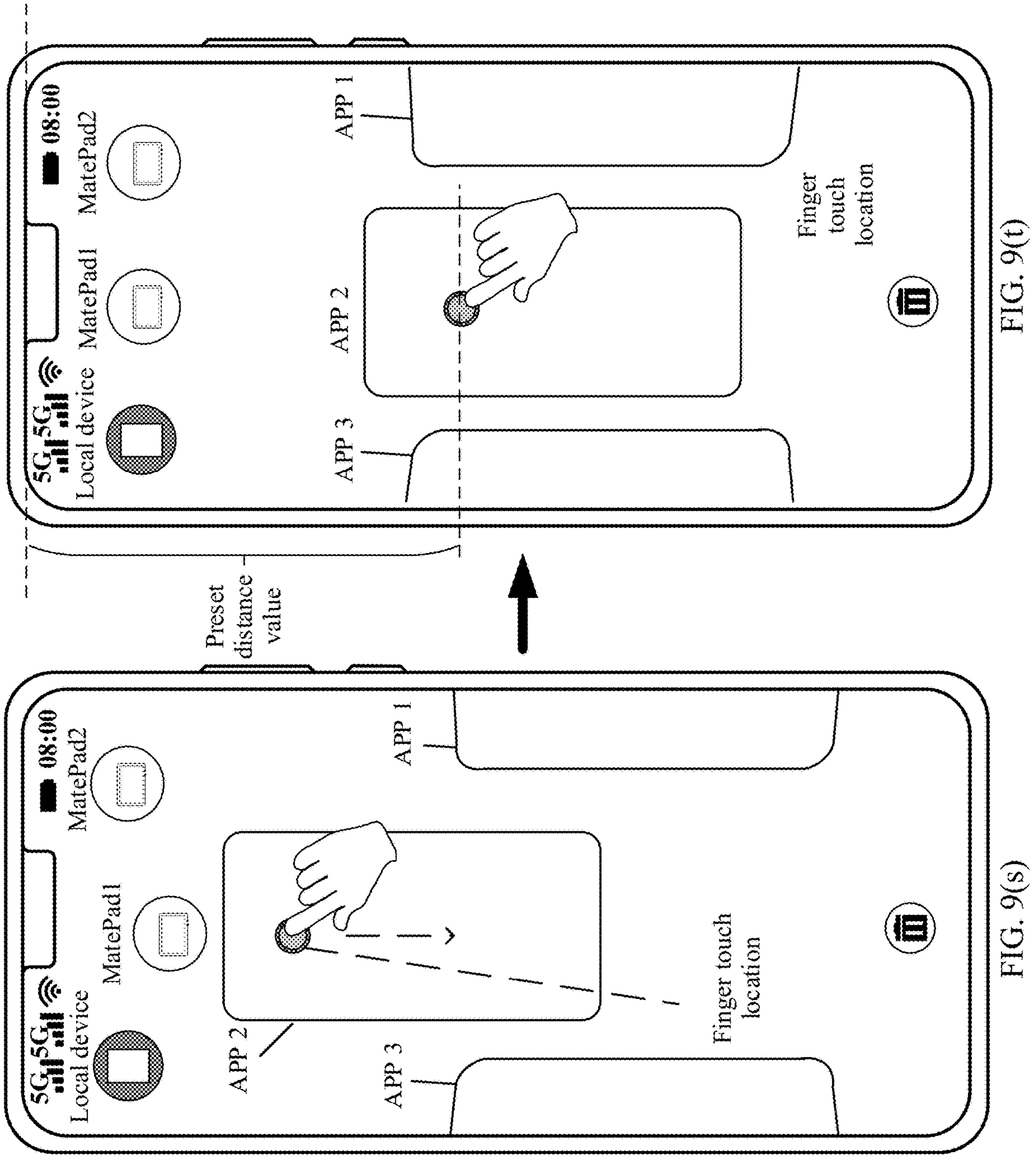
Figures 9U, 9V:
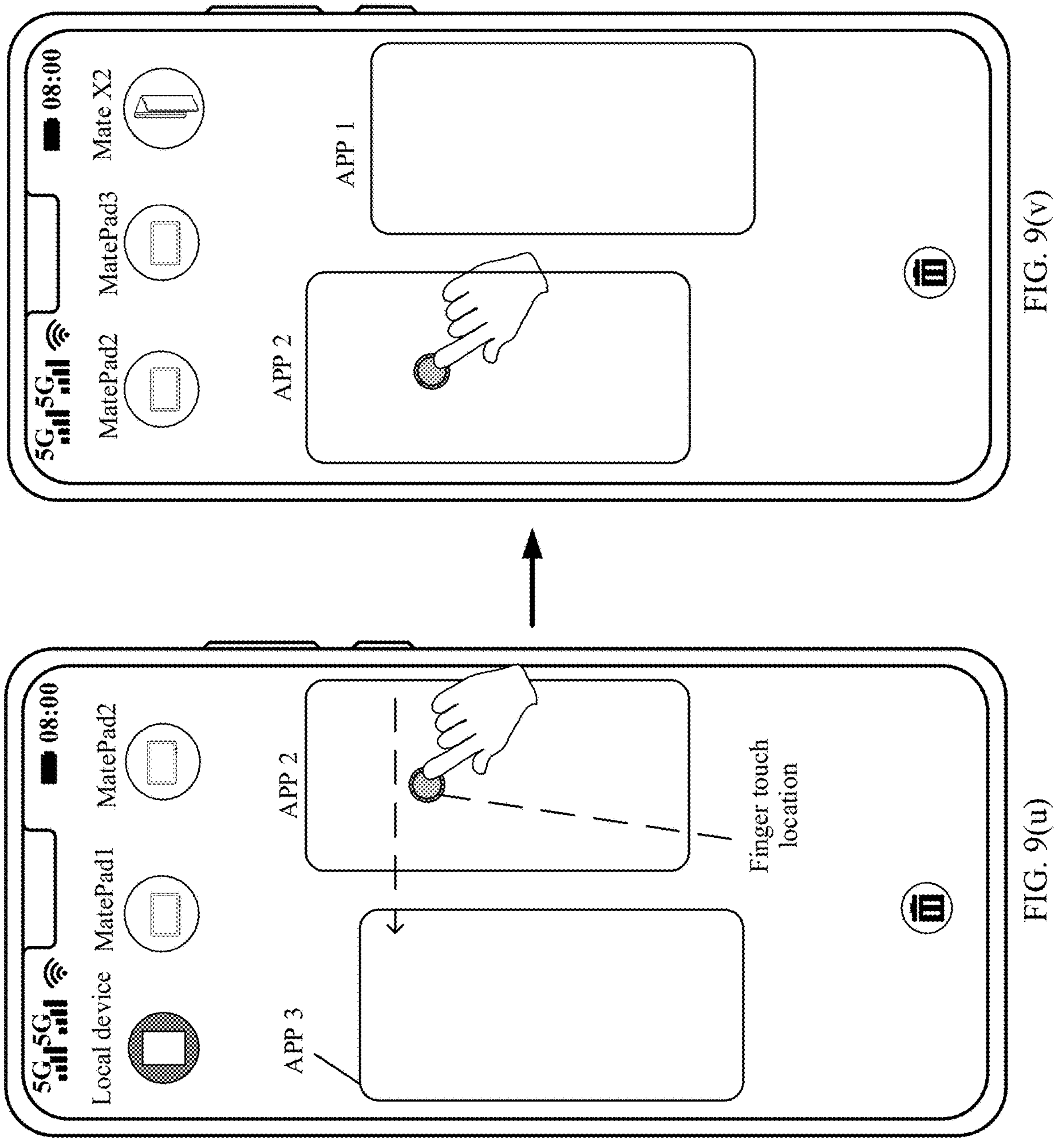
Figures 1, 10A:
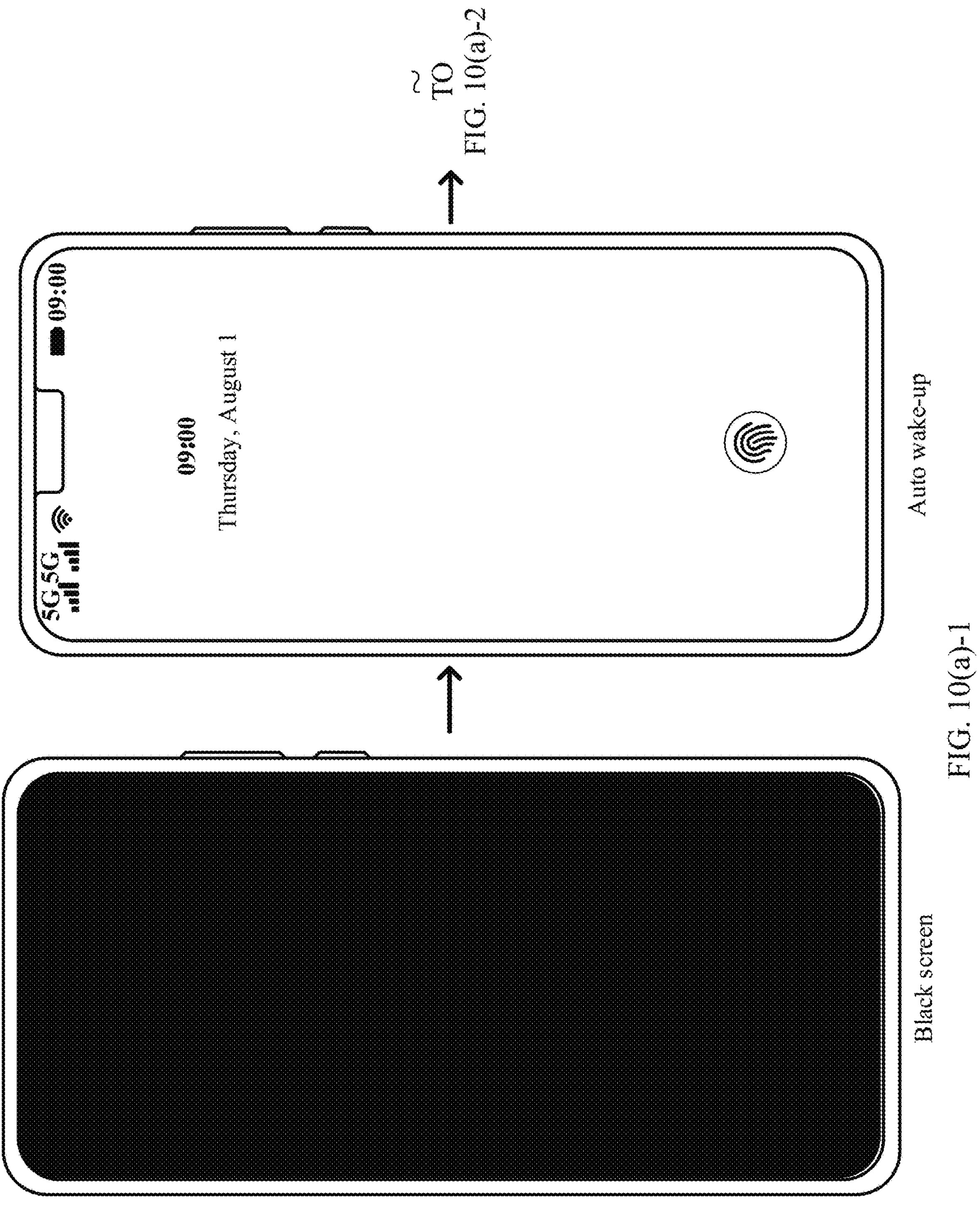
Figures 2, 10A:
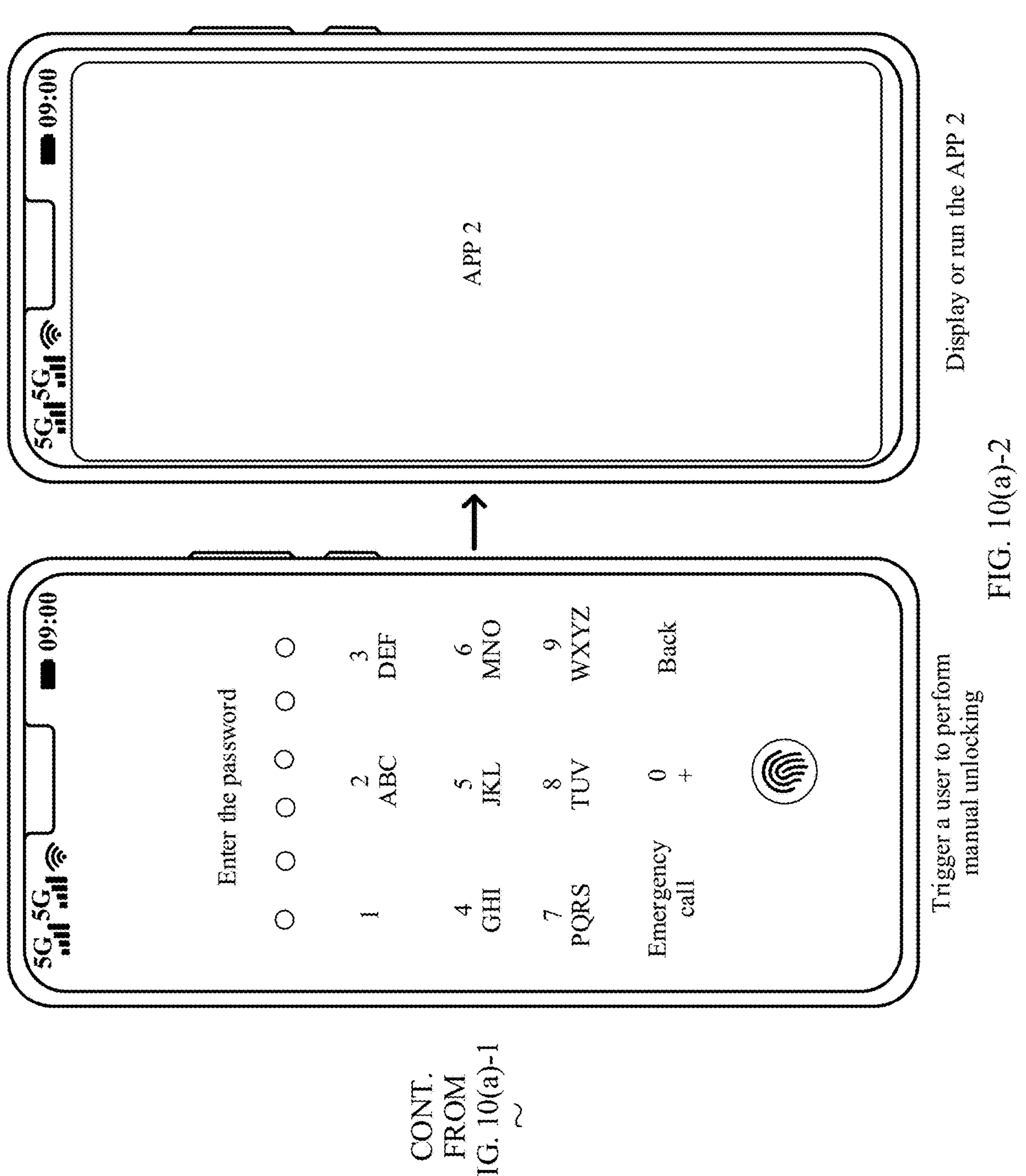
Figure 10B:
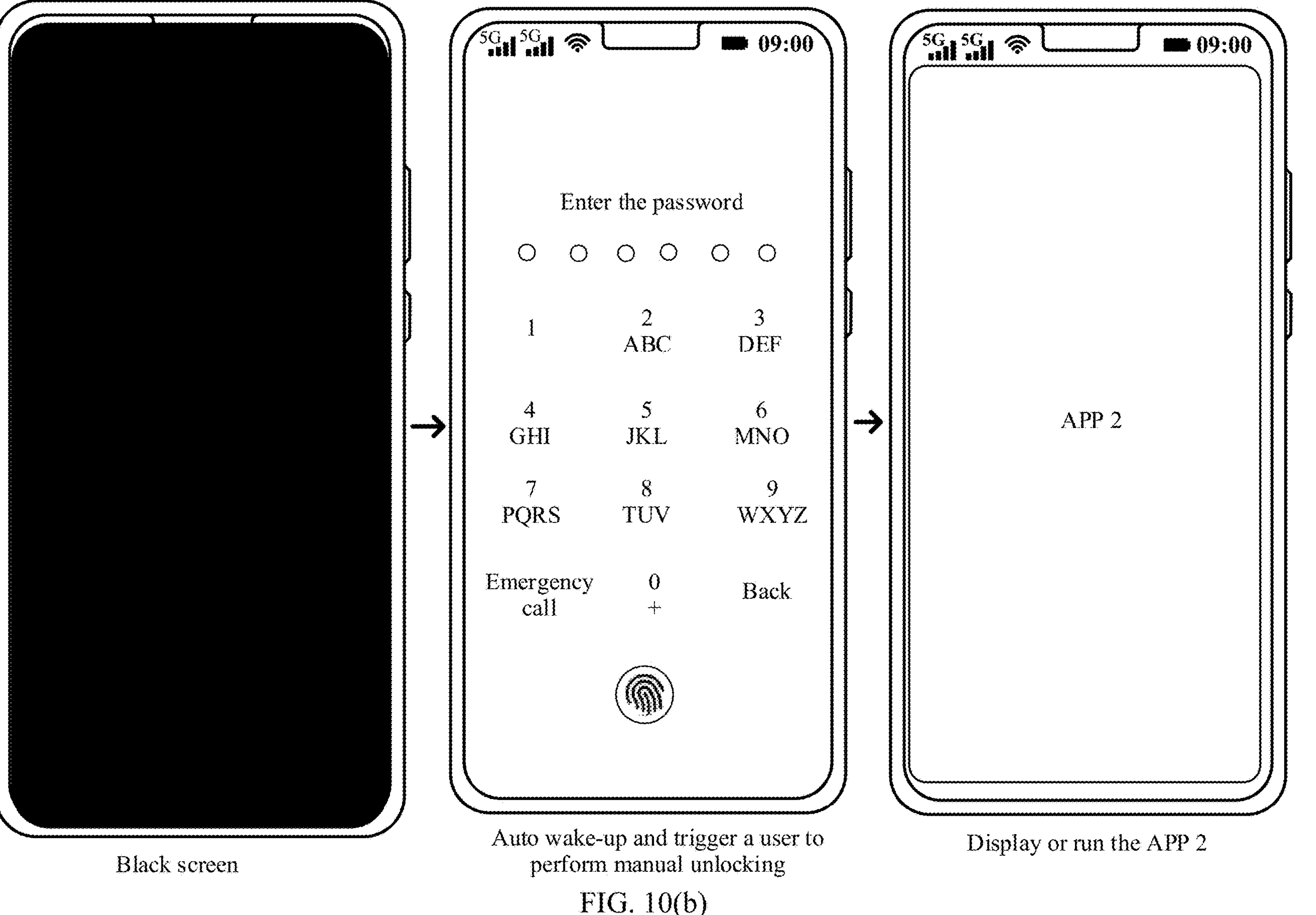
FIG. 10(*a*)-1 to FIG. 10(*c*) are schematic diagrams of interfaces of a target device from a screen-off state to display of an application after the application is migrated to the target device according to this application.
Figure 10C:
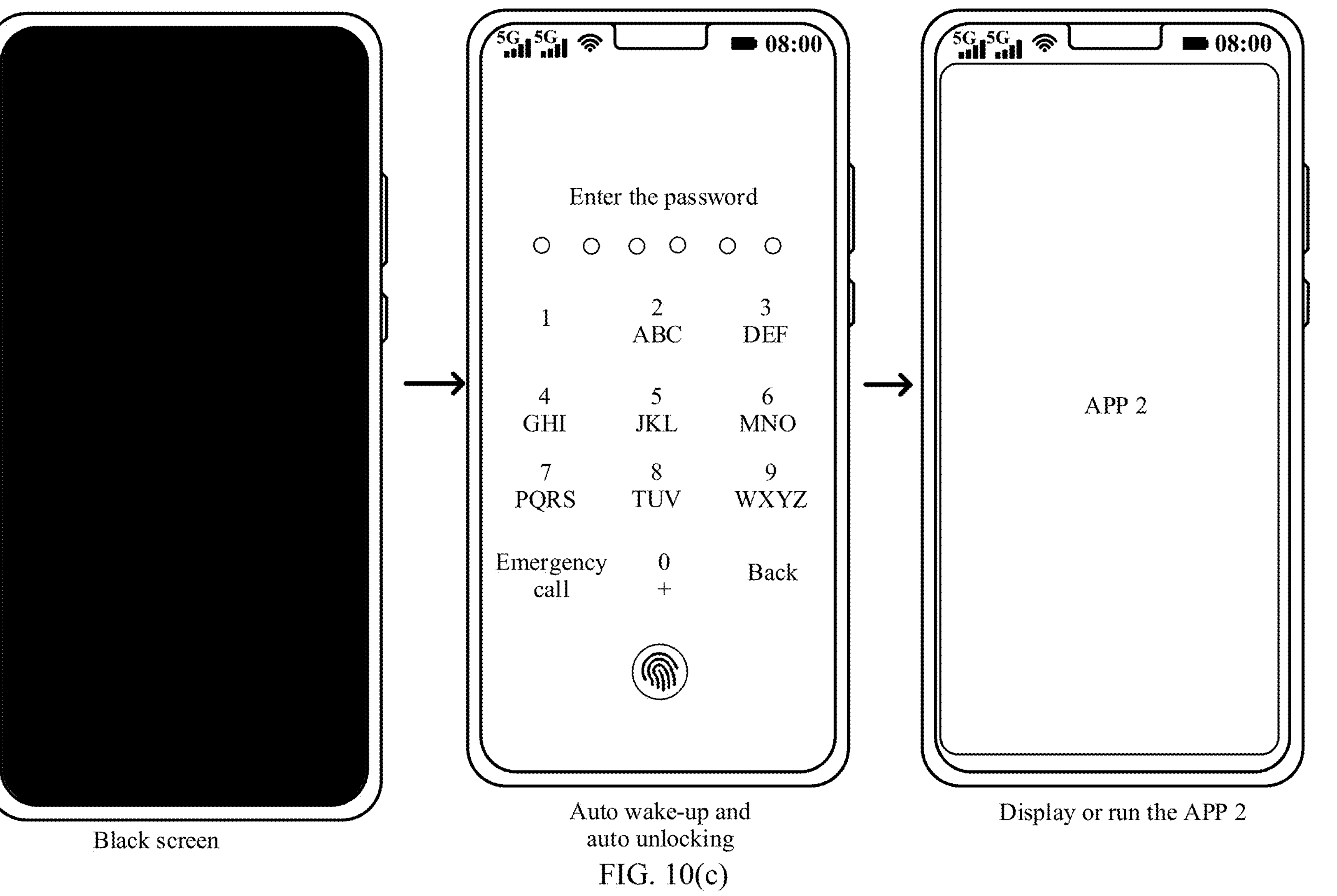

As shown in FIG. 2(*a*), the user may make, on the home screen of the terminal, a gesture of swiping up from the bottom of a screen of the terminal to trigger the display of the terminal to display the recent tasks screen. During actual application, another gesture or another operation manner (for example, tapping a "multi-task" button or touching and holding a "back" button) may be further used to trigger the display of the terminal to display the recent tasks screen. A manner of triggering the terminal to display the recent tasks screen is not limited in this application.

As shown in FIG. 2(*b*), the display of the terminal displays the recent tasks screen. On the recent tasks screen, a task card of the first application is completely displayed, and a task card of the second application is partially displayed. The recently run application further includes a third application, and a card of the third application is hidden on the recent tasks screen. On the recent tasks screen shown in FIG. 2(*b*), when the user makes a gesture of swiping rightward on a touchscreen, the recent tasks screen displayed on the display of the terminal may be switched to a recent tasks screen shown in FIG. 2(*c*).

As shown in FIG. 2(*c*), a task card that is currently completely displayed on the recent tasks screen is switched from the task card of the first application to the task card of the second application. Before the switching, as shown in FIG. 2(*b*), the task card of the first application is completely displayed on the recent tasks screen, and the task card of the second application is partially displayed on the recent tasks screen. After the switching, as shown in FIG. 2(*c*), the task card of the first application is partially displayed on the recent tasks screen, and the task card of the second application is completely displayed on the recent tasks screen. In addition, after the switching, as shown in FIG. 2(*c*), the task card of the third application is changed from a hidden state to partial display on the recent tasks screen.

As shown in FIG. 2(*b*) and FIG. 2(*c*), when there are a plurality of recently run tasks, a task card of a recently run task can be completely displayed on the recent tasks screen, and a task card of another recently run task is partially displayed on the left side and/or the right side of the completely displayed task card of the recently run task, where the completely displayed task card and the partially displayed task card are displayed side by side in the left-and-right direction. During actual application, a manner of displaying the task card on the recent tasks screen may be another manner. For example, a task card of a recently run task is completely displayed on the recent tasks screen, and a task card of another recently run task is partially displayed on the upper side and/or the lower side of the completely displayed task card of the recently run task, where the completely displayed task card and the partially displayed task card are displayed side by side in the up-and-down direction. In embodiments of this application, the manner of displaying the task card on the recent tasks screen is not limited. It can be triggered, by an operation, that different task cards are switched on the recent tasks screen for display, where a completely displayed task card exists before and/or after the switching.

On the recent tasks screen, the user can perform different operations, to achieve different effects.

Figure 11A:
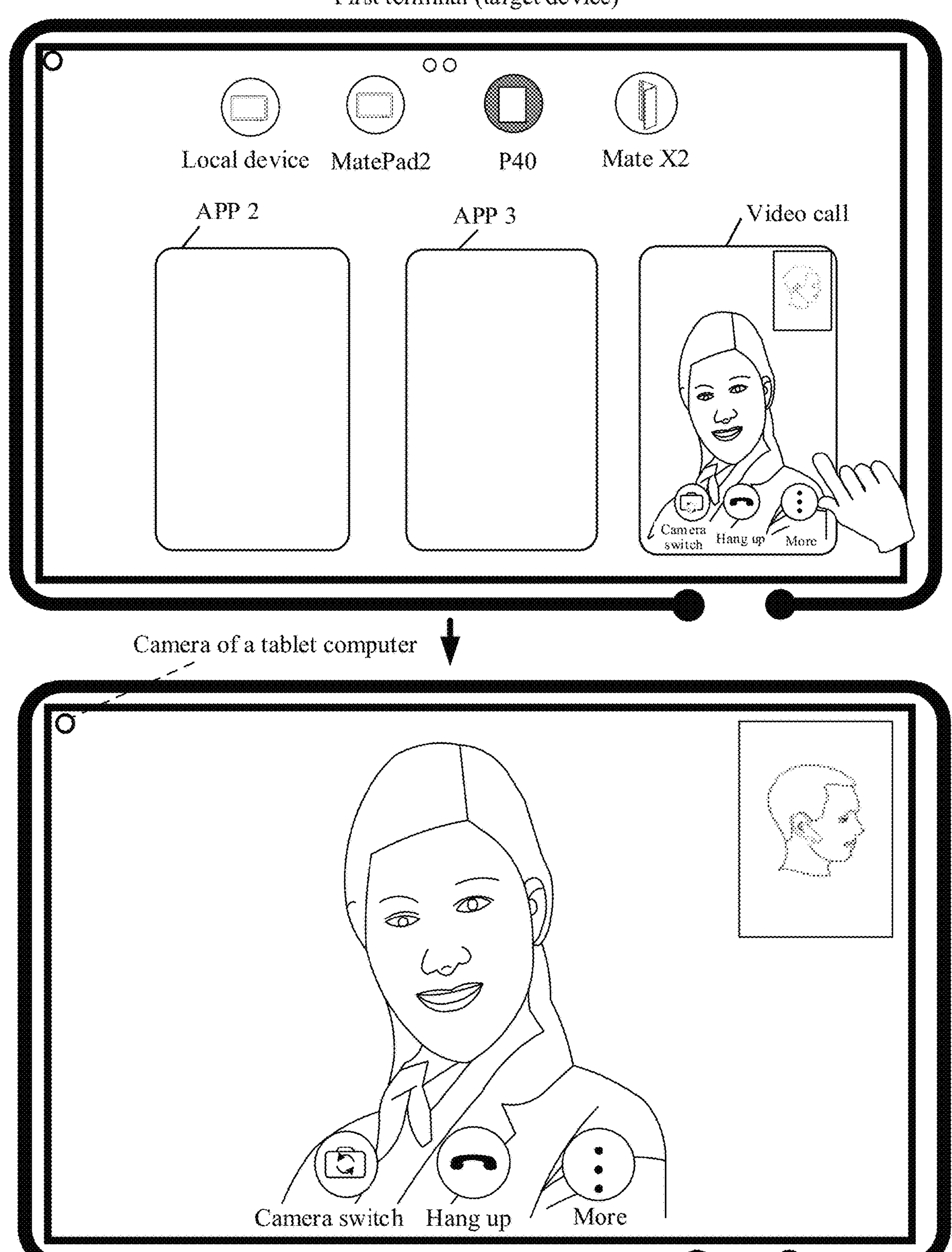
FIG. 11(*a*) to FIG. 11(*k*)-4 are schematic diagrams of interfaces of running, based on different allocations of hardware capabilities involved in the application, an application after the application is migrated from a source device to a target device according to this application.
Figure 11B:
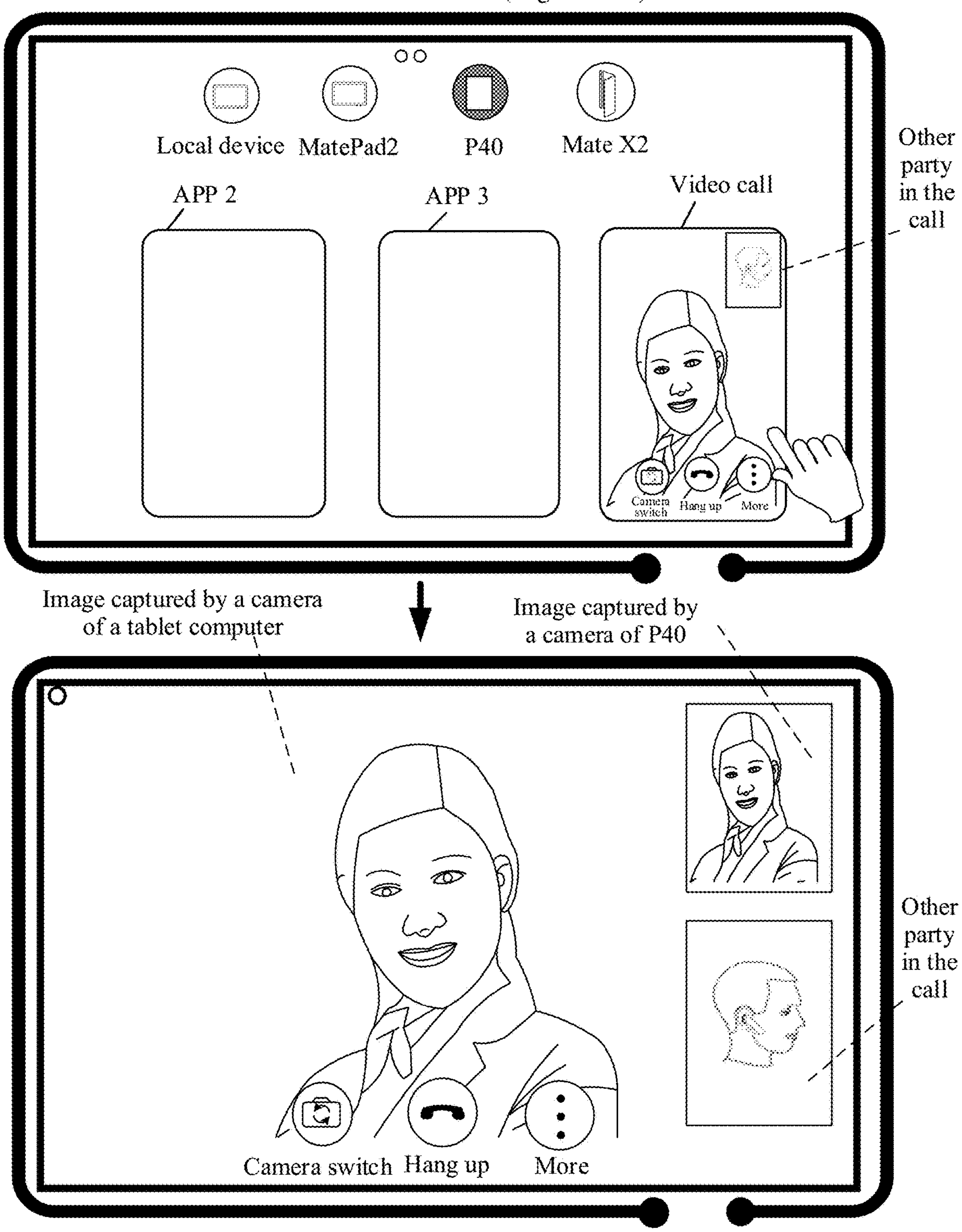
Figures 2, 11C:
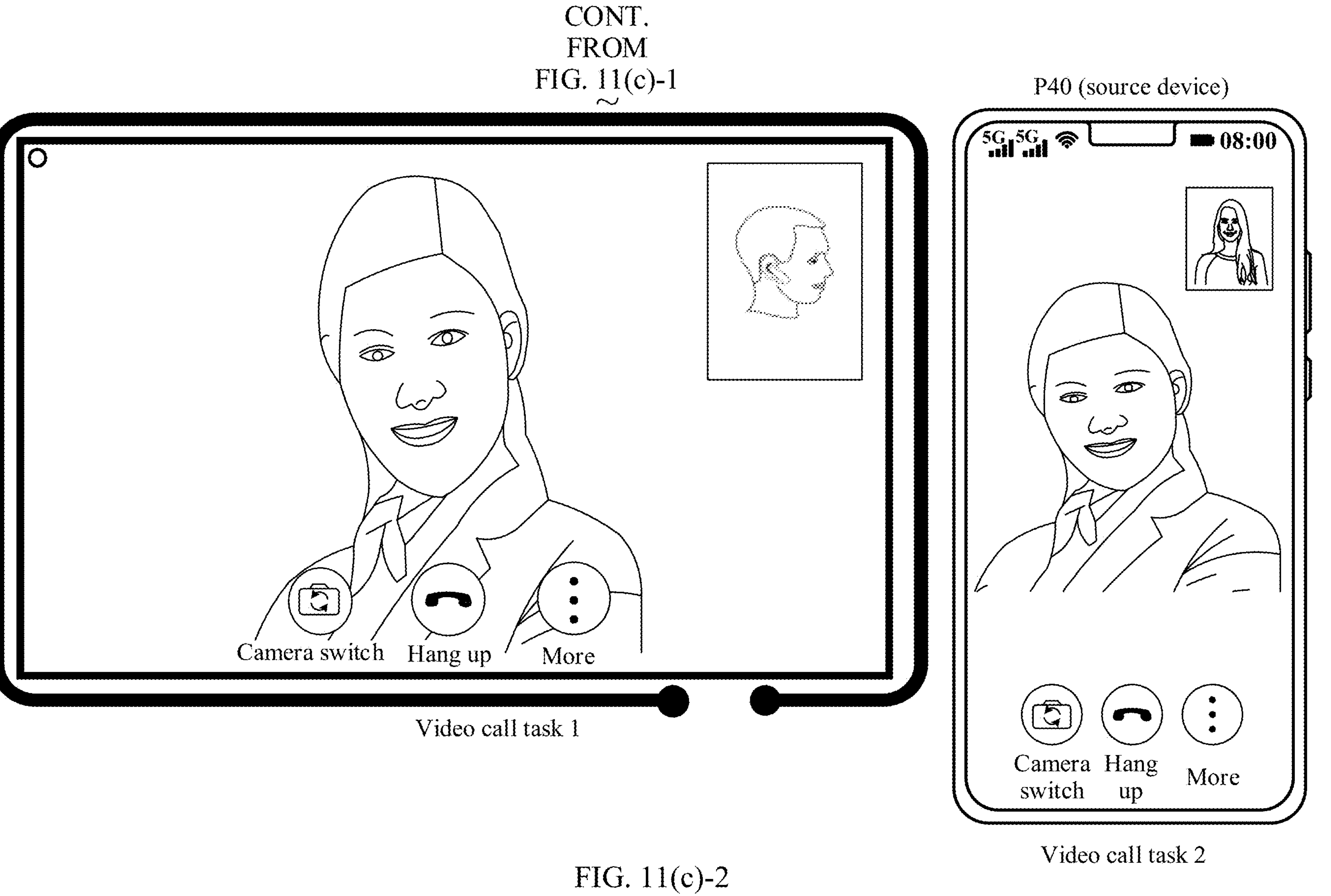
Figures 1, 11D:
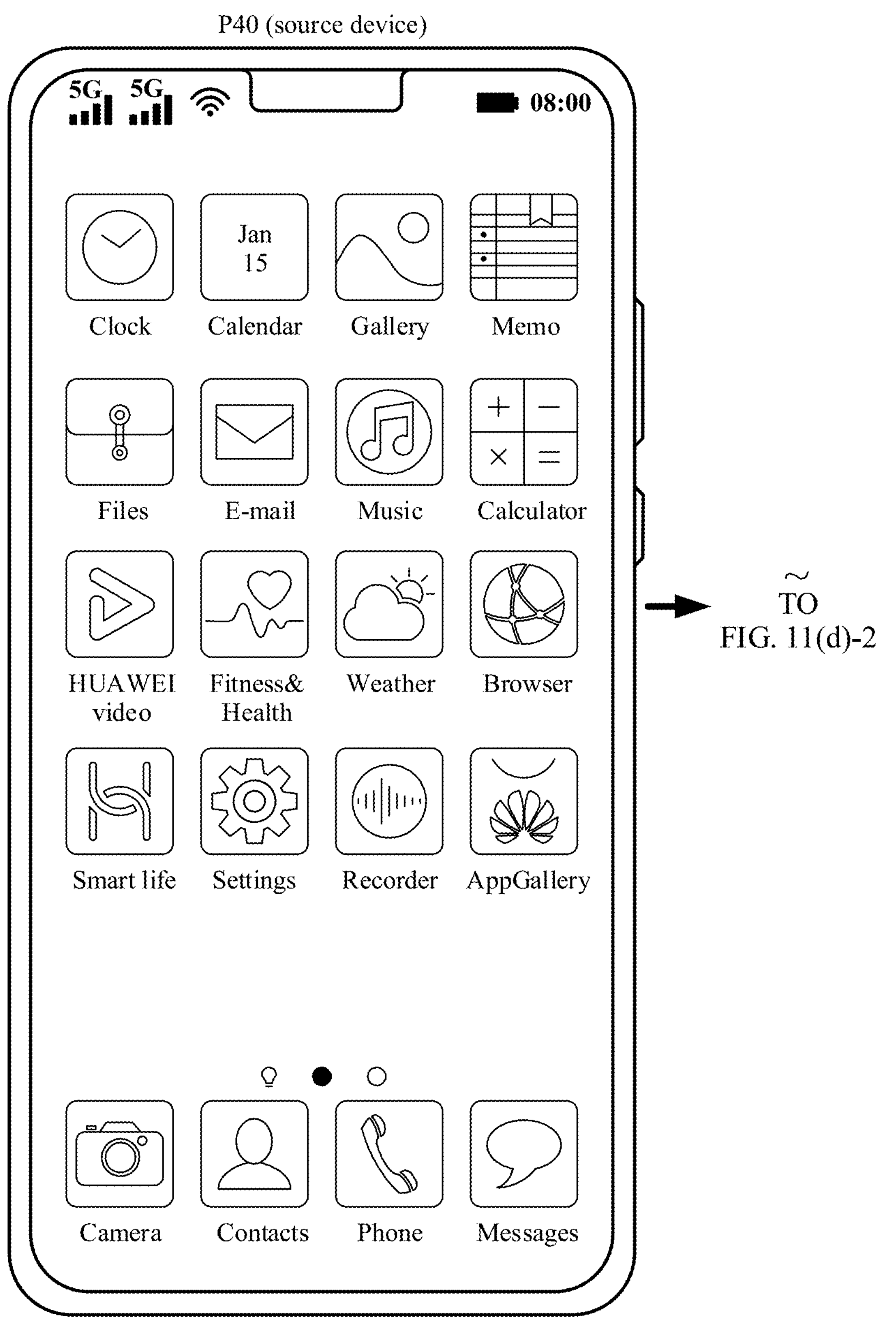
Figures 2, 11D:
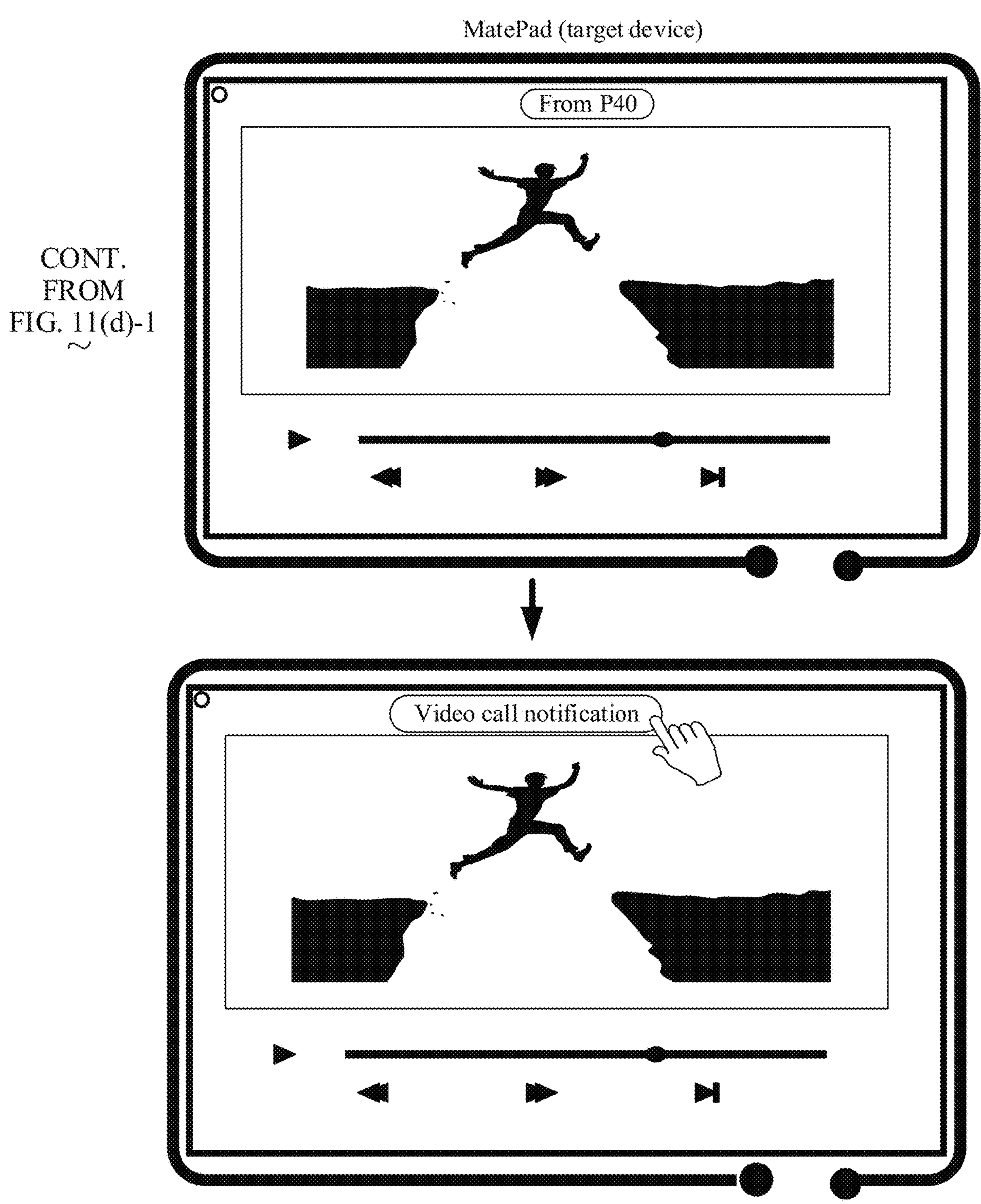
Figures 1, 11E:
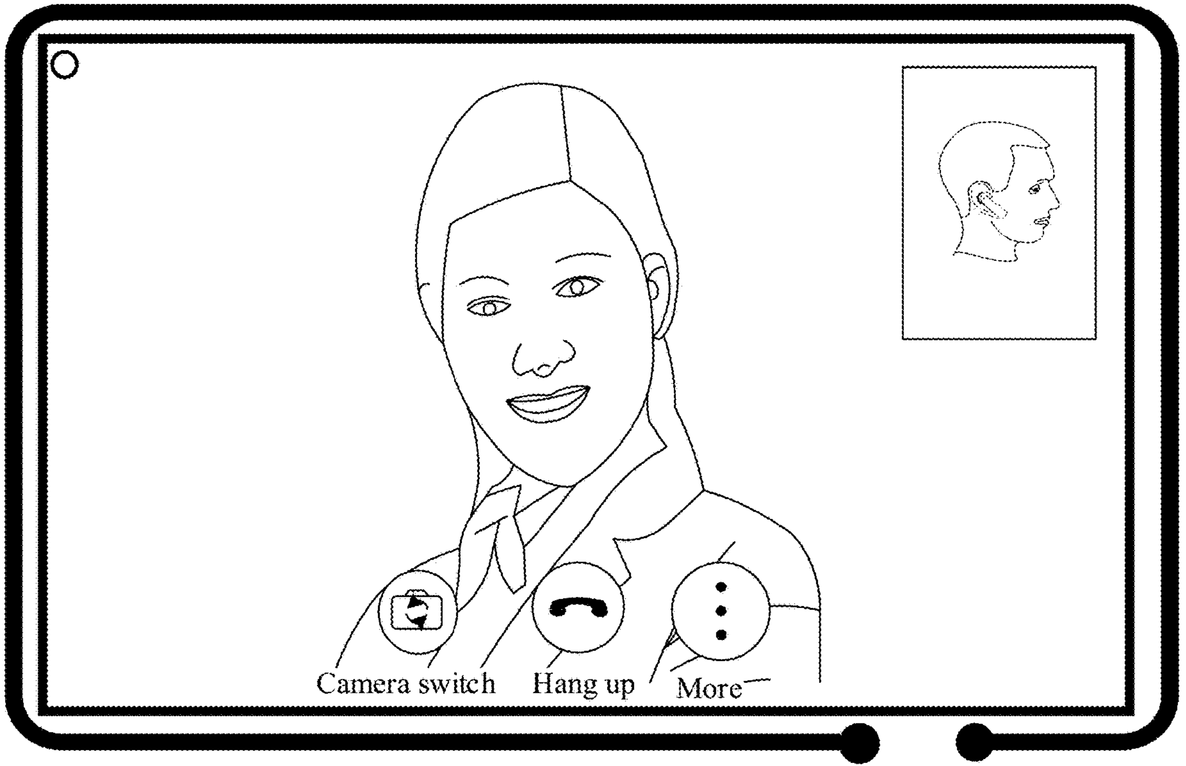
Figures 2, 11E:
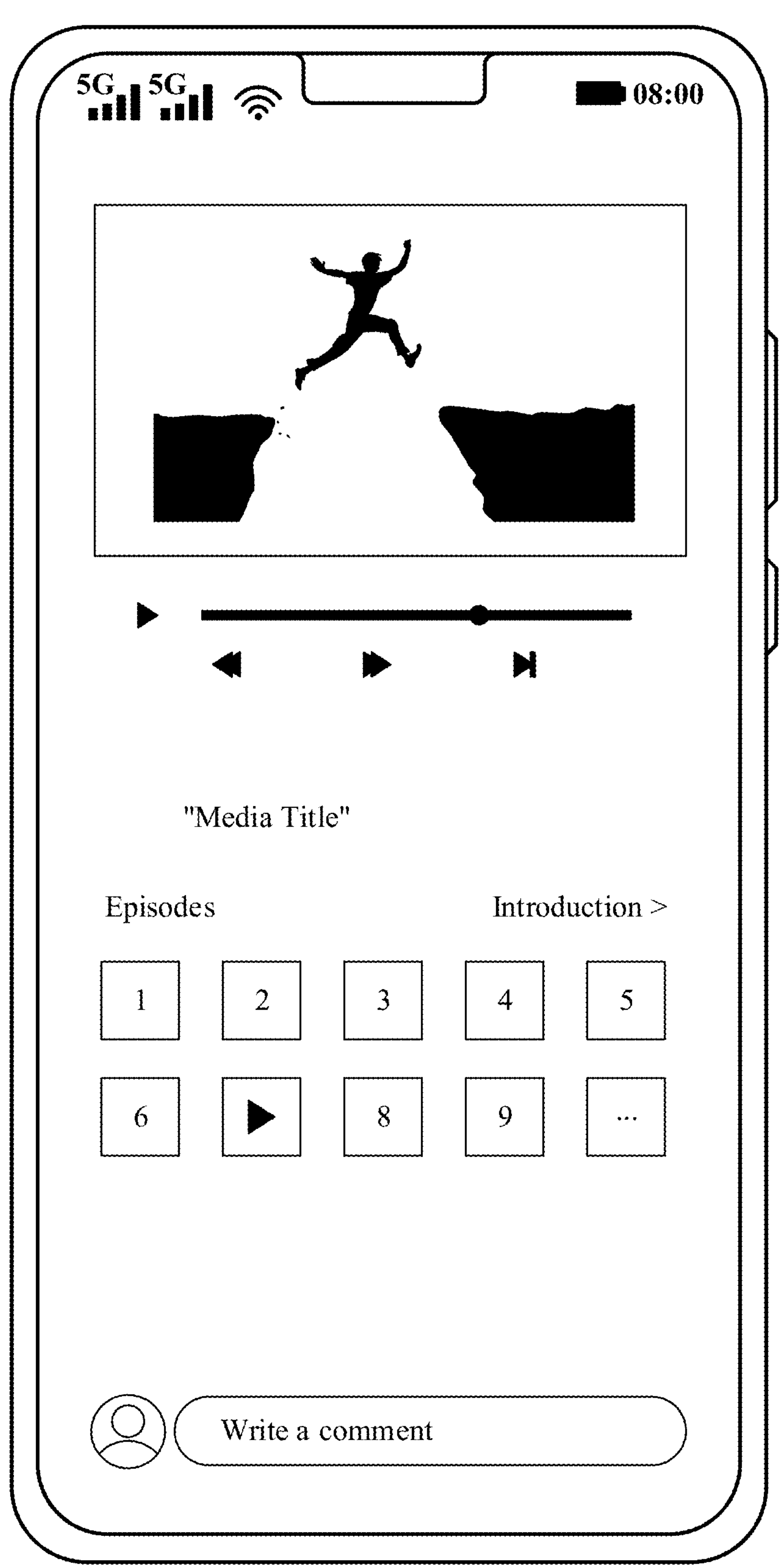
Figures 1, 11F:
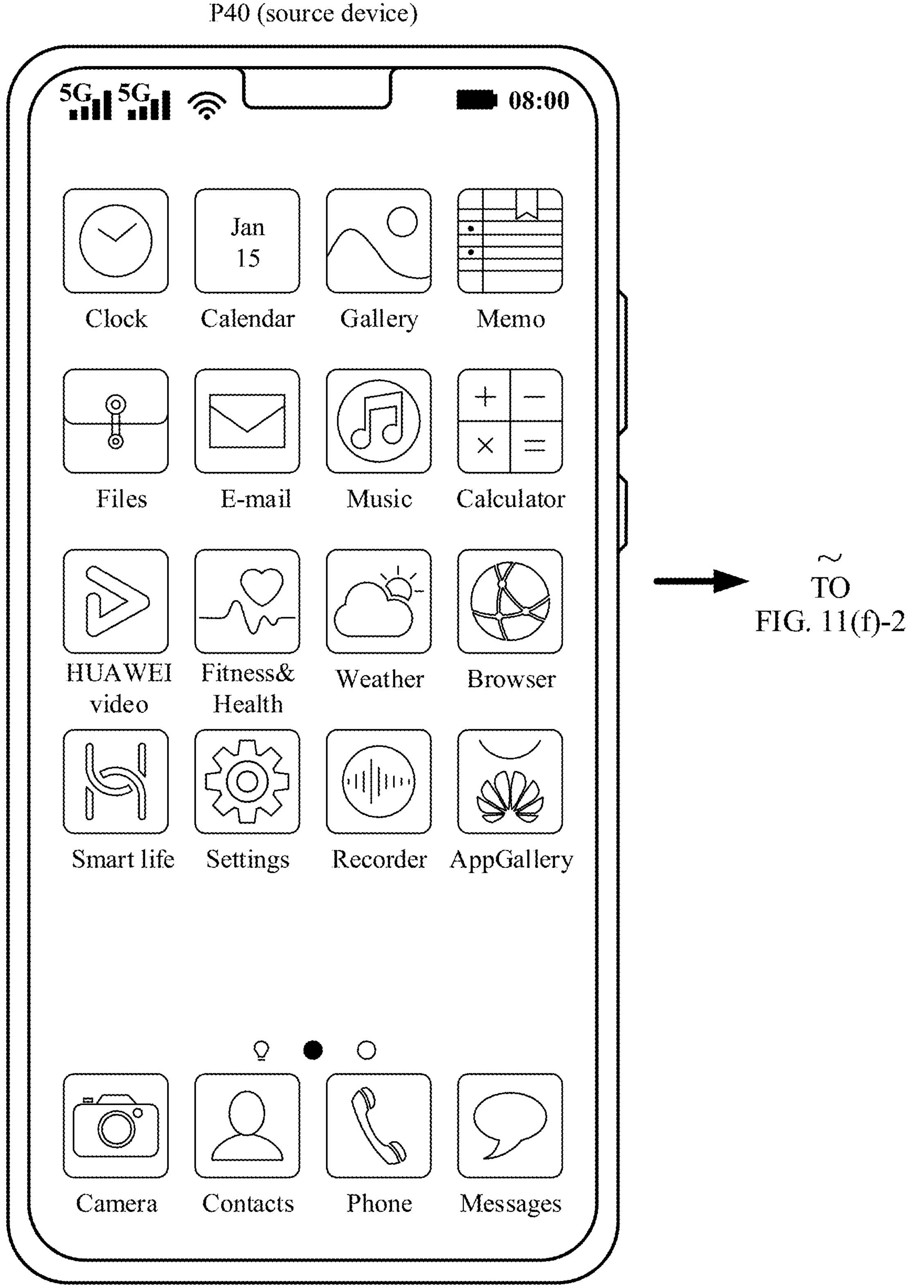
Figures 2, 11F:
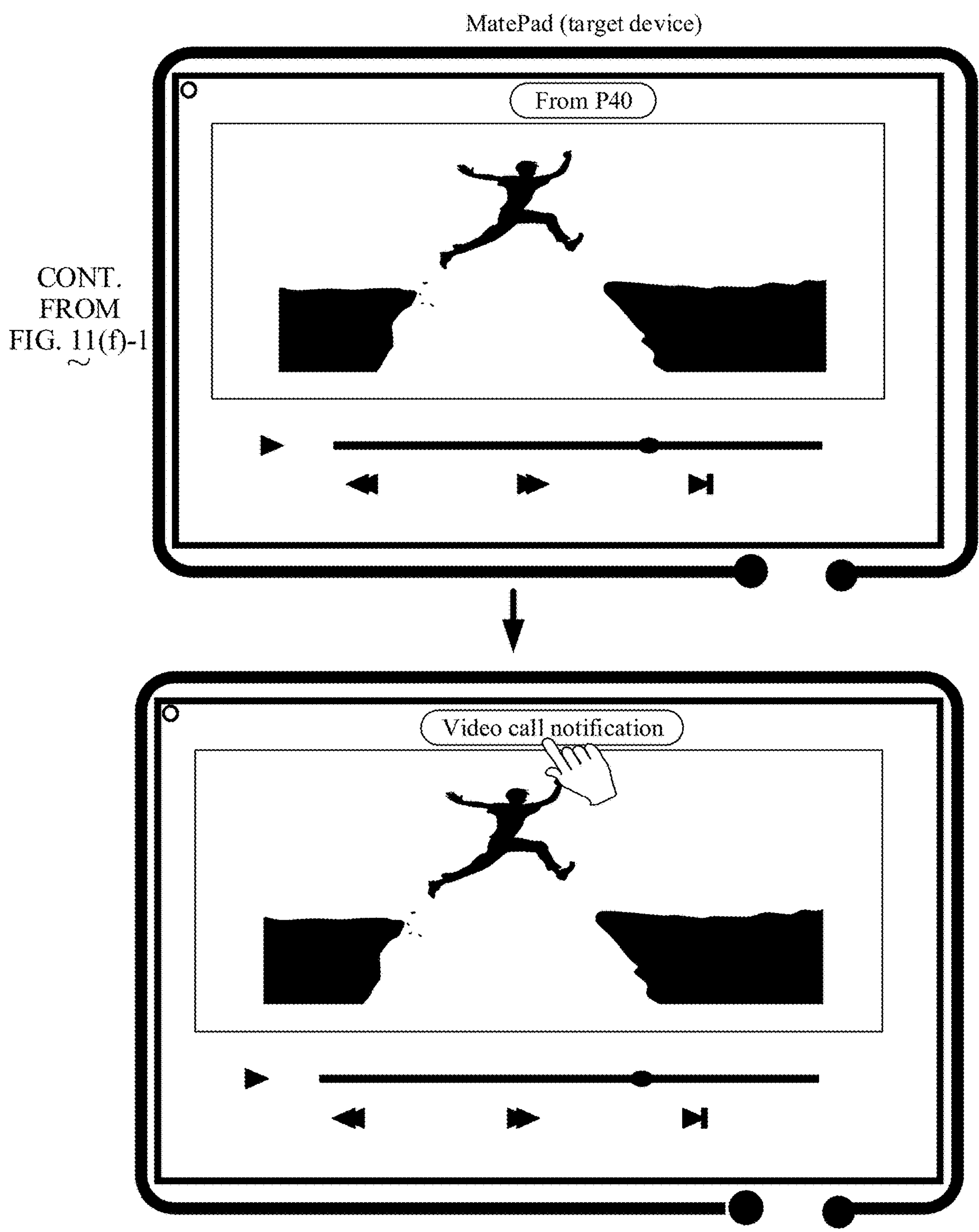
Figure 11G:
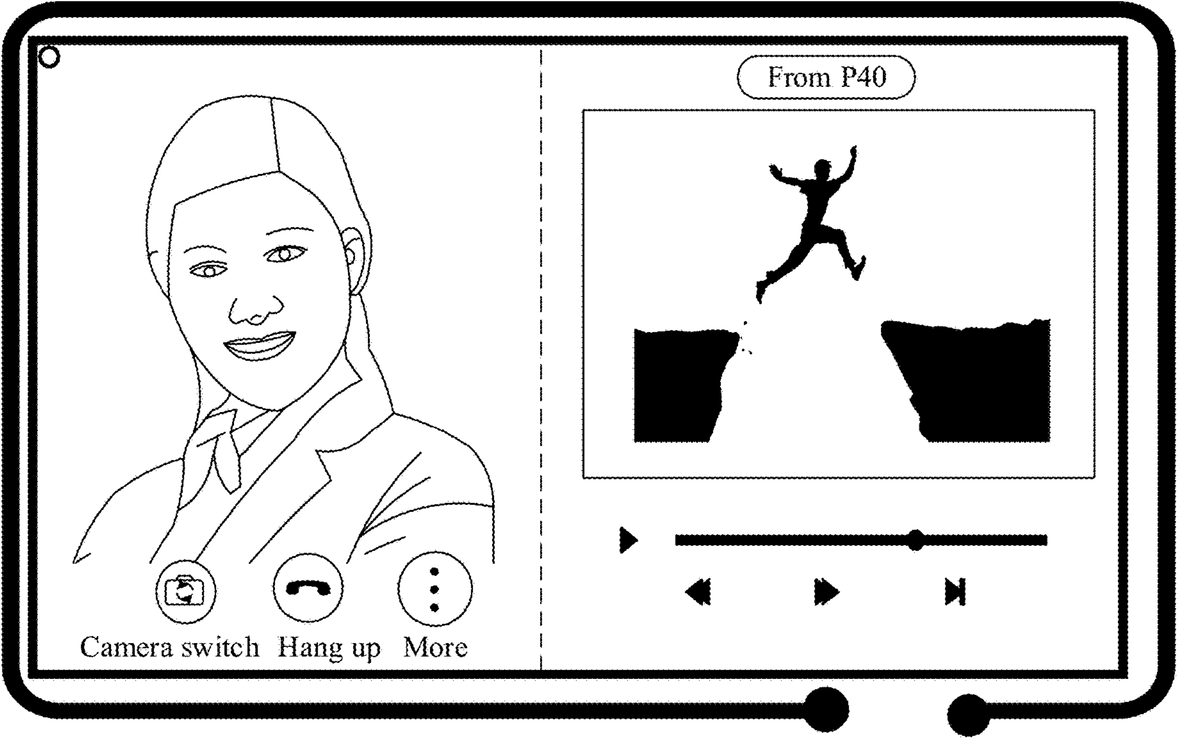
Figures 1, 11H:
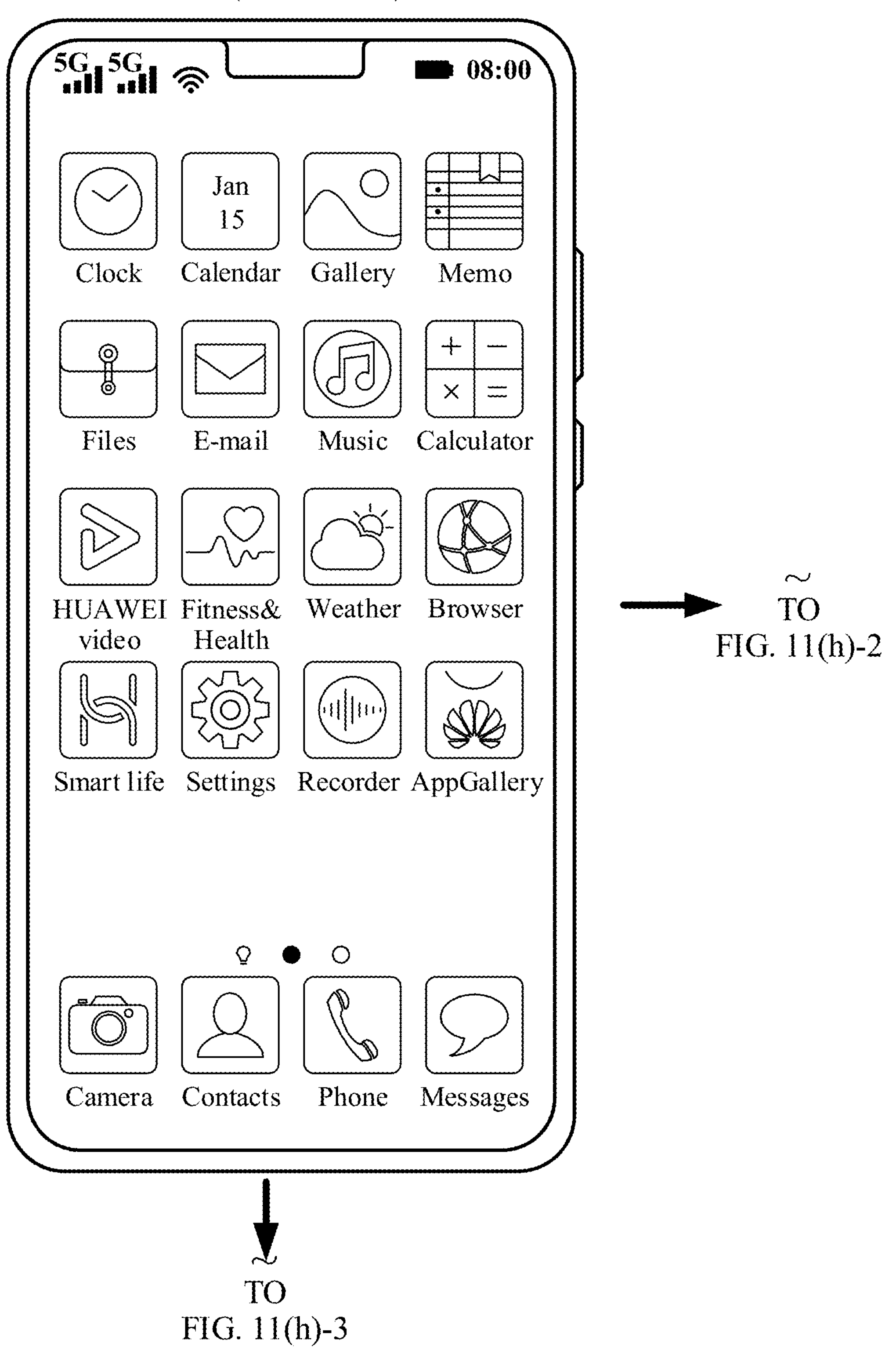
Figures 2, 11H:
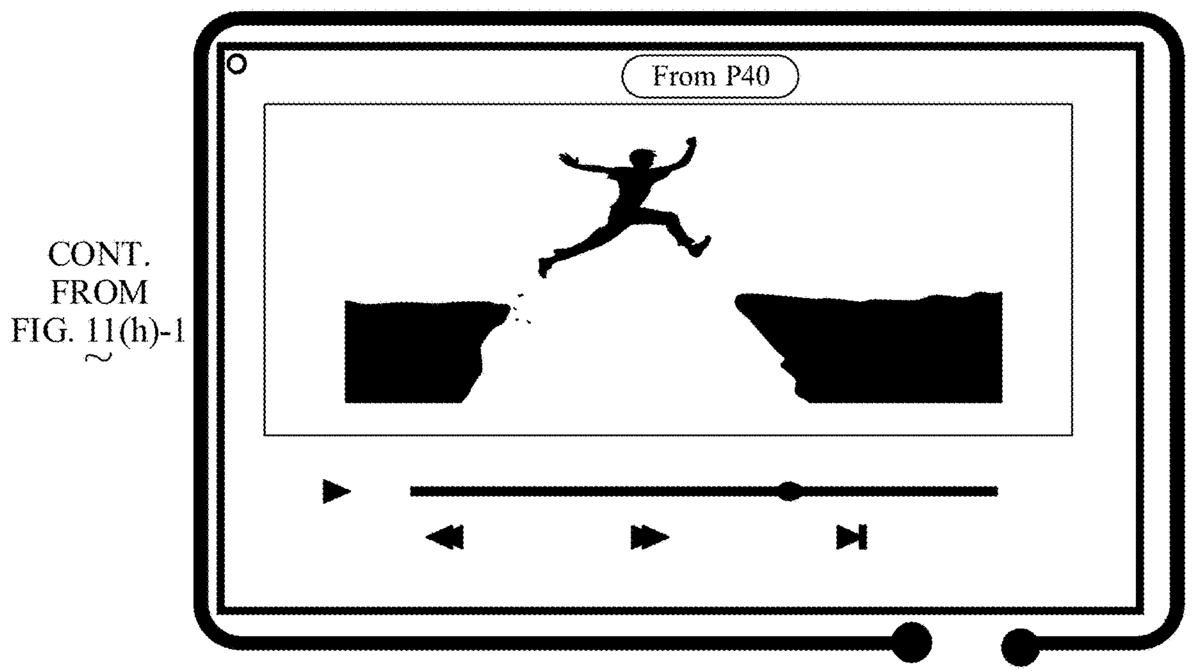
Figures 3, 11H:
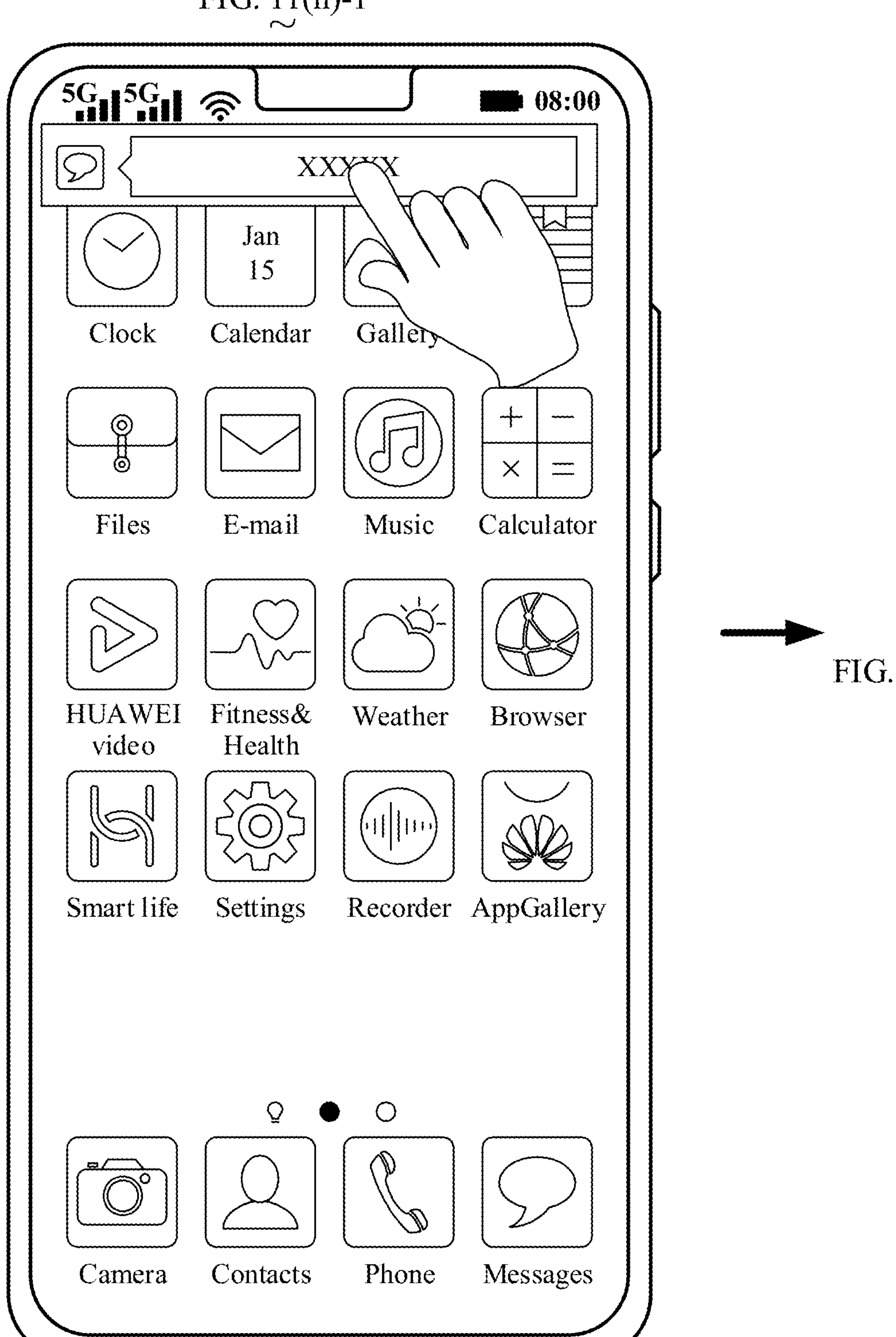

For example, in FIG. 3(*a*), when the user makes a tap gesture in an area other than a task card on the recent tasks screen, the recent tasks screen exits, and the display of the terminal displays the home screen.

However, as shown in FIG. 3(*b*), when the user makes a tap gesture in an area corresponding to the task card of the first application, the recent tasks screen exits, the display of the terminal displays an interface of the first application, and the first application is switched from the background to the foreground for running.

In FIG. 3(*a*) and FIG. 3(*b*), responses made by the terminal to the gestures of the user are merely used as examples. During actual application, there may be another response. This is not limited in this application.

In addition, during actual application, refer to FIG. 3(*a*) and FIG. 3(*b*). Space such as a trash can icon in the lower part in FIG. 3(*a*) and FIG. 3(*b*) used to close all recently run applications may be further displayed on the recent tasks screen. The user can tap this icon to close all the recently run tasks. During specific implementation, all applications or a specific application run in a floating window on the recent tasks screen can be closed in another manner. For example, the application may be further closed by using a gesture of swiping up, a gesture of swiping down, or a specific control (for example, a close button in a task card) in the task card.

The foregoing describes content of the recent tasks screen and basic operations on the recent tasks screen. In this application, on a recent tasks screen of a terminal, not only a recently run application of the terminal can be displayed, but also a recently run application of another terminal can be displayed. Further, an operation may be performed on a task card corresponding to one or more applications, to implement cross-device migration of an application, application running, and the like.

A scenario shown in FIG. 1 is used as an example for description. A first terminal, a second terminal, a third terminal, and the like are connected through a network. When the user operates the first terminal to enter the recent tasks screen, not only a recently used application of the first terminal but also recently used applications of the second terminal and the third terminal are displayed on the recent tasks screen.

Optionally, before the recently used applications of the second terminal and the third terminal are displayed on the recent tasks screen of the first terminal, it is a prerequisite that the first terminal, the second terminal, and the third terminal establish a trust relationship. That is, the first terminal, the second terminal, and the third terminal are bound or a device-level authentication relationship is established. In embodiments of this application, a specific process in which the first terminal, the second terminal, and the third terminal are bound or the device-level authentication relationship is established is not limited.

In some embodiments, the electronic device (using the mobile phone 101 as an example for description) may learn, by using a mobile network or the internet, that a login account of one or more other devices (including the tablet computer 102, the large-screen device 103, and the like) is an account of the mobile phone 101, or that a login account of one or more other devices is an associated account of a login account of the mobile phone 101. In this case, the one or more other devices have a trust relationship with the mobile phone 101. The one or more other devices include the tablet computer 102, the large-screen device 103, the smart refrigerator 104, the smart air conditioner 105, and the like. Devices that log in to the same account or associated accounts can obtain information about each other to implement data communication. The associated accounts may be accounts authorized by a same account.

The account may be an account provided by a cloud server provider for the user, for example, a HUAWEI account, or may be an account used to log in to an application, for example, an account of various communication software or an account of payment software.

In some embodiments, a trust relationship may be established between terminal devices in a manual addition manner including, for example, a tap manner and a scan manner. For example, as shown in FIG. 3(*c*), the user may enter a device management interface 110 through a setting application of the mobile phone 101, and the device management interface 110 may include a list named "My devices". "My devices" includes a local device, a second terminal 102, a third terminal 103, another smart device, and the like. The local device, the second terminal 102, the third terminal 103, and another smart device may be devices with a same account (for example, sharing a HUAWEI account). Alternatively, the local device, the second terminal 102, the third terminal 103, and the another smart device may be devices that have different accounts but are bound through authentication.

Optionally, the device management interface 110 may include a button 111 for binding another device. In this embodiment of this application, binding means that a trust relationship is established between two devices, so that an operation like data synchronization between the devices can be performed. In response to an operation (for example, a tap operation) performed by the user on the button 111 for binding another device, a device binding interface 120 shown in FIG. 3(*d*) is displayed. The device binding interface 120 includes a list of devices that are found through scanning and that can be added, and the user may select a device to be bound from the list of devices that can be added, for example, a room television 121, a tablet 122, and a smartwatch 123 shown in FIG. 3(*d*). When the mobile phone 101 wants to establish a binding relationship with the room television 121, the tablet 122, or the smartwatch 123, the mobile phone 101 may directly tap a binding button 121A corresponding to the room television 121, a binding button 122A corresponding to the tablet 122, or a binding button 123A corresponding to the smartwatch 123, to implement binding to the room television 121, the tablet 122, or the smartwatch 123.

Optionally, the device binding interface 120 further includes a tap to add button 124 and a scan to add button 125 through which the mobile phone may be bound to an electronic device that is not found through scanning by the mobile phone 101. For example, in response to a user operation on the tap to add button 124, the mobile phone 101 enables NFC, and touches an ontag tag on another device by using a back side, to implement binding to the another device. In response to a user operation on the scan to add button 125, the mobile phone 101 scans a two-dimensional code of the another device, to implement binding to the another device.

It should be understood that locations, names, shapes, and the like of elements (such as a button, an icon, and a text) on UI interfaces respectively corresponding to FIG. 3(*c*) and FIG. 3(*d*) are not fixed, and may be freely assembled or designed according to requirements. For example, the button 111 in FIG. 3(*c*) may be replaced with the button 124 and the button 125 in FIG. 3(*d*).

It should be noted that mutual communication between devices to implement the solutions of embodiments of this application may be based on a same network, or may be based on a fact that a trust relationship exists between the devices before, for example, a common account, an associated account, or a binding relationship, or may be based on a same network and a trust relationship. This is not limited in this application.

For example, the first terminal, the second terminal, and the third terminal may form a local area network device group through networking, and a plurality of devices in the local area network device group are trusted devices. In this case, a local area network device formed by the first terminal, the second terminal, and the third terminal may be referred to as a "super terminal".

For another example, the first terminal, the second terminal, and the third terminal separately log in to a same account.

For another example, although the first terminal, the second terminal, and the third terminal respectively log in to different accounts, the three accounts are mutually trusted associated accounts, family accounts, or the like.

For another example, at least one device of the first terminal, the second terminal, and the third terminal logs in to an account, and at least one device does not have an account. A device-level authentication relationship may also be established between the device with an account and the device without an account. A specific representation form of establishing the trust relationship among the first terminal, the second terminal, and the third terminal is not limited in this application.

Not only a recently used application of the first terminal but also recently used applications of the second terminal and the third terminal are displayed on a recent tasks screen of the first terminal. When a historical task card of another device is displayed on the recent tasks screen of the first terminal, identifiers of the first terminal and a plurality of terminals (including the second terminal and the third terminal) connected to the first terminal may be first displayed on the recent tasks screen of the first terminal. When the identifier of the first terminal or an identifier of a terminal connected to the first terminal is selected, a recent task list corresponding to the terminal is correspondingly displayed on the recent tasks screen.

In this application, when a recently used application of another terminal (which may be alternatively referred to as a recent task snapshot of the another terminal, a recent task card of the another terminal, a historical task card of the another terminal, or the like) is displayed on the recent tasks screen of the first terminal, the task card of the another terminal may be arranged on the recent tasks screen of the first terminal based on a common use status of the another terminal. For example, the common use status of the another terminal includes: a landscape-mode use state, a portrait-mode use state, a portrait-mode use state in an unfolded state of a foldable screen, a landscape-mode use state in an unfolded state of a foldable screen, a landscape-mode use state in a folded state of a foldable screen, a portrait-mode use state in a folded state of a foldable screen, and the like. Alternatively, the task card of the another terminal may be arranged on the recent tasks screen of the first terminal based on a use status of a single user of the another terminal. Alternatively, the task card of the another terminal may be arranged on the recent tasks screen of the first terminal based on a screen status (for example, a size) and a use status (for example, a landscape-mode use state or a portrait-mode use state) of the first terminal. Alternatively, the task card of the another terminal may be arranged on the recent tasks screen of the first terminal based on settings performed by the user on the first terminal. This is not limited in this application.

Figures 4, 11H:
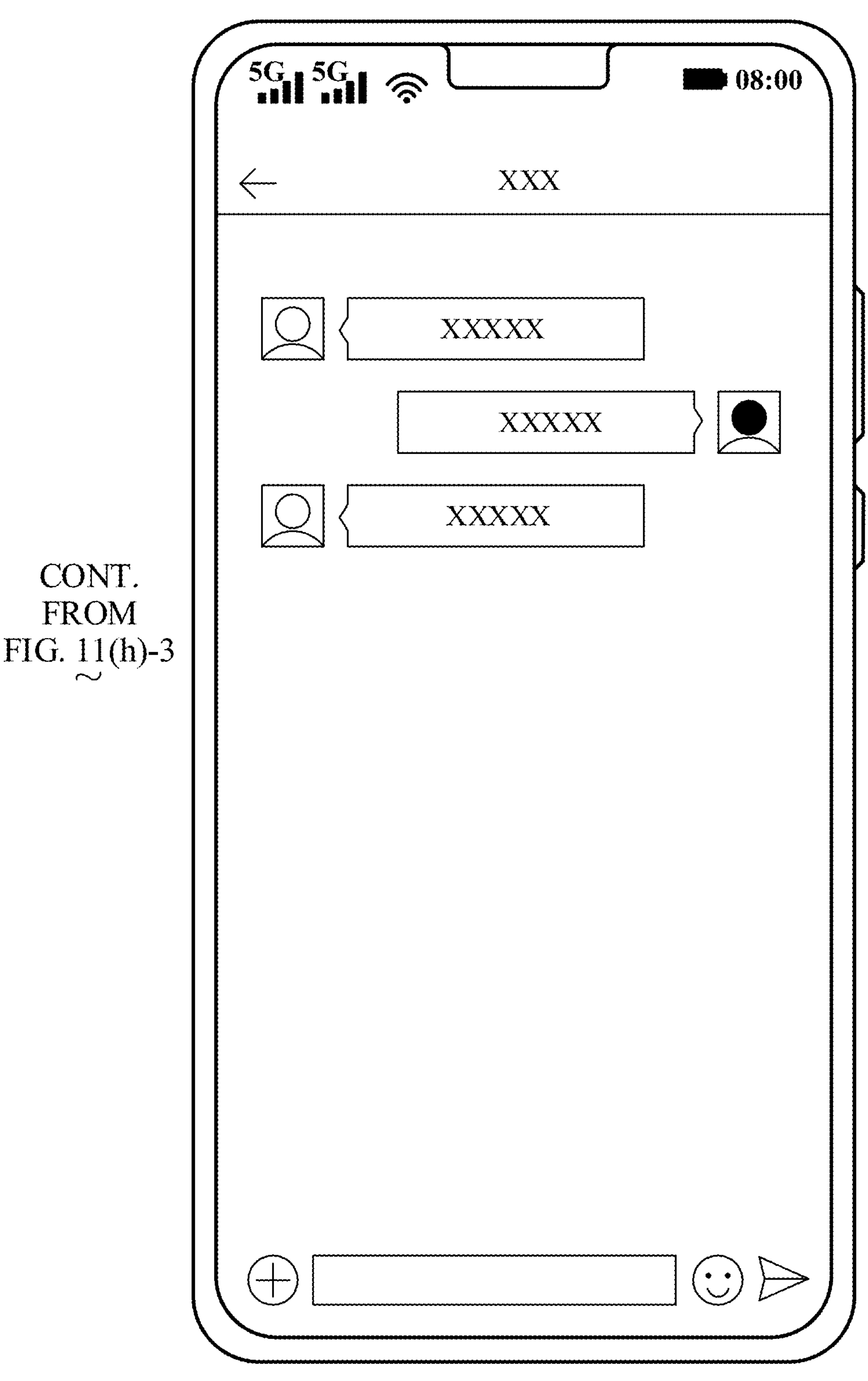
Figures 1, 11I:
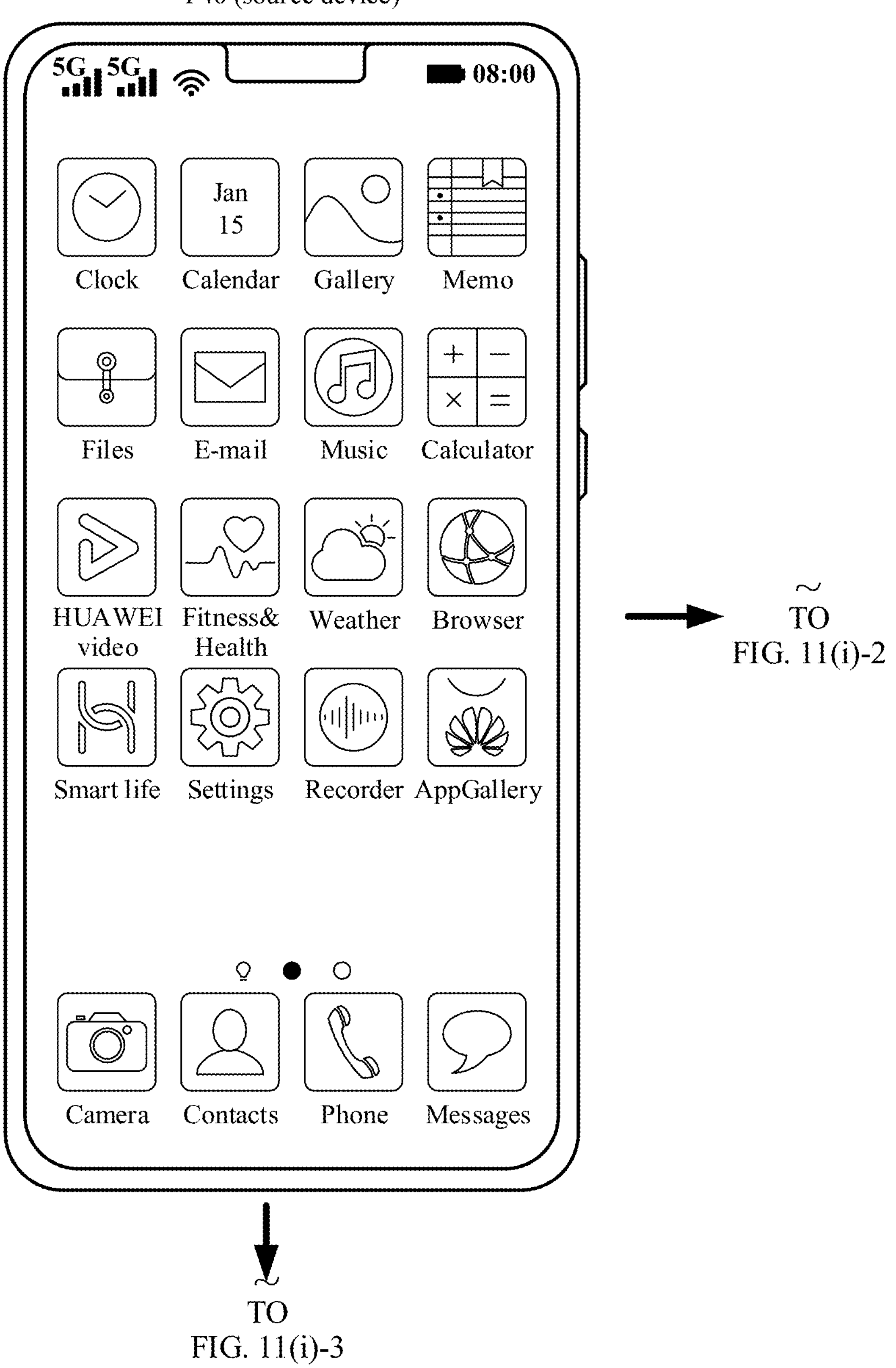
Figures 2, 11I:
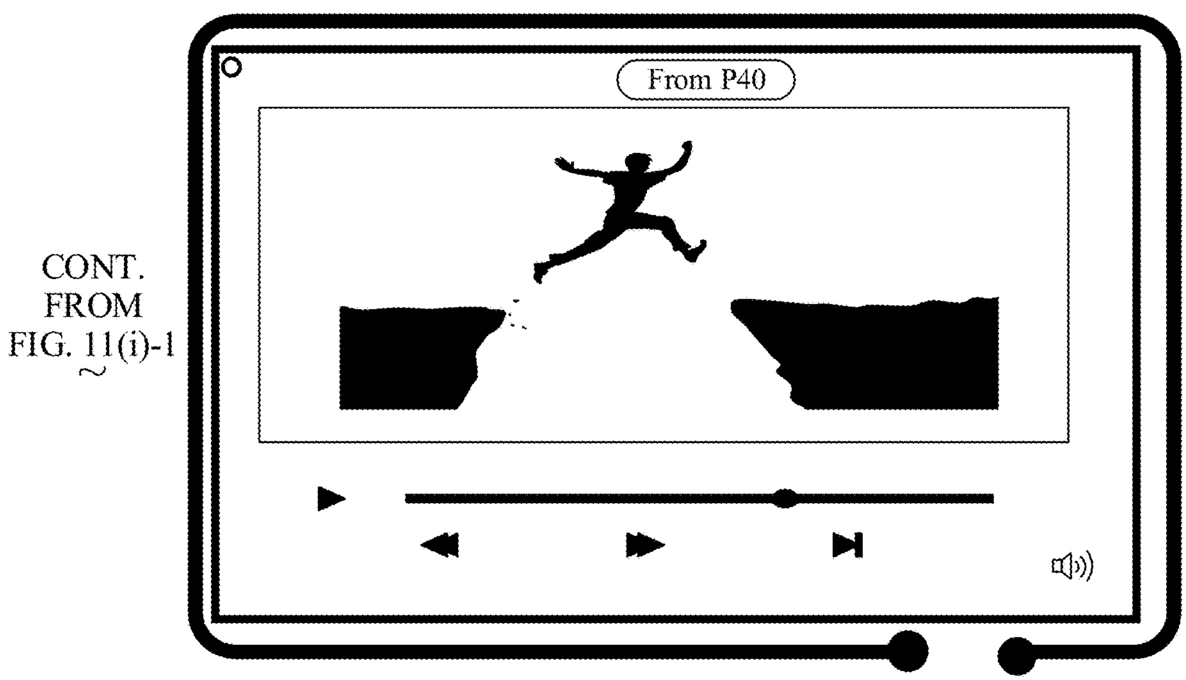
Figures 3, 11I:
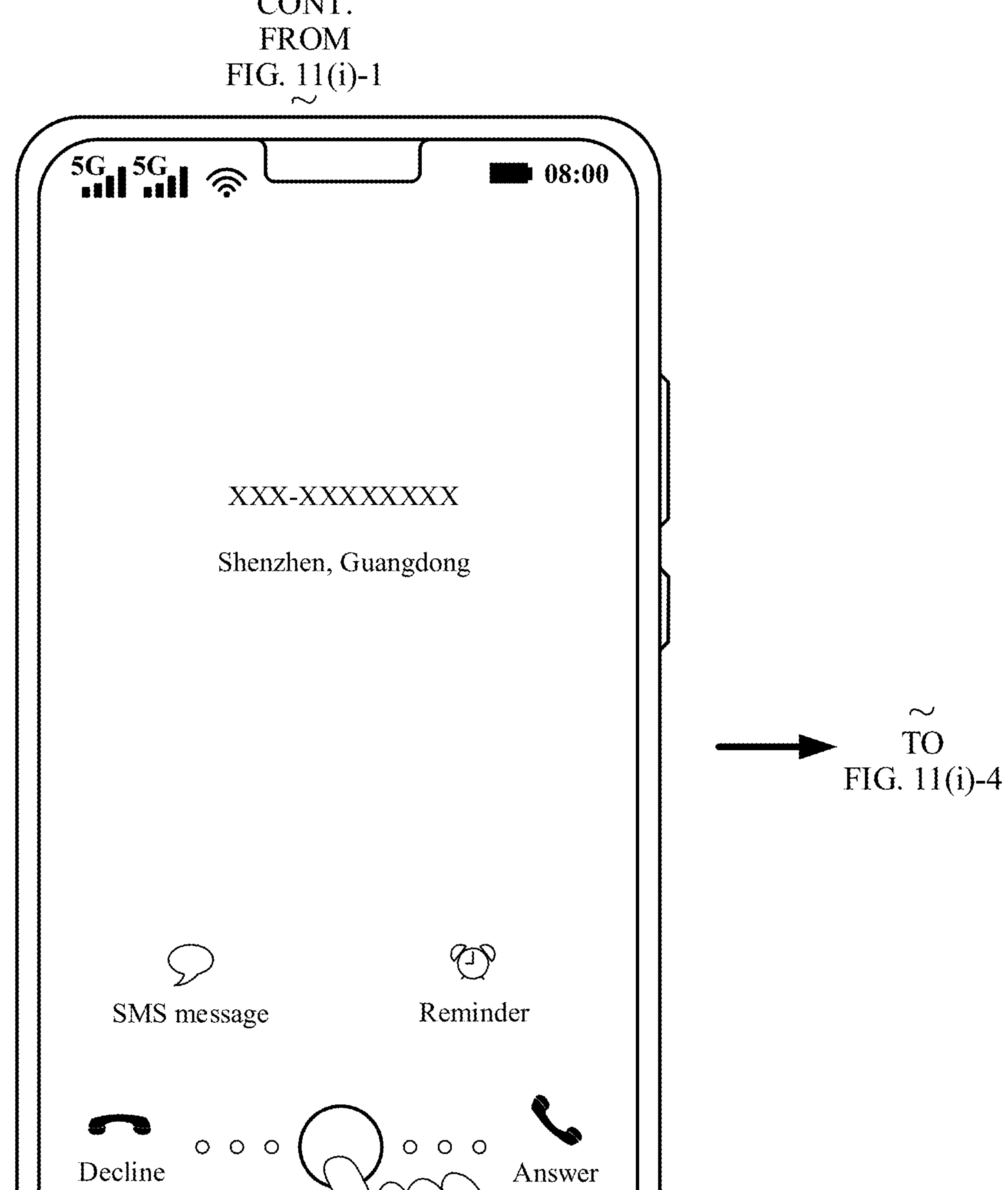
Figures 4, 11I:
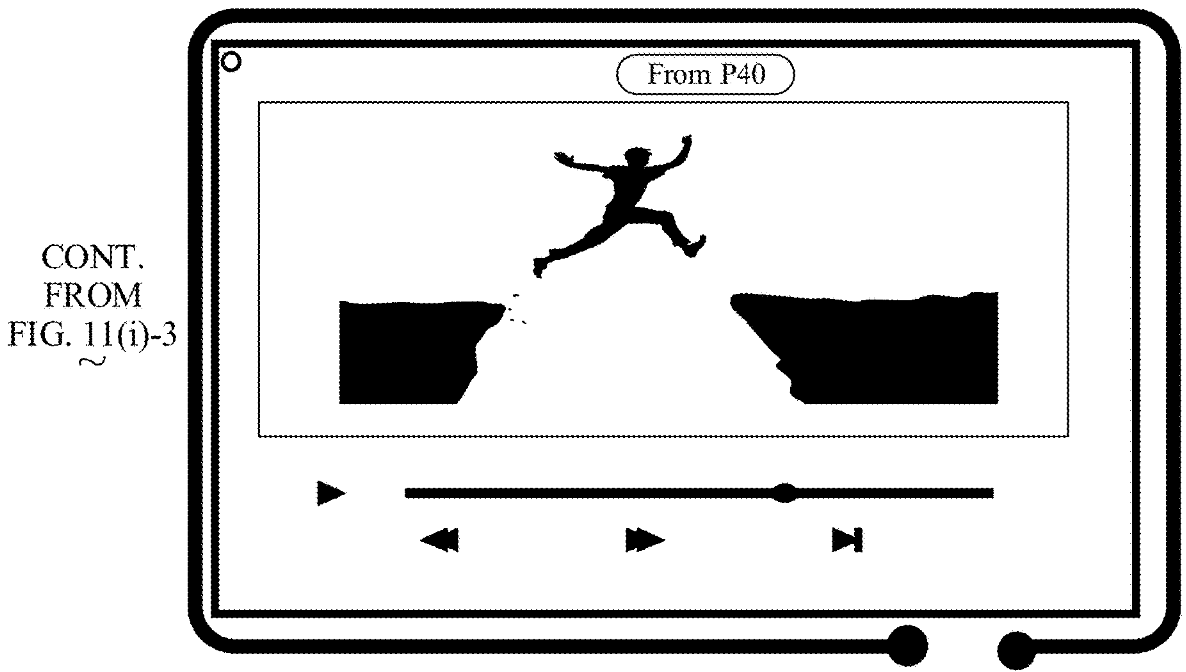
Figures 1, 11J:
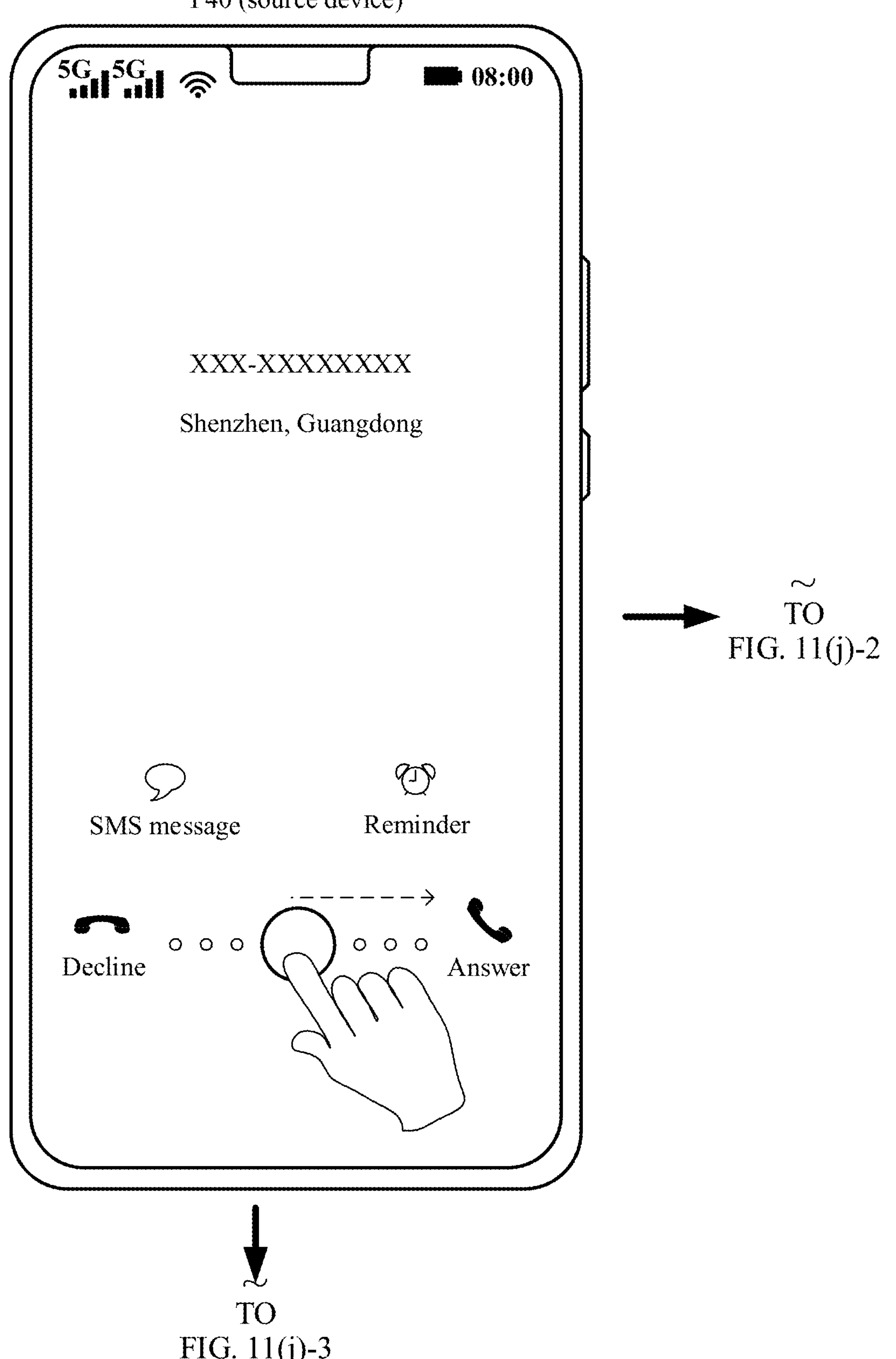
Figures 2, 11J:
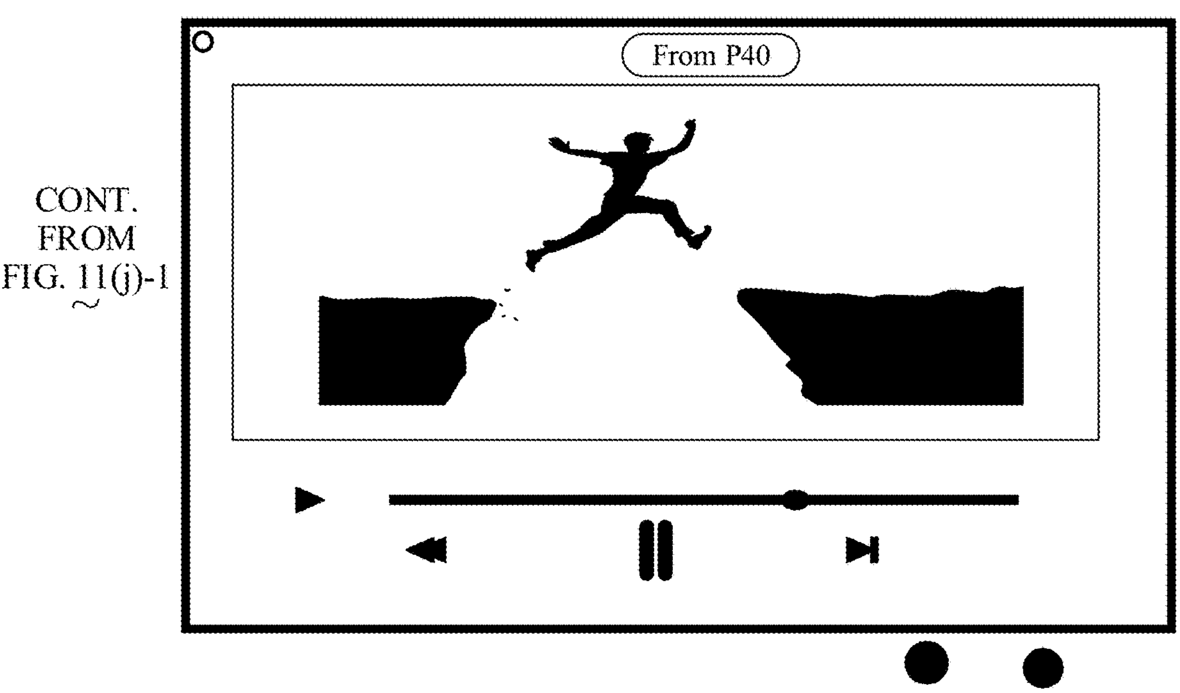
Figures 3, 11J:
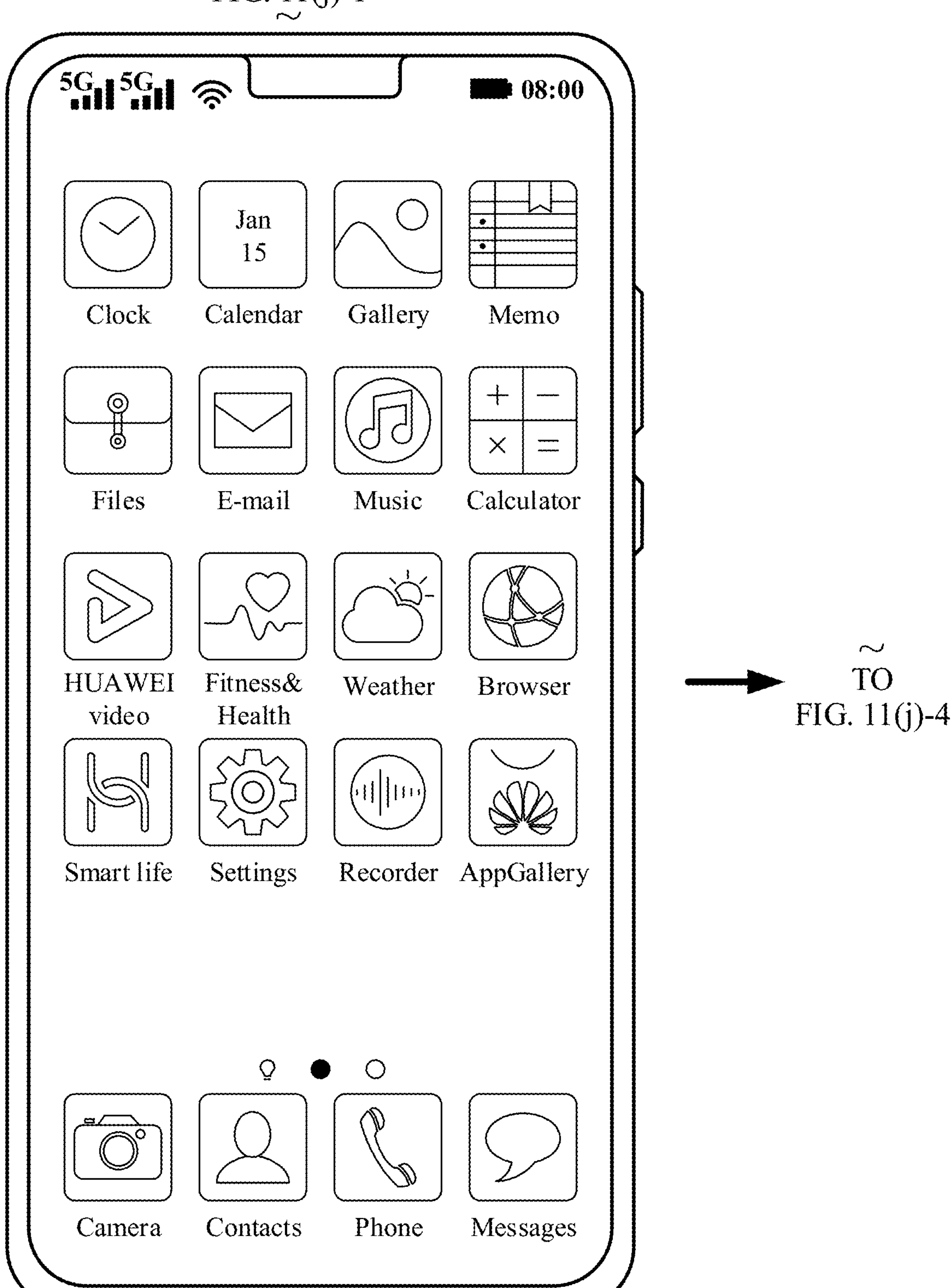
Figures 4, 11J:
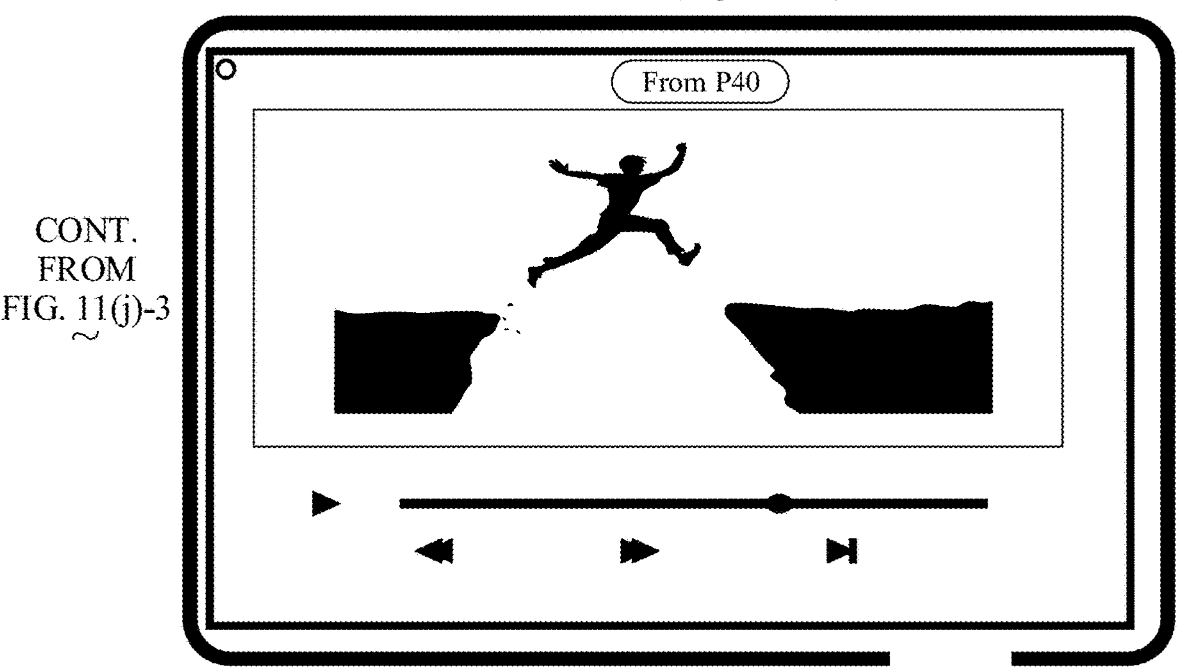
Figures 1, 11K:
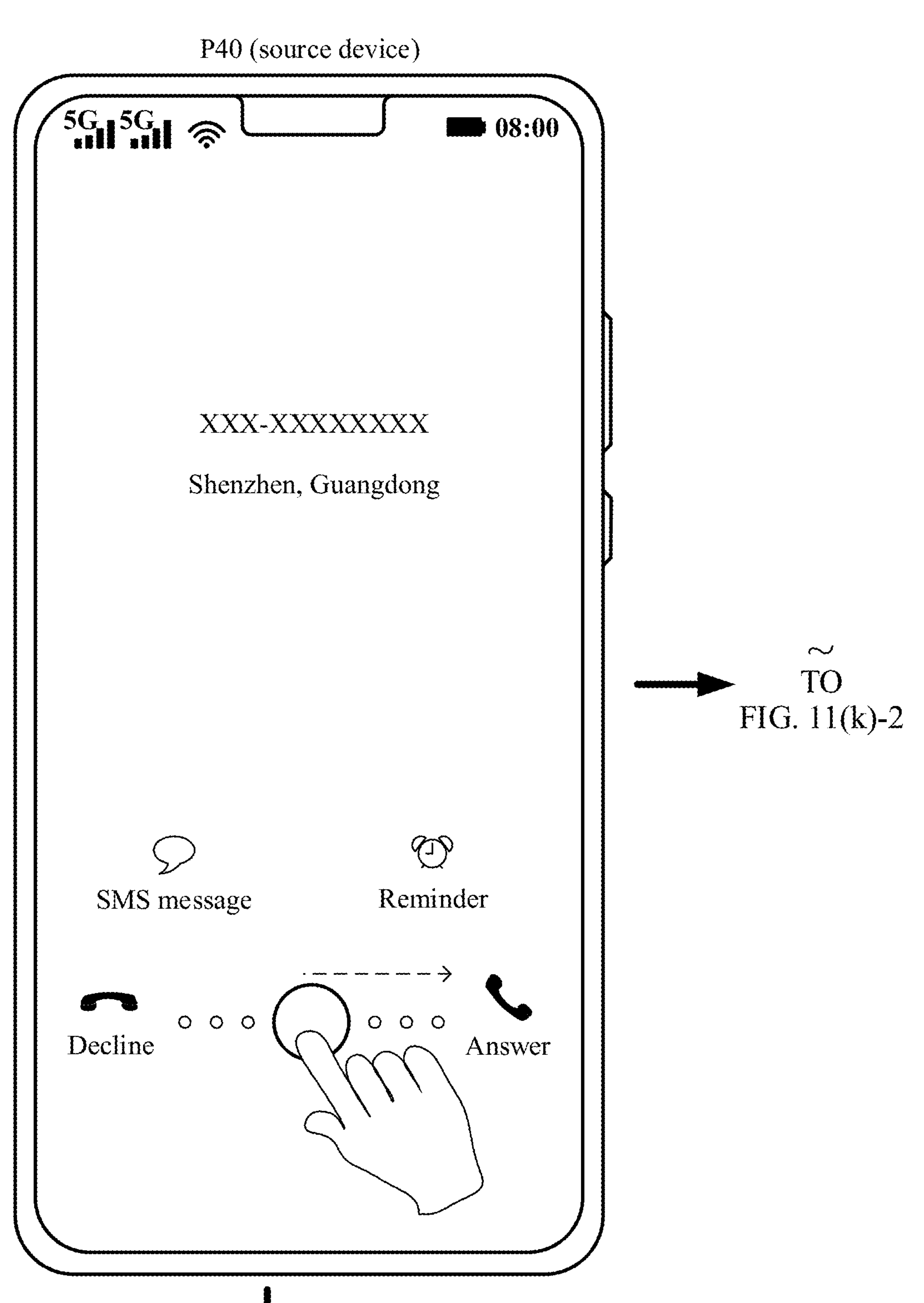
Figures 2, 11K:
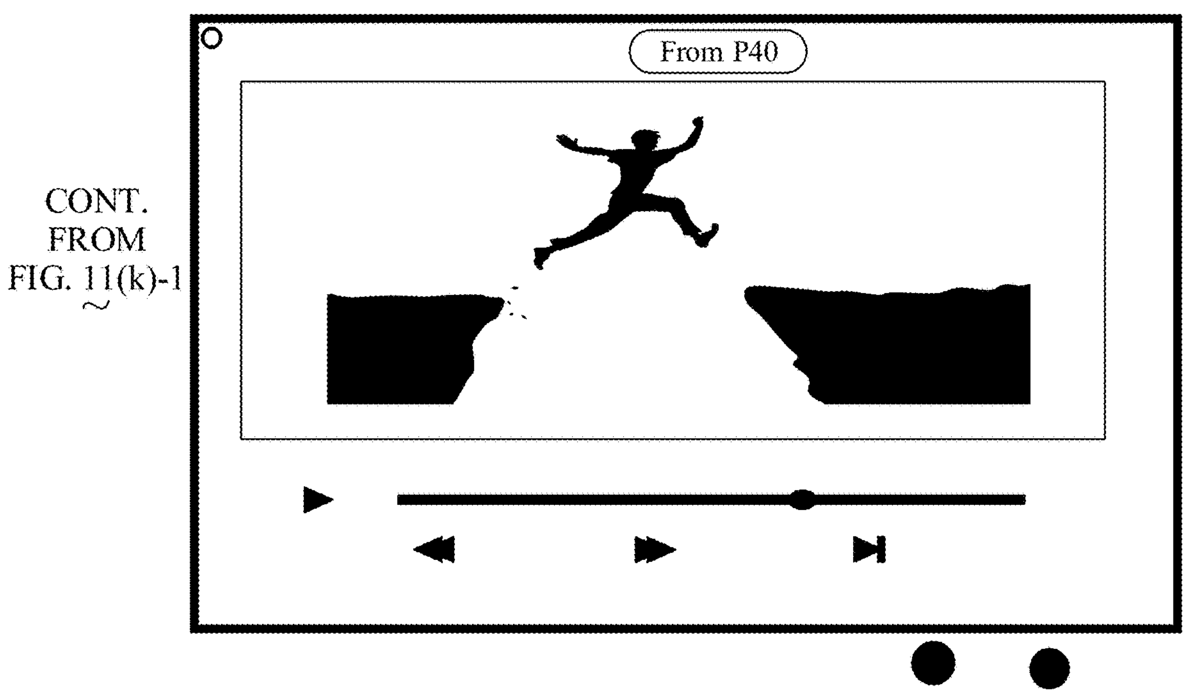
Figures 3, 11K:
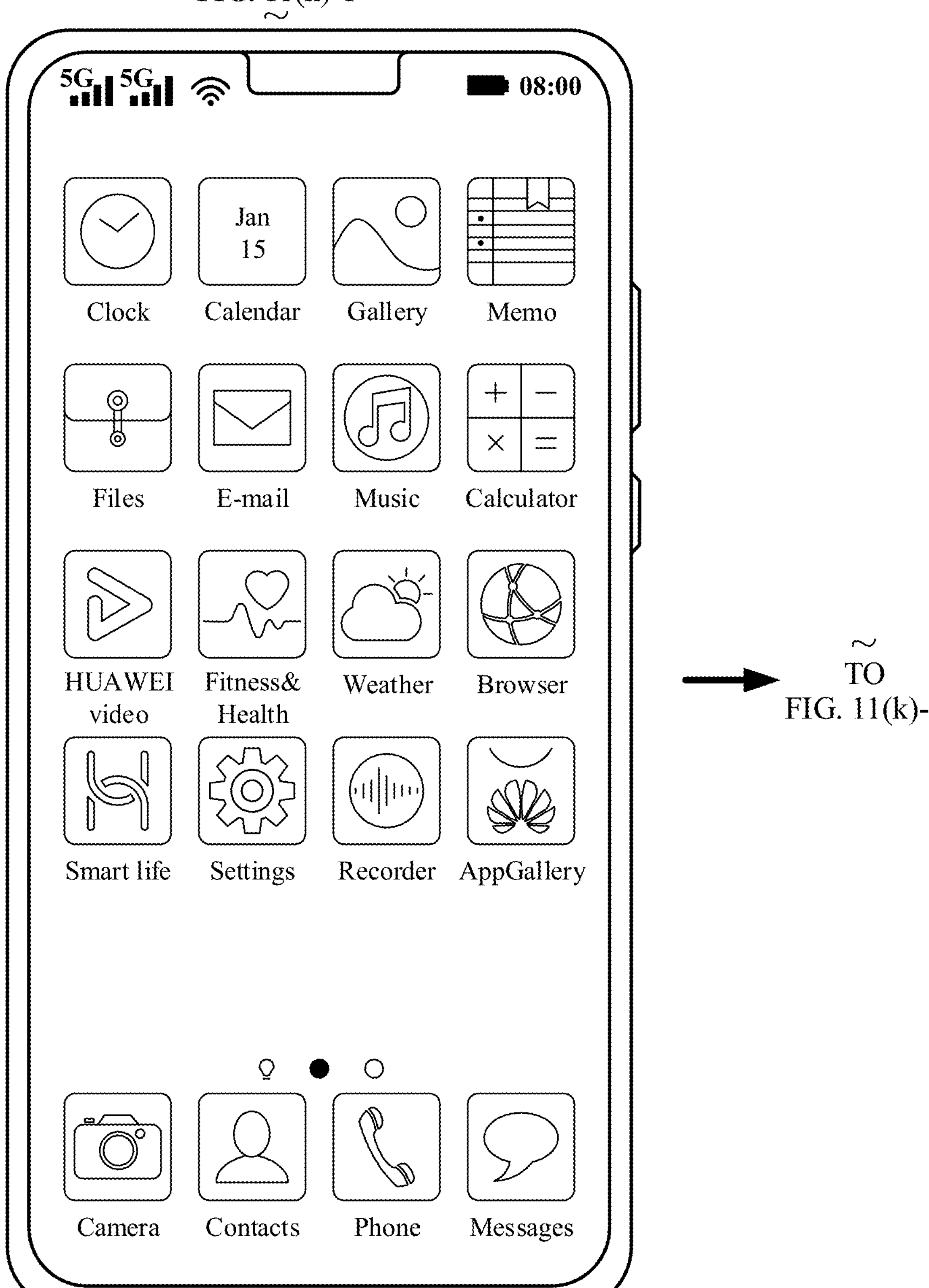
Figures 4, 11K:
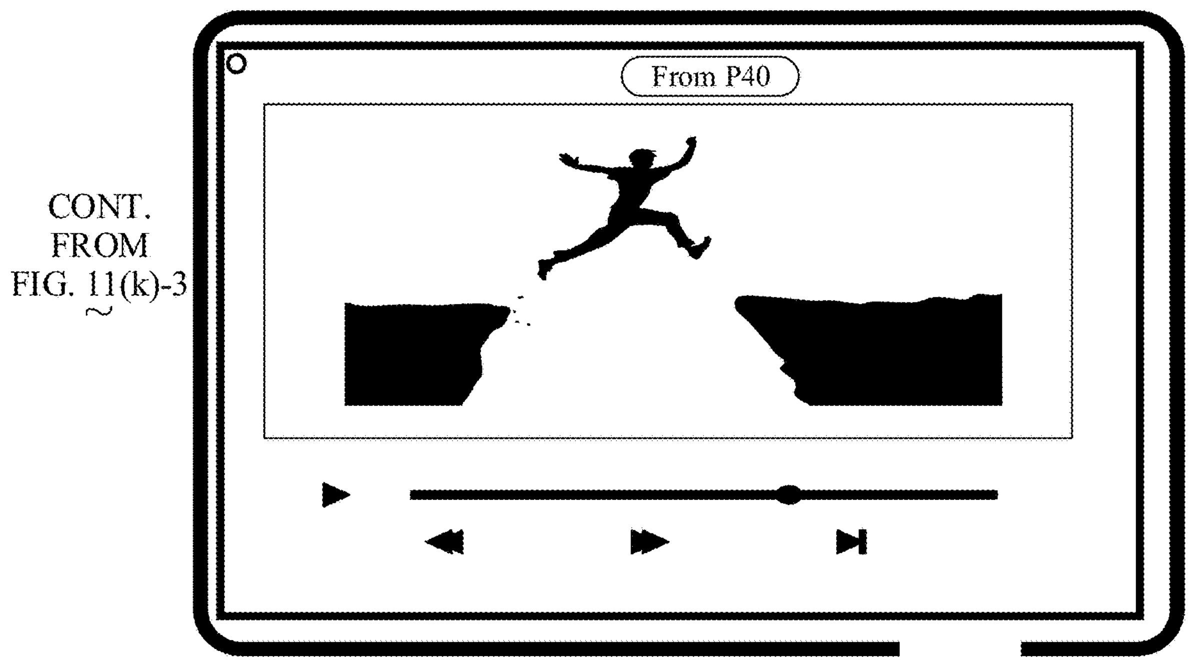
Figures 1, 12A:
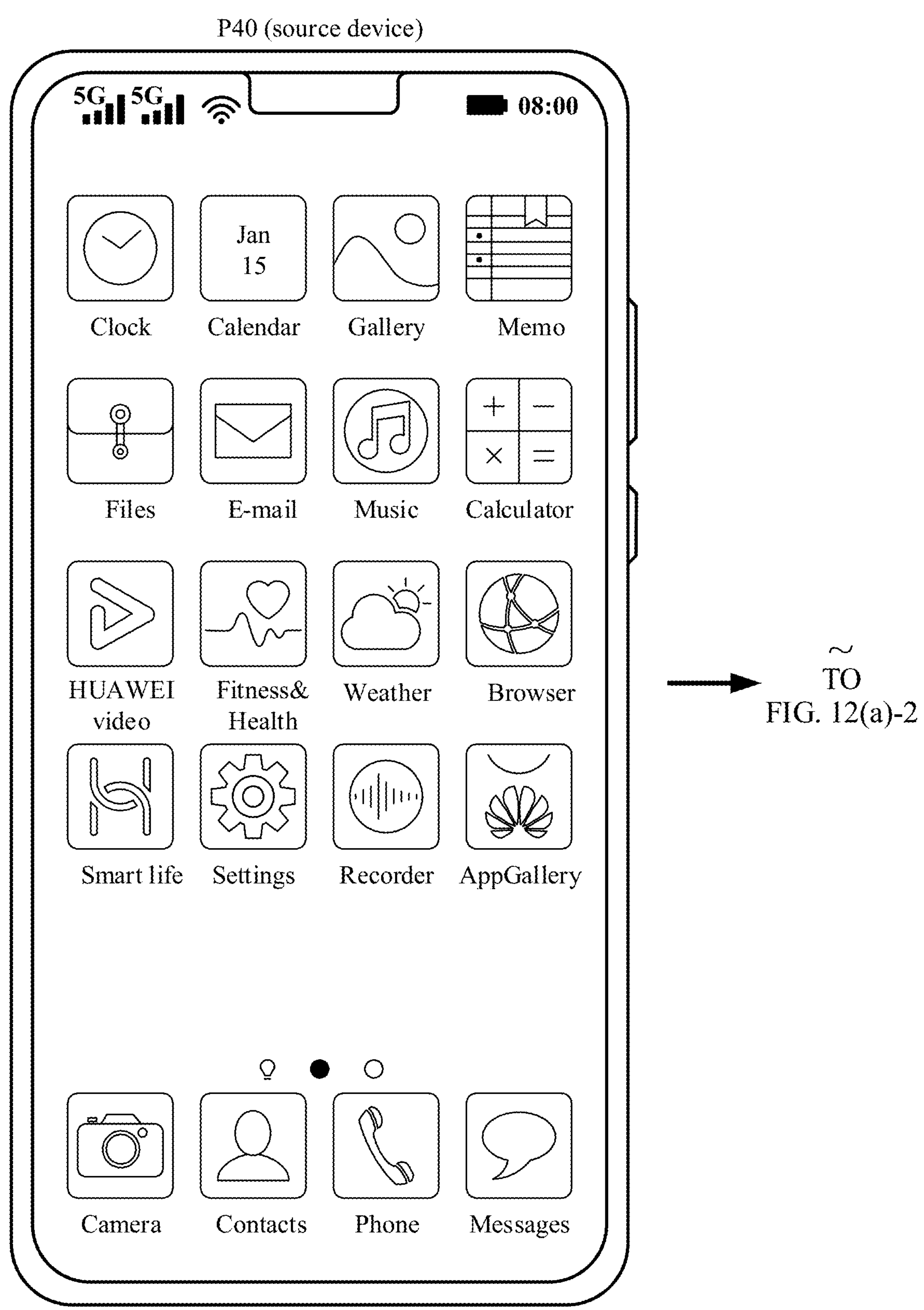
Figures 2, 12A:
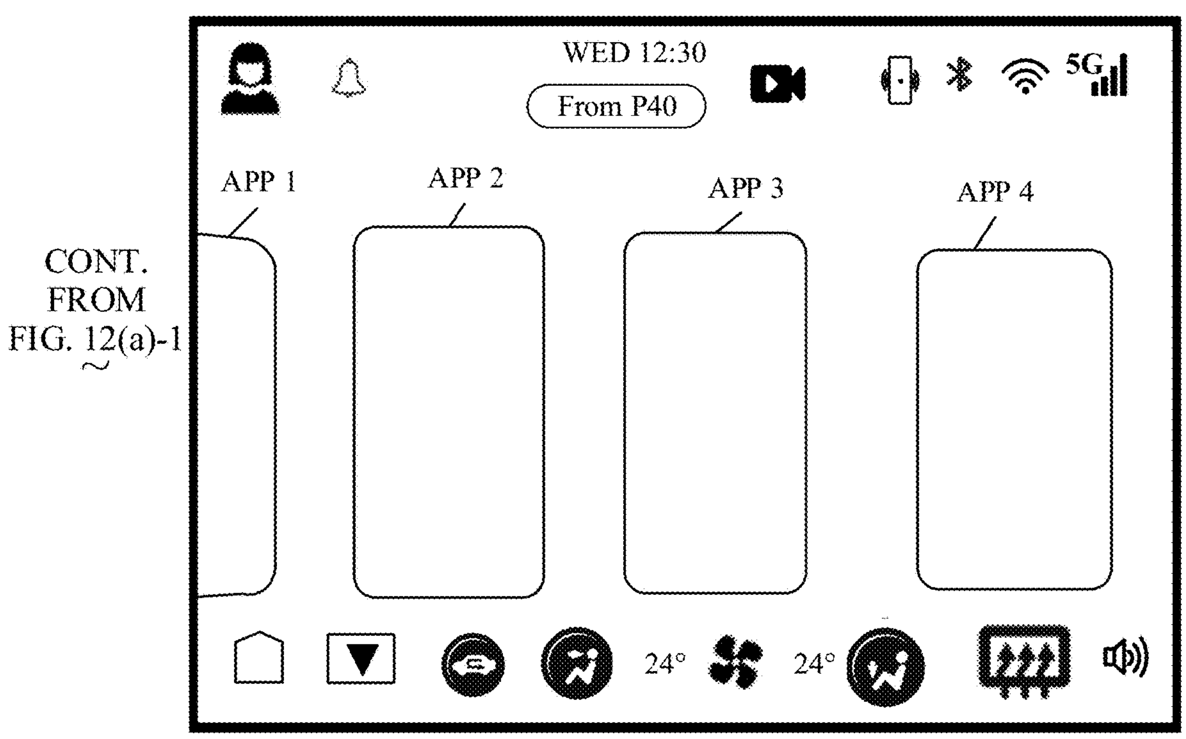
Figure 12B:
FIG. 12(*a*)-1 and FIG. 12(*a*)-2 are a schematic diagram of an interface of displaying a task card of a mobile phone on a recent tasks screen of a head unit according to this application.
Figure 1:
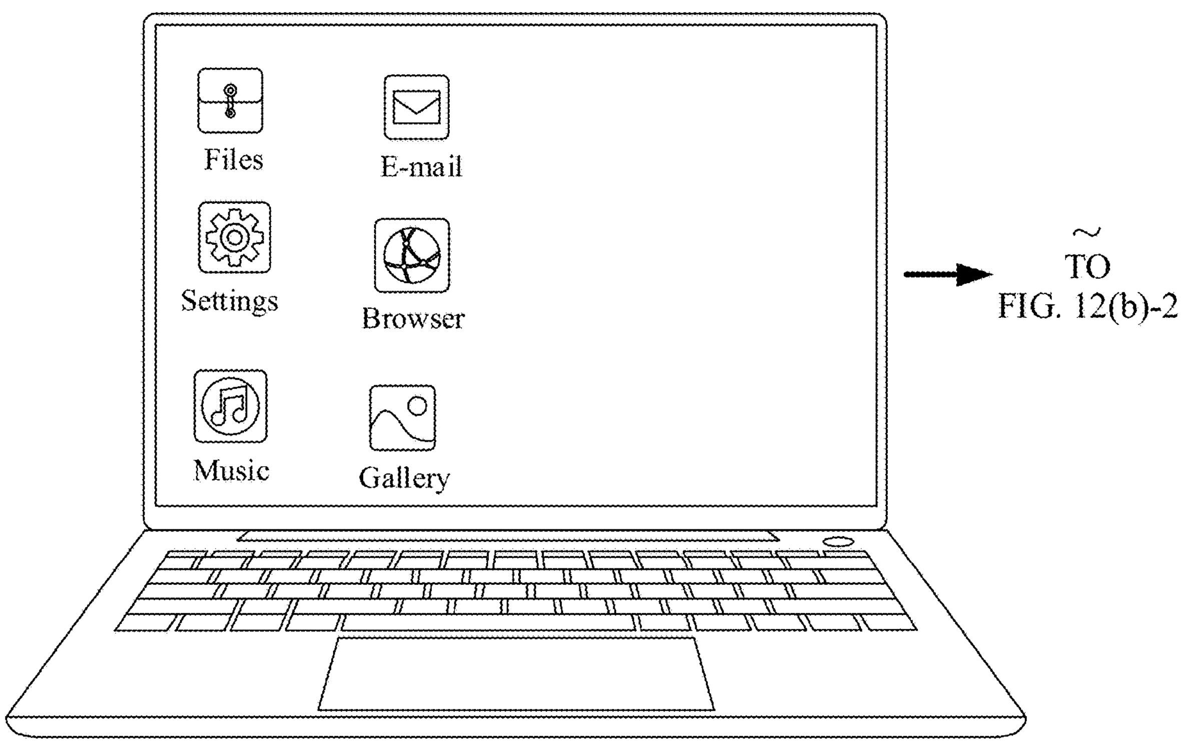
Figures 2, 12B:
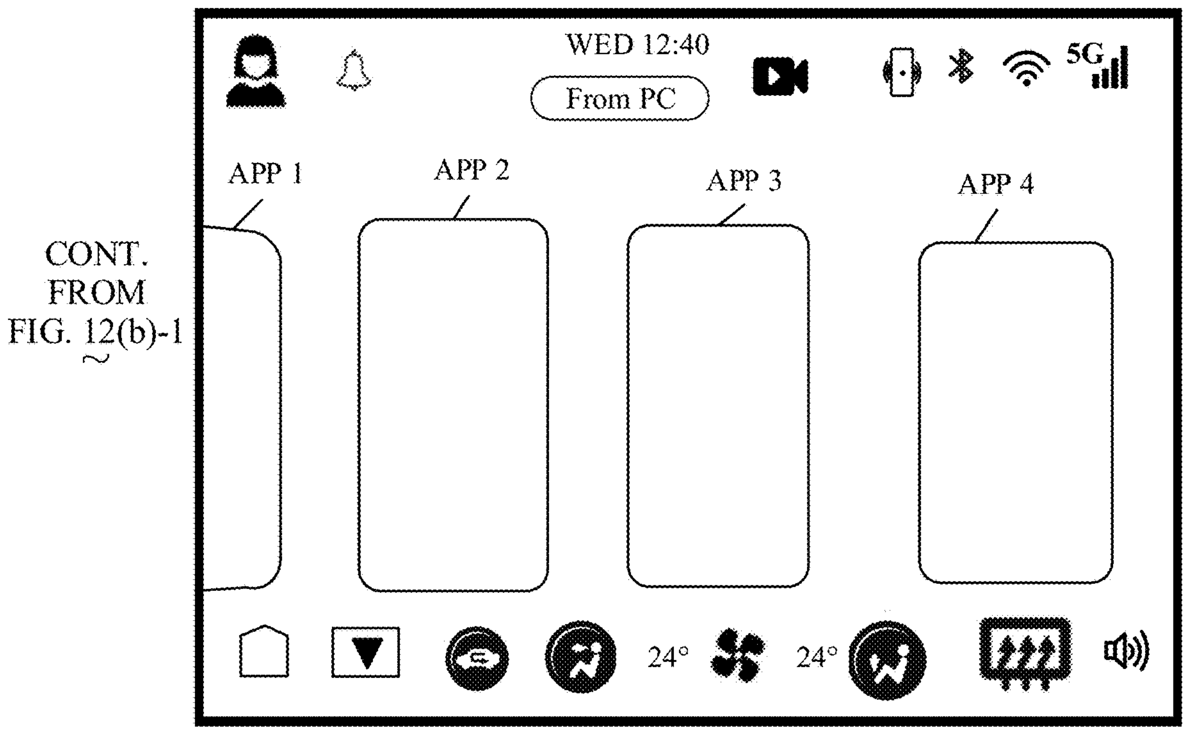
Figures 1, 12C:
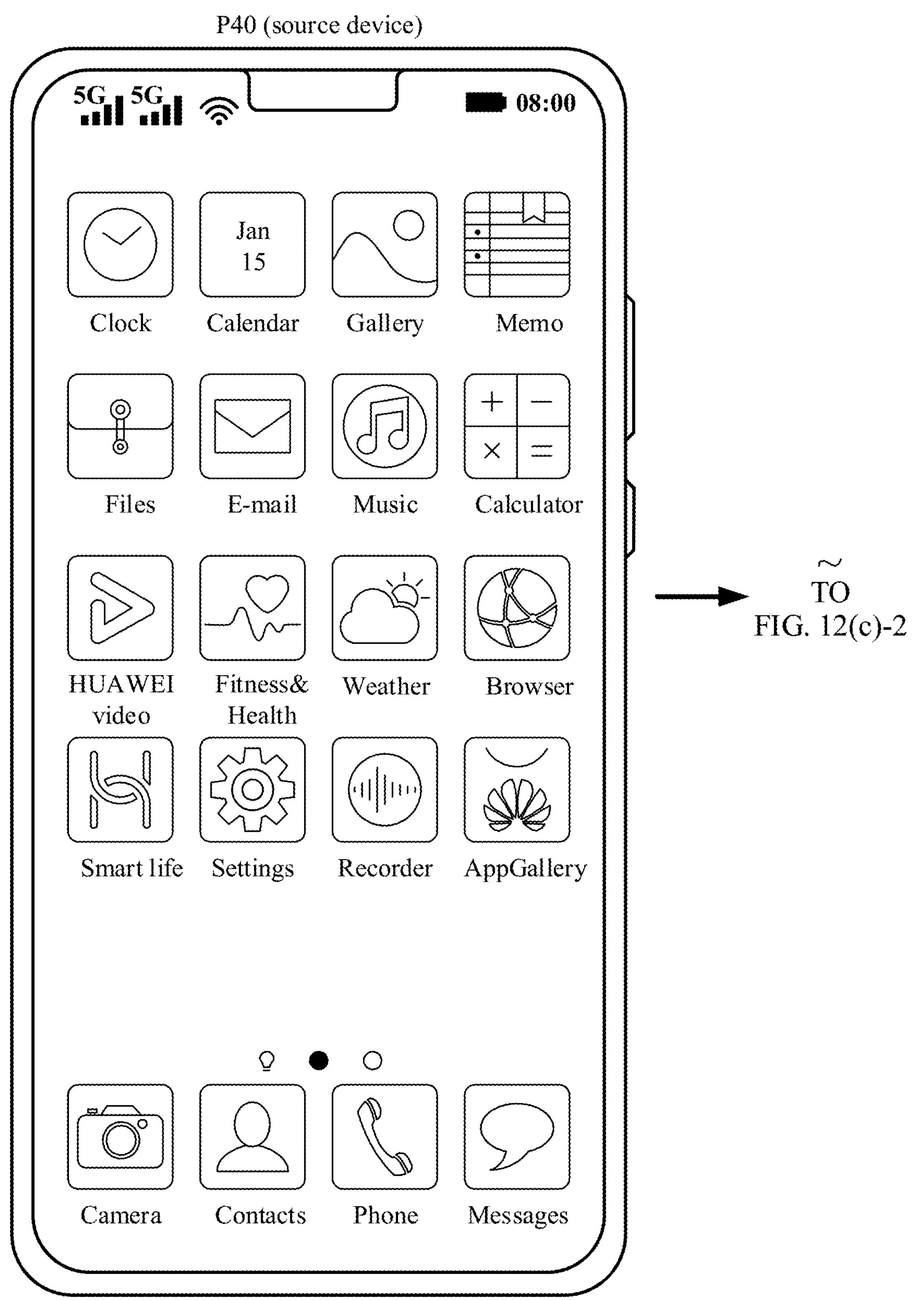
Figures 2, 12C:
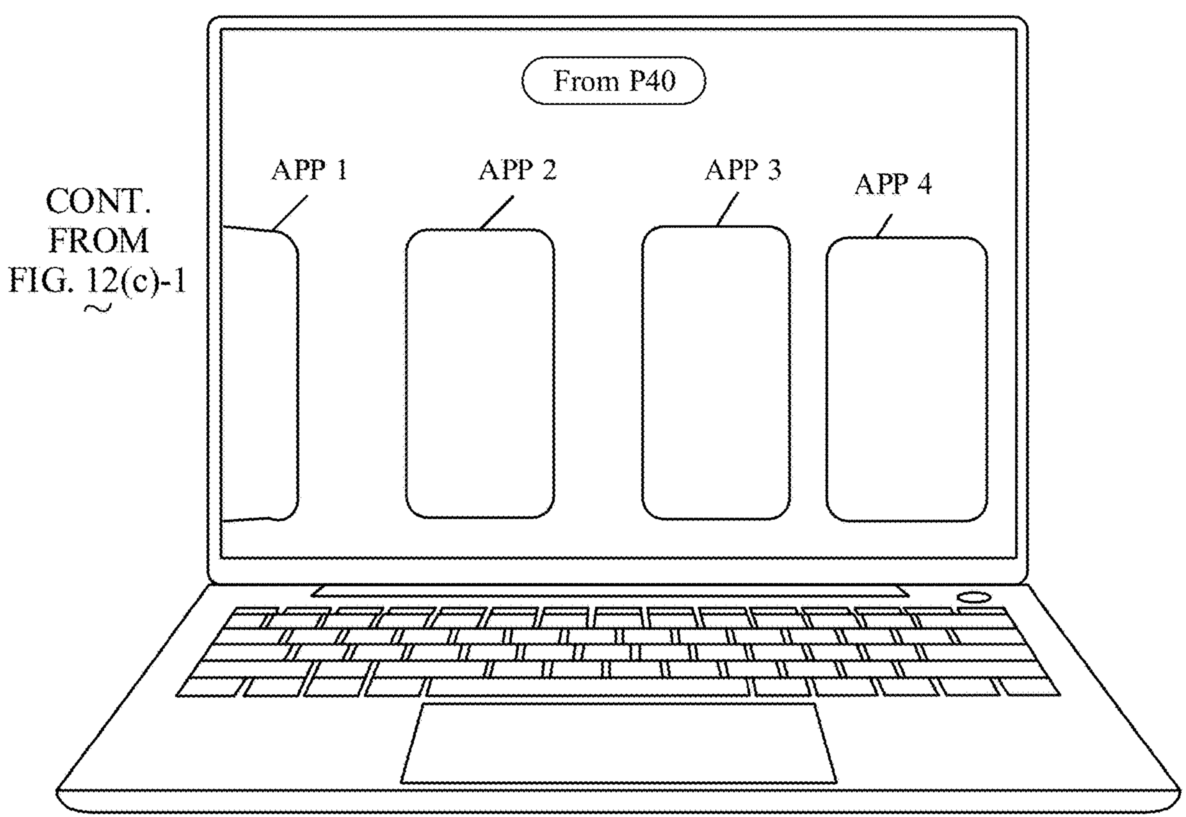

For example, in a possible implementation, a display layout of a historical task card of a device A on a recent tasks screen of another device may be determined according to procedures shown in FIG. 4(*a*) and FIG. 4(*b*).

As shown in FIG. 4(*a*), if the device A is a foldable screen device (for example, a foldable screen mobile phone), whether a common use status of the device A within a period of time before is an unfolded state is to be determined. If the common use status of the device A within the period of time is the unfolded state, whether the common use status within the period of time is an unfolded state in portrait mode is further to be determined. If the common use status within the period of time is the unfolded state in portrait mode, the historical task card of the device A is displayed (which may be alternatively referred to as arranged) on the recent tasks screen of the another device based on the unfolded state of the device A in portrait mode. If the common use status is an unfolded state in landscape mode, the historical task card of the device A is displayed on the recent tasks screen of the another device based on the unfolded state of the device A in landscape mode.

If the common use status is a folded state, whether the common use status within the period of time is a folded state in portrait mode is further to be determined. If the common use status within the period of time is the folded state in portrait mode, the historical task card of the device A is displayed on the recent tasks screen of the another device based on the folded state of the device A in portrait mode. If the common use status is a folded state in landscape mode, the historical task card of the device A is displayed on the recent tasks screen of the another device based on the folded state of the device A in landscape mode.

As shown in FIG. 4(*b*), if the device A is a non-foldable screen device (for example, a non-foldable screen mobile phone or a tablet computer), whether a common use status of the device A within a period of time before is a portrait-mode use state is to be determined. If the common use status of the device A within the period of time is the portrait-mode use state, the historical task card of the device A is displayed on the recent tasks screen of the another device based on the portrait-mode use state of the device A. If the common use status is a landscape-mode use state, the historical task card of the device A is displayed on the recent tasks screen of the another device based on the landscape-mode use state of the device A.

Optionally, in this embodiment of this application, when the task cards of the first terminal and the another device are displayed on the first terminal, the user may further perform task card layout selection. After the user selects a layout, the first terminal may display the task cards of the first terminal and the another device on the first terminal in a form of the layout selected by the user. For example, a form of a layout that may be selected by the user includes: a horizontal list mode (List), a grid mode (Grid), a stack mode (Stack), a vertical list mode (Vertical list), a slim list mode (Slim list), and the like. This is not limited in this application.

The following provides description based on different examples.

Example 1: It is assumed that a first terminal is a tablet computer, a second terminal is another tablet computer, a third terminal is a non-foldable screen mobile phone, and a fourth terminal is a foldable screen mobile phone.

FIG. 5(*a*) is a schematic diagram of a historical task card of a second terminal displayed on a recent tasks screen of a first terminal (a local device). As shown in FIG. 5(*a*), a layout of the historical task card of the second terminal displayed on the recent tasks screen of the first terminal is displayed based on a multi-task layout used when a tablet computer is used in landscape mode. In FIG. 5(*a*), identifiers (or icons) of the first terminal and a plurality of terminals connected to the first terminal are separately displayed on the recent tasks screen of the first terminal. When the identifier of the first terminal or an identifier of a terminal connected to the first terminal is selected, a historical task card corresponding to the terminal is correspondingly displayed on the recent tasks screen. However, as shown in FIG. 5(*a*), when the first terminal receives an instruction of the user to enable an identifier of the second terminal (MatePad) to be selected, the historical task card of the second terminal is displayed on the recent tasks screen of the first terminal. When the historical task card of the second terminal (MatePad) is displayed on the recent tasks screen of the first terminal (the local device), the historical task card of the second terminal is displayed in a single row based on a case in which the second terminal (MatePad) is used in landscape mode.

Optionally, if the height of a screen of the first terminal (the local device) is relatively large, the historical task card of the second terminal may be alternatively displayed in a plurality of rows based on a case in which the second terminal (MatePad) is used in landscape mode. As shown in FIG. 5(*b*), when the historical task card of the second terminal (MatePad) is displayed on the recent tasks screen of the first terminal (the local device), the historical task card of the second terminal is displayed in two rows based on a case in which the second terminal (MatePad) is used in landscape mode.

FIG. 5(*c*) is a schematic diagram of a historical task card of a third terminal (P40) displayed on a recent tasks screen of a first terminal (a local device). As shown in FIG. 5(*c*), when the first terminal (the local device) displays the historical task card of the third terminal (P40), the historical task card of the third terminal is displayed based on a case in which the third terminal (P40) is used in portrait mode.

FIG. 5(*d*) is a schematic diagram of a historical task card of a fourth terminal (Mate X2) displayed on a recent tasks screen of a first terminal (a local device). The fourth terminal (Mate X2) is a foldable screen device. Therefore, in a possible implementation, as shown in FIG. 5(*d*), when the first terminal (the local device) displays the historical task card of the fourth terminal (Mate X2), the historical task card of the fourth terminal is displayed in a single row based on a case in which the fourth terminal (Mate X2) is used in portrait mode in an unfolded state of a folded screen. Optionally, in another possible implementation, if the height of a screen of the first terminal (the local device) is relatively large, the historical task card of the fourth terminal may be displayed in a plurality of rows based on a case in which the fourth terminal (Mate X2) is used in portrait mode in an unfolded state of a folded screen.

Example 2: It is assumed that a first terminal is a non-foldable screen mobile phone, a second terminal is a tablet computer, and a third terminal is a foldable screen mobile phone.

FIG. 6(*a*) is a schematic diagram of a historical task card of a second terminal (MatePad) displayed on a recent tasks screen of a first terminal (a local device). As shown in FIG. 6(*a*), when the first terminal (the local device) displays the historical task card of the second terminal (MatePad), the historical task card of the second terminal is displayed in two rows based on a case in which the second terminal (MatePad) is used in landscape mode. Optionally, when the first terminal (a local device) displays the historical task card of the second terminal (MatePad), the historical task card of the second terminal may be further displayed in a single row based on a case in which the second terminal (MatePad) is used in landscape mode.

FIG. 6(*b*) is a schematic diagram of a historical task card of a third terminal (Mate X2) displayed on a recent tasks screen of a first terminal. The third terminal (Mate X2) is a foldable screen device. Therefore, in a possible implementation, as shown in FIG. 6(*b*), when the first terminal (the local device) displays the historical task card of the third terminal (Mate X2), the historical task card of the third terminal is displayed in a single row based on a case in which the third terminal (Mate X2) is used in portrait mode in an unfolded state. Optionally, if the height of a screen of the first terminal (the local device) is relatively large, the historical task card of the third terminal may be displayed in a plurality of rows based on a case in which the third terminal (Mate X2) is used in portrait mode in an unfolded state.

Example 3: It is assumed that a first terminal is a non-foldable screen mobile phone, a second terminal is a tablet computer, a third terminal is a foldable screen mobile phone, and the first terminal is in landscape mode.

FIG. 6(*c*) is a schematic diagram of a historical task card of a first terminal (for example, P40) displayed on a recent tasks screen of the first terminal (a local device). As shown in FIG. 6(*c*), because the first terminal is in landscape mode, the historical task card of the first terminal (the local device) is displayed based on a case in which the first terminal (the local device) is in landscape mode.

FIG. 6(*d*) is a schematic diagram of a historical task card of a second terminal (MatePad) displayed on a recent tasks screen of a first terminal (a local device). As shown in FIG. 6(*d*), because the first terminal is in landscape mode, the historical task card of the second terminal (MatePad) is displayed based on a case in which the first terminal (the local device) is in landscape mode.

FIG. 6(*e*) is a schematic diagram of a historical task card of a third terminal (Mate X2) displayed on a recent tasks screen of a first terminal (a local device). As shown in FIG. 6(*e*), because the first terminal is in landscape mode, the historical task card of the third terminal (Mate X2) is displayed based on a case in which the first terminal (the local device) is in landscape mode, and the historical task card of the third terminal (Mate X2) is displayed in a single row in portrait mode in an unfolded state of a foldable screen. Optionally, the historical task card of the third terminal (Mate X2) may alternatively be displayed in portrait mode in a folded state of the foldable screen, or displayed in landscape mode in a folded state of the foldable screen, or displayed in landscape mode in an unfolded state, or the like. This is not limited in this application.

It should be understood that the foregoing examples are merely examples, and should not impose any limitation on a layout of a historical task card of another device displayed on a recent tasks screen of this device in this application. In another embodiment of this application, a layout different from layouts in the foregoing examples may be also used for display. This is not limited in this application.

In embodiments of this application, when a historical task card of another device is displayed on the recent tasks screen of the first terminal (the local device or a local end device), the last one or more historical task cards of the another device may display: a device home screen snapshot (or may be referred to as a foreground home screen snapshot); or a device home screen snapshot and a floating bubble; or a device home screen snapshot and a floating window; or a device home screen snapshot that displays a task card; or a remote control that controls the device, or an ongoing (OnGoing) task of the device. The following provides description based on specific examples.

Example 4: It is assumed that a first terminal (a local device) is a tablet computer. FIG. 7(*a*) is a schematic diagram of viewing a historical task card of a non-foldable screen mobile phone (P40) on a recent tasks screen of the first terminal. As shown in FIG. 7(*a*), the last task card in the historical task cards of the mobile phone P40 displays a home screen snapshot of the mobile phone P40, and a feature ability (FA) card may further exist on the home screen snapshot. The FA card may be a card corresponding to an application or a task. A user may tap the "FA card" on the home screen snapshot of the mobile phone P40. In a possible implementation, after the FA card is tapped, an application or a task corresponding to the FA card is displayed on a screen of the first terminal, that is, the application or the task corresponding to the FA card is opened on the first terminal. Alternatively, in another possible implementation, after the FA card is tapped, a home screen of the mobile phone P40 is displayed on a screen of the first terminal, and the FA card is displayed on the home screen of the mobile phone P40. The user may tap the FA card, and an application or a task corresponding to the FA card is displayed on the screen of the first terminal.

Example 5: It is assumed that a first terminal (a local device) is a tablet computer. FIG. 7(*b*) is a schematic diagram of viewing a historical task card of a non-foldable screen mobile phone (a mobile phone P40) on a recent tasks screen of the first terminal. As shown in FIG. 7(*b*), the last task card in the historical task cards of the mobile phone P40 displays a first home screen snapshot of the mobile phone P40. When a user makes a gesture of swiping leftward on the first home screen snapshot of the mobile phone P40, the last task card on the recent tasks screen of the first terminal is switched to a second home screen snapshot of the mobile phone P40, as shown in FIG. 7(*c*). Optionally, the user may tap the first home screen snapshot or the second home screen snapshot of the mobile phone P40, and the first terminal displays the first home screen snapshot or the second home screen snapshot of the mobile phone P40. The user may tap an application icon on the first home screen snapshot or the second home screen snapshot of the mobile phone P40 to open an application on the local device. Alternatively, in another possible implementation, as shown in FIG. 7(*c*), the user may tap a blank area of the first home screen snapshot or the second home screen snapshot of the mobile phone P40 (an area other than an application icon on a home screen snapshot). After the blank area is tapped, a screen of the first terminal displays a first home screen or a second home screen of the mobile phone P40. The user may tap an application icon on the home screen of the mobile phone P40, to open an application on the mobile phone P40.

Example 6: It is assumed that a first terminal (a local device) is a tablet computer. FIG. 7(*d*) is a schematic diagram of viewing a historical task card of a non-foldable screen mobile phone (for example, P40) on a recent tasks screen of the first terminal. As shown in FIG. 7(*d*), a home screen snapshot of the mobile phone P40 is displayed on the last task card in the historical task card of the mobile phone P40, and a floating window of a task or an application is displayed on the home screen snapshot of the mobile phone P40. Optionally, a user may tap the floating window on the home screen snapshot of the mobile phone P40. In a possible implementation, after the floating window is tapped, an application or a task corresponding to the floating window is displayed on the first terminal, that is, the application or the task corresponding to the floating window is opened on the first terminal. Alternatively, in another possible implementation, after the floating window is tapped, an interface of a home screen of P40 is displayed on the first terminal. Optionally, the floating window exists on the interface of the home screen of P40. After the user taps the floating window on the home screen of P40, an application or a task corresponding to the floating window is opened on the first terminal.

Example 7: It is assumed that a first terminal (a local device) is a tablet computer. FIG. 7(*e*) is a schematic diagram of viewing a historical task card of a non-foldable screen mobile phone (for example, P40) on a recent tasks screen of the first terminal. As shown in FIG. 7(*e*), a home screen snapshot of the mobile phone P40 is displayed on the last task card in the historical task card of the mobile phone P40, and a floating bubble of a task or an application is displayed on the home screen snapshot of the mobile phone P40. Optionally, the user may tap the floating bubble on the home screen snapshot of the mobile phone P40. In a possible implementation, after the floating bubble is tapped, an application or a task corresponding to the floating bubble is displayed (for example, displayed in full screen or in a floating window) on the first terminal, that is, the application or the task corresponding to the floating bubble is opened on the first terminal. Alternatively, in another possible implementation, after the user taps the floating bubble, a home screen of P40 is displayed on the first terminal. Optionally, the floating bubble exists on an interface of the home screen of P40. After the user taps the floating bubble on the home screen of P40, the application or the task corresponding to the floating bubble is opened on the first terminal.

Example 8: It is assumed that a first terminal (a local device) is a tablet computer. FIG. 7(*f*) is a schematic diagram of viewing a historical task card of a large-screen device (HUAWEI TV) on a recent tasks screen of the first terminal. As shown in FIG. 7(*f*), a snapshot of a remote control of the large-screen device is displayed on the last task card in the historical task card of the large-screen device. Optionally, as shown in FIG. 7(*f*), the user may tap a blank area (an area other than a control button on the snapshot of the remote control) on the snapshot of the remote control of the large-screen device. After the user taps the blank area, details of the remote control of the large-screen device are displayed on the first terminal, and the user may directly control the large-screen device by using the remote control of the large-screen device on the first terminal. Alternatively, the user may directly tap, on the snapshot of the remote control of the large-screen device, the control button that is on the snapshot of the remote control, to control the large-screen device.

Example 9: It is assumed that a first terminal (a local device) is a mobile phone. FIG. 7(*g*) is a schematic diagram of viewing historical task cards of a plurality of other devices on a recent tasks screen of the first terminal. A device icon of one (for example, the last) device of the plurality of devices is a device icon of a lite device type. A lite device is a general name of devices such as an internet of things (IOT) device, a wearable device, and a smart home device. For example, the lite device may include a smart refrigerator, a smart air conditioner, a smart cooking pot, a smart range hood, a smart sound box, a smartwatch, and the like. After tapping a "Lite device" icon in FIG. 7(*g*), as shown in FIG. 7(*h*), the user may display, on one or more task cards on the recent tasks screen of the first terminal, task cards corresponding to ongoing (OnGoing) tasks of lite devices (kitchen appliances). In FIG. 7(*h*), when the user makes a gesture of swiping leftward on a task card of a lite device, as shown in FIG. 7(*i*), task cards of some other lite devices (for example, carry-on devices) are displayed on the recent tasks screen of the first terminal.

In the examples shown in FIG. 7(*g*) to FIG. 7(*i*), all lite devices are integrated together, and all lite devices are displayed by using a lite device icon on an upper part of a screen. Optionally, in some other embodiments of this application, each lite device may correspond to a device icon of the lite device to be displayed on the upper part of the screen, that is, one lite device corresponds to one device icon. Alternatively, the lite devices may be classified, and lite devices of one type correspond to one icon. For example, a plurality of lite devices of a kitchen type correspond to one device icon, and a plurality of lite devices of a living room use type correspond to one device icon. Alternatively, the user may perform setting, so that one or a plurality of lite devices correspond to one device icon, and the like. This is not limited in this application.

On the interfaces shown in FIG. 7(*h*) and FIG. 7(*i*), in a possible implementation, the user may perform a tap operation on a blank area (namely, an area other than a control button on the task card) on a task card of any lite device shown in FIG. 7(*h*) and FIG. 7(*i*). For example, as shown in FIG. 7(*j*), if the user performs a tap operation on a blank area on a task card of the smart cooking pot, an interface displayed by the first terminal is shown in FIG. 7(*k*). After the tapping, details about an ongoing task of the smart cooking pot may be displayed on the interface of the first terminal, and the user may remotely control the task on the details interface.

For another example, as shown in FIG. 7(*l*), if the user performs a tap operation on a blank area on a task card of a HUAWEI watch (HUAWEI WATCH GT2), an interface displayed by the first terminal is shown in FIG. 7(*m*). After the tapping, details about an ongoing task of a music player may be displayed on the interface of the first terminal, and the user may remotely control the task on the details interface.

Optionally, on the interfaces shown in FIG. 7(*h*) and FIG. 7(*i*), in another possible implementation, the user may also perform a tap operation on a blank area on a task card of any lite device shown in FIG. 7(*i*) and FIG. 7(*j*), and after the tapping, details about the lite device (namely, the smart cooking pot) may be displayed on the interface of the first terminal.

Optionally, on the interfaces shown in FIG. 7(*h*) and FIG. 7(*i*), in another possible implementation, the user may also directly perform a tap operation on a control button on any lite device card, that is, the user directly taps a corresponding control button on a lite device card. In this way, remote task control can also be implemented. For example, as shown in FIG. 7(*n*), the user taps a "close" button on the task card of the smart cooking pot, and then the smart cooking pot stops running.

Optionally, when a task card of another lite device is displayed on the recent tasks screen of the first terminal, if there are few operations corresponding to a lite device, a standard device card may be used to display a task card of the lite device. For example, carry-on cards corresponding to the smart cooking pot, the smart range hood, the HUAWEI watch (HUAWEI WATCH GT2), and the smart washing machine shown in FIG. 7(*h*) and FIG. 7(*i*) are all standard device cards.

Optionally, in another possible implementation, when a task card of another lite device is displayed on the recent tasks screen of the first terminal, if there are a relatively large quantity of operations corresponding to a lite device, more functions may be displayed on a task card of the lite device. For example, it is assumed that the lite device is the smart cooking pot that can be quickly switched to: stewing, stir-frying, adjusting the firepower, or visually viewing the food in the cooking cooker, the task card corresponding to the lite device may be displayed by using an immersive task card. For example, as shown in FIG. 7(*o*), task cards corresponding to the smart cooking pot and the smart range hood on the recent tasks screen of the first terminal are immersive task cards.

Optionally, when a task card of another lite device is displayed on the recent tasks screen of the first terminal, the user may alternatively drag a task card of a lite device to an icon of another smart device (for example, MatePad or Mate X2) on the recent tasks screen of the first terminal, and the task card of the lite device is displayed on the recent tasks screen of the another smart device or displayed on a home screen of the another smart device. Optionally, after information about the task card of the lite device is received by the smart device, the smart device may further add the task card of the lite device to a recent task center of the smart device, or add the task card of the lite device to the home screen.

Example 10: It is assumed that a first terminal (a local device) is a mobile phone, and historical task cards of a plurality of other devices are displayed on a recent tasks screen of the first terminal. In this case, a home screen application icon of a device may be displayed on the last one or more task cards. For example, FIG. 7(*p*) is a schematic diagram of a historical task card of a mobile phone P40 displayed on a recent tasks screen of a first terminal, where a home screen application icon (icon) of the mobile phone P40 is displayed on the last task card.

In the example shown in FIG. 7(*p*), in a possible implementation, the user may tap a blank area of the task card, to display a home screen application of the mobile phone P40 on the first terminal, as shown in FIG. 7(*q*). The user may drag an application icon on the interface shown in FIG. 7(*q*), to help the mobile phone P40 manage applications (for example, sort applications, create a folder, and delete an application).

In the example shown in FIG. 7(*p*), in another possible implementation, the user may alternatively directly perform an operation on a task card of a home screen application of the mobile phone P40. For example, the user drags an application icon on the task card of the home screen application of the mobile phone P40, to help the mobile phone P40 manage the application without a need of first displaying the home screen application of the mobile phone P40 on the first terminal.

In this embodiment of this application, in addition to displaying a task card of another lite device on a recent tasks screen of a terminal device used by the user, a task card of another smart device (including another lite device, and a smart terminal used by the user, for example, a mobile phone or a tablet computer) that has a same account or an associated account is also viewed on the lite device, and an operation may be performed on the task card on the lite device, to remotely control another smart terminal device on the lite device.

For example, on a lite device, when the user views a task card of another smart terminal that has a same account or an associated account, identity authentication of the user may be performed in aid of a sensor, a camera, a microphone, or the like of the lite device, or identity authentication of the user may be performed in aid of the lite device, or a sensor, a camera, a microphone, or the like of another peripheral device (for example, a smartwatch carried by the user or a large-screen device at home). After the identity authentication of the user succeeds, a task card of another device displayed on the lite device may be viewed, and an operation may be performed on the task card, to remotely control another smart terminal device and another lite device on the lite device. The following provides description based on specific examples.

Example 11: As shown in FIG. 7(*r*), it is assumed that a lite device used by a user is a smart range hood. When the user taps a "Lite device" button on a screen of the smart range hood, an ongoing (OnGoing) task card of another lite device that has a same account or an associated account as the smart range hood may be displayed on the screen of the smart range hood. As shown in FIG. 7(*r*), after the user taps the "Lite device" button, the displayed task card of the lite device includes task cards of a smart cooking pot and a smart washing machine. When the task card of the another lite device is displayed on the screen of the smart range hood, the task card can be adaptively displayed based on the screen of the smart range hood (that is, the task card is arranged based on a screen responsive layout). When the user slides a task card leftward or rightward, the user can view more task cards of lite devices that have other accounts or associated accounts. In addition, the user may tap a blank area (an area other than a control button on a task card) on a task card, and then detailed content of the task card is displayed in full screen on a display or is adaptively displayed based on the screen. The user may remotely control a task on the details interface. Alternatively, the user may also directly perform a tap operation on a control button on any lite device task card, that is, the user directly taps a corresponding control button on a lite device card. In this way, remote task control can also be implemented.

Example 12: As shown in FIG. 7(*s*), it is assumed that a lite device used by a user is a smart range hood, and the user taps a "Lite device" button on a screen of the smart range hood. In this case, the smart range hood may invoke a sensor, a camera, a microphone, and the like of the smart range hood and another peripheral device (for example, a smartwatch carried by the user or a large-screen device at home) to assist in user identity authentication. After the user identity authentication succeeds, an ongoing task card of another lite device that has a same account or an associated account as the range hood is displayed on the screen of the smart range hood, where one lite device may correspond to one ongoing task card. The user slides the ongoing task card leftward. The last several task cards are icons of smart terminals that have the same account or associated accounts as the range hood. For a terminal 1 and a terminal 2 shown in FIG. 7(*s*), the user selects an icon of a smart terminal that needs to be viewed, for example, the terminal 1. The user taps a "Terminal 1" icon, and then a plurality of task cards of the terminal 1 are displayed on a screen of the smart range hood. The plurality of task cards of the terminal 1 include a historical task card and a foreground task card of the terminal 1, and the foreground task card is a task card corresponding to an application that is being displayed on a screen of the terminal 1. For example, if a video is being played on the screen of the terminal 1, a task card corresponding to a video application is a foreground task card. It should be understood that a task card corresponding to a floating window displayed on the screen of the terminal 1 is also a foreground task card of the terminal 1, and the historical task card includes a task card corresponding to an application that is run by the terminal 1 on the background.

In addition, the user may tap a blank area on a task card, and then detailed content of the task card is displayed in full screen on a display of the smart range hood or is adaptively displayed based on the screen. The user may remotely control a task on the details interface. Alternatively, the user may also directly perform a tap operation on a control button on any device card, that is, the user directly taps a corresponding control button on a device task card. In this way, remote task control can also be implemented.

When a historical task card of another device (a remote device) is displayed on the recent tasks screen of the first terminal (the local device), the user may tap the task card on the first terminal, so that the first terminal displays (or may be referred to as runs) a task or an application corresponding to the task card on the first terminal. This process may be referred to as pulling up the task card of the remote device on the first terminal.

In this application, when the task card of the remote device is pulled up on the recent tasks screen of the first terminal, a rule shown in FIG. 8(*a*)-1 and FIG. 8(*a*)-2 may be used.

As shown in FIG. 8(*a*)-1 and FIG. 8(*a*)-2, if an application of the remote device is migrated to the recent tasks screen of the first terminal in a copying mode, that is, a task card on the recent tasks screen of the first terminal is obtained from the application of the remote device in the copying mode, after the task card is pulled up on the first terminal, the first terminal and the remote device may simultaneously display (or may also be referred to as run) the application. In addition, a status of the application displayed on both the first terminal and the remote device is synchronous (for example, a same page of a same PPT file is displayed), and data of the application on the first terminal is synchronous with that on the remote device. When displaying the application, the first terminal and the remote device may perform adaptive display based on features of respective screens. In this application, it may also be understood that in a display process, different devices may adjust, based on sizes of respective screens, a size and a layout of the application displayed on the screen, that is, the layout and the size of the application displayed on the screen are adjustable (Resizable), for example, one is in full screen, and the other is in non-full screen. Alternatively, one is in landscape mode, and the other is in portrait mode. When the task card of the application is tapped on the recent tasks screen of the remote device or the application icon is tapped on a home screen of the remote device, the application is not pulled back. "Pulling back the application" may be understood as: performing an operation on a source device (the remote device in this example) of the application, so that the application is migrated back to the source device, and the application is not displayed on a recent tasks screen or a home screen of another device, or is not running on another device.

If an application of the remote device migrated to the recent tasks screen of the first terminal is not in the copying mode, it is further determined whether the application is displayed on the recent tasks screen of the first terminal in a window projection technology-based migration mode. In the window projection technology-based migration mode, the first terminal does not need to install the application. If yes, whether the application supports multi-instance continues to be determined.

When the application supports the multi-instance, the application may be displayed (or may be referred to as run) on both the first terminal and the source device (the remote device). Data of the application on the first terminal is synchronized with that on the remote device. When displaying the application, the first terminal and the remote device may perform adaptive display according to a feature of each screen. However, a status of the application displayed by both the first terminal and the remote device may be asynchronous (for example, one device displays a first page of a PPT file, and the other device displays a second page of the PPT file). When the task card of the application is tapped on the recent tasks screen of the remote device or the application icon is tapped on a home screen of the remote device, the application is not pulled back.

If the application does not support the multi-instance, the application cannot be simultaneously displayed on the first terminal and the remote device. If the application is a foreground task or a foreground application (an ongoing task or application displayed on an interface of the remote device) of the remote device, after the application is migrated to the first terminal, the remote device automatically exits the task, and the screen of the remote device displays the home screen of the remote device. When the task card of the application is tapped on the recent tasks screen of the remote device or the application icon is tapped on a home screen of the remote device, the application is pulled back.

If an application of the remote device displayed on the recent tasks screen of the first terminal is not in a window projection technology-based migration mode, but is in an FA technology-based migration mode, the first terminal needs to first install the application or an FA of the application, and then can display a task card of the application on the recent tasks screen of the first terminal only after the installation is completed. After the application or the FA of the application is installed on the first terminal, data of the application on the first terminal is synchronized with that on the remote device. When displaying the application, the first terminal and the remote device may perform adaptive display according to a feature of each screen. However, a status of the application displayed on the first terminal and the remote device may be asynchronous. When the task card of the application is tapped on the recent tasks screen of the remote device or the application icon is tapped on a home screen of the remote device, the application is not pulled back.

The following provides description based on specific examples. It should be understood that the following examples in FIG. 8(*b*)-1 and FIG. 8(*b*)-2 to FIG. 8(*n*) may be a part of the flowchart shown in FIG. 8(*a*)-1 and FIG. 8(*a*)-2, or may be an independent solution. This is not limited in this application.

Example 13: It is assumed that a first terminal (a local device) is a tablet computer. FIG. 8(*b*)-1 and FIG. 8(*b*)-2 are schematic diagrams of viewing historical task cards of a plurality of other devices on a recent tasks screen of the first terminal. As shown in FIG. 8(*b*)-1 and FIG. 8(*b*)-2, it is assumed that a magazine unlock application of a remote device (namely, a task source device) is displayed on the recent tasks screen of the first terminal in a copying mode, that is, a task card of the magazine unlock application on the recent tasks screen of the first terminal is obtained from a device P40 in the copying mode. After a user taps the task card of the magazine unlock application on the recent tasks screen of the first terminal, that is, after the user pulls up the task card on the first terminal, as shown in FIG. 8(*c*), the first terminal and P40 may simultaneously display the magazine unlock application. In addition, a status of the application displayed on both the first terminal and the remote device is synchronous, and both the first terminal and the device P40 display a picture 3 of the magazine unlock application. Data of the application is synchronized between the first terminal and the device P40. For example, if the user edits the picture 3 on the first terminal, this editing state is automatically synchronized to the device P40. When displaying the magazine unlock application, the first terminal and the device P40 may perform adaptive display based on features of respective screens (for example, P40 is in portrait mode, and the first terminal is in landscape mode).

Example 14: It is assumed that a first terminal (a local device) is a tablet computer. FIG. 8(*d*)-1 and FIG. 8(*d*)-2 are schematic diagrams of viewing historical task cards of a plurality of other devices on a recent tasks screen of the first terminal. As shown in FIG. 8(*d*)-1 and FIG. 8(*d*)-2, it is assumed that a magazine unlock application of a remote device is displayed on the recent tasks screen of the first terminal in a window projection technology-based migration mode, and the magazine unlock application supports multi-instance; or the magazine unlock application is displayed on the recent tasks screen of the first terminal in an FA technology-based migration mode. In the two cases, data of the application is synchronized between the first terminal and a device P40. A user taps a task card of the magazine unlock application on the recent tasks screen of the first terminal. It is assumed that the user taps a picture 2 on the task card of the magazine unlock application, that is, after the task card is pulled up on the first terminal, as shown in FIG. 8(*e*), the first terminal displays the picture 2 of the magazine unlock application, but the device P40 still displays the picture 3 of the magazine unlock application. In other words, statuses of the magazine unlock applications displayed on the first terminal and P40 are asynchronous, the statuses of the magazine unlock applications displayed on the two devices do not affect each other. In addition, when displaying the magazine unlock application, the first terminal and the device P40 may perform adaptive display based on features of respective screens (for example, P40 is in portrait mode, and the first terminal is in landscape mode).

In this application, if an application of the device P40 is displayed on the recent tasks screen of the first terminal in the FA technology-based migration mode, after the user pulls up an application card on the first terminal, the first terminal may not display prompt information of a source device of the application. For example, a prompt "From P40" may not be displayed on the first terminal.

Example 15: It is assumed that a first terminal (a local device) is a tablet computer. FIG. 8(*f*) is a diagram of an interface displayed on a first terminal after a "HUAWEI video" APP of a remote device (P40) is started on the first terminal. A video of the "HUAWEI video" APP of the device P40 is being played on the first terminal. It is assumed that a HUAWEI video application of the device P40 is displayed on a recent tasks screen of the first terminal in a window projection technology-based migration mode. In addition, the HUAWEI video application does not support multi-instance. If a user wants to pull back the application on the device P40, the user may tap a "HUAWEI video" icon on a home screen of the device P40, or may select a task card of "HUAWEI video" of the device P40 on a recent tasks screen of the device P40, and tap the task card. In this way, the HUAWEI video application is pulled back. As shown in FIG. 8(*f*), the user taps the "HUAWEI video" icon on the home screen of the device P40. After the user pulls back the HUAWEI video application, as shown in FIG. 8(*g*), the first terminal does not play the video of the "HUAWEI video" APP, and displays a home screen of the first terminal. The device P40 continues a status of the video played before on the first terminal to continue to play the video (for example, the first terminal plays a video at a time point t before the "HUAWEI video" APP is pulled back, and the device P40 continues to play the video after the time point t after the "HUAWEI video" APP is pulled back).

Example 16: It is assumed that a first terminal (a local device) is a tablet computer. FIG. 8(*h*) is a diagram of an interface displayed on a first terminal after a "HUAWEI video" APP of a remote device (P40) is started on the first terminal. A video of the "HUAWEI video" APP of the device P40 is being played on the first terminal. It is assumed that a HUAWEI video application of the device P40 is displayed on a recent tasks screen of the first terminal in a copying mode; or is displayed on a recent tasks screen of the first terminal in a window projection technology-based migration mode, where the HUAWEI video application supports multi-instance; or is displayed on a recent tasks screen of the first terminal in an FA technology-based migration mode. In this case, a user taps a "HUAWEI video" icon on a home screen of the device P40; or a user selects a task card of "HUAWEI video" of the device P40 on a recent tasks screen of the device P40, and taps the task card; and in this case, the HUAWEI video application is not pulled back. As shown in FIG. 8(*h*), the user taps the "HUAWEI video" icon on the home screen of the device P40. After the user taps the "HUAWEI video" icon, as shown in FIG. 8(*i*), the "HUAWEI video" APP enters a new video selection interface, and the user taps another video to play, that is, the user starts a new task on the device P40, where the new task does not affect playing of a video of the "HUAWEI video" APP of the device P40 on the first terminal. As shown in FIG. 8(*i*), the new task of the user that is run on the device P40 and the video of the "HUAWEI video" APP that is migrated from the device P40 to the first terminal do not affect each other.

In embodiments of this application, if a local device is a small-screen device, and a remote device is a large-screen device, after a task card of the remote device is pulled up on the local device, an application corresponding to the task card is displayed on a screen of the local device. In a process in which the local device displays the application, the application may be displayed on a display of the local device according to one of the following rules:

Rule 1: On the local device, the application is adaptively displayed according to a size of the screen of the local device.

Optionally, in embodiments of this application, if the local device is a wide-screen device, and the remote device is a narrow-screen device, after the task card of the remote device is pulled up on the local device, the application corresponding to the task card may be displayed on the display of the local device according to Rule 2:

Rule 2: On the local device, the application is automatically displayed in an APP Multiplier manner.

Optionally, in embodiments of this application, if the local device is a narrow-screen device, and the remote device is a wide-screen device, after the task card of the remote device is pulled up on the local device, the application corresponding to the task card may be displayed on the display of the local device according to Rule 3:

Rule 3: The local device automatically closes an APP Multiplier manner, and adaptively displays the application based on a size of the screen of the local device.

Optionally, in embodiments of this application, if the local device is a narrow-screen device, and the remote device is a wide-screen device, after the task card of the remote device is pulled up on the local device, the application corresponding to the task card may be displayed on the display of the local device according to Rule 4:

Rule 4: The application is displayed in full screen on the local device, and landscape/portrait mode switching is not performed, that is, the application is displayed on the screen of the local device based on a display state of the application on the remote device.

The following provides description based on specific examples.

Example 17: It is assumed that a first terminal (a local device) is a mobile phone (for example, P40), and a remote device is a tablet computer. After a task card of a magazine unlock APP of the tablet computer is pulled up on P40, a magazine unlock screen corresponding to the task card is displayed on a screen of P40. As shown in FIG. 8(*j*)-1 and FIG. 8(*j*)-2, a magazine unlock screen displayed on the tablet computer is displayed in full screen, and the magazine unlock screen is also adaptively displayed in full screen on the device P40.

As shown in FIG. 8(*j*)-1 and FIG. 8(*j*)-2, after the task card of the magazine unlock APP of the device P40 is pulled up on the tablet computer, a magazine unlock screen corresponding to the task card is displayed in full screen on a screen of the tablet computer.

Example 18: It is assumed that a first terminal (a local device) is a tablet computer, and a remote device is a mobile phone (for example, P40). The local device is a wide-screen device, and the remote device is a narrow-screen device. After a task card of a news browsing APP of P40 is pulled up on the tablet computer, a news browsing interface corresponding to the task card is displayed on a screen of the tablet computer. As shown in FIG. 8(*k*), the news browsing interface displayed on the tablet computer is automatically displayed in an APP Multiplier manner, and an APP Multiplier manner of displaying a news browsing interface on a screen of P40 is automatically disabled, that is, the news browsing interface on the screen of P40 is displayed in a normal state.

As shown in FIG. 8(*k*), after the task card of the news browsing APP of the tablet computer is pulled up on P40, the news browsing interface corresponding to the task card is displayed on the screen of P40. The news browsing interface displayed on the tablet computer is automatically displayed in the APP Multiplier manner, and the APP Multiplier manner of displaying the news browsing interface on the screen of P40 is automatically disabled, that is, the news browsing interface on the screen of P40 is displayed in a normal state (for example, adaptively displayed in full screen).

Example 19: It is assumed that a first terminal (a local device) is a mobile phone (for example, P40), and a remote device is a tablet computer. After a task card of a video APP of the tablet computer is pulled up on P40, a video corresponding to the task card is displayed on a screen of P40. As shown in FIG. 8(*l*), because a video displayed on the tablet computer is displayed in landscape mode, the video is also displayed in landscape mode on the device P40, that is, landscape/portrait mode switching is not performed.

As shown in FIG. 8(*l*), after the task card of the video APP of the device P40 is pulled up on the tablet computer, the video corresponding to the task card is displayed on a screen of the tablet computer. Because the video displayed on the device P40 is displayed in landscape mode, the video is also displayed in landscape mode on the tablet computer, that is, landscape/portrait mode switching is not performed.

Optionally, in this embodiment of this application, in another possible implementation, if the local device is a large-screen device, and the remote device is a small-screen device, after a task card of the remote device is pulled up on the local device, an application corresponding to the task card is displayed on a screen of the local device. In a process of displaying the application, the application corresponding to the task card may alternatively be displayed on the screen of the local device in a form of a floating window. Further, if the local device supports adaptive display, when the application corresponding to the task card is displayed on the screen of the local device in the form of a floating window, the application corresponding to the task card may be displayed by using a horizontal or wide floating window; or if the local device does not support adaptive display, the application corresponding to the task card may be displayed by using a vertical or narrow floating window.

Optionally, in this embodiment of this application, in another possible implementation, if the local device is a PC-type device, after a task card of an application of the remote device is pulled up on the local device, the application may be displayed in a floating window on the local device by default, for example, as shown in Example 20.

Example 20: As shown in FIG. 8(*m*), a user taps, on a recent tasks screen of a PC device, a task card corresponding to an APP 2 of a device P40, to pull up the task card on the PC device. When the APP 2 is displayed on the PC device, as shown in FIG. 8(*m*), there may be two different floating window display forms: a vertical or narrow floating window display form and a horizontal or wide floating window display form.

Optionally, in this embodiment of this application, in another possible implementation, if the local device is a PC-type device, after a task card of an application of the remote device is pulled up on the local device, when the application is displayed on the local device, a selection interface may be set, so that the user may select to display the application in full screen or display the application in a floating window, for example, as shown in Example 21.

Example 21: As shown in FIG. 8(*n*), a user taps, on a recent tasks screen of a PC device, a task card corresponding to an APP 2 of a device P40, to pull up the task card on the PC device. When the APP 2 is displayed on the PC device, as shown in FIG. 8(*n*), there may be two different floating window display forms: a full-screen display form and a floating window display form. The user may select, according to a requirement of the user, to display the application in full screen or in a floating window. After the user taps a corresponding option to select, the APP 2 may be correspondingly displayed on the PC device based on a selection result of the user.

In this embodiment of this application, in addition to displaying the task cards of the another device and the local device on the recent tasks screen of the local device used by the user, the user may further perform an operation on the task card on the recent tasks screen, so that the local device or the another device installs an application corresponding to the task card. The following provides description based on specific examples.

Example 22: It is assumed that a local device (a local device) used by a user is a mobile phone (for example, P40). FIG. 8(*o*) is a schematic diagram of another device task card displayed on a recent tasks screen of P40. In the example shown in FIG. 8(*o*), the user views a task card of a tablet computer 1 (MatePad1) on the recent tasks screen of the local device. When the user touches and holds a task card corresponding to an APP 2, a dialog box may be displayed, including "Downloaded to the local device", "Open in a floating window", and "Open in split screen". If the user taps "Downloaded to the local device", the local device P40 can automatically download and install the APP 2. Optionally, after the APP 2 is installed, the local device automatically opens the APP 2. If the user taps "Open in a floating window", the APP 2 is opened on a screen of the local device P40 in a floating window (that is, after the APP 2 is started on the local device, the APP 2 is displayed in a floating window). If the user taps "Open in split screen", the APP 2 is opened on the screen of the local device P40 in split screen (that is, after the APP 2 is started on the local device, the APP 2 is displayed in split screen).

Example 23: It is assumed that a local end device (a local device) used by a user is a tablet computer 1 (MatePad1). FIG. 8(*p*) is a schematic diagram of another device task card displayed on a recent tasks screen of MatePad1. In the example shown in FIG. 8(*p*), the user views a task card of P40 on the recent tasks screen of the local device, and the user touches and holds a task card corresponding to an APP 2 and drags the task card to an icon position of a device Mate X2, to complete migrating the APP 2 from the device P40 to the device Mate X2. In addition, a dialog box may be displayed on the local device, including "Download to Mate X2", "Open in a floating window", "Open in split screen", and "Open in full screen". If the user taps "Download to Mate X2", Mate X2 automatically downloads and installs the APP 2. Optionally, after the APP 2 is installed, Mate X2 may automatically open the APP 2. If the user taps "Open in a floating window", the APP 2 is opened on a screen of the local device in a floating window (that is, after the APP 2 is started on the local device, the APP 2 is displayed in a floating window). If the user taps "Open in split screen", the APP 2 is opened on the screen of the local device in split screen (that is, after the APP 2 is started on the local device, the APP 2 is displayed in split screen). If the user taps "Open in full screen", the APP 2 is opened on the screen of the local device in full screen (that is, after the APP 2 is started on the local device, the APP 2 is displayed in full screen).

In this embodiment of this application, in a process in which the recent tasks screen of the local device used by the user displays task cards of other devices and the local device, the user may further operate a plurality of task cards of a same device, or operate task cards of different devices, to simultaneously display applications respectively corresponding to the plurality of task cards on a screen of the local device or a screen of the remote device in split screen, or display one task in full screen and the other tasks in a floating window or a floating bubble, or display the plurality of task cards in a floating window, or the like The following provides descriptions based on specific examples.

Example 24: It is assumed that a local end device (a local device) used by a user is a mobile phone (for example, P40). FIG. 8(*q*) is a schematic diagram of a task card of another device displayed on a recent tasks screen of P40. In the example shown in FIG. 8(*q*), the user views a task card of the local device on the recent tasks screen of the local device. The user touches and holds a task card corresponding to an APP 2 of the local device with the left hand, and slides the task card leftward with the right hand, to switch to a task card corresponding to another application of the local device with the right hand for selection. It is assumed that the user selects a task card corresponding to an APP 5 of the local device. The user touches and holds the task card corresponding to the APP 5 of the local device with the right hand, drags the task card corresponding to the APP 5 to overlap the task card corresponding to the APP 2, and then releases the task card. In this way, the APP 2 and the APP 5 can be displayed on the local device in split screen.

Optionally, in another possible implementation, when the APP 2 and the APP 5 are displayed on the local device, the APP 2 is displayed in full screen, and the APP 5 is displayed in a floating window; or the APP 5 is displayed in full screen, and the APP 2 is displayed in a floating window; or both the APP 2 and the APP 5 are displayed in a floating window. This is not limited in this application.

Example 25: It is assumed that a local end device (a local device) used by a user is a mobile phone (for example, P40). FIG. 8(*r*)-1 and FIG. 8(*r*)-2 are a schematic diagram of a task card of another device displayed on a recent tasks screen of P40. In the example shown in FIG. 8(*r*)-1 and FIG. 8(*r*)-2, the user views a task card of the local device on the recent tasks screen of the local device. The user touches and holds a task card corresponding to an APP 2 of the local device with the left hand, taps a device icon of MatePad1 with the right hand to switch to a task card of MatePad1, and slides the task card of MatePad1 leftward or rightward with the right hand for selection. It is assumed that the user selects a task card corresponding to an APP 4 of MatePad1. The user touches and holds the task card corresponding to the APP 4 of MatePad1 with the right hand, drags the task card corresponding to the APP 4 to overlap the task card corresponding to the APP 2, and then releases the task card. In this way, the APP 2 of the local device and the APP 4 of MatePad1 can be displayed on the local device in split screen.

Optionally, in another possible implementation, when the APP 2 and the APP 4 are displayed on the local device, the APP 2 is displayed in full screen, and the APP 4 is displayed in a floating window; or the APP 4 is displayed in full screen, and the APP 2 is displayed in a floating window; or both the APP 2 and the APP 4 are displayed in a floating window. This is not limited in this application.

Example 26: It is assumed that a local end device (a local device) used by a user is a mobile phone (for example, P40). FIG. 8(*s*) is a schematic diagram of a task card of another device displayed on a recent tasks screen of P40. In the example shown in FIG. 8(*s*), the user views a task card of the local device on the recent tasks screen of the local device. The user presses a task card corresponding to an APP 2 of the local device with the left hand, taps a device icon of MatePad1 with the right hand to switch to a task card of MatePad1, and slides the task card of MatePad1 leftward or rightward with the right hand for selection. It is assumed that the user selects a task card corresponding to an APP 4 of MatePad1. The user touches and holds the task card corresponding to the APP 4 of MatePad1 with the right hand. In this case, the user may slide the task card corresponding to the APP 2 and the task card corresponding to the APP 4 together to an icon of a target device (a mobile phone P30), and then release the task cards, so that the APP 2 and the APP 4 may be displayed on a screen of P30, that is, APPs corresponding to different devices are migrated to the target device at the same time.

When the APP 2 and the APP 4 are displayed on the screen of P30, as shown in FIG. 8(*t*), the APP 2 and the APP 4 may be displayed in split screen; or the APP 2 is displayed in full screen, and the APP 4 is displayed in a floating window; or the APP 4 is displayed in full screen, and the APP 2 is displayed in a floating window; or both the APP 2 and the APP 4 are displayed in a floating window.

Optionally, in Example 26, after the user touches and holds the task card corresponding to the APP 2 of the local device with the left hand, the user may slide the task card leftward with the right hand, to switch to a task card corresponding to another application of the local device for selection. After the selection is completed, the user slides the task card corresponding to the APP 2 and the task card corresponding to the another application of the local device together to the target device and then releases the task cards, so that two different APP 2 on the local device can be displayed on the target device.

Example 27: It is assumed that a local end device (a local device) used by a user is a mobile phone (for example, P40). FIG. 8(*u*)-1 and FIG. 8(*u*)-2 are a schematic diagram of a task card of another device displayed on a recent tasks screen of P40. In the example shown in FIG. 8(*u*)-1 and FIG. 8(*u*)-2, the user touches and holds a task card corresponding to an APP 2 of the local device with the left hand, taps a device icon of MatePad1 with the right hand to switch to a task card of MatePad1, and slides the task card of MatePad1 leftward or rightward for selection. It is assumed that the user selects a task card corresponding to an APP 4 of MatePad1. The user touches and holds the task card corresponding to the APP 4 of MatePad1 with the right hand, drags the task card corresponding to the APP 4 to overlap the task card corresponding to the APP 2, and then releases the task card. In this way, the task card corresponding to the APP 4 and the task card corresponding to the APP 2 form a new task card (a split-screen task card) to be displayed on the recent tasks screen of the local device. The task card includes the task card corresponding to the APP 4 and the task card corresponding to the APP 2.

Optionally, in Example 27, after the user touches and holds the task card corresponding to the APP 2 of the local device with the left hand, the user may also slide the task card leftward with the right hand to switch to a task card corresponding to another application of the local device for selection. After the selection is completed, the user drags the task card corresponding to the another application of the local device to overlap the task card corresponding to the APP 2 and releases the task card. In this case, the task cards corresponding to the two different applications on the local device form a new task card, and this task card is displayed on the recent tasks screen of the local device.

In embodiments of this application, after a task (an application) crosses devices in a window projection technology-based migration mode, a distance between a local device (a device that displays a task card of a remote device) and the remote device (a source device of the task card) exceeds a threshold, or after network quality between the local device and the remote device is less than a preset threshold, a communication connection between the local device and the remote device is interrupted. In this case, a "capsule" prompt may appear on the local device to notify the user that the local and remote device will be disconnected. In addition, the user may perform an operation (for example, a slide-up or slide-down operation) on the "capsule". After the "capsule" prompt is operated, the "capsule" prompt may be hidden; or the "capsule" prompt may be automatically hidden after a preset display time length. After the "capsule" prompt is hidden for the preset time length, if the distance between the local device and the remote device still exceeds the threshold for a moment, or the network quality between the local device and the remote device is still less than the preset threshold, the "capsule" prompt may appear again. Optionally, after the "capsule" prompt appears again, hiding or automatic hiding may be implemented by using an operation of the user. In addition, the prompt of the source device (the remote device) is displayed on the local device.

However, when a task crosses devices in an FA technology-based migration mode, after the distance between the local device and the remote device exceeds the threshold for a moment, or the network quality between the local device and the remote device is less than the preset threshold, the communication connection between the local device and the remote device is interrupted. In this case, the "capsule" prompt may not appear on the local device, that is, no "capsule" prompt exists on the local device. In addition, the application may be independently used in a long distance on the local device. Optionally, there is no prompt of the source device (the remote device) on the local device.

The following provides description based on specific examples.

Example 28: It is assumed that a first terminal (a local device) is a tablet computer. FIG. 8(*v*) is a diagram of an interface displayed on the first terminal after the first terminal starts an application of a remote device (a device P40) on the first terminal. As shown in FIG. 8(*v*), it is assumed that a magazine unlock application of the remote device (a task source device P40) is displayed on a recent tasks screen of the first terminal in a window projection technology-based migration mode. In this case, if a distance between the local device and the remote device exceeds a threshold for a moment, a "capsule" prompt may appear on the local device, to prompt a user that "Too far from P40. The connection will be released". Optionally, the user may perform an operation (for example, a slide-up or slide-down operation) on the "capsule". After the "capsule" prompt is operated, the "capsule" prompt may be hidden; or the "capsule" prompt may be automatically hidden after a preset display time length. In addition, a prompt of the source device (P40) on the local device is "From P40".

In this application, after the distance between the local device and the remote device exceeds the threshold, or the network quality between the local device and the remote device is less than the preset threshold, or the remote device exits a super terminal, or the remote device changes a login account, and in these cases, after a communication connection between the local device and the remote device is interrupted, an application of the remote device started by the local device is displayed on a mask on the local device, and prompt information is displayed to the user on the mask, to prompt the user: "The connection has been released due to XXX". If factors (for example, a network is recovered, a distance between devices is within a secure distance, or a device resumes login to the same account or associated account) that cause the disconnection are eliminated within a preset time length, the local device automatically reconnects to the remote device. After the reconnection succeeds, mask display exits, and normal task display is restored.

Optionally, a button is further displayed on the mask to the user, to prompt the user: "Reconnect". The user may manually tap the button to perform reconnection.

Optionally, a button is further displayed on the mask to the user, to prompt the user: "Exit the application". The user may manually tap the button, and after the application exits, a home screen of the local device is displayed. If the user does not tap the button within the preset time length (for example, 15 minutes), after the preset time length ends, the application automatically exits, and the home screen of the local device is displayed.

If factors (for example, a network is recovered, a distance between devices is within a secure distance, or a device resumes login to the same account or associated account) that cause the disconnection are eliminated before the application exits by the user, the local device automatically reconnects to the remote device. After the reconnection succeeds, mask display exits, and normal task display is restored.

If the application fails to be migrated to the local device due to another exception, for example, the application of the remote device is migrated to another device, mask display is still performed on the local device, and a button is further displayed on the mask to the user, to prompt the user: "Exit the application".

The following provides description based on specific examples.

Example 29: It is assumed that a first terminal (a local device) is a tablet computer. FIG. 8(*w*) is a diagram of an interface displayed on the first terminal after the first terminal starts a "Magazine Unlock" application of a remote device (a device P40) on the first terminal. As shown in FIG. 8(*w*), if the distance between the local device and the remote device exceeds a threshold for a moment, after the communication connection between the local device and the remote device is interrupted, the "Magazine Unlock" application is displayed on a mask on the local device. In addition, prompt information is displayed to a user on the mask, to prompt the user: "Too far away. The connection has been released".

Optionally, as shown in FIG. 8(*w*), a button is further displayed on the mask to the user, to prompt the user: "Reconnect". The user may manually tap the button to perform reconnection.

If factors (for example, a distance between devices is within a secure distance) that cause the disconnection are eliminated within a preset time length, the local device automatically reconnects to the remote device. After the reconnection succeeds, mask display exits, and normal task display is restored.

Optionally, as shown in FIG. 8(*w*), a button is further displayed on the mask to the user, to prompt the user: "Exit the application". The user may manually tap the button, and after the application exits, a home screen of the local device is displayed. If the user does not tap the button within the preset time length (for example, 15 minutes), after the preset time length ends, the application automatically exits, and the home screen of the local device is displayed.

In this application, the local device may further migrate a recently used application of another terminal to the local device, and display the application on a foreground of the local device; or migrate a recently used application of the local device to another terminal, and display the application on a foreground of the another terminal. Alternatively, if there are a plurality of other terminals (for example, including a device B and a device C), the local device may further migrate a recently used application of the device B to the device C, and display the application on a foreground of the device C.

In the foregoing process in which the local device migrates a task card of a device to another device for display, the user may touch and hold, on the local device, a task card corresponding to an application. In this case, another surrounding task card and an unavailable device icon can be hidden. The unavailable device icon indicates that the device does not support the application. That is, after the application is migrated to the device, the device cannot run the application.

Further, when the user needs to migrate an application on the local device to another device (namely, a target device), the user may drag the task card corresponding to the application to an icon area of the target device, and the local device may automatically determine the target device according to an area of an overlapping part of the task card and each device icon.

Further, the user may further perform different operations on the task card, to determine the target device to which the task card needs to be migrated.

The following provides description based on specific examples.

Example 30: It is assumed that a first terminal is a mobile phone (P40), a second terminal is a tablet computer 1 (MatePad1), and a third terminal is a tablet computer 2 (MatePad2). FIG. 9(*a*) is a schematic diagram of historical task cards of a second terminal and a third terminal that are displayed on a recent tasks screen of a first terminal (a local device or a local end device). It is assumed that a user needs to migrate an APP 2 of the local device to another device. The user may touch and hold a task card corresponding to the APP 2. It is assumed that MatePad2 is an unavailable device, an icon of MatePad2 may be hidden. Optionally, in embodiments of this application, in addition to hiding the icon of the unavailable device, the icon of the unavailable device may be displayed to the user in another manner. For example, a text dialog box may be set below the unavailable icon, to indicate that the device is an unavailable device, or the icon of the unavailable device may be displayed on a mask or in a blurry manner. This is not limited in this application.

Example 31: It is assumed that a first terminal is a mobile phone (P40), a second terminal is a tablet computer 1 (MatePad1), and a third terminal is a tablet computer 2 (MatePad2). FIG. 9(*b*) is a schematic diagram of historical task cards of a second terminal and a third terminal that are displayed on a recent tasks screen of a first terminal (a local device or a local end device). It is assumed that a user needs to migrate an APP 2 of the local device to MatePad1. The user may touch and hold a task card corresponding to the APP 2 and slide up to an icon area of MatePad1. The closer the task card is to the icon area of MatePad1, the smaller the task card becomes. After the task card partially overlaps the icon area of MatePad1, or a distance between the task card and the icon area of MatePad1 is less than a preset threshold, the user releases the task card, and then the task card may be automatically moved to MatePad1 and displayed on the foreground of MatePad1.

Example 32: It is assumed that a first terminal is a mobile phone (P40), a second terminal is a tablet computer 1 (MatePad1), and a third terminal is a tablet computer 2 (MatePad2). FIG. 9(*c*) is a schematic diagram of historical task cards of a second terminal and a third terminal that are displayed on a recent tasks screen of a first terminal (a local device or a local end device). It is assumed that a user needs to migrate an APP 2 of the local device to another device. The user may touch and hold a task card corresponding to the APP 2 and slide up to icon areas of devices. The task card overlaps an icon area of a device, and then an icon of the device is determined as a target device. For example, as shown in FIG. 9(*c*), after the user touches and holds the task card corresponding to the APP 2 and slides up, if the task card overlaps an icon of MatePad1, MatePad1 is determined as the target device. After the user releases the task card, the task card can be automatically migrated to the target device and displayed on a foreground of the target device.

Example 33: It is assumed that a first terminal is a mobile phone (P40), a second terminal is a tablet computer 1 (MatePad1), and a third terminal is a tablet computer 2 (MatePad2). FIG. 9(*d*) is a schematic diagram of historical task cards of a second terminal and a third terminal that are displayed on a recent tasks screen of a first terminal (a local device or a local end device). It is assumed that a user needs to migrate an APP 2 of the local device to another device. The user may touch and hold a task card corresponding to the APP 2 and slide up to icon areas of devices. If the task card overlaps icon areas of a plurality of devices at the same time, an icon of a device with a largest overlapping area is determined as a target device. As shown in FIG. 9(*d*), if the task card overlaps device icons of both MatePad1 and MatePad2, and an overlapping area between the task card and the device icon of MatePad1 is the largest, it is determined that MatePad1 is the target device. After the user releases the task card, the task card can be migrated to the target device and displayed on a foreground of the target device.

Example 34: It is assumed that a first terminal is a mobile phone (P40), a second terminal is a tablet computer 1 (MatePad1), and a third terminal is a tablet computer 2 (MatePad2). FIG. 9(*e*) is a schematic diagram of historical task cards of a second terminal and a third terminal that are displayed on a recent tasks screen of a first terminal (a local device or a local end device). It is assumed that a user needs to migrate an APP 2 of the local device to another device. The user may touch and hold a task card corresponding to the APP 2 and slide up. After the user slides the task card upward (that is, a distance between a finger touch location of the user on the mobile phone before sliding and a finger touch location of the user on the mobile phone after sliding) is greater than or equal to a preset distance, a device right above the task card is a target device. For example, an interface displayed when the user touches and holds the task card corresponding to the APP 2 and does not perform sliding is shown in FIG. 9(*e*), and an interface displayed after the user slides up the task card is shown in FIG. 9(*f*). A device right above the task card is MatePad1. In this case, it is determined that MatePad1 is the target device. After the user releases the task card, the task card may be migrated to the target device and displayed on a foreground of the target device.

Example 35: It is assumed that a first terminal is a mobile phone (P40), a second terminal is a tablet computer 1 (MatePad1), and a third terminal is a tablet computer 2 (MatePad2). FIG. 9(*g*) is a schematic diagram of historical task cards of a second terminal and a third terminal that are displayed on a recent tasks screen of a first terminal (a local device or a local end device). It is assumed that a user needs to migrate an APP 2 of the local device to another device. The user may touch and hold a task card corresponding to the APP 2 and slide up the task card. After a distance between a finger touch location of the user on the mobile phone and the top of a screen of the first terminal is less than or equal to a preset distance, a device right above the task card is a target device. For example, an interface displayed after sliding up is shown in FIG. 9(*h*). The device right above the task card is MatePad1. In this case, it is determined that MatePad1 is the target device. After the user releases the task card, the task card can be migrated to the target device and displayed on a foreground of the target device.

In embodiments of this application, in addition to determining, in the foregoing manners, the target device to which the task card needs to be migrated, some preset rules may be further set. For example, the user may touch and hold a task card of another device on the recent tasks screen of the local device, and then release the task card. The task card is automatically migrated to the local device, and an application corresponding to the task card is displayed or run on the local device. Alternatively, the user may set a default target device, and release a task card after the user touches and holds the task card. In this case, the task card is automatically migrated to the default target device. This is not limited in this application.

After the user selects the target device by performing an operation on the task card, in a possible implementation, the user may continue to touch and hold the task card, and drag the task card until the task card overlaps a selected target device icon. In this case, the user releases the task card, and then the task card may be migrated to the target device and displayed on the foreground of the target device, to complete cross-device interaction. In a possible implementation, after the user selects the target device by performing an operation on the task card, although the task card does not overlap a selected target device icon, the user releases the task card, and the task card may also be migrated to the target device and displayed on the foreground of the target device, to complete cross-device interaction, for example, as shown in Example 36.

Example 36: It is assumed that a first terminal is a mobile phone (P40), a second terminal is a tablet computer 1 (MatePad1), and a third terminal is a tablet computer 2 (MatePad2). FIG. 9(*i*) is a schematic diagram of historical task cards of a second terminal and a third terminal that are displayed on a recent tasks screen of a first terminal (a local device or a local end device). It is assumed that a user needs to migrate an APP 2 of the local device to another device. After the user determines a target device by using any one of the foregoing operations, although a task card does not overlap a selected target device icon, the user may release the task card. After the user releases the task card, the task card may be migrated to the target device and displayed on the foreground of the target device. For example, FIG. 9(*i*) shows a diagram of an interface of a target device selected by the user. The target device is MatePad1. In this case, the user releases the task card, and a displayed interface is shown in FIG. 9(*j*). The task card may automatically move to an icon of the target device (for example, the task card automatically fly to the icon of the target device), so that migration of the task card to the target device is completed. The task card can be displayed on the foreground of the target device to implement cross-device interaction.

In embodiments of this application, after the user selects the target device by performing an operation on the task card, the icon of the target device may further be accordingly changed. For example, the icon of the target device may move downward for a distance, or a color of the icon of the target device changes, to prompt the user of the selected target device. In addition, the user may further perform an operation on the task card to change the selected target device, and the like. The following provides description based on specific examples.

Example 37: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed on a recent tasks screen of a first terminal (a local device or a local end device). It is assumed that a user needs to migrate an APP 2 of the local device to another device. After the user determines a target device by using any one of the foregoing operations, an icon of the target device may move downward for a distance. For example, as shown in FIG. 9(*k*), the target device selected by the user is MatePad1, and a device icon of MatePad1 may move downward for a distance. Alternatively, a color of the icon of the target device may change to a selected state color. Refer to FIG. 9(*l*). If the target device selected by the user is MatePad1, a device icon of MatePad1 changes to a filled state.

Optionally, in this application, the selected target device may be identified in another manner. For example, the selected target device may be prompted to the user in a manner such as a text dialog box. This is not limited in this application.

In this application, a correspondence between a location of a task card and a target device may be further preset. After the user touches and holds the task card and drags the task card to a preset location, the target device corresponding to the preset location is automatically displayed to the user. As the location of the task card dragged by the user changes, the target device changes accordingly. After determining the target device to which the task card needs to be migrated, the user may release the task card, and the task card may automatically move to an icon of the target device (for example, the task card automatically flies to the icon of the target device), so that the task card is migrated to the target device. The task card can be displayed on the foreground of the target device to implement cross-device interaction.

Example 38: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed on a recent tasks screen of a first terminal (a local device or a local end device). It is assumed that a user needs to migrate an APP 2 of the local device to another device. After the user touches and holds a task card and drags the task card to change a location of the task card, a target device corresponding to the location of the task card is displayed. For example, as shown in FIG. 9(*m*), the user touches and holds the task card and drags the task card to change the location of the task card, and a displayed target is MatePad1. If the user determines that the APP 2 needs to be migrated to MatePad1, the user may release the task card. In this case, a displayed interface is shown in FIG. 9(*n*), and the task card may automatically move to an icon of the target device (for example, the task card automatically flies to the icon of the target device), so that the task card is migrated to the target device.

In embodiments of this application, after the user selects the target device by performing an operation on the task card, as the user further performs an operation on the task card, the selected target device also changes accordingly, or the selected target device may be deselected. The following provides description based on specific examples.

Example 39: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed on a recent tasks screen of a first terminal (a local device or a local end device). It is assumed that a user needs to migrate an APP 2 of the local device to another device. After the user determines a target device by using any one of the foregoing operations, for example, as shown in FIG. 9(*o*), it is assumed that a selected target device is MatePad1, and if the user continues to drag the task card and slide leftward or rightward, the selected target device is switched accordingly. Refer to FIG. 9(*p*). It is assumed that the user drags the task card and slide rightward, and a changed target device is MatePad2, and a device icon of MatePad2 moves downward for a distance. In this case, the user may release the task card, and the task card may automatically move to an icon of the target device (MatePad2) (for example, the task card automatically flies to the icon of the target device), so that the task card is migrated to the target device.

Example 40: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed on a recent tasks screen of a first terminal (a local device or a local end device). It is assumed that a user needs to migrate an APP 2 of the local device to another device. After the user determines a target device by using any one of the foregoing operations, for example, as shown in FIG. 9(*q*), it is assumed that a selected target device is MatePad1, and a device icon of MatePad1 moves downward for a distance. If the user continues to drag the task card and slide downward, after a sliding distance (namely, a distance between a finger touch location of the user on the mobile phone before sliding and a finger touch location of the user on the mobile phone after sliding) is greater than or equal to a preset distance, for example, as shown in FIG. 9(*r*), the user releases the task card. In this case, the selected target device MatePad1 is deselected, the device icon of MatePad1 is restored to a previous location, the task card is restored to a state before a target is selected, and migration of the task card is canceled.

Example 41: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed on a recent tasks screen of a first terminal (a local device or a local end device). It is assumed that a user needs to migrate an APP 2 of the local device to another device. After the user determines a target device by using any one of the foregoing operations, for example, as shown in FIG. 9(*s*), it is assumed that a selected target device is MatePad1, and a device icon of MatePad1 moves downward for a distance. If the user continues to drag the task card and slide downward, after a sliding distance (a distance between a finger touch location of the user on the mobile phone after sliding and a top of a screen of the first terminal) is greater than or equal to a preset distance, for example, as shown in FIG. 9(*t*), the user releases the task card. In this case, the selected target device MatePad1 is deselected, the device icon of MatePad1 is restored to a previous location, the task card is restored to a state before the target is selected, and migration of the task card is canceled.

In a process in which the user drags the task card to select a target device or deselects a target device, the user may further drag the task card to a left edge or a right edge of a screen. In this case, the user may continue to drag the task card to the left or right, so that more device icons may be displayed on the top of the screen, and the user may determine the target device from more device icons. In embodiments of this application, the more device icons may be arranged in one row for display, or may be displayed on the top of the screen of the device in a form of a radar chart. This is not limited in this application. For example, Example 42 shows a schematic diagram of an interface on which more device icons are arranged into one row for display.

Example 42: It is assumed that a first terminal is a mobile phone (P40), a second terminal is a tablet computer 1 (MatePad1), and a third terminal is a tablet computer 2 (MatePad2). There is a schematic diagram of historical task cards of a second terminal and a third terminal that are displayed a recent tasks screen of a first terminal (a local device or a local end device). It is assumed that a user needs to migrate an APP 2 of the local device to another device. For example, as shown in FIG. 9(*u*), the user drags a task card and slides leftward. After the task card is located on a right edge of a screen, the user continues to drag the task card to the right. A displayed interface is shown in FIG. 9(*v*). Other device icons (MatePad3 and Mate X2) are displayed on the top of the screen. A plurality of device icons displayed on the top of the screen are displayed in one row. The user may continue to perform an operation on the task card, and determine a target device from the more device icons.

In embodiments of this application, in a process in which the local device migrates, on the recent tasks screen, a task card of a device to a target device for display or running, for example, the user migrates a video of a mobile phone to a large-screen device for playing, or migrates an audio of a mobile phone to a sound box for playing, if the target device is in a black screen state, the target device may first automatically turn on a screen, and after the screen is turned on, the user may manually unlock the screen, and then an application corresponding to the task card is displayed; or the target device may first automatically turn on a screen, and automatically trigger unlocking, and after the user manually unlocks the screen, an application corresponding to a task card may be displayed; or the target device may first automatically turn on a screen, and automatically unlock the screen, and after the unlocking, an application corresponding to a task card may be displayed. The following provides description based on specific examples.

Example 43: It is assumed that a first terminal is a tablet computer (MatePad), a second terminal is a mobile phone (P40), and a third terminal is a foldable screen mobile phone (Mate X2). There is a schematic diagram of historical task cards of a second terminal and a third terminal that are displayed a recent tasks screen of a first terminal (a local device or a local end device). It is assumed that a user needs to migrate an APP 2 of the local device to the second terminal, and the second terminal is in a black screen state. After the user migrates a task card corresponding to the APP 2 to the mobile phone (P40) in any manner in the foregoing embodiments, as shown in FIG. 10(*a*)-1 and FIG. 10(*a*)-2, the mobile phone P40 is in a black screen state. After the mobile phone P40 receives task information, the mobile phone P40 automatically turns on a screen. After the mobile phone P40 automatically turns on the screen, the user is triggered to manually unlock the screen. After the user manually unlocks the screen, the mobile phone P40 may display or run the APP 2.

Example 44: It is assumed that a first terminal is a tablet computer (MatePad), a second terminal is a mobile phone (P40), and a third terminal is a foldable screen mobile phone (Mate X2). There is a schematic diagram of historical task cards of a second terminal and a third terminal that are displayed on a recent tasks screen of a first terminal (a local device or a local end device). It is assumed that a user needs to migrate an APP 2 of the local device to the second terminal, and the second terminal is in a black screen state. After the user migrates a task card corresponding to the APP 2 to the mobile phone (P40) in any manner in the foregoing embodiments, as shown in FIG. 10(*b*), the mobile phone (P40) is in a black screen state. After the mobile phone (P40) receives task information, the mobile phone (P40) automatically turns on a screen and triggers the user to manually unlock the screen. After the user manually unlocks the screen, the mobile phone (P40) may display or run the APP 2.

Example 45: It is assumed that a first terminal is a tablet computer (MatePad), a second terminal is a mobile phone (P40), and a third terminal is a foldable screen mobile phone (Mate X2). There is a schematic diagram of historical task cards of a second terminal and a third terminal that are displayed on a recent tasks screen of a first terminal (a local device or a local end device). It is assumed that a user needs to migrate an APP 2 of the local device to the second terminal, and the second terminal is in a black screen state. After the user migrates a task card corresponding to the APP 2 to the mobile phone (P40) in any manner in the foregoing embodiments, as shown in FIG. 10(*c*), the mobile phone (P40) is in a black screen state. After the mobile phone (P40) receives task information, the mobile phone (P40) automatically turns on a screen and triggers auto unlocking. After unlocking the mobile phone (P40), the mobile phone (P40) may display or run the APP 2.

Optionally, in embodiments of this application, in a process in which the local device migrates, on the recent tasks screen, a task card of a device to the target device for display or running, if the target device is in a black screen state, in a possible implementation, different rules for triggering the target device to turn on and unlock the screen may be further set based on different types of applications that need to be migrated or sensitivity degrees corresponding to the applications. For example, for an application with a relatively low sensitivity (for example, a video playback application or an audio playback application), after the application is migrated to a target device that is in a black screen state, the target device may automatically turn on a screen and trigger automatic unlocking, so that the application is displayed or run on the target device. For an application with a relatively high sensitivity (for example, a document editing application or a photo playing application), after the application is migrated to a target device that is in a black screen state, the target device may automatically turn on a screen and trigger a user to manually unlock the screen, so that the application is displayed or run on the target device.

Optionally, in another possible implementation, different rules for triggering the target device to turn on and unlock the screen may be set based on different statuses of the target device (for example, target devices with different security levels or security capabilities, and target devices of different types). For example, it is assumed that the target device is a large-screen device. After the application is migrated to the target device that is in a black screen state, the target device may automatically turn on the screen and trigger the user to manually unlock the screen, so that the application is displayed or run on the target device. It is assumed that the target device is a smart sound box. After the application is migrated to the target device that is in a black screen state, the target device may automatically turn on a screen and automatically unlock the screen, so that the application is displayed or run on the target device.

In embodiments of this application, in a process in which a source device migrates, on a recent tasks screen, a task card to a target device to run an application corresponding to the task card, if the application corresponding to the task card relates to a hardware capability of the device, for example, including a hardware capability like a camera, a microphone, or a display of the device, after the application is migrated from the source device to the target device, the application may be run on the target device by using a hardware capability of the source device or the target device by using any one of the following rules:

Rule 1: After migrating the application to the target device, the source device does not use the hardware capability of the target device. In other words, after the application is migrated to the target device, the hardware capability of the source device continues to be used to run the application on the target device.

Rule 2: After migrating the application to the target device, the source device uses a part of the hardware capability of the target device. In other words, after the application is migrated to the target device, a part of the hardware capability of the source device and a part of the hardware capability of the target device may be used at the same time, to cooperatively run the application on the target device.

Rule 3: After migrating the application to the target device, the source device uses the hardware capability of the target device, and releases the hardware capability that is of the source device and that is occupied by the application. In this case, the source device may run a new application by using the hardware capability of the source device, that is, devices at both ends may separately use their respective hardware capabilities to execute different tasks without affecting each other.

Rule 4: After migrating the application to the target device, the source device uses the hardware capability of the target device, and does not release the hardware capability that is of the source device and that is occupied by the application.

The following provides description based on specific examples.

Example 46: It is assumed that a first terminal is a tablet computer 1 (MatePad1), a second terminal is a mobile phone (P40), and historical task cards of the second terminal and another terminal are displayed on a recent tasks screen of the first terminal (a local device or a local end device). It is assumed that a user needs to migrate a video call of the mobile phone P40 (a source device) to MatePad1 (a target device) for running. Refer to FIG. 11(*a*). The user may tap a task card corresponding to the video call on a recent tasks screen of MatePad1, and after the tapping, the video call be run on MatePad1. By default, a camera, a microphone, and a speaker of MatePad1 are invoked for the video call. In other words, a hardware capability of the target device is used, and a hardware capability of the mobile phone P40 is not used. Optionally, the hardware capability that is of the mobile phone P40, namely, the source device, and that is occupied by the video call may be released; or the hardware capability that is of the mobile phone P40 and that is occupied by the video call is not released. If the hardware capability that is of the mobile phone P40 and that is occupied by the video call is not released, the mobile phone P40 cannot use the hardware capability to initiate a new task.

Optionally, MatePad1 may also pop up a dialog box. For example, the dialog box prompts the user whether to use a hardware capability of the device. If the user taps "Yes", the hardware capability of MatePad1 may be used; or if the user taps "No", the hardware capability of the source device (the mobile phone P40) is used. The dialog box may automatically disappear after preset time. If the user does not make a selection within the preset time, the hardware capability of MatePad1 is used by default.

Example 47: It is assumed that a first terminal is a tablet computer 1 (MatePad1), a second terminal is a mobile phone (P40), and historical task cards of the second terminal and another terminal are displayed on a recent tasks screen of the first terminal. It is assumed that a user needs to migrate a video call of the mobile phone P40 (a source device) to MatePad1 (a target device) for running. Refer to FIG. 11(*b*). The user may tap a task card corresponding to the video call on a recent tasks screen of MatePad1, and after the tapping, the video call is run on MatePad1. Cameras, microphones, and speakers of MatePad1 and the mobile phone P40 are used for the video call at the same time, to collaboratively complete the video call on MatePad1. In other words, hardware capabilities of both the target device and the source device are used to run the application on the target device in a collaborative manner. As shown in FIG. 11(*b*), after the video call is migrated from the mobile phone P40 to the tablet MatePad1, the camera of MatePad1 is used, and the user may select to start another camera of the mobile phone P40 on MatePad1, to perform a video call by using the camera of MatePad1 and the camera of the mobile phone P40 at the same time. In addition, sound reception and sound playing are performed by using the microphones and the speakers of MatePad1 and the mobile phone P40 at the same time.

Example 48: It is assumed that a first terminal is a tablet computer 1 (MatePad1), a second terminal is a mobile phone (P40), and historical task cards of the second terminal and another terminal are displayed on a recent tasks screen of the first terminal. It is assumed that a user needs to migrate a video call of the mobile phone P40 (a source device) to MatePad1 (a target device) for running. Refer to FIG. 11(*c*)-1 and FIG. 11(*c*)-2. The user may tap a task card corresponding to the video call on a recent tasks screen of MatePad1, and after the tapping, the video call (a video call task 1) is run on MatePad1. By default, the video call invokes a camera, a microphone, and a speaker of MatePad1. In other words, a hardware capability of the target device is used, and a hardware capability of the source device (a local device) is not used. In addition, after the video task is migrated from the mobile phone P40 to MatePad1, another video task (a video call task 2) can be further performed on the mobile phone P40. The mobile phone P40 and MatePad1 use respective hardware capabilities (a camera capability, a microphone capability, a speaker capability, an input capability, and the like) independently, and do not interfere with each other. In other words, after a video application is migrated from the mobile phone P40 to MatePad1, the hardware capability of MatePad1 is used, and the hardware capability that is of the mobile phone P40 and that is occupied by the video application is released. In this case, the mobile phone P40 may run a new application by using the hardware capability of the mobile phone P40, that is, devices at both ends may separately use respective hardware capabilities to execute different tasks without affecting each other.

In embodiments of this application, when a task is migrated from a source device to a target device for running, and a hardware capability of the target device is used during running, in a process in which the task is run on the target device, if a new task is run on the target device, and a hardware capability conflict exists between the new task run on the target device and the task migrated from the source device, for example, a camera, a microphone, a speaker, and the like of the target device need to be used, in a possible implementation, the task migrated from the source device can automatically switch to use a hardware capability of the source device to continue to be run on the source device, and the new task on the target device preferentially uses the hardware capability of the target device, that is, it is ensured that the task of the target device is executed first. After the execution of the new task on the target device is completed, the hardware capability of the target device is released, and the task migrated from the source device may be switched to using the hardware capability of the target device, and continue to be run on the target device.

Optionally, in another possible implementation, when a hardware capability conflict exists between the new task run on the target device and the task migrated from the source device, the task migrated from the source device may also preferentially use the hardware capability of the target device, that is, it is ensured that the migrated task is preferentially executed on the target device. After the execution of the migrated task on the target device is completed, the new task on the target device may use the hardware capability of the target device, so that the new task is executed.

Optionally, in still another possible implementation, when a hardware capability conflict exists between the new task run on the target device and the task migrated from the source device, the hardware capability of the target device may be separated based on the tasks, and both the new task and the task migrated from the source device are supported. In addition, the target device may also perform split-screen display, that is, simultaneously display the new task and the task migrated from the source device. The following provides description based on specific examples.

Example 49: Refer to FIG. 11(*d*)-1 and FIG. 11(*d*)-2. It is assumed that a video playback task on a mobile phone P40 (a source device) is migrated to a tablet computer MatePad (a target device), and the video playback task is run on MatePad. When a video is being played on MatePad, MatePad receives a video call task. MatePad may display a "Video call notification" dialog box for a user. After the user taps the dialog box, as shown in FIG. 11(*e*)-1 and FIG. 11(*e*)-2, a video call screen is displayed on MatePad, and the video is automatically migrated back to the mobile phone P40 to continue playing. After a video call on MatePad ends, the video is automatically migrated to MatePad to continue playing.

Example 50: Refer to FIG. 11(*f*)-1 and FIG. 11(*f*)-2. It is assumed that a video playback task on a mobile phone P40 (a source device) is migrated to a tablet computer MatePad (a target device), and the video playback task is run on MatePad. When a video is being played on MatePad, MatePad receives a video call task. MatePad may display a "Video call notification" dialog box for a user. After the user taps the dialog box, as shown in FIG. 11(*g*), MatePad plays the video and display a video call in split screen. In addition, a hardware capability (for example, a camera, a microphone, a speaker, and an input/output capability) of MatePad may be separated based on the two tasks: video playback and video call, and running of the video playback and the video call is supported at the same time.

In embodiments of this application, when a task is migrated from a local device (a source device) to a target device and a hardware capability of the source device is used during running, in a process in which the target device runs the task, if a new task is run on the source device, and a hardware capability conflict exists between the new task run on the source device and the task migrated from the source device, for example, a camera, a microphone, a speaker, and the like of the target device need to be used. There are the following several possible implementations.

In a possible implementation, execution of the task migrated from the source device may be automatically suspended on the target device, and after execution of the new task on the source device is completed, the migrated task is automatically continued on the target device.

In another possible implementation, the target device continues to execute, by using the hardware capability of the target device, the task migrated from the source device. That is, the source device executes the new task by using the hardware capability of the source device, and the target device executes, by using the hardware capability of the target device, the task migrated from the source device. After the execution of the new task on the source device is completed, the target device may switch to use the hardware capability of the source device to execute the task migrated from the source device, or continue to use the hardware capability of the target device to execute the task migrated from the source device.

In still another possible implementation, the hardware capability of the source device may be separated based on the tasks, and both the new task and the task that is migrated from the source device and that is executed on the target device are supported.

The following provides description based on specific examples.

Example 51: Refer to FIG. 11(*h*)-1 to FIG. 11(*h*)-4. It is assumed that a video playback task on a mobile phone P40 (a source device) is migrated to a tablet computer MatePad (a target device), the video playback task is run on MatePad, and a hardware capability of the mobile phone P40 is used in a process of running the video playback task on MatePad. When the video playback task is running on MatePad, the mobile phone P40 receives a new information notification, and the mobile phone P40 notifies a user by using a sound or vibration. It is assumed that a hardware capability required by the sound or vibration does not conflict with a hardware capability required for video playback, the video playback continues on MatePad. The user can tap a notification dialog box displayed on the mobile phone P40, to view information on the mobile phone P40. Two tasks of viewing information on the mobile phone P40 and playing videos on MatePad do not affect each other, and are performed at the same time. The two tasks use the hardware capability of the mobile phone P40 at the same time.

Example 52: Refer to FIG. 11(*i*)-1 to FIG. 11(*i*)-4. It is assumed that a video playback task on a mobile phone P40 (a source device) is migrated to a tablet computer MatePad (a target device), the video playback task is run on MatePad, and a hardware capability (a microphone, a speaker, or the like) of the mobile phone P40 is used in a process of running the video playback task on MatePad. When the video playback task is run on MatePad, the mobile phone P40 receives an incoming call (for example, a carrier or VoIP network call). The mobile phone P40 rings, and MatePad continues to play a video. As shown in FIG. 11(*j*)-1 to FIG. 11(*j*)-4, after a user answers the call through sliding, call voice input and output are performed on the mobile phone P40. Because a hardware capability used by MatePad to play the video conflicts with a hardware capability used by the mobile phone P40 for the voice call, video playback on MatePad automatically pauses. After the call on the mobile phone P40 ends, video playback on MatePad automatically continues.

Example 53: Refer to FIG. 11(*i*)-1 to FIG. 11(*i*)-4. It is assumed that a video playback task on a mobile phone P40 (a source device) is migrated to a tablet computer MatePad (a target device), the video playback task is run on MatePad, and a hardware capability (a microphone, a speaker, or the like) of the mobile phone P40 is used in a process of running the video playback task on MatePad. When the video playback task is run on MatePad, the mobile phone P40 receives an incoming call (for example, a carrier or VoIP network call). The mobile phone P40 rings, and MatePad continues to play a video. As shown in FIG. 11(*k*)-1 to FIG. 11(*k*)-4, after a user answers the call through sliding, call voice input and output are performed on the mobile phone P40. Because a hardware capability used by MatePad to play the video conflicts with a hardware capability used by the mobile phone P40 for the voice call, the hardware capability of the mobile phone P40 may be separated based on the two tasks (the voice call and the video playback). Video playback on MatePad continues, and the call on the mobile phone P40 also continues. After the call on P40 ends, the hardware capability occupied by the call on P40 is automatically occupied by the video playback on MatePad.

Alternatively, in Example 53, after a user answers the call through sliding, call voice input and output are performed on the mobile phone P40. Because a hardware capability used by MatePad to play the video conflicts with a hardware capability used by the mobile phone P40 for the voice call, the video playing on MatePad may automatically switch to using a hardware capability of MatePad, that is, devices at both ends may use respective hardware capabilities to perform different tasks without affecting each other. The video playback on MatePad continues. The call is also made on the mobile phone P40 at the same time. After the call on P40 ends, the video playback task on MatePad automatically switches to using the hardware capability of the mobile phone P40 for continuing.

Example 54: FIG. 12(*a*)-1 and FIG. 12(*a*)-2 are a schematic diagram of displaying, on a head unit (a target device), a historical task card of P40 (a source device) used by a user. As shown in FIG. 12(*a*)-1 and FIG. 12(*a*)-2, when a historical task card layout of P40 is displayed on the head unit, the historical task card layout is displayed based on a multi-task layout when P40 is used in portrait mode. The user can perform an operation on the task card of P40 on the head unit. In this embodiment of this application, the operation may be an operation in any one of the foregoing examples, so that the user can remotely manage and control a task of P40 on the head unit.

Optionally, when the historical task card of P40 is displayed on the head unit, any display manner or display rule in the foregoing examples may also be used. For example, the last task card displays a home screen snapshot of P40, and an FA card exists on the home screen snapshot. Alternatively, the last task card displays a first home screen snapshot of P40, and may slide horizontally to switch to display a second home screen snapshot of P40. The user may tap an application icon on the home screen snapshot, to open an application on the head unit. Alternatively, the last task card displays a home screen snapshot of P40 and a floating window. Alternatively, the last task card displays a home screen snapshot of P40 and a floating bubble. Alternatively, the last task card displays ongoing task cards of a plurality of lite devices controlled by P40. Alternatively, the last task card displays a home screen application icon of P40. Alternatively, the user may pull up the task card of P40 on the head unit. Alternatively, the user may create a cross-device split-screen/floating window on the head unit. Alternatively, after a task on P40 is migrated to the head unit, hardware capability allocation may be performed on the head unit and P40 according to the hardware usage rules in the foregoing examples. This is not limited in this application.

In this application, the head unit may include an electronic control unit (electronic control unit, ECU) in a vehicle, a trip computer, an in-vehicle computer, an in-vehicle T-Box, or the like. This is not limited in embodiments of this application.

In this application, a smart device (for example, P40) used by the user may establish a communication connection to the head unit by using a Bluetooth (BT) technology, Wi-Fi, NFC, Zigbee, a USB, Cellular, or the like, establish a trust relationship, and perform information communication with each other.

Example 55: FIG. 12(*b*)-1 and FIG. 12(*b*)-2 are a schematic diagram of displaying, on a head unit (a target device), a historical task card of a PC device (a source device) used by a user. As shown in FIG. 12(*b*)-1 and FIG. 12(*b*)-2, the user may perform an operation on the task card of the PC device on the head unit. In this embodiment of this application, the operation may be an operation in any one of the foregoing examples, so that the user can remotely manage and control a task of the PC device on the head unit.

Optionally, when the historical task card of the PC device is displayed on the head unit, any display manner or display rule in the foregoing examples may also be used. For example, the last task card displays a home screen snapshot of the PC device, and an FA card exists on the home screen snapshot. Alternatively, the last task card displays a home screen snapshot of the PC device and a floating window. Alternatively, the last task card displays a home screen snapshot of the PC device and a floating bubble. Alternatively, the last task card displays ongoing task cards of a plurality of lite devices controlled by the PC device. Alternatively, the last task card displays a home screen application icon of the PC device. Alternatively, the user may pull up the task card of the PC device on the head unit. Alternatively, the user may create a cross-device split-screen/floating window on the head unit. Alternatively, after a task on the PC device is migrated to the head unit, hardware capability allocation may be performed on the head unit and the PC device according to a hardware usage rule in the foregoing examples. This is not limited in this application.

Example 56: FIG. 12(*c*)-1 and FIG. 12(*c*)-2 are a schematic diagram of displaying, on a PC device (a target device), a historical task card of P40 (a source device) used by a user. As shown in FIG. 12(*c*)-1 and FIG. 12(*c*)-2, the user may perform an operation on the task card of P40 on the PC device. In this embodiment of this application, the operation may be an operation in any one of the foregoing examples, so that the user can remotely manage and control a task of P40 on the PC device.

Optionally, when the historical task card of P40 is displayed on the PC device, any display manner or display rule in the foregoing examples may also be used. For example, the last task card displays a home screen snapshot of P40, and an FA card exists on the home screen snapshot. Alternatively, the last task card displays a first home screen snapshot of P40, and may slide horizontally to switch to display a second home screen snapshot of P40. The user may tap an application icon on the home screen snapshot, to open an application on the PC device. Alternatively, the last task card displays a home screen snapshot of P40 and a floating window. Alternatively, the last task card displays a home screen snapshot of P40 and a floating bubble. Alternatively, the last task card displays ongoing task cards of a plurality of lite devices controlled by P40. Alternatively, the last task card displays a home screen application icon of P40. Alternatively, the user may pull up the task card of P40 on the PC device. Alternatively, the user may create a cross-device split screen/floating window on the PC device. Alternatively, after a task on P40 is migrated to the PC device, hardware capability allocation may be performed on the PC device and P40 according to the hardware usage rules in the foregoing examples. This is not limited in this application.

Optionally, in embodiments of this application, in addition to performing any one of the solutions in the foregoing examples between two devices, remote task management and control may also be performed on more devices (for example, three or four devices) by using a task card on a recent tasks screen. The following provides description based on specific examples.

Figure 13A:
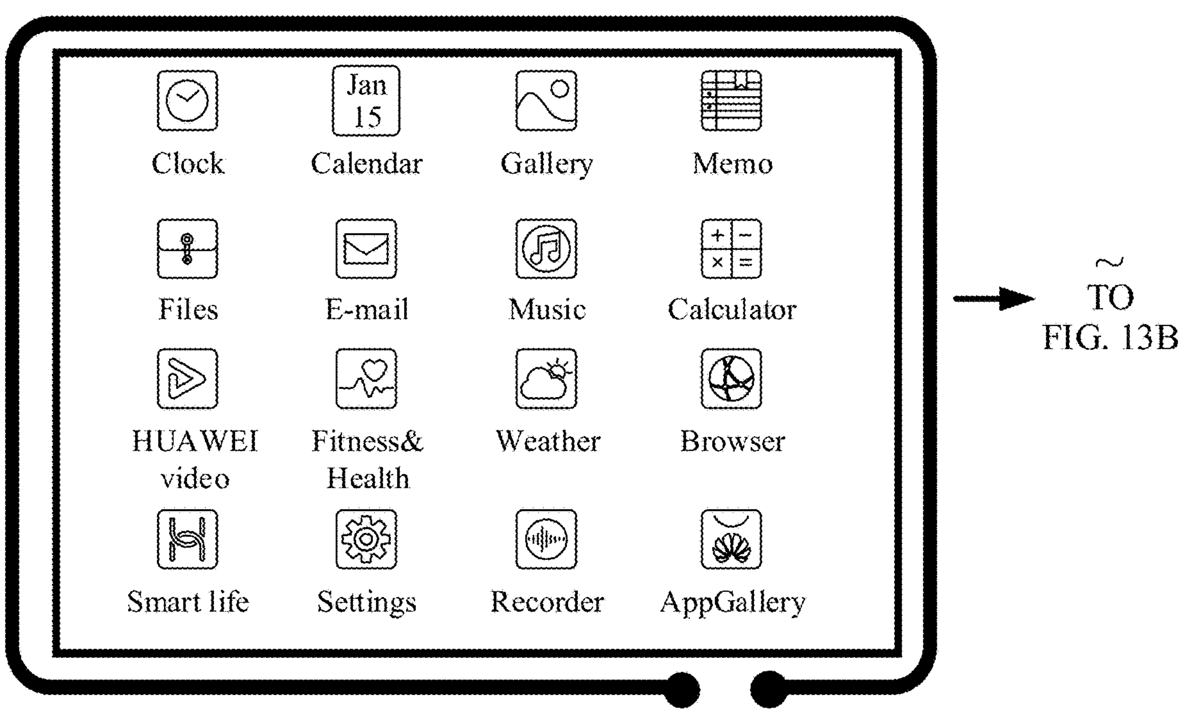
FIG. 13A to FIG. 13C are a schematic diagram of interfaces for migrating a task card of a first terminal to a third terminal on a recent tasks screen of a second terminal according to this application.
Figure 13B:
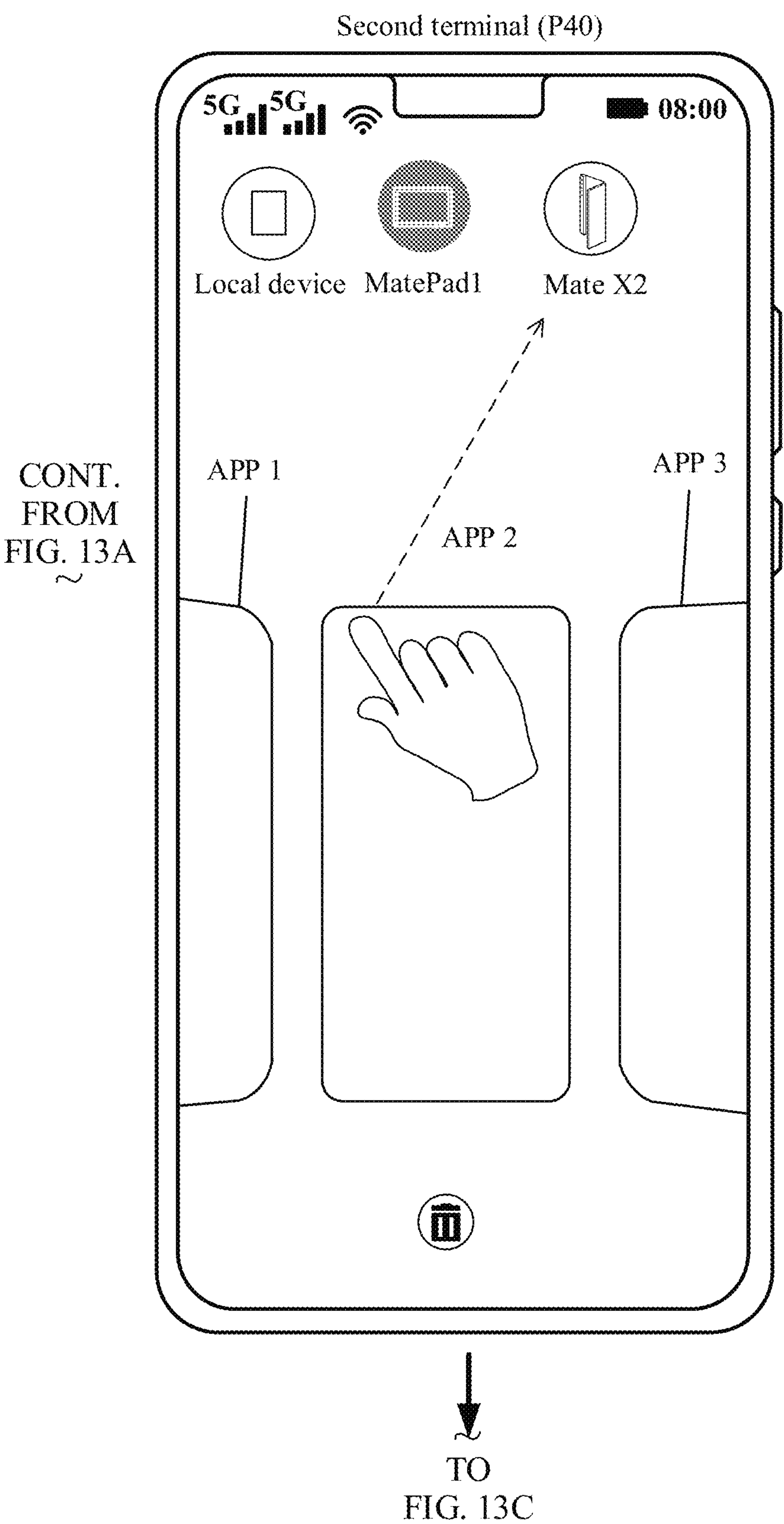
Figure 13C:
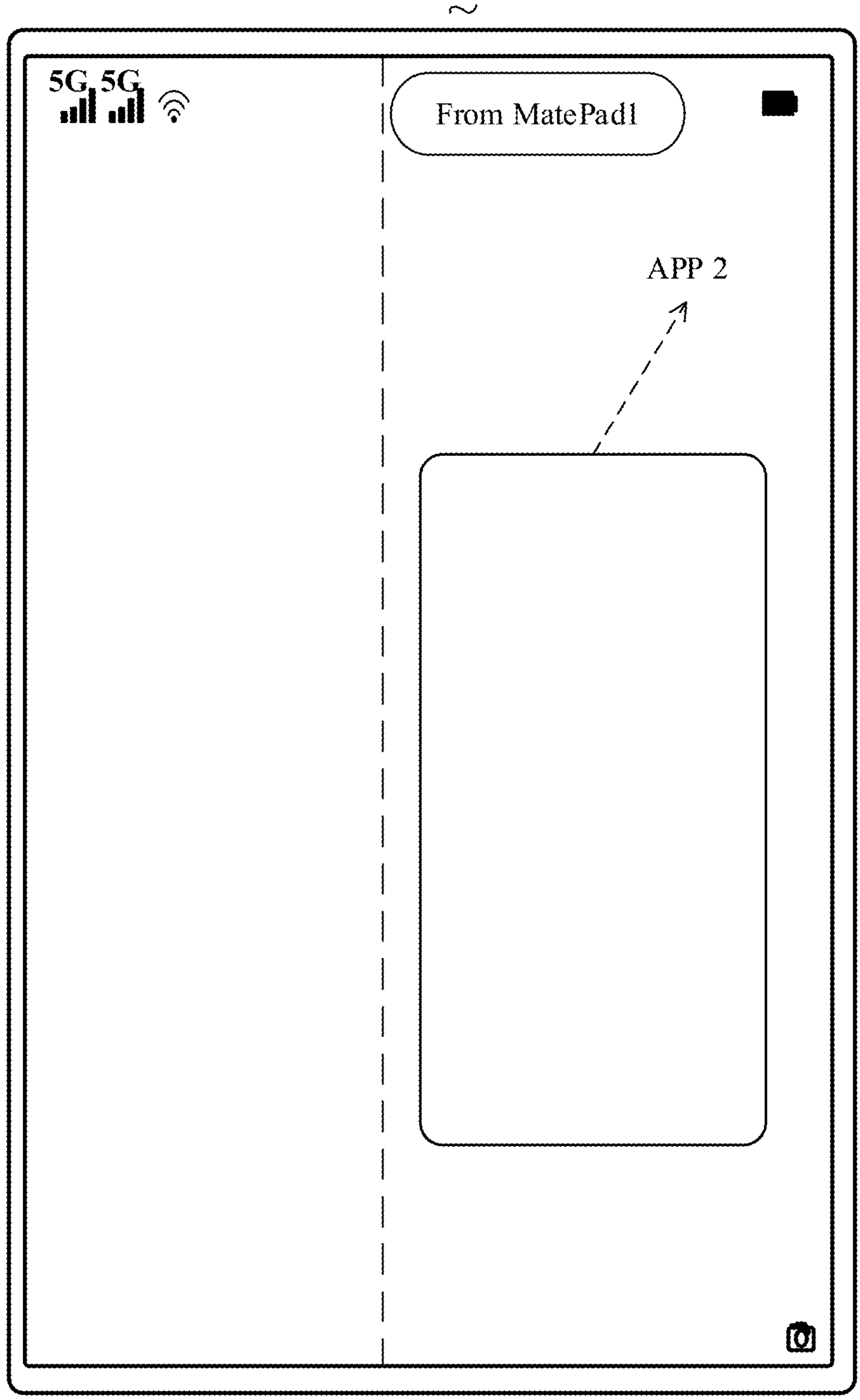
Figures 1, 14A:
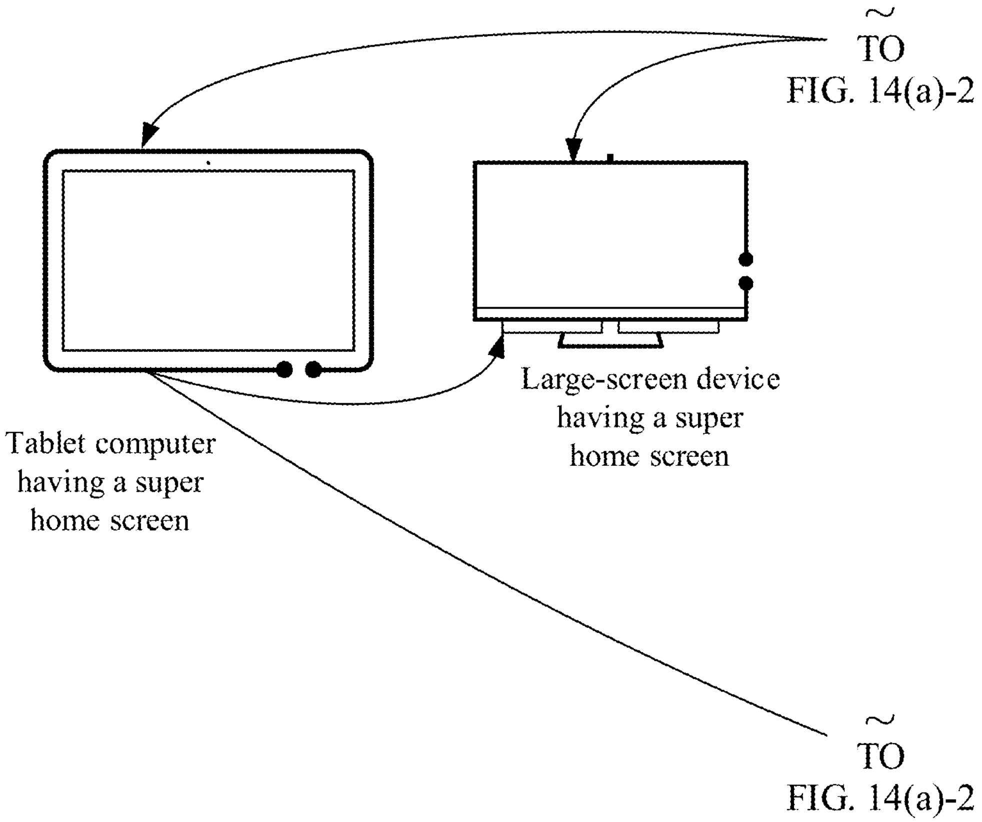
Figures 2, 14A:
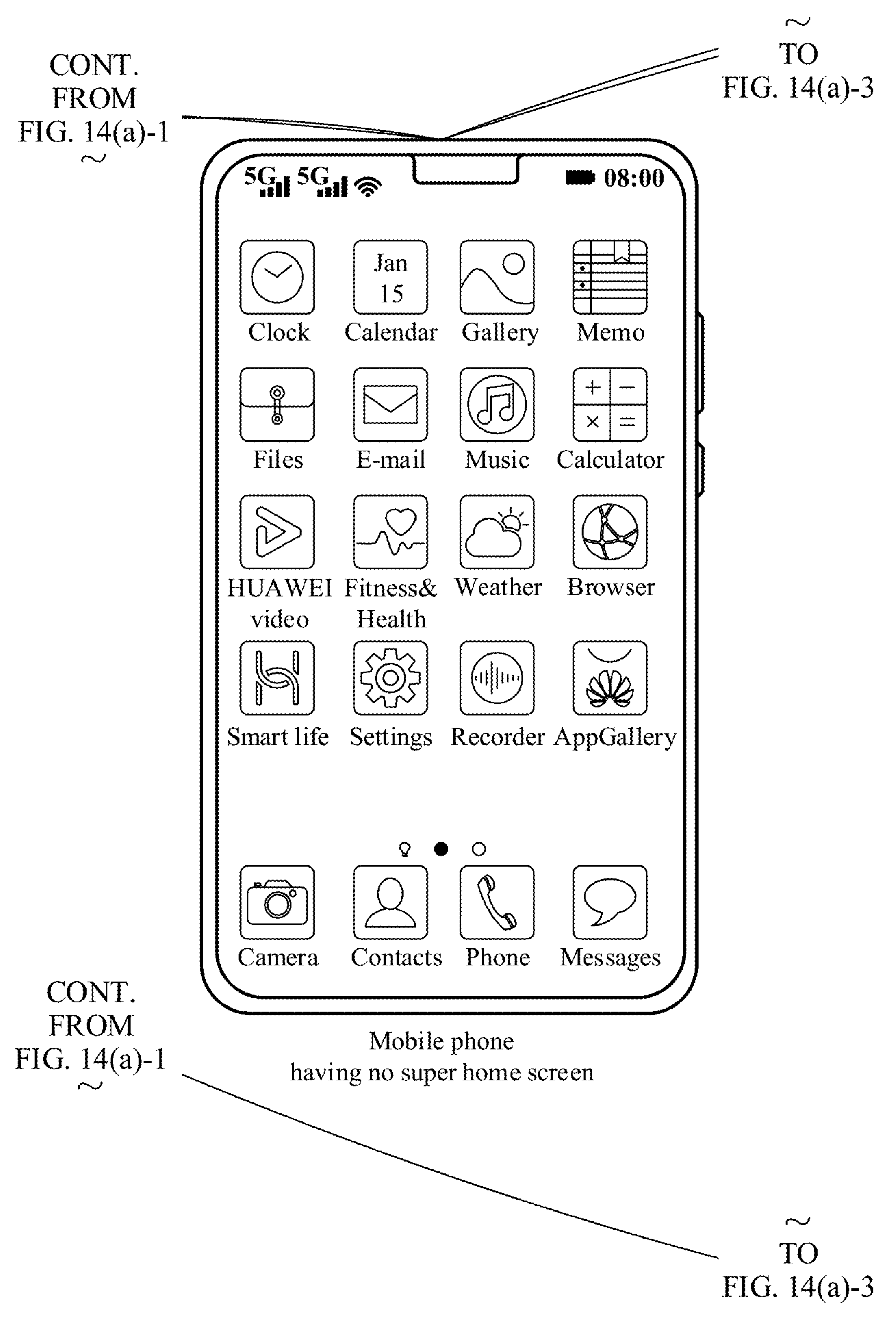
Figure 14A:
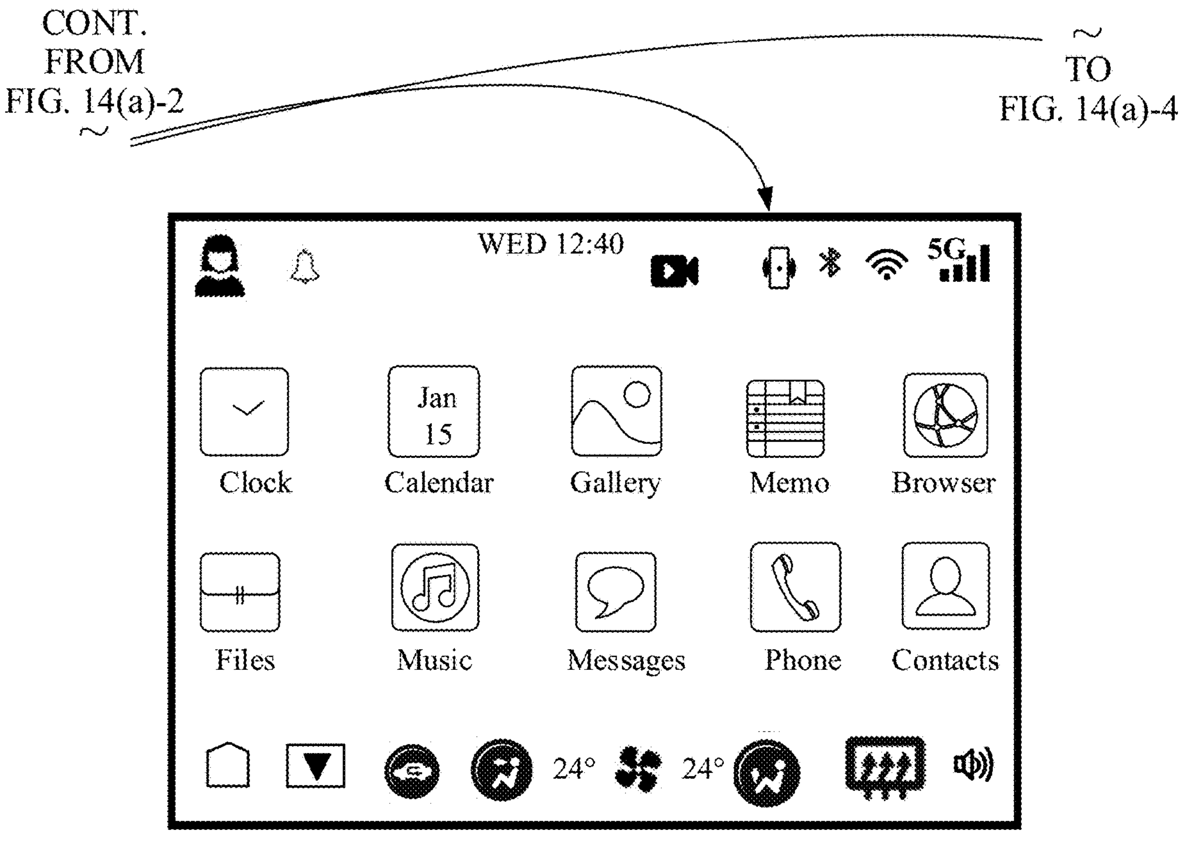
FIG. 14(*a*)-1 to FIG. 14(*s*) are schematic diagrams of interfaces of super home screens displayed on different devices according to this application.
Figure 3:
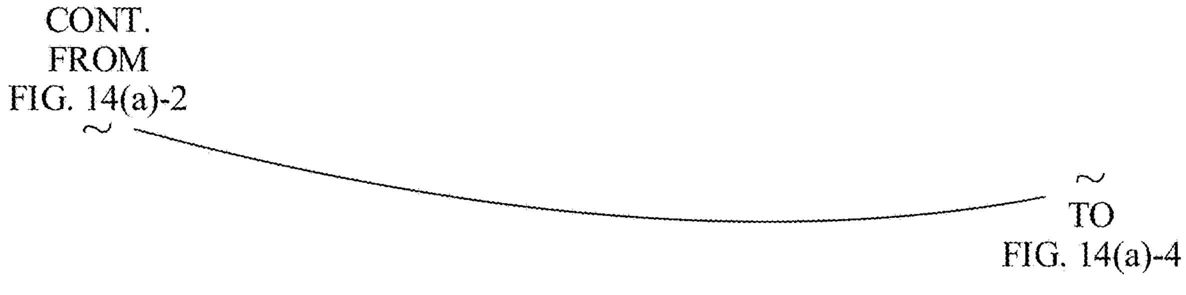
Figures 4, 14A:
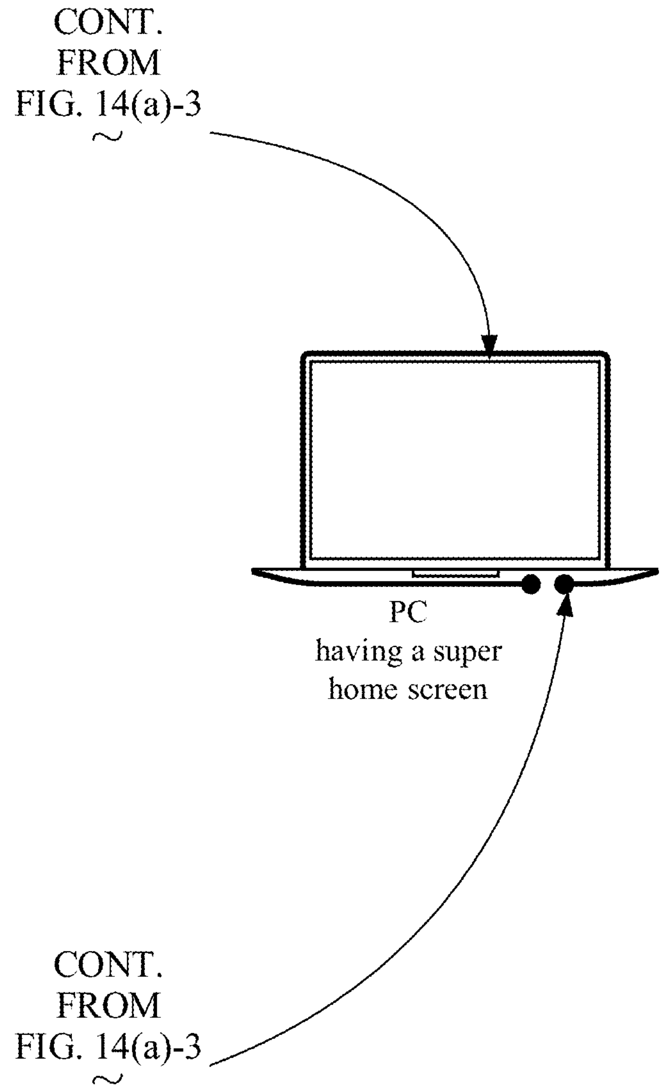
Figure 14B:
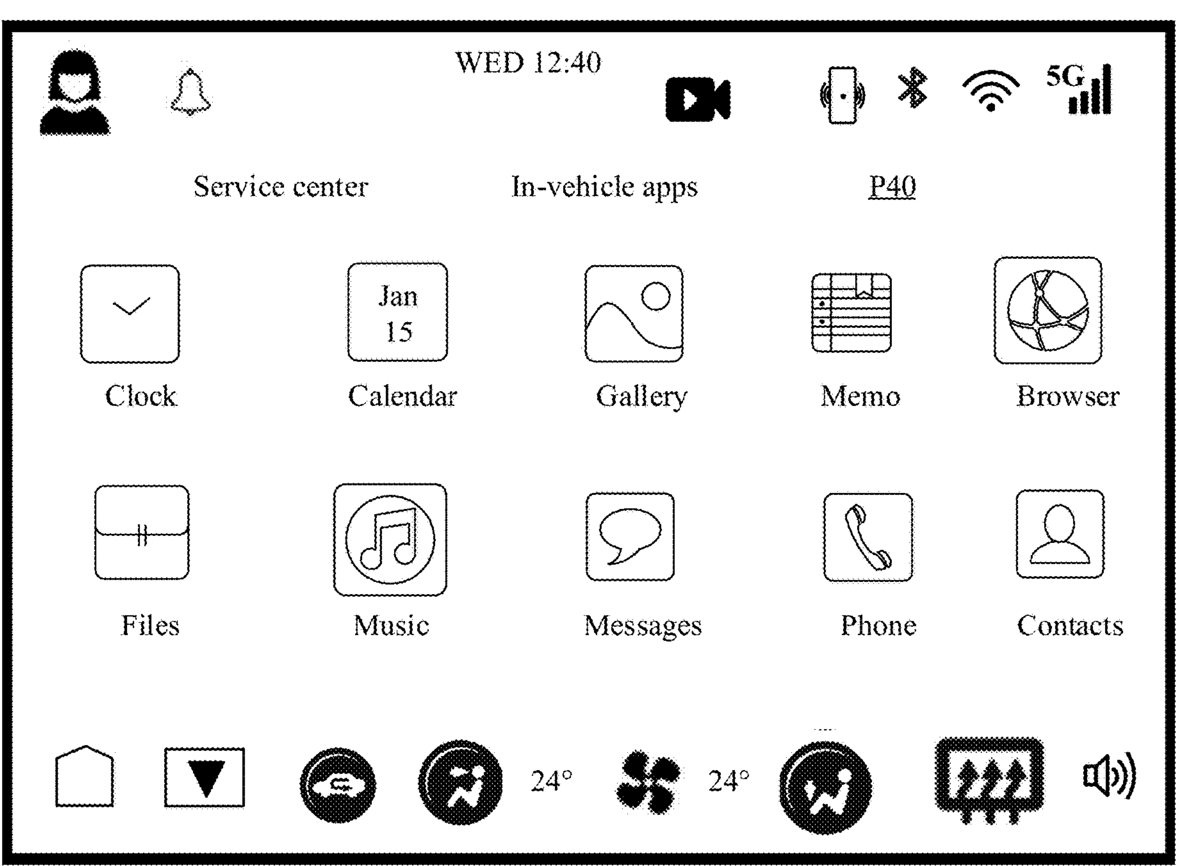
Figure 14C:
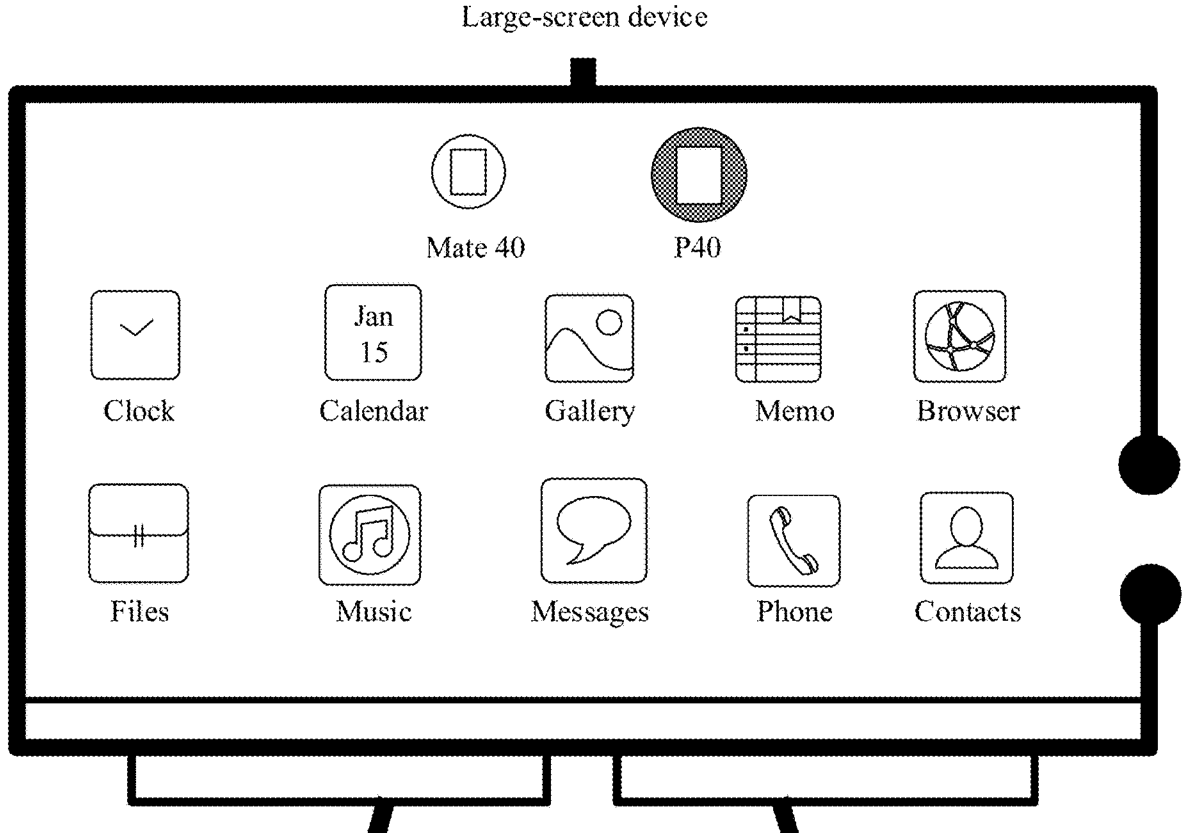
Figure 14D:
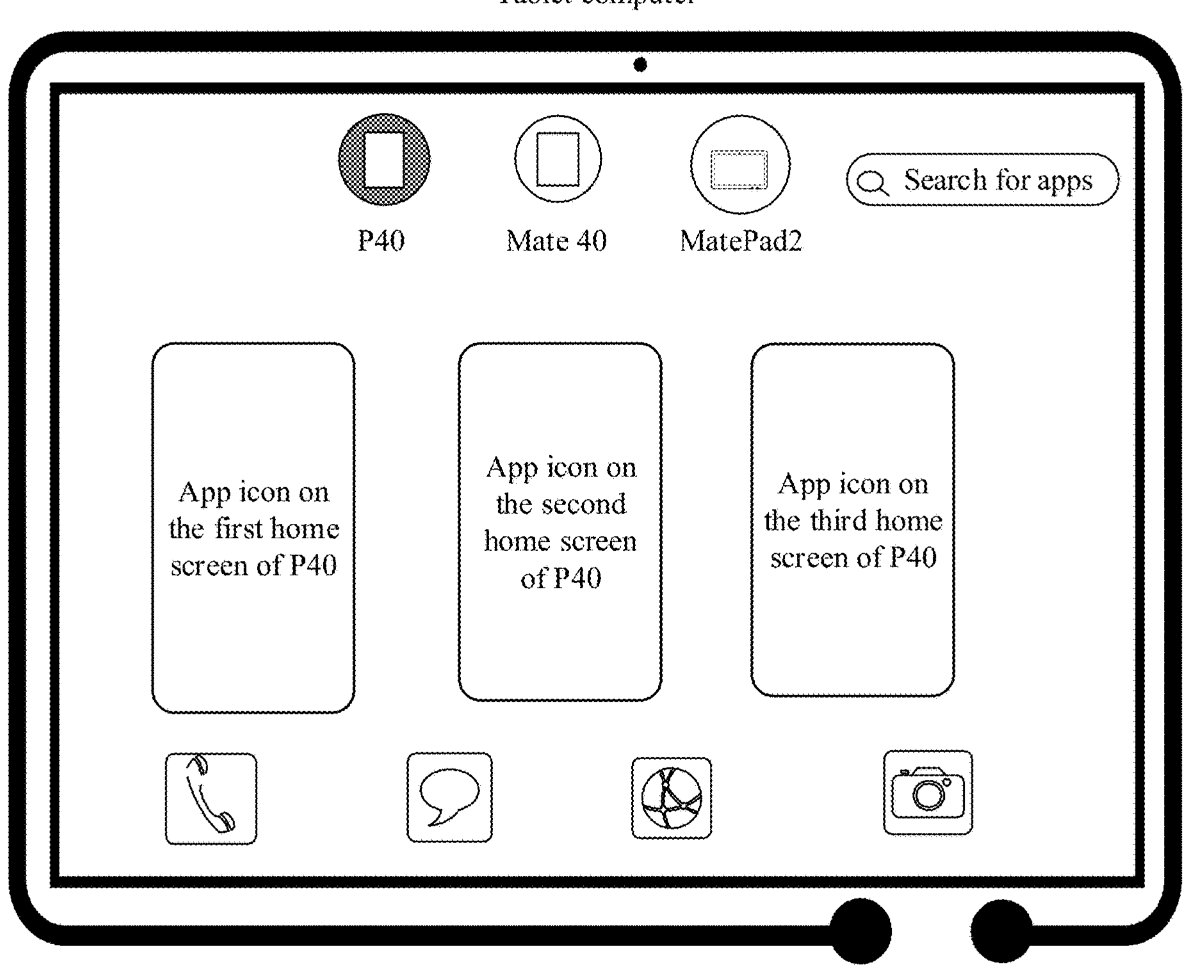
Figure 14E:
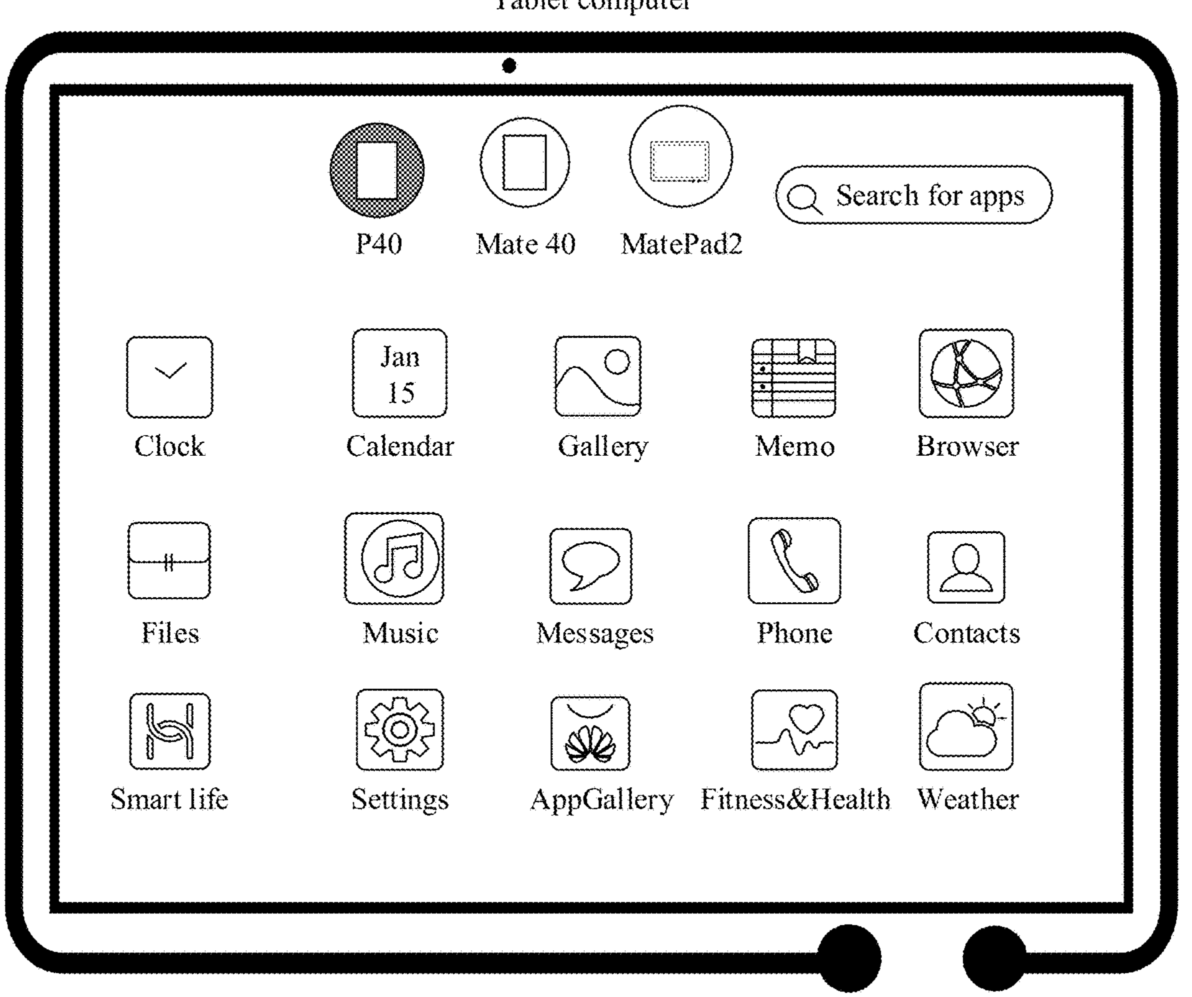
Figure 14F:
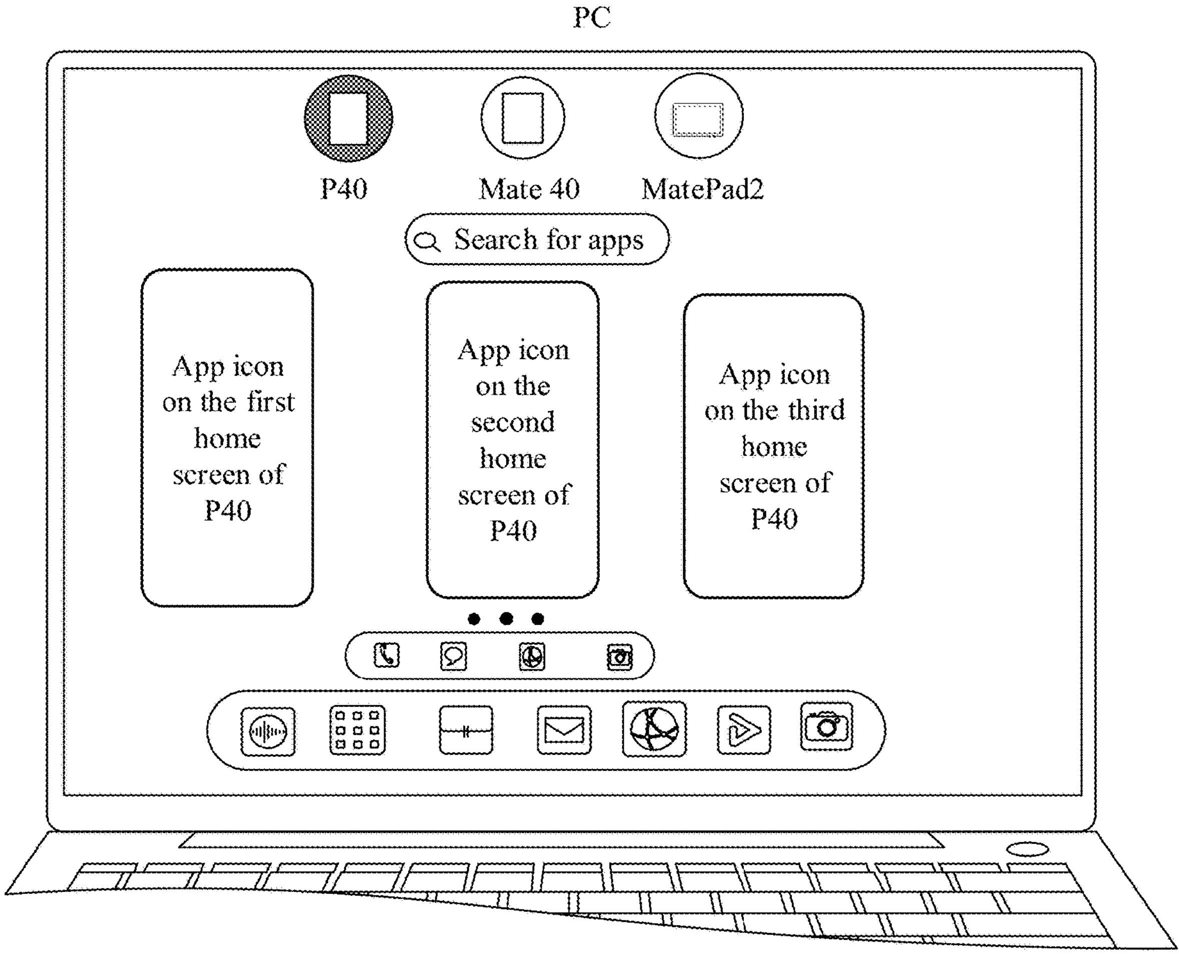
Figure 14G:
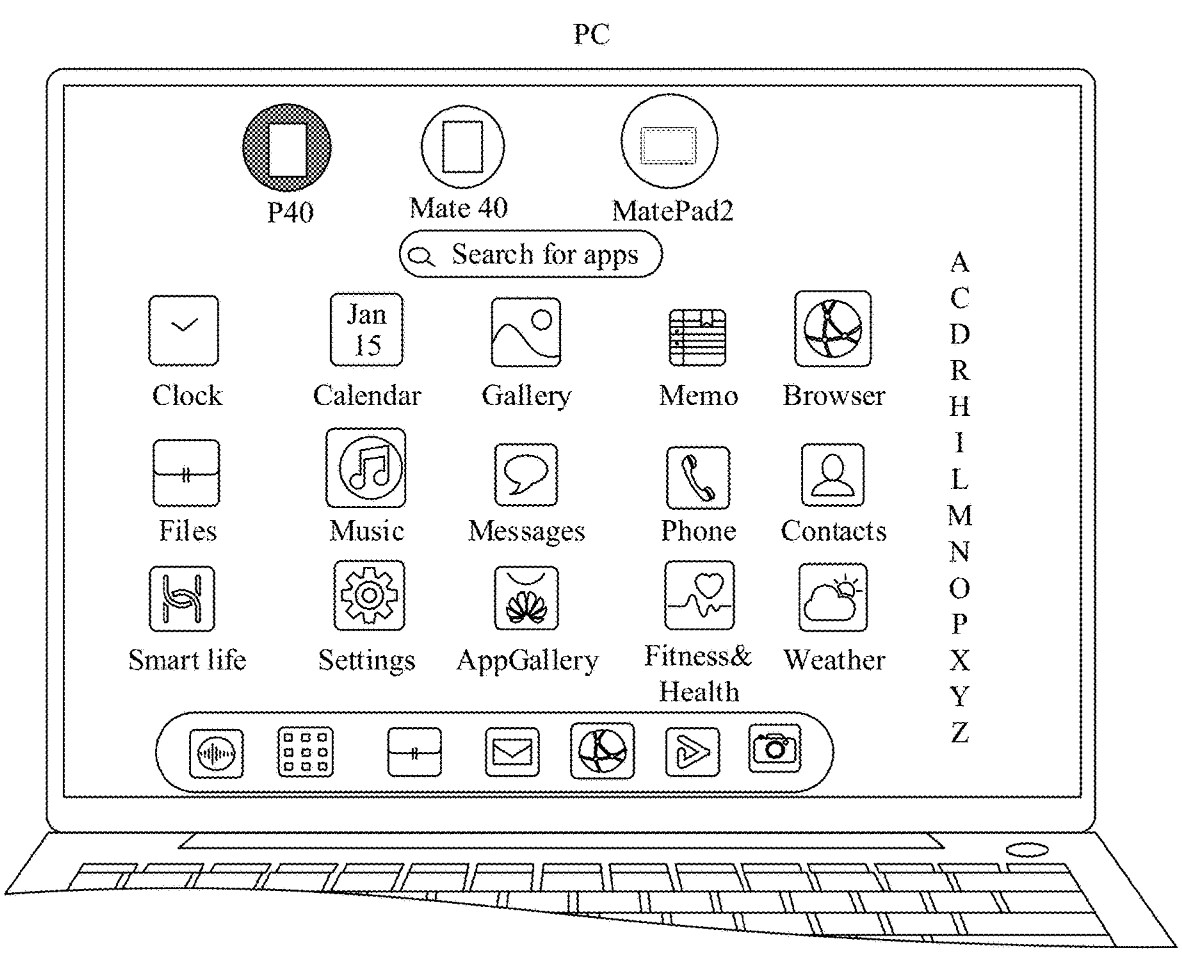
Figure 14H:
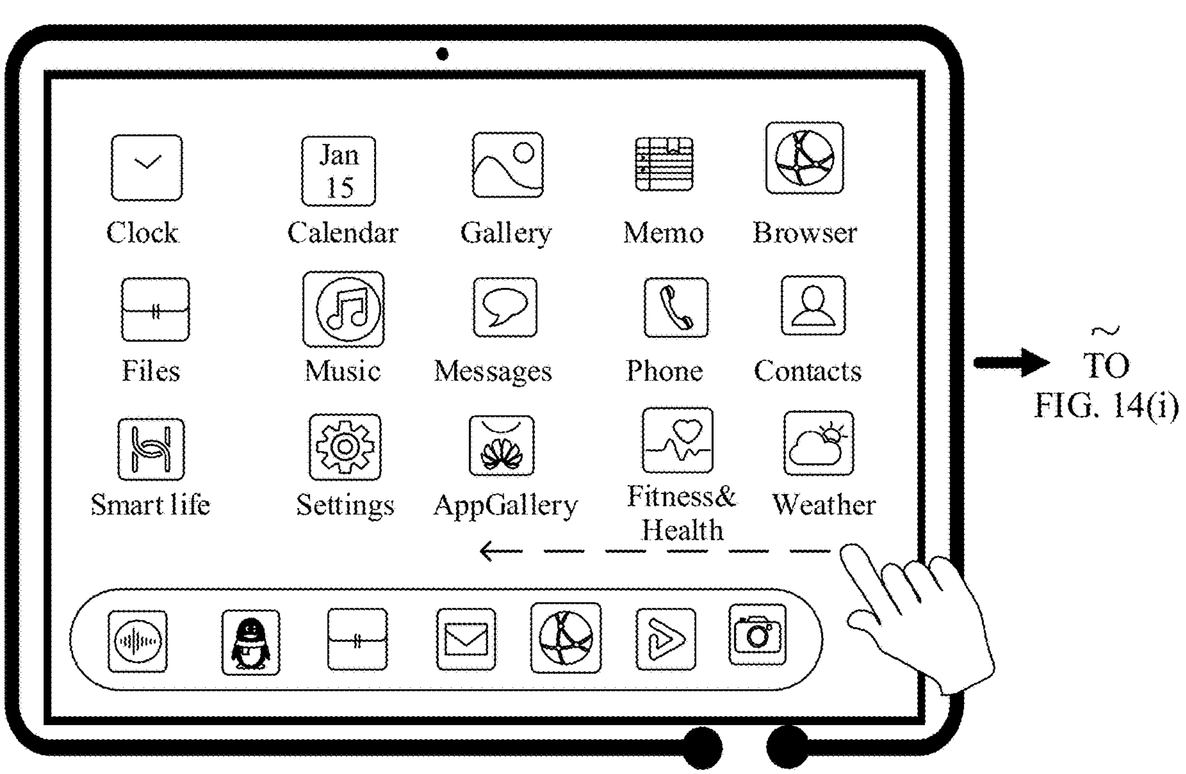
Figure 14I:
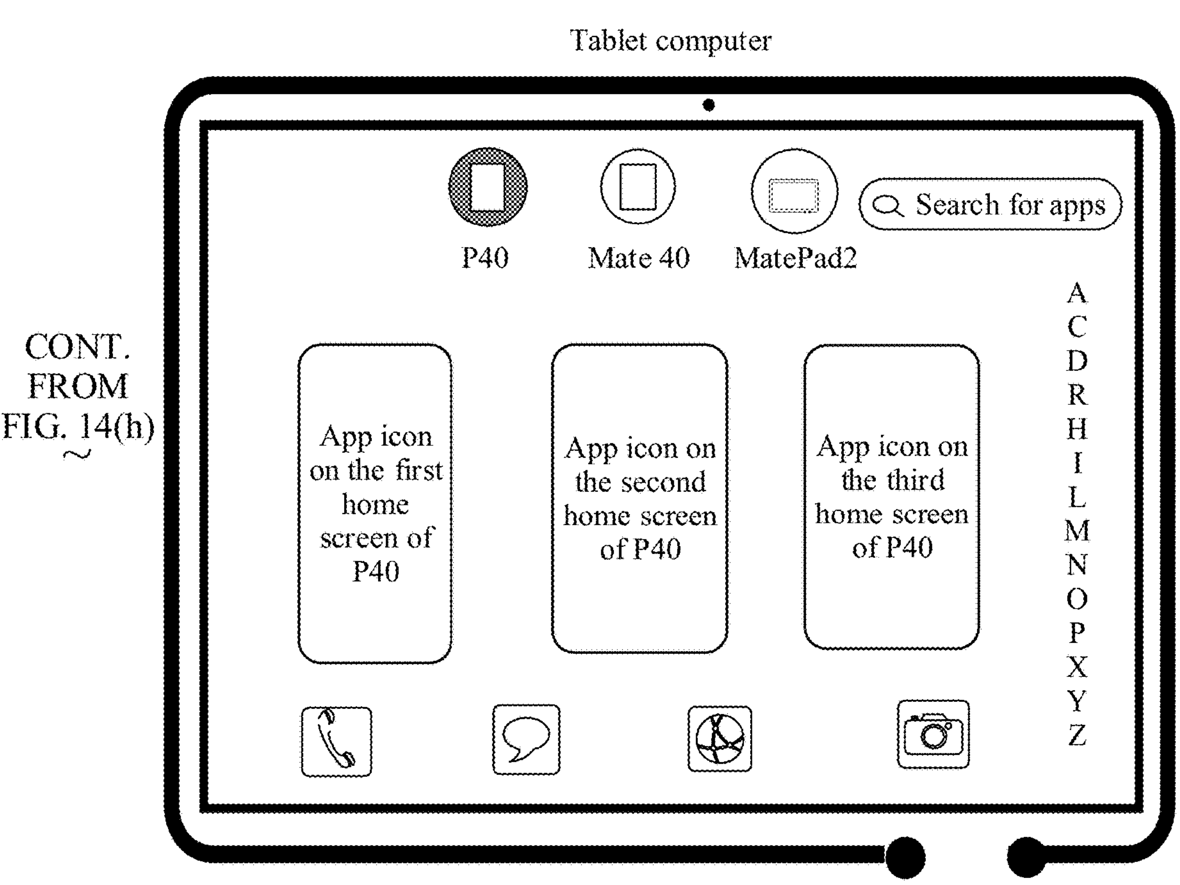
Figure 14J:
Figure 14J:
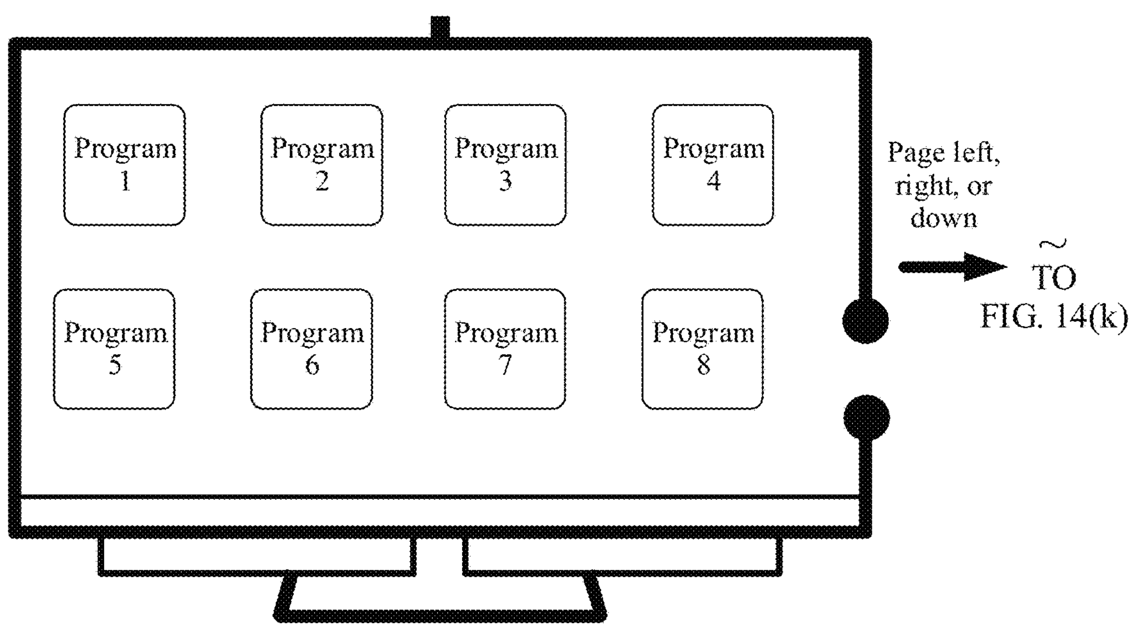
Figure 14K:
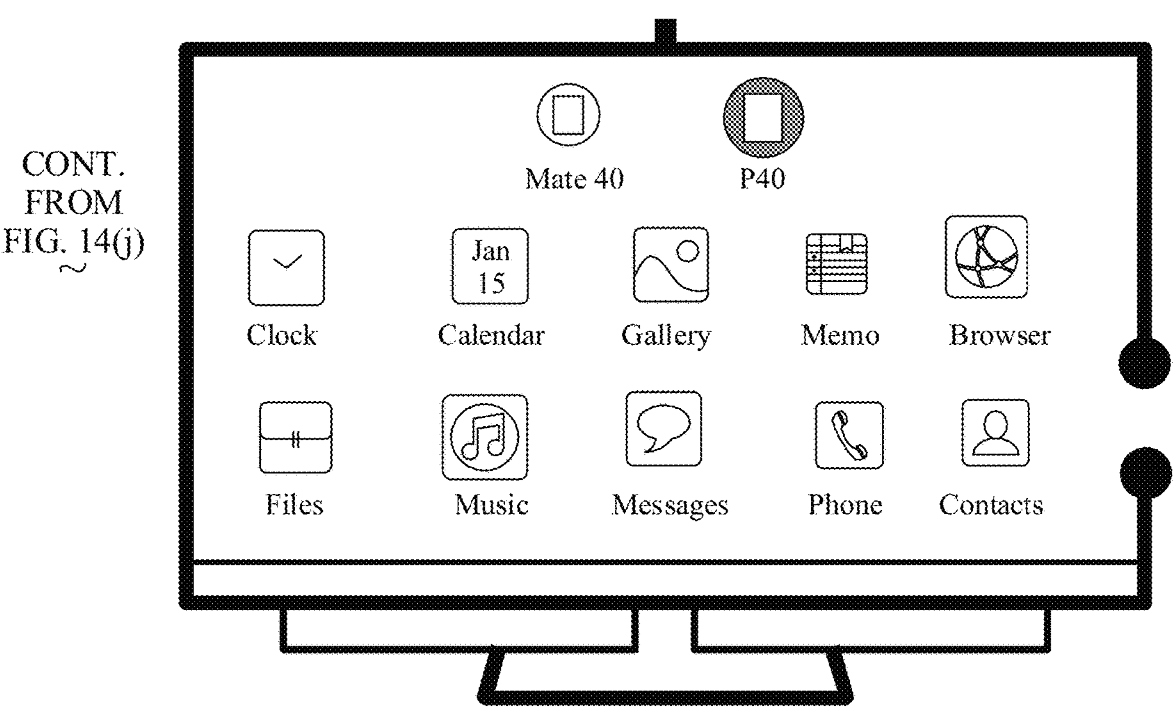
Figure 14L:
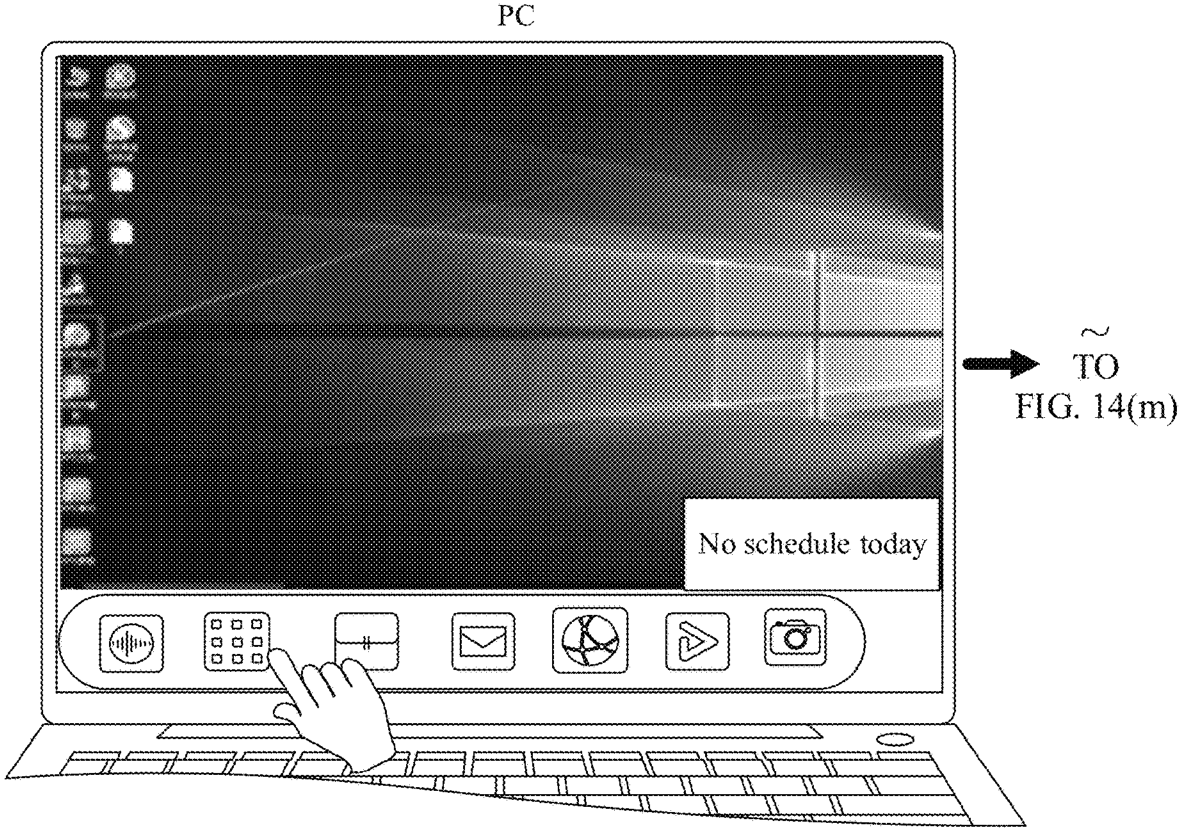
Figure 14M:
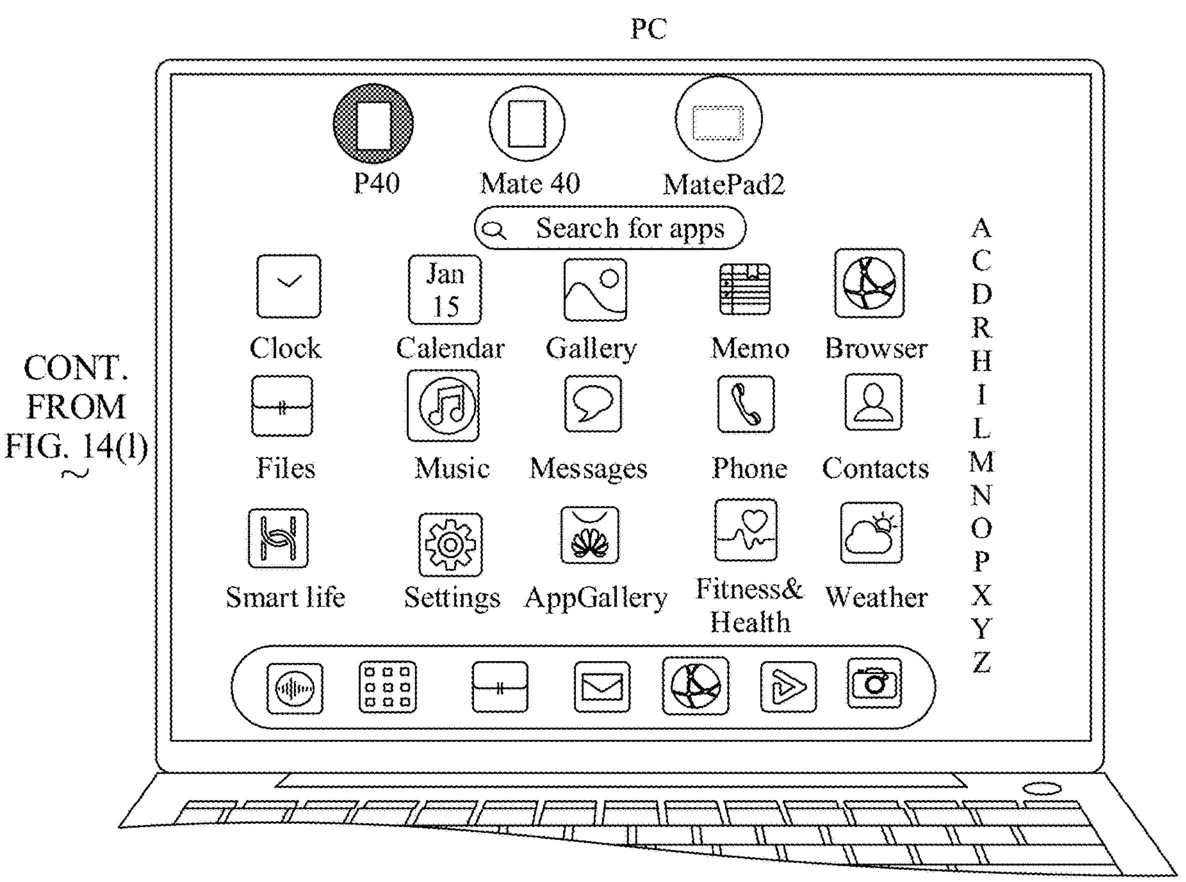
Figure 14N:
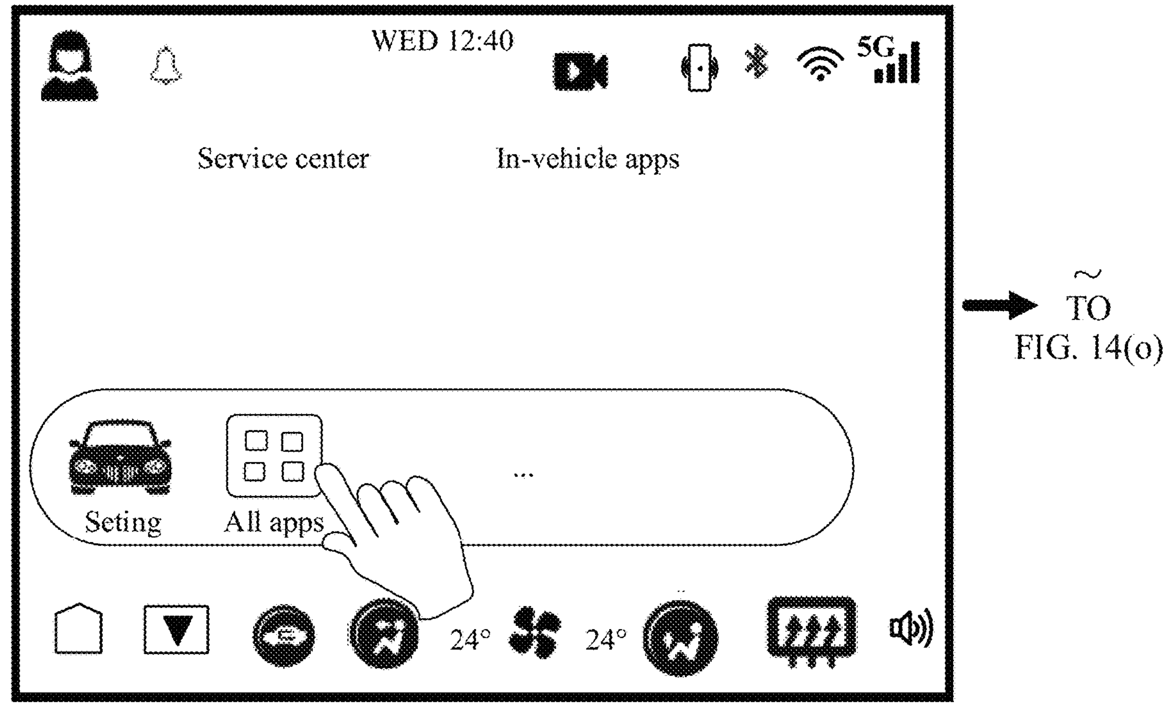
Figure 14O:
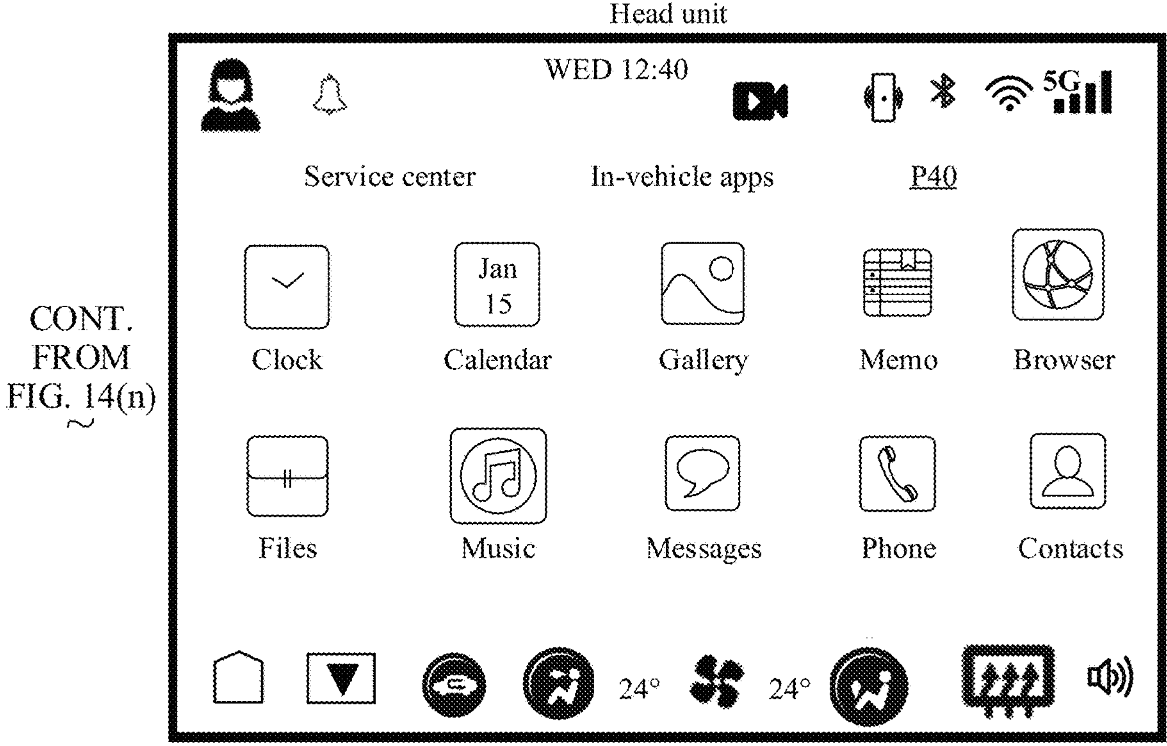
Figure 14P:
Figure 14P:
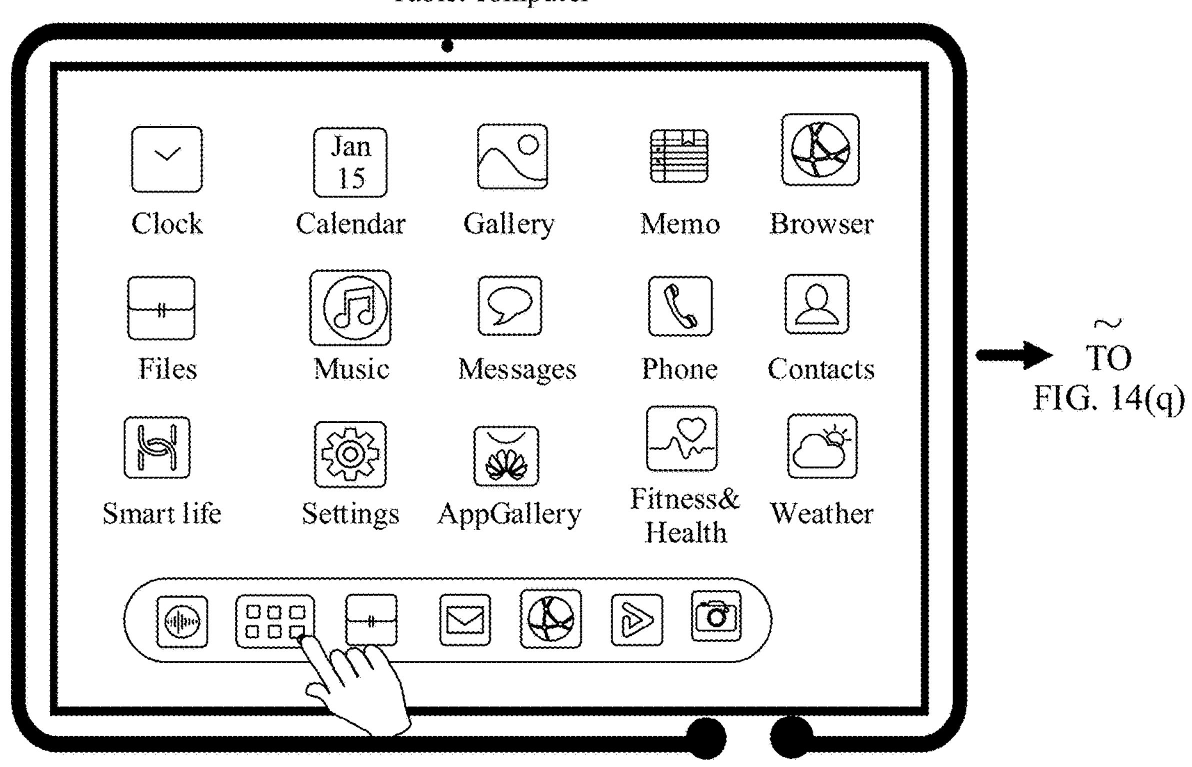
Figure 14Q:
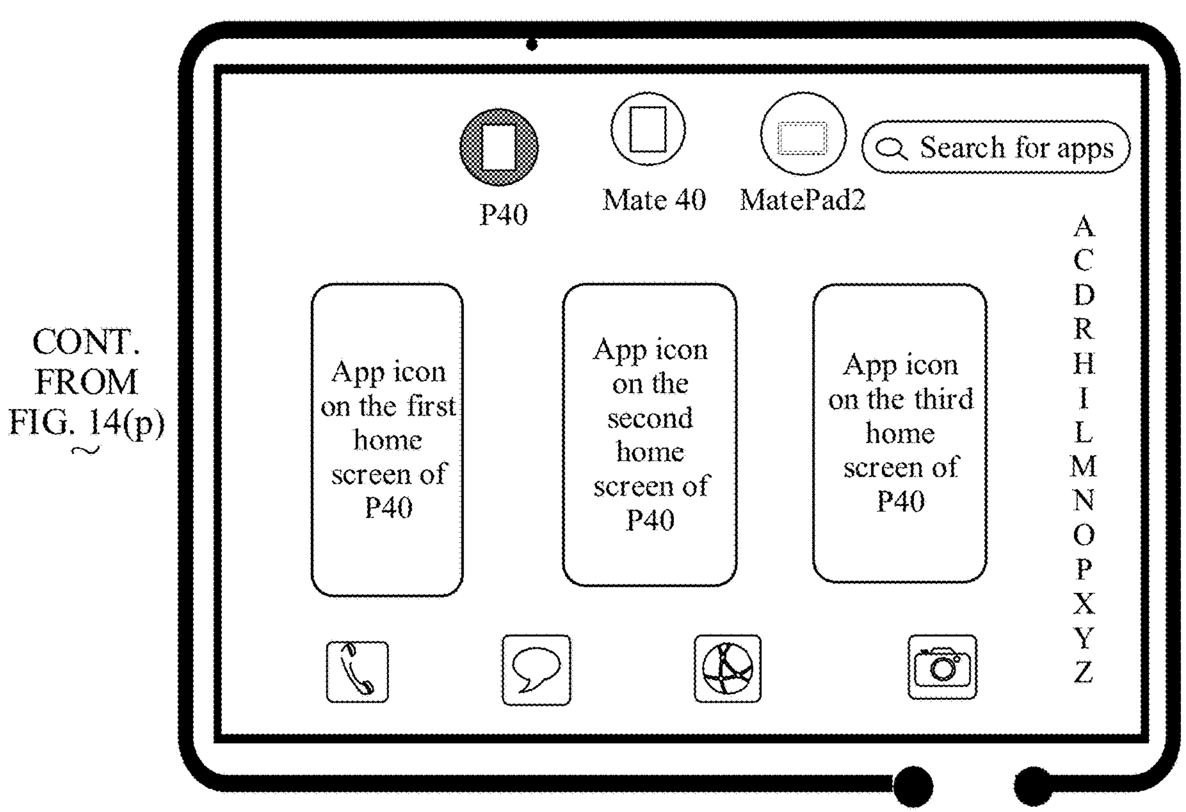
Figure 14R:
Figure 14R:
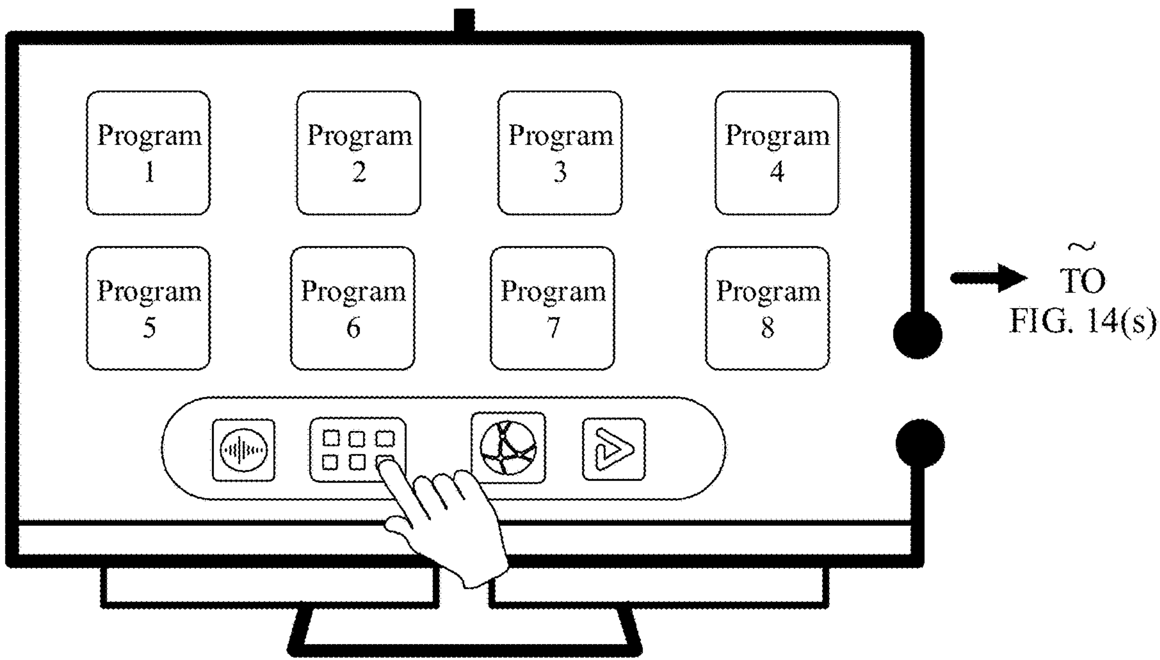
Figure 14S:
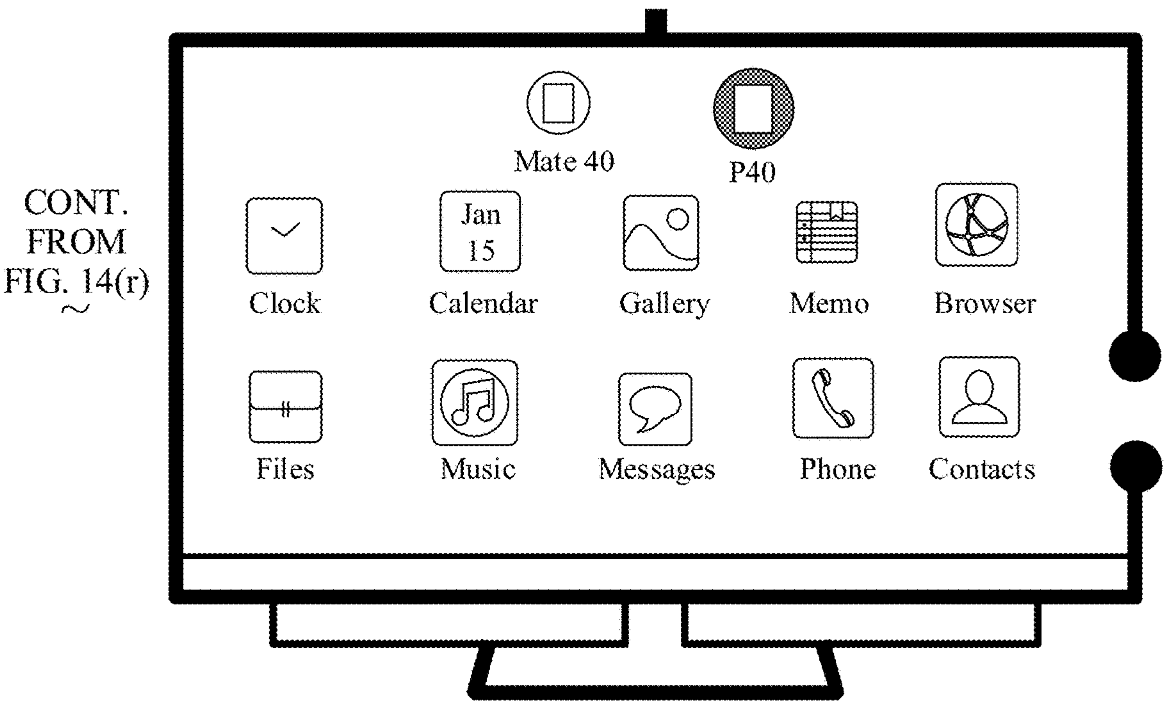
Figure 15A:
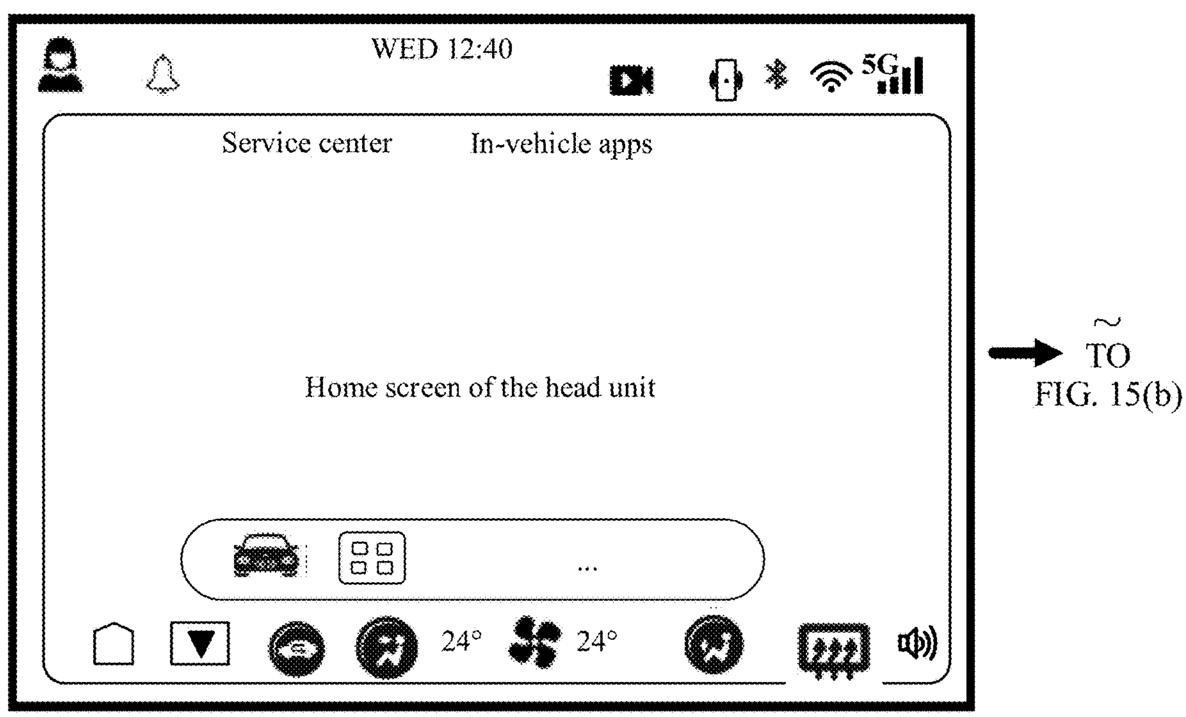
FIG. 15(*a*) to FIG. 15(*g*) are schematic diagrams of interfaces of entries and layouts of super home screens displayed on different devices according to this application.
Figure 15B:
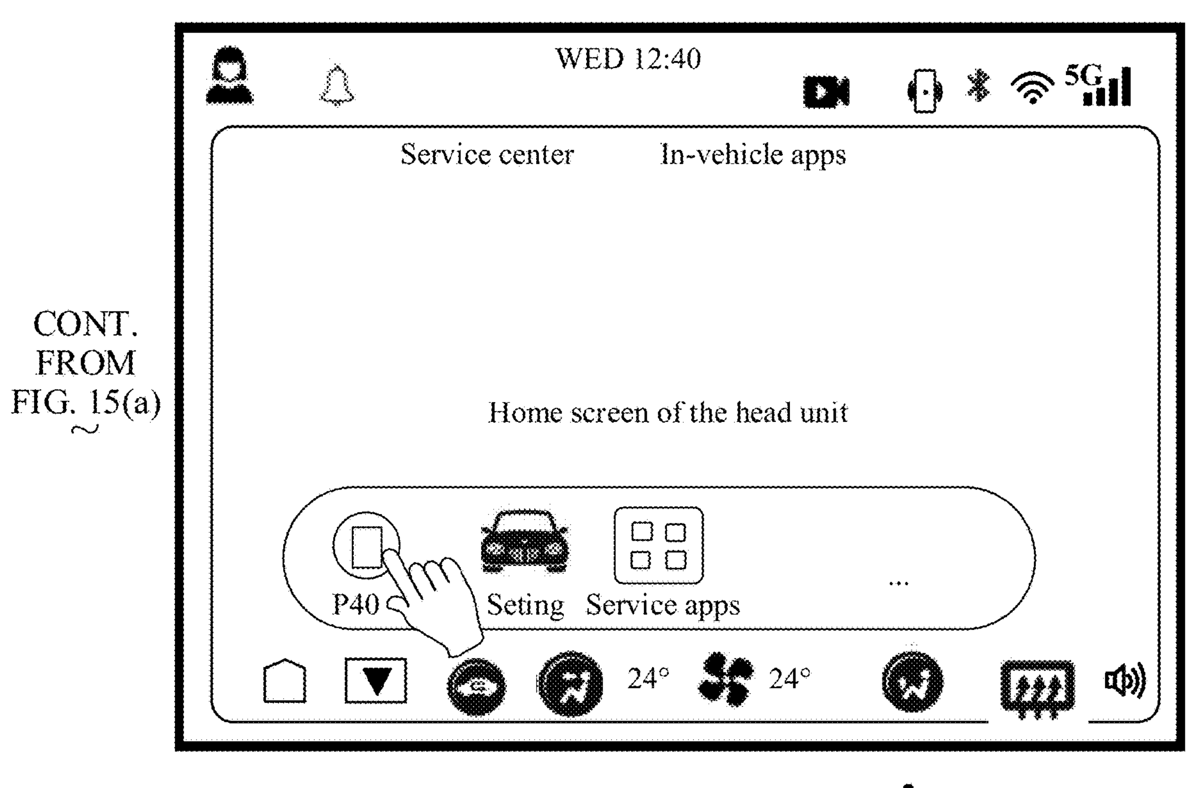
Figure 15B:
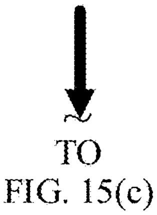
Figure 15C:
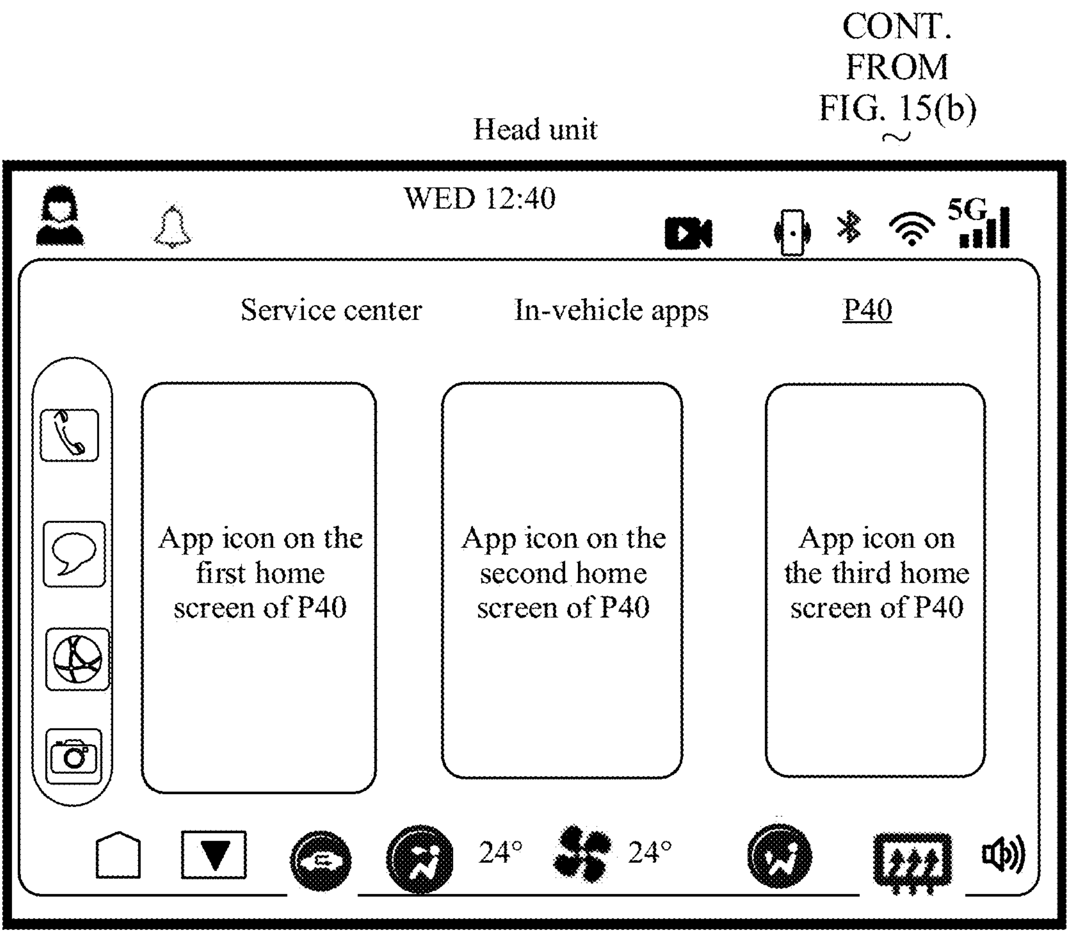
Figure 15D:
Figure 15D:
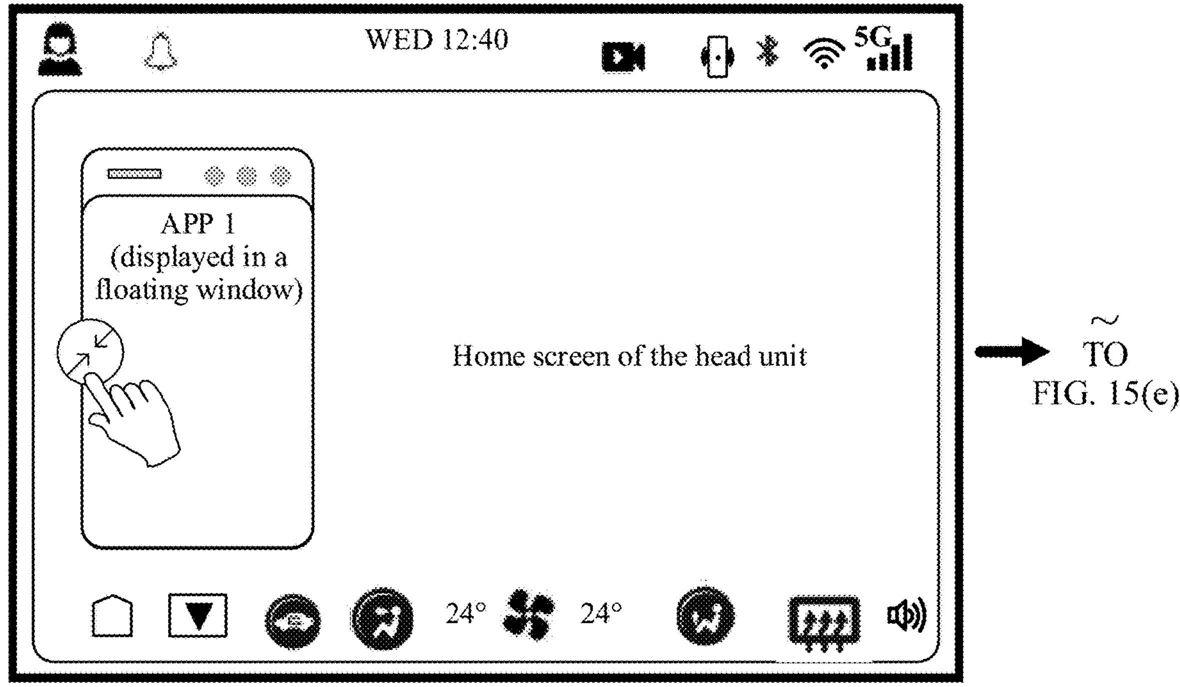
Figure 15E:
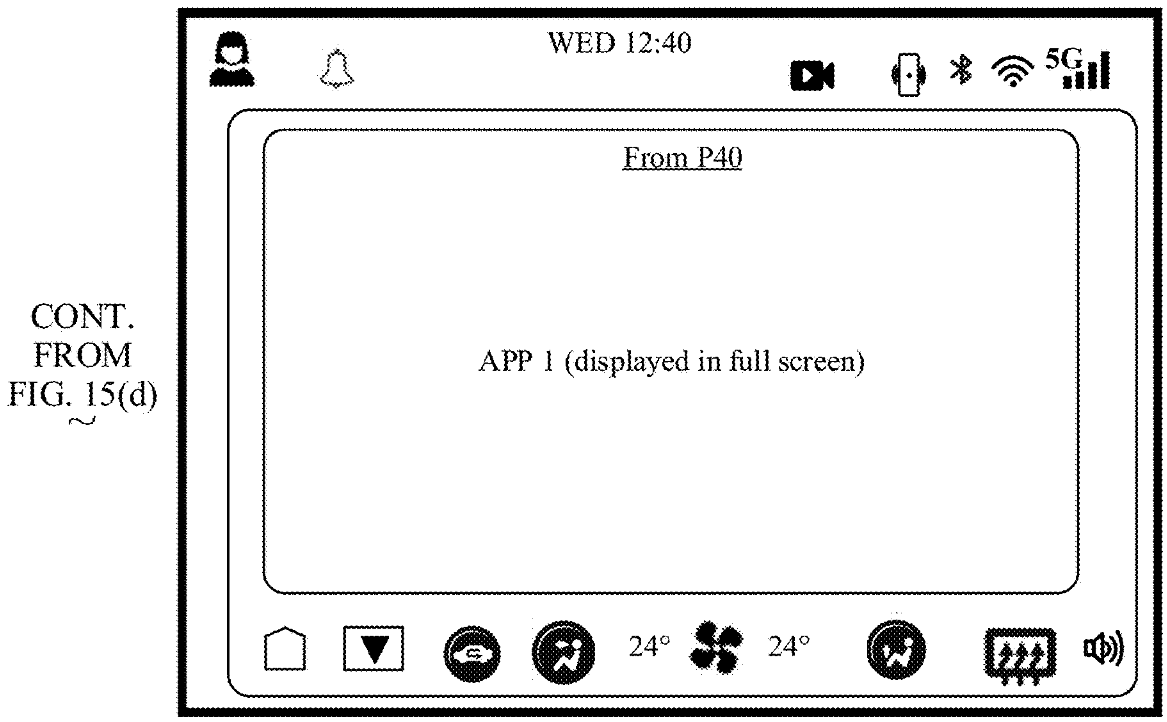
Figure 15F:
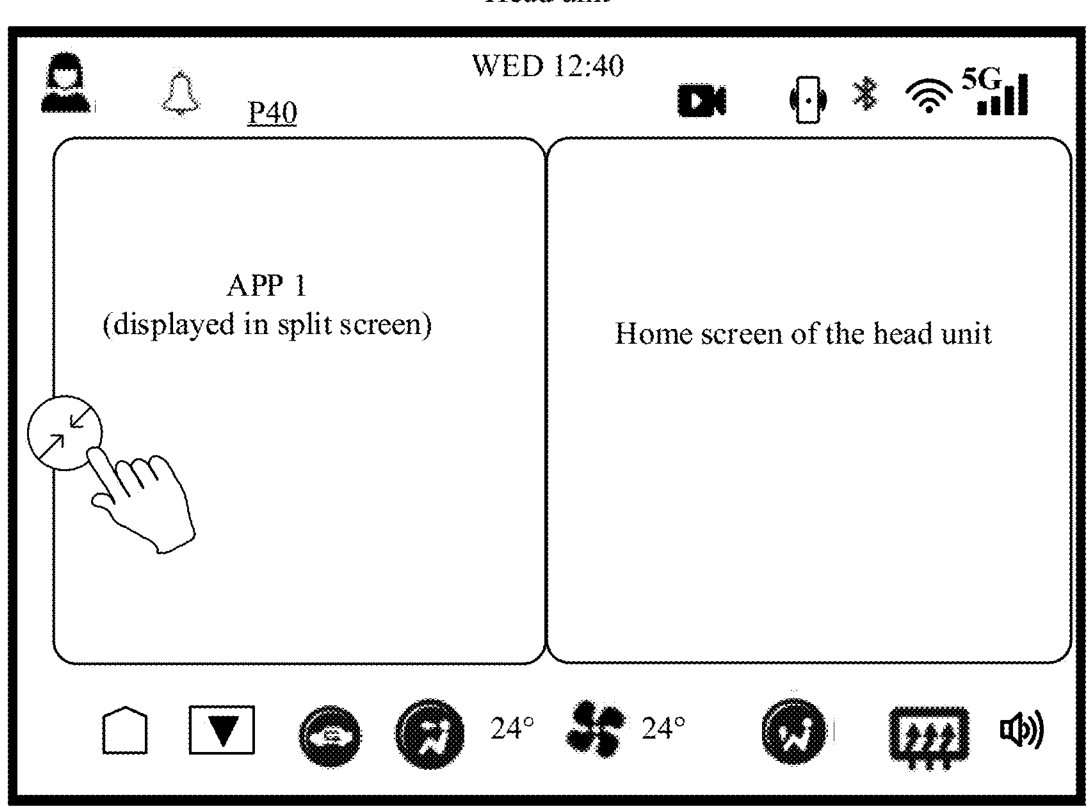
Figure 15G:
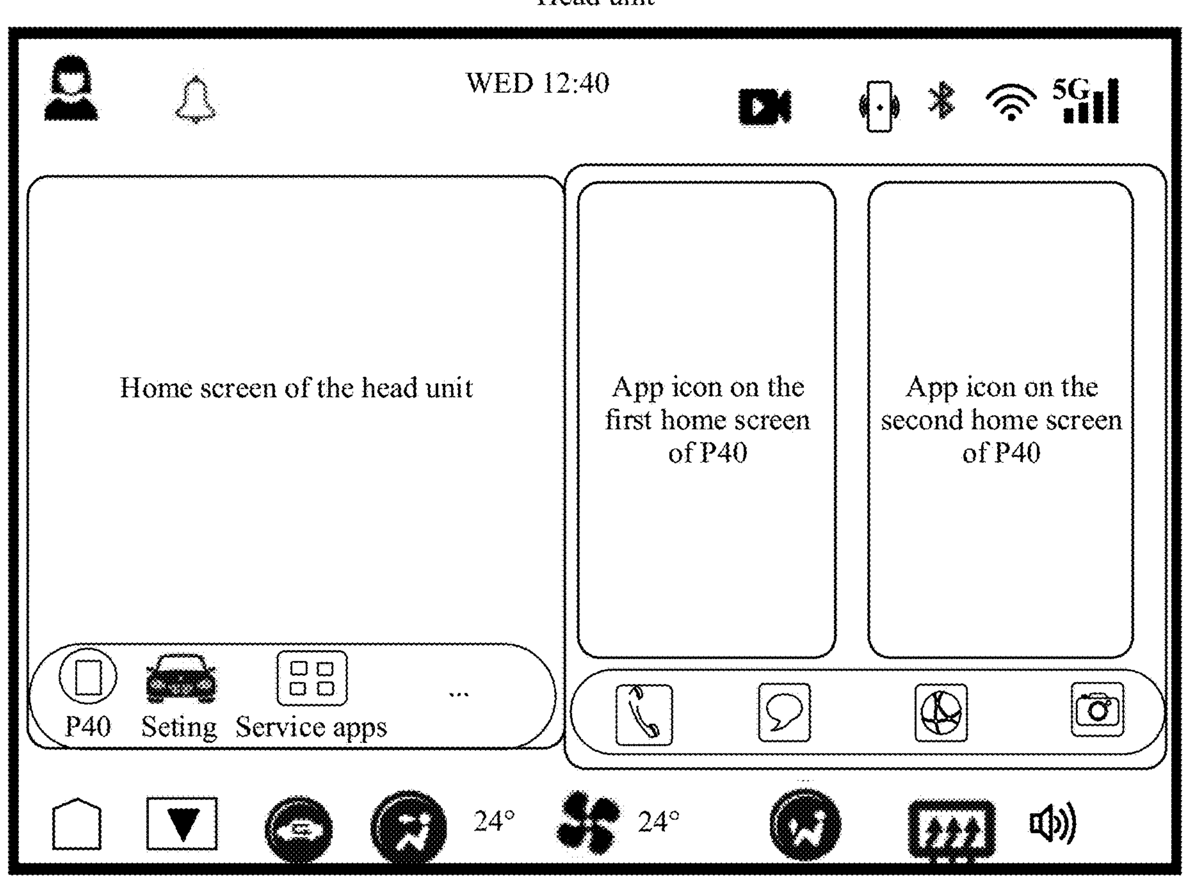
Figure 16A:
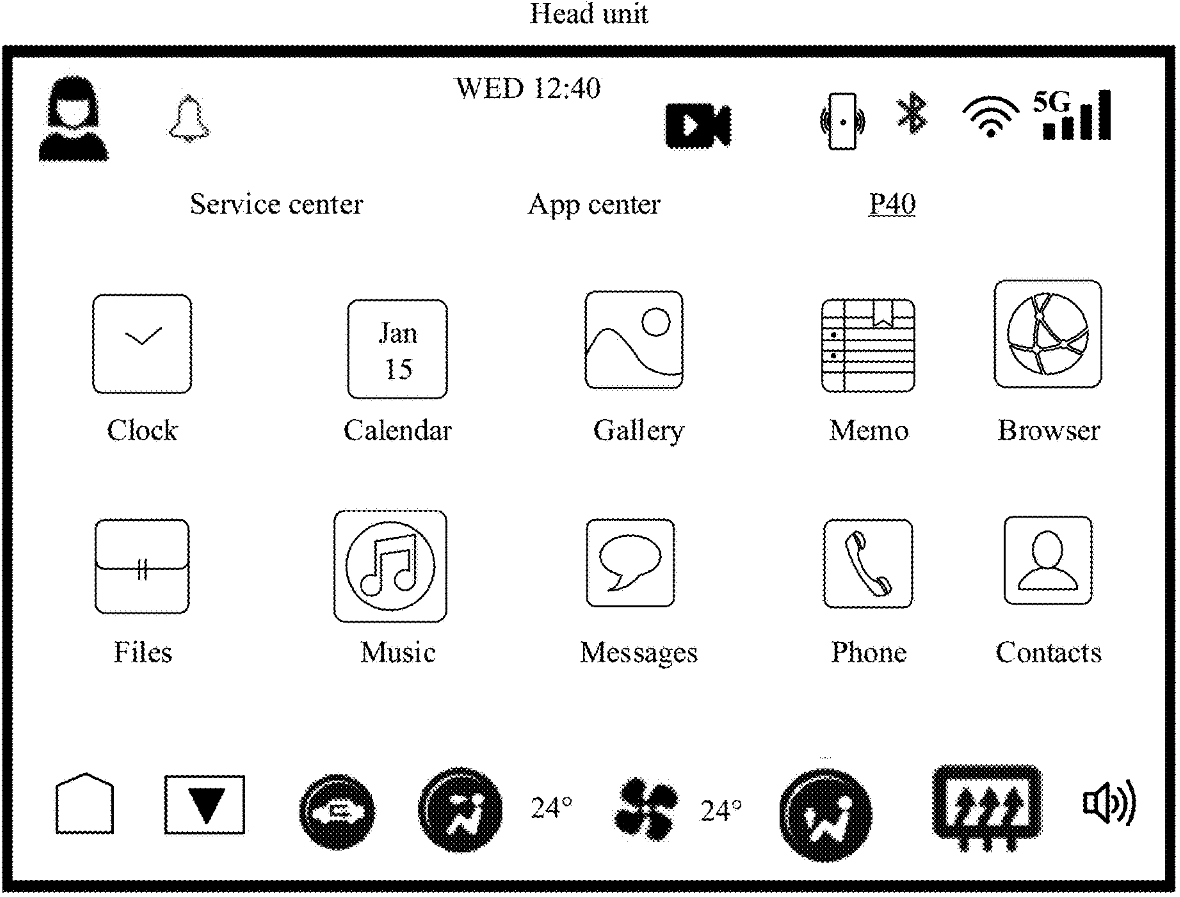
FIG. 16(*a*) to FIG. 16(*h*) are schematic diagrams of interfaces displayed by a terminal device in a process in which the terminal device temporarily establishes a super home screen according to this application.
Figure 16B:
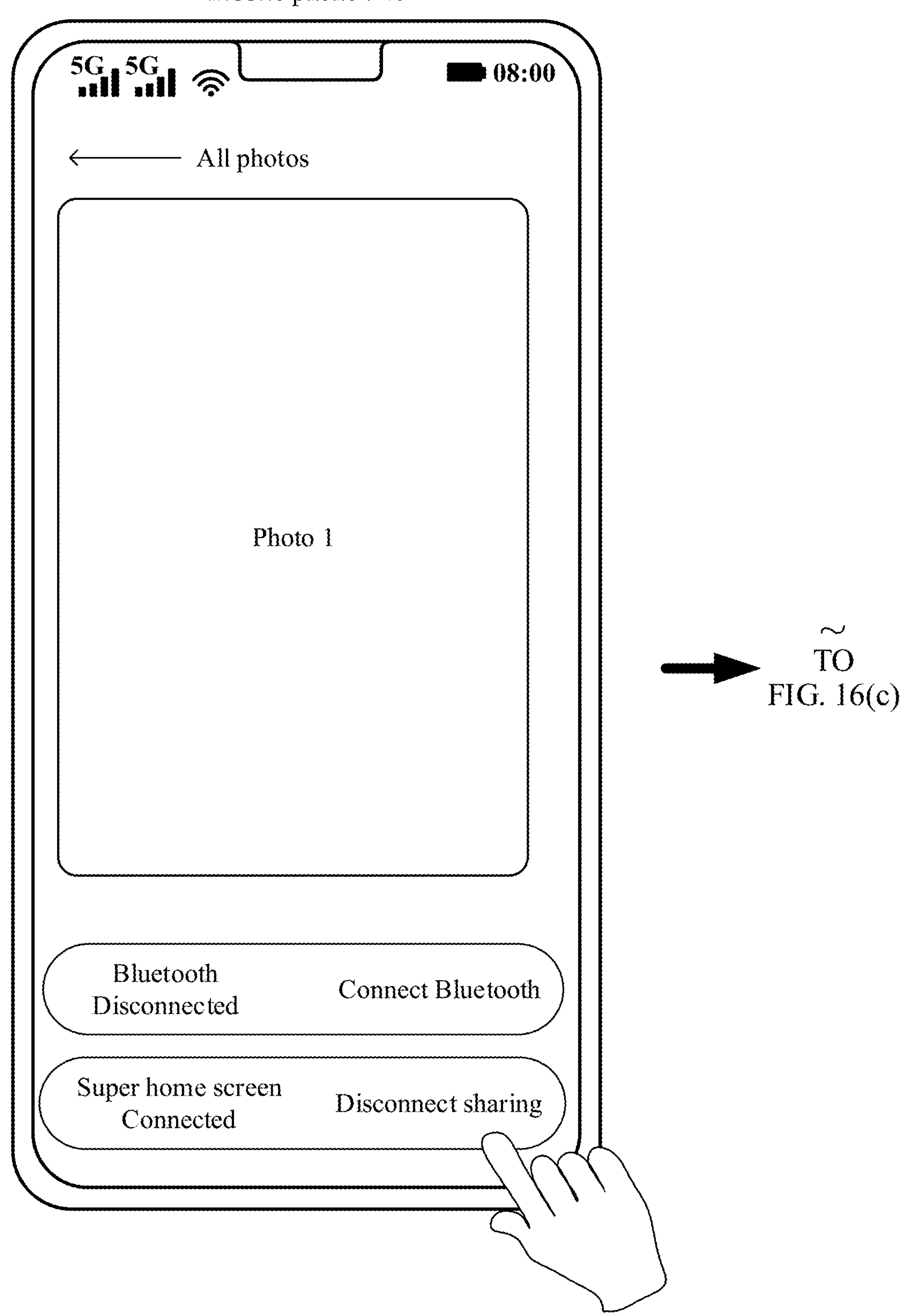
Figure 16C:
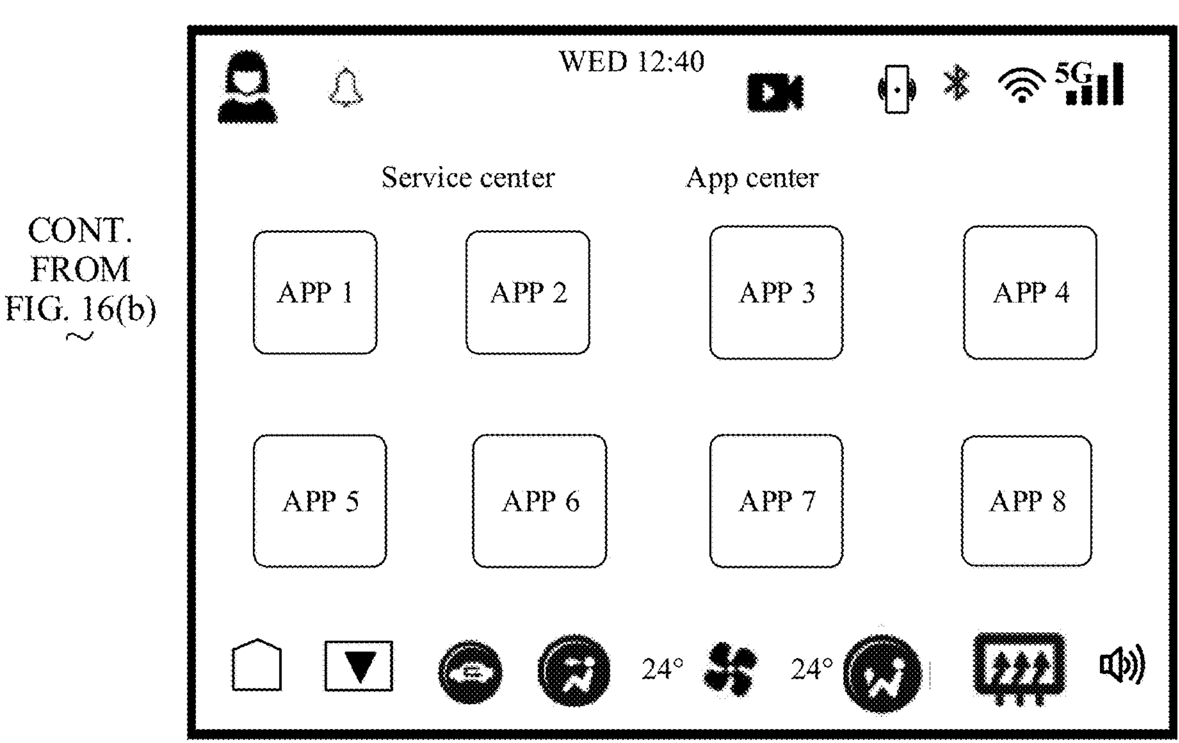
Figure 16D:
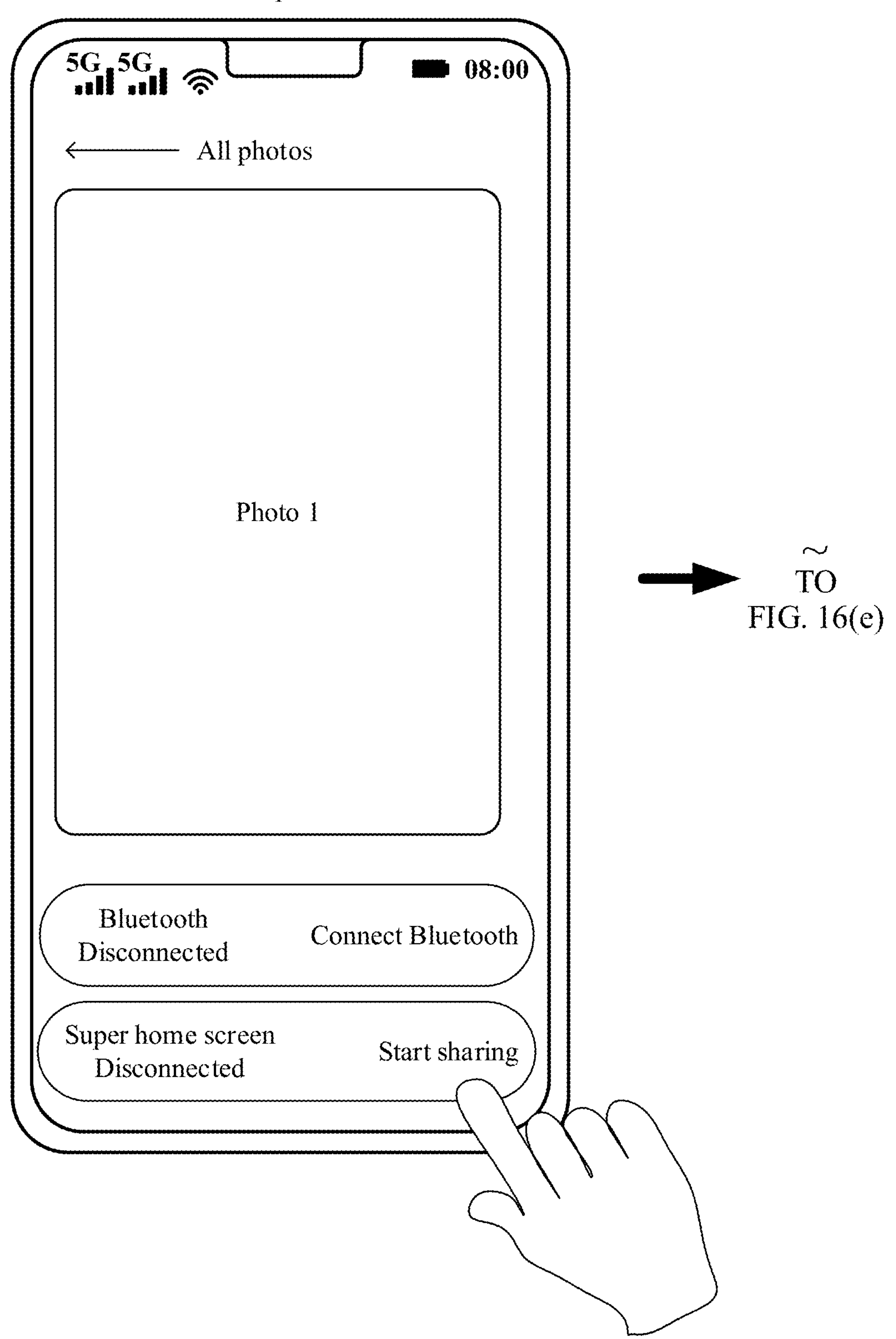
Figure 16E:
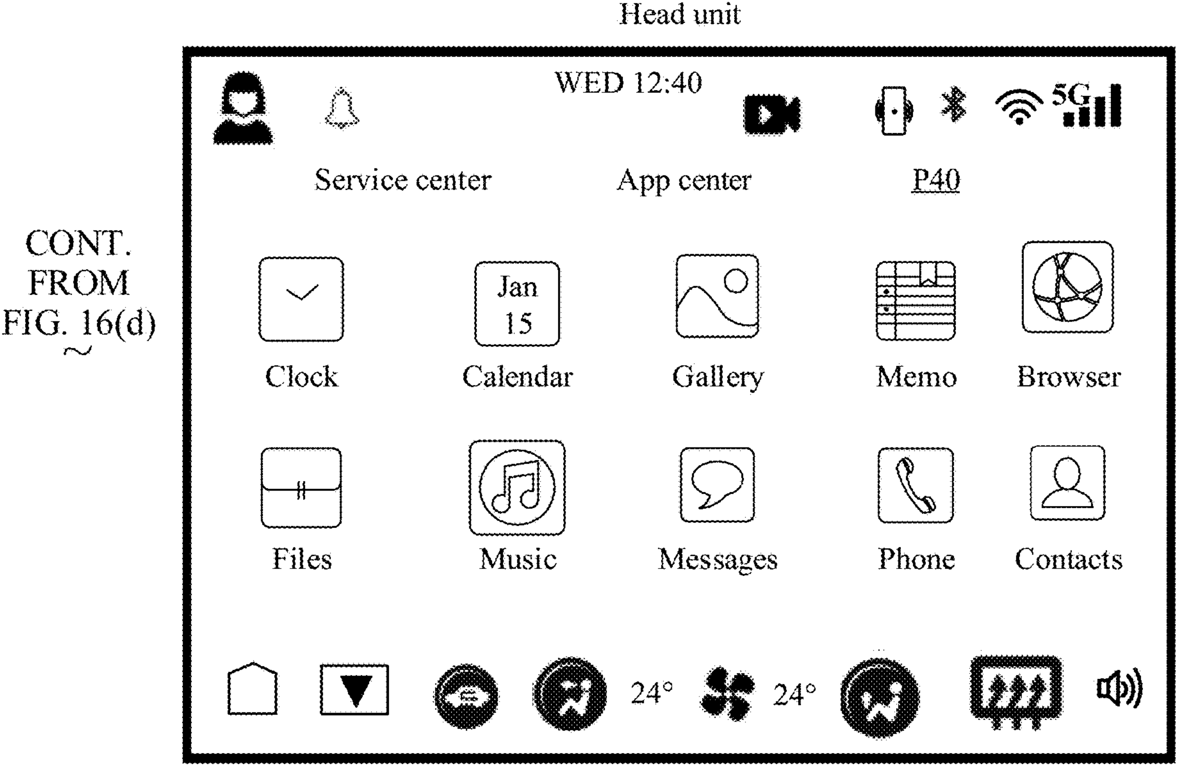
Figure 16F:
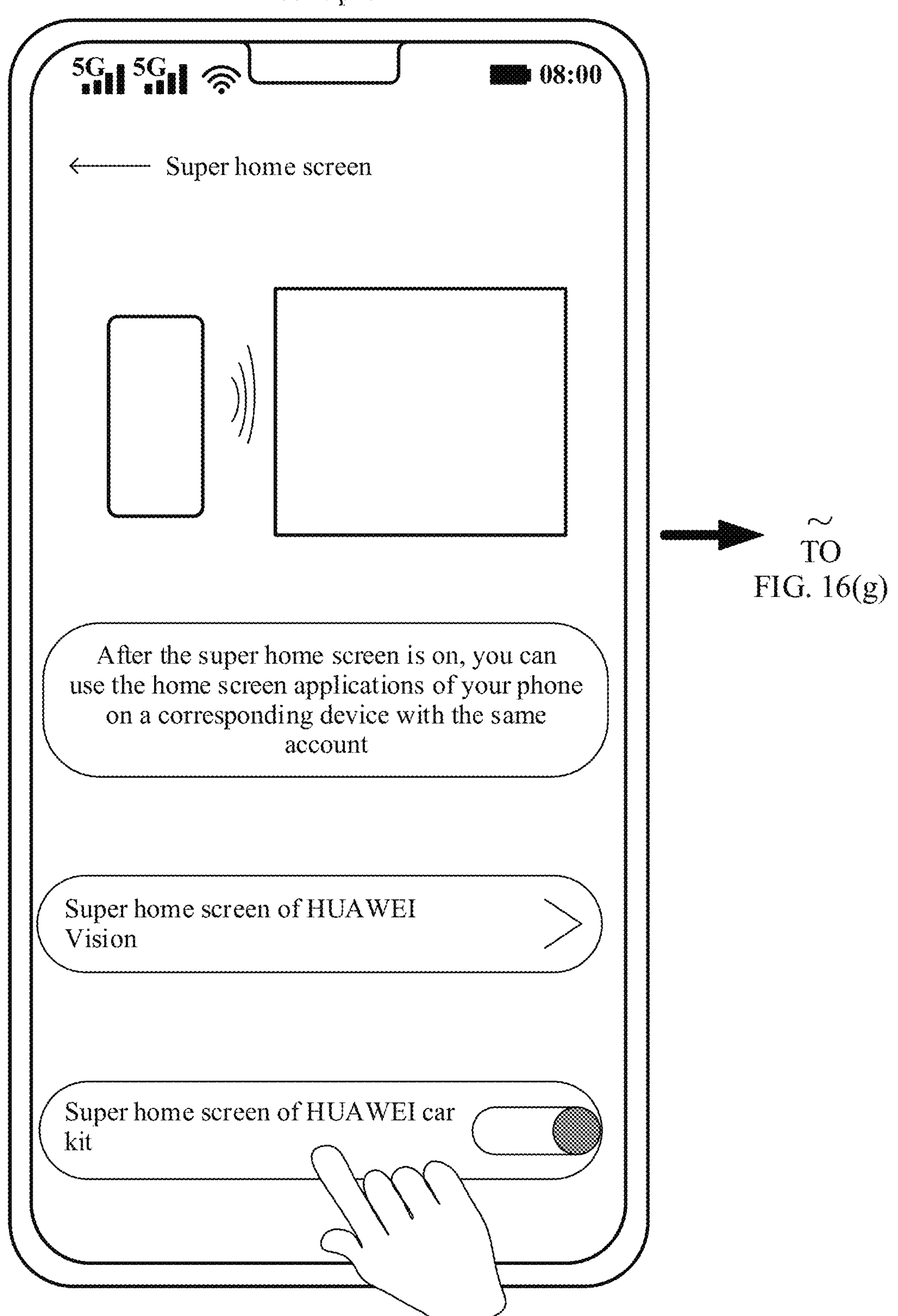
Figure 16G:
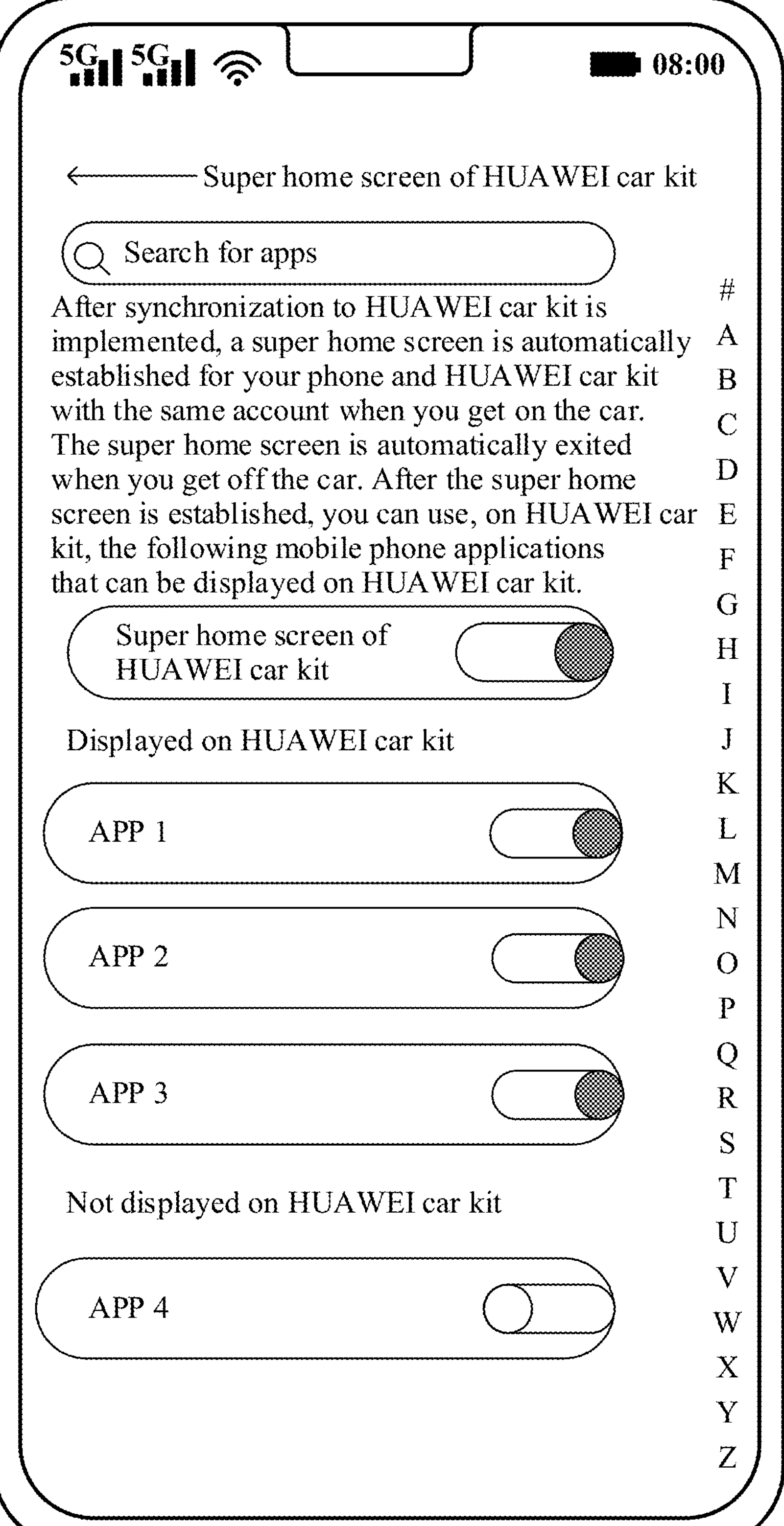
Figure 16H:
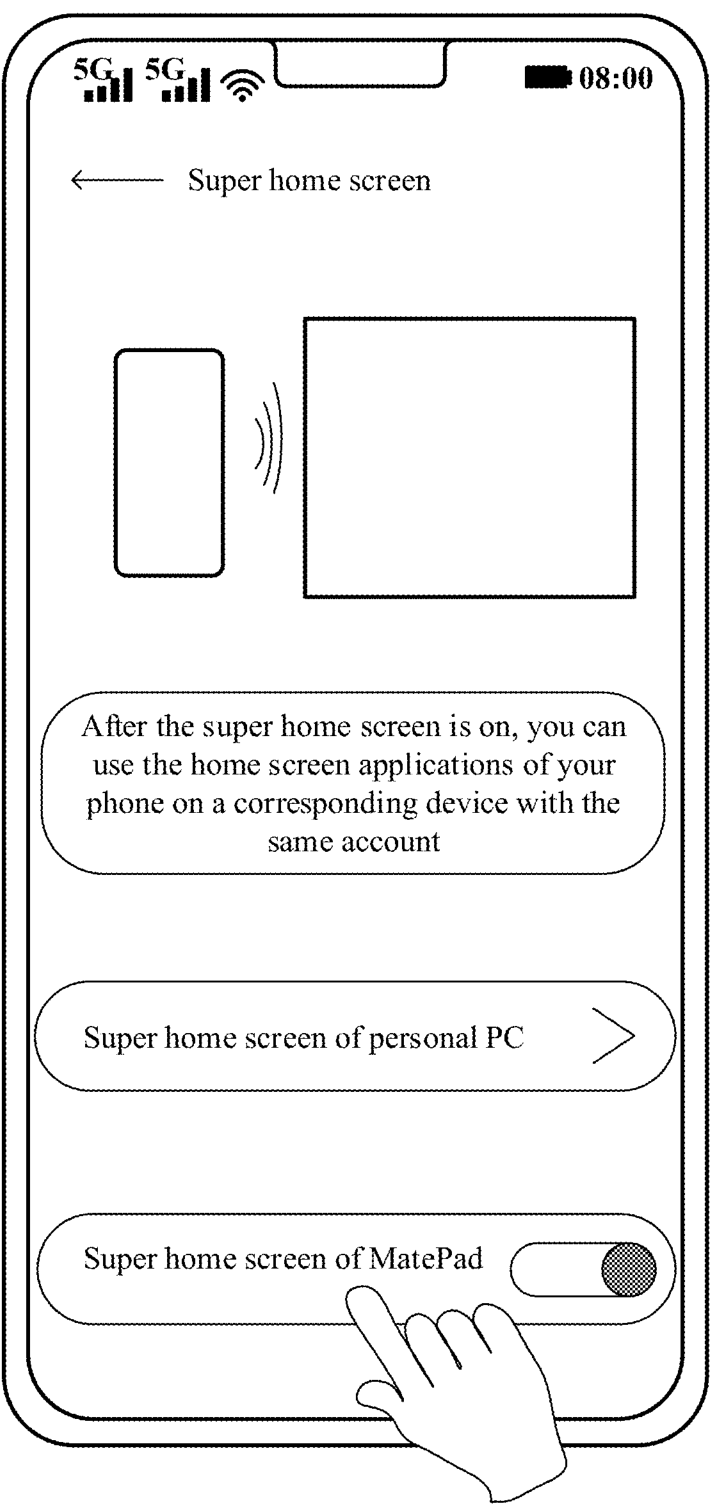

Example 57: FIG. 13A to FIG. 13C are a schematic diagram of a first terminal (MatePad1) and a historical task card that are displayed on a recent tasks screen of a second terminal (P40). It is assumed that a user needs to migrate an APP 2 of P40 to a third terminal (Mate X2). The user may touch and hold a task card corresponding to the APP 2 and slide up to an icon area of Mate X2. After the user releases the task card, the task card may be automatically migrated to Mate X2, and is displayed or run on a foreground of Mate X2. Optionally, when an application corresponding to the APP 2 is displayed or run or the task card of the APP 2 is displayed on Mate X2, the application corresponding to the APP 2 may be displayed or run or the task card of the APP 2 may be displayed on Mate X2 based on an unfolded state of Mate X2 in portrait mode, an unfolded state of Mate X2 in landscape mode, a folded state of Mate X2 in portrait mode, or a folded state of Mate X2 in landscape mode.

Optionally, when the application corresponding to the APP 2 is displayed or run or the task card of the APP 2 is displayed on Mate X2, the application or the task card may be displayed in full screen or in a floating window.

Optionally, in Example 57, on the device P40, after the user may also touch and hold the task card corresponding to the APP 2 with the left hand, the user may slide the task card leftward with the right hand, to switch to a task card corresponding to another application of a local device (P40) or (MatePad1) for selection. After the selection is completed, the user slides the task card corresponding to the APP 2 and the task card corresponding to the another application together to Mate X2 and then releases the task cards, so that applications corresponding to two different APPs can be displayed on Mate X2. Optionally, in a process in which the applications respectively corresponding to the two different APPs or task cards respectively corresponding to the two different APPs are displayed on Mate X2, the two different APPs may be displayed in split screen; or one APP is displayed in full screen, and the other APP is displayed in a floating window; or both the two different APPs are displayed in a floating window.

In embodiments of this application, based on the foregoing three migration modes (a copying mode, a window projection technology-based migration mode, and an FA technology-based migration mode), an application on a source device may be migrated to a target device for running, and various home screen applications of the source device may be viewed and used on the target device, to form a super home screen on a target. In this application, the super home screen may be understood as: if home screen applications of a plurality of other devices may be viewed and used on one device, a super home screen function is implemented on the device. The following provides description based on specific examples.

Example 58: In this application, whether a device needs to implement a super home screen function may be determined by using a case shown in FIG. 14(*a*)-1 to FIG. 14(*a*)-4. As shown in FIG. 14(*a*)-1 to FIG. 14(*a*)-4, if a trusted connection relationship is established between a head unit and a mobile phone, a super home screen may be displayed on the head unit, to implement the super home screen function. For example, a home screen application of the mobile phone may be viewed and used on the head unit. However, the super home screen function does not need to be implemented on the mobile phone. For example, a home screen application of the head unit does not need to be viewed and used on the mobile phone. In this application, the head unit may be, for example, a trip computer, an in-vehicle computer, an in-vehicle device, or an in-vehicle T-BOX. This is not limited in this application.

If a trusted connection relationship is established between a large-screen device (for example, a HUAWEI television) and a mobile phone, a super home screen may be displayed on the large-screen device, to implement the super home screen function. However, the super home screen function does not need to be implemented on the mobile phone.

If a trusted connection relationship is established between a tablet computer and a mobile phone, a super home screen may be displayed on the tablet computer, to implement the super home screen function. However, the super home screen function does not need to be implemented on the mobile phone.

If a trusted connection relationship is established between a personal PC and a mobile phone, a super home screen may be displayed on the personal PC, to implement the super home screen function. However, the super home screen function does not need to be implemented on the mobile phone.

If a trusted connection relationship is established between a large-screen device (for example, a HUAWEI television) and a tablet computer, a super home screen may be displayed on both the large-screen device and the tablet computer, to implement the super home screen function.

If a trusted connection relationship is established between a personal PC and a tablet computer, a super home screen may be displayed on both the personal PC and the tablet computer, to implement the super home screen function.

Optionally, in another possible implementation, in the foregoing scenarios, regardless of which device and the mobile phone establish a trusted connection relationship, the super home screen function may also be implemented on the mobile phone, for example, a home screen application of another device is viewed and used on the mobile phone. This is not limited in this application.

In embodiments of this application, a layout status in which a super home screen is not used on a device may be distinguished based on factors such as a physical feature (for example, a size of a screen) of each device that is connected in a trusted manner or whether precise interaction is easy to be performed.

For devices that are difficult to perform precise interaction, for example, a head unit and a large-screen device, super home screen applications displayed on these devices are limited. For example, the super home screen applications may be filtered by a system or the user, and are displayed based on a home screen application layout of a target device (namely, a device that is difficult to perform precise interaction).

For devices that are easy to perform precise interaction, for example, a tablet and a personal PC, home screen applications may be displayed as many as possible. When the home screen applications are displayed on these devices, the applications of the devices are displayed based on a home screen layout of a source device of the home screen applications by default. When a home screen style of the source device is a drawer-style home screen, when the home screen applications are displayed on these devices, the home screen applications are uniformly displayed based on a home screen layout of a target device (namely, a device that is easy to perform precise interaction).

The following provides description based on specific examples.

Example 59: FIG. 14(*b*) is a schematic diagram of displaying a super home screen layout on a head unit. Because the head unit is a device that is difficult to perform precise interaction, when home screen applications of a mobile phone P40 are displayed on the head unit, the home screen applications need to be filtered by a system or a user of the head unit, and filtered home screen applications of the mobile phone P40 are displayed on the head unit. In addition, home screen applications of the head unit and the mobile phone P40 are arranged together, and are displayed by using a tab (Tab).

Example 60: FIG. 14(*c*) is a schematic diagram of displaying a super home screen layout on a large-screen device. Because the large-screen device is a device that is difficult to perform precise interaction, when home screen applications of a mobile phone P40 are displayed on the large-screen device, the home screen applications of the mobile phone P40 need to be filtered by a system or a user of the large-screen device, and filtered home screen applications of the mobile phone P40 are displayed on the large-screen device. In addition, home screen applications of the large-screen device and the mobile phone P40 are arranged together, and are displayed by using a tab (Tab).

Example 61: FIG. 14(*d*) is a schematic diagram of displaying a super home screen layout on a tablet computer (for example, MatePad1). Because the tablet computer is a device that is easy to perform precise interaction, when home screen applications of a mobile phone P40 are displayed on the tablet computer, the home screen applications of the mobile phone P40 may be displayed as many as possible based on a home screen layout of the mobile phone P40 without being filtered by a system or a user of the tablet computer. FIG. 14(*d*) is a schematic diagram of displaying home screen applications of a mobile phone P40 on a tablet computer when a home screen style of the mobile phone P40 is a standard home screen style. As shown in FIG. 14(*d*), a local application of the tablet computer and the home screen applications of the mobile phone P40 are arranged together, and are displayed by using a tab (Tab) based on a home screen application layout of the mobile phone P40.

Example 62: FIG. 14(*e*) is a schematic diagram of displaying a super home screen layout on a tablet computer (for example, MatePad1). Because the tablet computer is a device that is easy to perform precise interaction, when home screen applications of a mobile phone P40 are displayed on the tablet computer, the home screen applications of the mobile phone P40 may be displayed as many as possible without being filtered by a system or a user of the tablet computer. FIG. 14(*e*) is a schematic diagram of displaying home screen applications of a mobile phone P40 on a tablet computer when a home screen style of the mobile phone P40 is a drawer-style home screen. A local application of the tablet computer and the home screen applications of the mobile phone P40 are arranged together, and are displayed by using a tab (Tab) based on a home screen layout of the tablet computer.

Example 63: FIG. 14(*f*) is a schematic diagram of displaying a super home screen layout on a PC. Because the PC is a device that is easy to perform precise interaction, when home screen applications of a mobile phone P40 are displayed on the PC, the home screen applications of the mobile phone P40 may be displayed as many as possible based on a home screen layout of the mobile phone P40 without being filtered by a system or a user of the PC. FIG. 14(*f*) is a schematic diagram of displaying home screen applications of a mobile phone P40 on a PC when a home screen style of the mobile phone P40 is a standard home screen style. A local application of the PC and the home screen applications of the mobile phone P40 are arranged together, and are displayed by using a tab (Tab) based on a home screen application layout of the mobile phone P40.

Example 64: FIG. 14(*g*) is a schematic diagram of displaying a super home screen layout on a PC. Because the PC is a device that is easy to perform precise interaction, when home screen applications of a mobile phone P40 are displayed on the PC, the home screen applications of the mobile phone P40 may be displayed as many as possible without being filtered by a system or a user of the PC. FIG. 14(*g*) is a schematic diagram of displaying home screen applications of a mobile phone P40 on a PC when a home screen style of the mobile phone P40 is a drawer-style home screen. A local application of the PC and the home screen applications of the mobile phone P40 are arranged together, and are displayed by using a tab (Tab) based on a home screen layout of the PC.

In embodiments of this application, different forms of super home screen entries are provided for different devices.

For example, for a device (for example, a head unit or a PC) that has a drawer-style home screen, a local application and a super home screen of the device are arranged together, and are displayed by using a tab, for example, as shown in FIG. 14(*b*) and FIG. 14(*f*).

For a device (for example, a tablet or a large-screen device) that does not have a drawer-style home screen, a home screen of the device is slid to the last screen. In this case, a super home screen is displayed independently.

For another example, for a device that has a drawer-style home screen, an icon of "all applications" is provided on a Dock. After the user taps the icon, a super home screen is displayed, where a local application of the device and a home screen application of another device are arranged together, and are displayed by using a tab (Tab).

For a device that does not have a drawer-style home screen, an icon of "another end application center" is provided on a Dock. After the user taps the icon, a super home screen is displayed, where a home screen application of another end device is displayed on the super home screen. Optionally, a local application of the device and a home screen application of another device are arranged together, and are displayed by using a tab (Tab).

The following provides description based on specific examples.

Example 65: FIG. 14(*h*) is a schematic diagram of a super home screen entry form of a tablet computer. Because the tablet computer does not have a drawer-style home screen, a user may slide a home screen of the tablet computer, as shown in FIG. 14(*h*). For example, the user may slide the home screen of the tablet computer leftward, rightward, or downward, and a super home screen is displayed on the last home screen of the tablet computer. As shown in FIG. 14(*i*), a local application of the tablet computer and a home screen application of another device are arranged together, and are displayed by using a tab (Tab).

Example 66: FIG. 14(*j*) is a schematic diagram of a super home screen entry form of a large-screen device. Because the large-screen device does not have a drawer-style home screen, as shown in FIG. 14(*j*), for example, after a user turns a home screen of the large-screen device leftward, rightward, or downward, a super home screen is displayed on the large-screen device. As shown in FIG. 14(*k*), a local application of the large-screen device and a home screen application of another device are arranged together, and are displayed by using a tab (Tab).

Example 67: FIG. 14(*l*) is a schematic diagram of a super home screen entry form of a PC device. Because the PC device has a drawer-style home screen, as shown in FIG. 14(*l*), the PC device may provide an icon of "all applications" on a Dock. After a user clicks the icon, a super home screen is displayed. As shown in FIG. 14(*m*), on the super home screen displayed by the PC device, a local application of the PC device and a home screen application of another device are arranged together, and are displayed by using a tab (Tab).

Example 68: FIG. 14(*n*) is a schematic diagram of a super home screen entry form of a head unit. Because the head unit has a drawer-style home screen, as shown in FIG. 14(*n*), the head unit may provide an icon of "all applications (All Apps)" on a Dock. After a user taps the icon, a super home screen is displayed. As shown in FIG. 14(*o*), on the super home screen displayed by the head unit, a local application of the head unit and a home screen application of another device are arranged together, and are displayed by using a tab (Tab).

Example 69: FIG. 14(*p*) is a schematic diagram of a super home screen entry form of a tablet computer. Because the tablet computer does not have a drawer-style home screen, an icon of "another end application center" may be provided on a Dock of the tablet computer. For example, another end device includes a mobile phone P40. After a user taps the icon, a super home screen is displayed. As shown in FIG. 14(*q*), a local application of the tablet computer and a home screen application of another device (including the mobile phone P40) are arranged together, and are displayed by using a tab (Tab).

Example 70: FIG. 14(*r*) is a schematic diagram of a super home screen entry form of a large-screen device. Because the large-screen device does not have a drawer-style home screen, as shown in FIG. 14(*r*), an icon of "another end application center" may be provided on a Dock of the large-screen device. For example, another end device includes a mobile phone P40. After a user taps the icon, a super home screen is displayed. As shown in FIG. 14(*s*), on the super home screen displayed by the large-screen device, a local application of the large-screen device and a home screen application of another device (including the mobile phone P40) are arranged together, and are displayed by using a tab (Tab).

In embodiments of this application, when the super home screen is displayed on the head unit, the user may tap an application icon of another device on the super home screen, and after the application icon of the another device is tapped, an application may be displayed on the head unit. For example, the application may be displayed on the head unit in a floating window, split screen, full screen, or a manner of covering a home screen of the head unit. The following provides description based on a specific example.

Example 71: FIG. 15(*a*) is a schematic diagram of an interface before a trusted connection is established between a head unit and another device. There is no icon of the another device on a Dock of the head unit. FIG. 15(*b*) is a schematic diagram of an interface after a trusted connection is established between a head unit and a mobile phone P40. An icon of the mobile phone P40 is displayed on a Dock of the head unit. A user may tap the icon, and a display result is shown in FIG. 15(*c*). A super home screen is displayed on the head unit. On the super home screen displayed on the head unit, a local application of the head unit and a home screen application of another device are arranged together, and are displayed by using a tab (Tab).

Example 72: The user may tap any application on a home screen of the mobile phone P40 on the interface shown in FIG. 15(*c*). It is assumed that the application tapped by the user is an APP 1. After the user taps an icon of the APP 1, the APP 1 is displayed on the head unit.

In a possible implementation, on the interface shown in FIG. 15(*c*), the user taps the icon of the APP 1, and the APP 1 is displayed on the head unit in a floating window, for example, as shown in FIG. 15(*d*). Optionally, there may be a "full-screen button" on the interface displayed in a floating window. After the user taps the "full-screen button", as shown in FIG. 15(*e*), the APP 1 is displayed on the head unit in full screen.

In another possible implementation, on the interface shown in FIG. 15(*c*), the user taps an icon of an APP (for example, the APP 1), and the APP 1 is displayed on the head unit in split screen, for example, as shown in FIG. 15(*f*). The split screen means that the APP 1 and a home screen of the head unit are displayed on a display of the head unit in split screen. Optionally, there may be a "full-screen button" on the interface of the APP 1 displayed in split screen. After the user taps the "full-screen button", as shown in FIG. 15(*e*), the APP 1 is displayed on the head unit in full screen.

In still another possible implementation, on the interface shown in FIG. 15(*c*), the user taps the icon of the APP 1, and the APP 1 is displayed on the head unit in full screen, for example, as shown in FIG. 15(*e*).

Example 73: On the interface shown in FIG. 15(*b*), the user may tap the icon of the mobile phone P40 on the Dock of the head unit. After the icon is tapped, a display result is shown in FIG. 15(*g*). A super home screen is displayed on the head unit. On the super home screen displayed on the head unit, a display manner of a home screen application icon of the mobile phone P40 may be the same as a home screen layout of the mobile phone P40. Optionally, as shown in FIG. 15(*g*), the home screen application icon of the mobile phone P40 and the home screen of the head unit may be displayed on a display of the head unit in split screen.

Optionally, in embodiments of this application, after a super home screen application is opened on a device that displays an application in full screen by default, the newly opened application is displayed on the device in full screen; and on a premise that screen splitting is met, the super home screen application is opened, and the newly opened application is displayed on the device in split screen.

Optionally, after a super home screen application is opened on a device like a computer (for example, a PC) that is displayed in a floating window by default, the newly opened application is displayed on the device in a floating window, and the newly opened application is displayed by using a vertical or narrow floating window or a horizontal or wide floating window according to a floating window adaptation rule of the device. This is not limited in this application.

In embodiments of this application, a temporary super home screen may be established between two or more terminal devices of a same account or different accounts in a manner of "tap" or "scan", or a super home screen may be temporarily disconnected (closed), or the like. The following provides description based on specific examples.

Example 74: It is assumed that a trust relationship has been established before between a mobile phone P40 used by a user and a head unit of a vehicle driven by the user before, and a super home screen has been established before. After the user gets on the vehicle and starts the vehicle this time, the super home screen is automatically established between the mobile phone P40 and the head unit. As shown in FIG. 16(*a*), the head unit displays the super home screen. In this case, the user can use the mobile phone P40 to temporarily close the super home screen in a manner of "tap" or "scan". For example, after the manner of "tap" or "scan" is used, as shown in FIG. 16(*b*), a pop-up dialog box may be displayed on the mobile phone P40 to prompt "Disconnect sharing". After the user taps "Disconnect sharing", the mobile phone P40 disconnects home screen sharing with the head unit. As shown in FIG. 16(*c*), the head unit exits the super home screen, and the head unit no longer displays the super home screen, but displays a home screen of the head unit.

After the user closes the super home screen, after the user gets on the vehicle and starts the vehicle next time, the super home screen is automatically established between the mobile phone P40 and the head unit, or the super home screen may be temporarily established in a manner of "tap" or "scan". For example, as shown in FIG. 16(*d*), a pop-up dialog box may be displayed on the mobile phone P40 to prompt "Start sharing". After the user taps "Start sharing", the mobile phone P40 shares a home screen with the head unit, and an interface displayed by the head unit changes from an interface shown in FIG. 16(*c*) to an interface shown in FIG. 16(*e*), that is, the super home screen is displayed.

Optionally, in the foregoing processes of temporarily establishing and closing the super home screen, a switch of the super home screen in settings is not affected.

Optionally, in a process in which the user establishes the super home screen for the first time or each time, an application management interface may exist. On the application management interface, the user may perform selection, so that some applications selected by the user may participate in display of the super home screen, and applications that are not selected do not appear on the super home screen. The following provides descriptions based on specific examples.

Example 75: It is assumed that a mobile phone and a large-screen device, or a mobile phone and a head unit need to establish a super home screen. After tunning on a "super home screen" option on the mobile phone, a user may search and add surrounding trusted devices in various manners (for example, in a manner of "tap" or "scan"). After the mobile phone finds the head unit or the large-screen device, an interface displayed by the mobile phone may be shown in FIG. 16(*f*). The user taps a device that needs to establish a super home screen, for example, selects "Super home screen of HUAWEI car kit". After the user taps "Super home screen of HUAWEI car kit", a displayed interface is shown in FIG. 16(*g*). The user may select an application on the interface, and the application selected by the user is displayed on the super home screen of the head unit.

Example 76: It is assumed that a mobile phone and a tablet computer (for example, MatePad), or a mobile phone and a personal PC need to establish a super home screen. After turning on a "super home screen" option on the mobile phone, a user may search and add surrounding trusted devices in various manners (for example, in a manner of "tap" or "scan"). After the mobile phone finds the tablet computer or the PC, an interface displayed by the mobile phone may be shown in FIG. 16(*h*). In this case, the user may not need to perform application filtering, that is, all applications on the mobile phone may be displayed on a super home screen of the personal PC or the tablet computer by default. The user taps a device that needs to establish a super home screen, for example, selects "Super home screen of MatePad". After the user taps "Super home screen of MatePad", the super home screen may be displayed on MatePad, and all the applications on the mobile phone may be displayed on MatePad.

It should be understood that in this application, the foregoing examples, the interfaces of the terminals, the operations of the user, and the like are merely examples, and do not constitute a specific limitation on embodiments of this application. For example, in some other embodiments of this application, the icons displayed on the interfaces of the terminals may include more or fewer icons than those displayed on the interface shown in any figure, or combine some icons, or split some icons, or have different icons. This is not limited in embodiments of this application.

Figure 17:
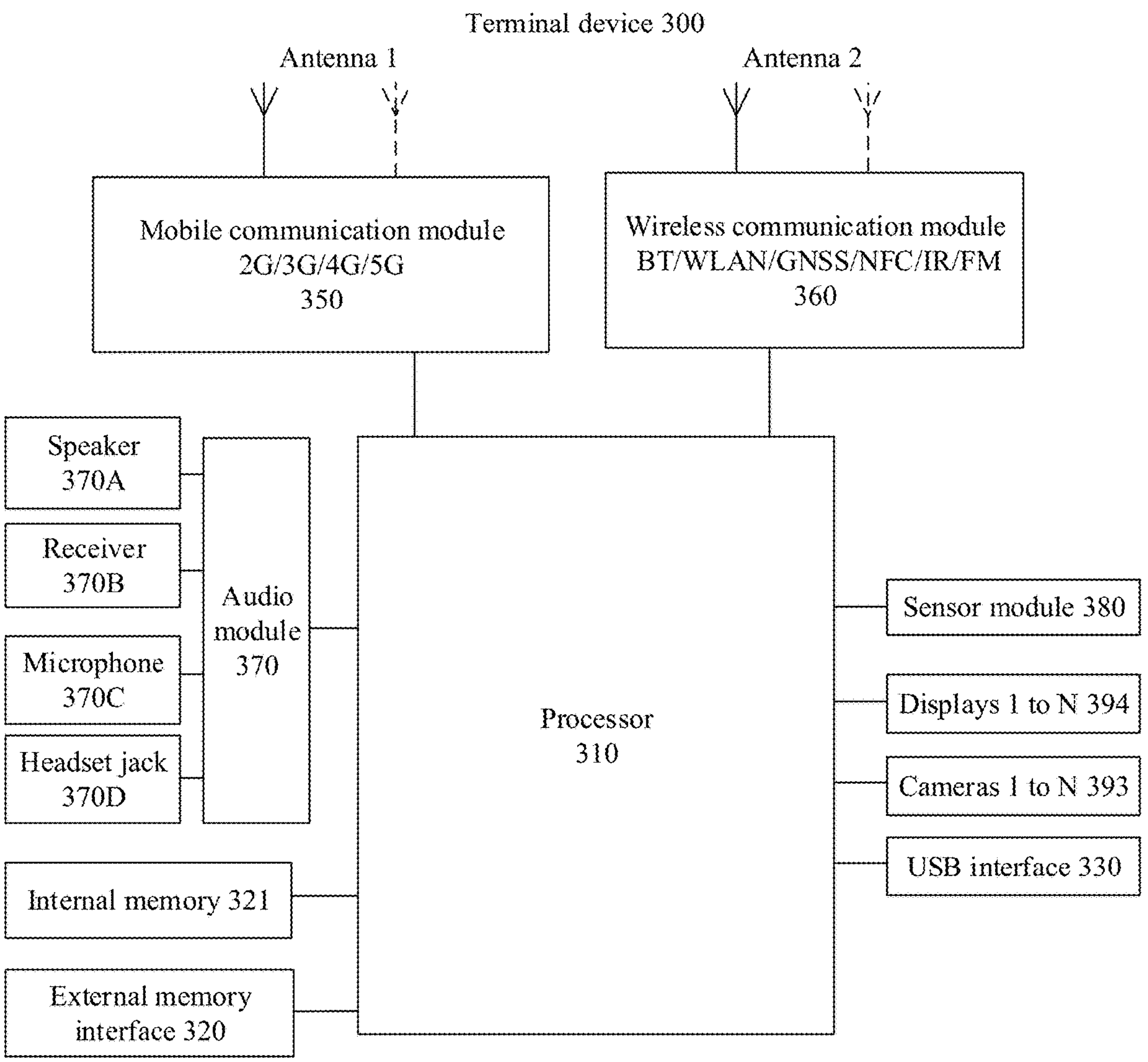
FIG. 17 is a schematic diagram of an example of a structure of a terminal device according to an embodiment of this application.

FIG. 17 is a schematic diagram of a structure of an example of a terminal device 300 according to this application. The mobile phone may be any terminal (for example, a mobile phone, a large-screen device, a tablet computer, a PC, a folded screen mobile phone, a head unit, or a lite device) in the foregoing embodiments. As shown in FIG. 17, the terminal device 300 may include a processor 310, an external memory interface 320, an internal memory 321, a universal serial bus (universal serial bus, USB) interface 330, an antenna 1, an antenna 2, a mobile communication module 350, a wireless communication module 360, an audio module 370, a speaker 370A, a receiver 370B, a microphone 370C, a headset jack 370D, a sensor module 380, and the like. The terminal device is configured to perform a step performed by any terminal in the foregoing task examples or display any interface.

It may be understood that the structure shown in this embodiment of this application does not constitute a specific limitation on the terminal device 300. In some other embodiments of this application, the terminal device 300 may include more or fewer components than those shown in the figure, or combine some components, or split some components, or have a different component arrangement. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces waiting time of the processor 310, thereby improving system efficiency.

A wireless communication function of the terminal device 300 may be implemented through the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the terminal device 300 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 350 may provide a wireless communication solution applied to the terminal device 300, including 2G, 3G, 4G, 5G, or the like. The mobile communication module 350 may include at least one filter, a switch, a power amplifier, a low noise amplifier (LNA), and the like. The mobile communication module 350 may receive an electromagnetic wave through the antenna 1, perform processing such as filtering or amplification on the received electromagnetic wave, and transmit a processed electromagnetic wave to the modem processor for demodulation. The mobile communication module 350 may further amplify a signal modulated by the modem processor, and convert an amplified signal into an electromagnetic wave for radiation through the antenna 1. In some embodiments, at least some functional modules in the mobile communication module 350 may be disposed in the processor 310. In some embodiments, at least some functional modules in the mobile communication module 350 may be disposed in a same device as at least some modules in the processor 310.

The wireless communication module 360 may provide wireless communication solutions, applied to the terminal device 300, for example, a wireless local area network (wireless local area network, WLAN) (such as a wireless fidelity (Wi-Fi) network), Bluetooth (BT), a global navigation satellite system (GNSS), frequency modulation (FM), near field communication (NFC) technology, and an infrared (IR) technology. The wireless communication module 360 may be one or more devices integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 of the terminal device 300 is coupled to the mobile communication module 350, and the antenna 2 is coupled to the wireless communication module 360, so that the terminal device 300 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), LTE, BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 300 implements a display function by using the GPU, the display 394, the application processor, and the like. The GPU is a microprocessor for image processing, and is connected to the display 394 and the application processor. The GPU is configured to: perform mathematical and geometric computation, and render an image. The processor 310 may include one or more GPUs, and execute a program instruction to generate or change display information.

The display 394 is configured to display an image, a video, and the like. The display 394 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal device 300 may include one or N displays 394, where N is a positive integer greater than 1.

The terminal device 300 may implement a photographing function by using the ISP, the camera 393, the video codec, the GPU, the display 394, the application processor, and the like.

The ISP is configured to process data fed back by the camera 393. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV. In some embodiments, the terminal device 300 may include one or N cameras 393, where N is a positive integer greater than 1.

The digital signal processor is configured to process a digital signal, and may process another digital signal in addition to the digital image signal. For example, when the terminal device 300 selects a frequency, the digital signal processor is configured to perform Fourier transform on frequency energy.

The video codec is configured to compress or decompress a digital video. The terminal device 300 may support one or more types of video codecs. In this way, the terminal device 300 may play or record videos in a plurality of coding formats, for example, moving picture experts group (MPEG)-1, MPEG-2, MPEG-3, and MPEG-4.

The external memory interface 320 may be configured to connect to an external memory card, for example, a micro SD card, to extend a storage capacity of the terminal device 300. The external memory card communicates with the processor 310 through the external memory interface 320, to implement a data storage function. For example, files such as music and videos are stored in the external memory card.

The internal memory 321 may be configured to store computer-executable program code, and the executable program code includes instructions. The processor 310 implements various function applications and data processing of the terminal device 300 by running instructions stored in the internal memory 321. The internal memory 321 may include a program storage area and a data storage area. The program storage area may store an operating system, an application required by at least one function (for example, a voice playing function or an image playing function), and the like. The data storage area may store data (such as audio data and a phone book) created during use of the terminal device 300, or the like. In addition, the internal memory 321 may include a high-speed random access memory, and may further include a nonvolatile memory, for example, at least one magnetic disk storage device, a flash memory device, or a universal flash storage (UFS).

The terminal device 300 may implement an audio function, for example, music playing and recording, through the audio module 370, the speaker 370A, the receiver 370B, the microphone 370C, the headset jack 370D, the application processor, and the like.

The audio module 370 is configured to convert digital audio information into an analog audio signal for output, and is further configured to convert an analog audio input into a digital audio signal. The audio module 370 may be further configured to code and decode an audio signal. In some embodiments, the audio module 370 may be disposed in the processor 310, or some functional modules in the audio module 370 are disposed in the processor 310.

The speaker 370A, also referred to as a "loudspeaker", is configured to convert an electrical audio signal into a sound signal. The terminal device 300 may be configured to listen to music or listen to a hands-free call by using the speaker 370A.

The receiver 370B, also referred to as an "earpiece", is configured to convert an audio electrical signal into a sound signal. When the terminal device 300 is configured to answer a call or listen to voice information, a voice may be listened to by placing the receiver 170B close to a human ear.

The microphone 370C, also referred to as a "mike" or a "mic", is configured to convert a sound signal into an electrical signal. When making a call or sending voice information, the user may make a sound near the microphone 370C through the mouth of the user, to enter a sound signal to the microphone 370C. The terminal device 300 may have at least one microphone 370C. In some other embodiments, the terminal device 300 may have two microphones 370C, to collect a sound signal and further implement a noise reduction function. In some other embodiments, the terminal device 300 may alternatively have three, four, or more microphones 370C, to collect a sound signal, reduce noise, identify a sound source, implement a directional recording function, and the like.

The headset jack 370D is configured to be connected to a wired headset. The headset jack 370D may be a USB interface 330, or may be a 3.5 mm open mobile terminal platform (OMTP) standard interface, or a cellular telecommunications industry association of the USA (CTIA) standard interface.

The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the terminal device 300 may further include a charging management module, a power management module, a battery, a button, an indicator, one or more SIM card interfaces, and the like. This is not limited in this embodiment of this application.

Figure 18:
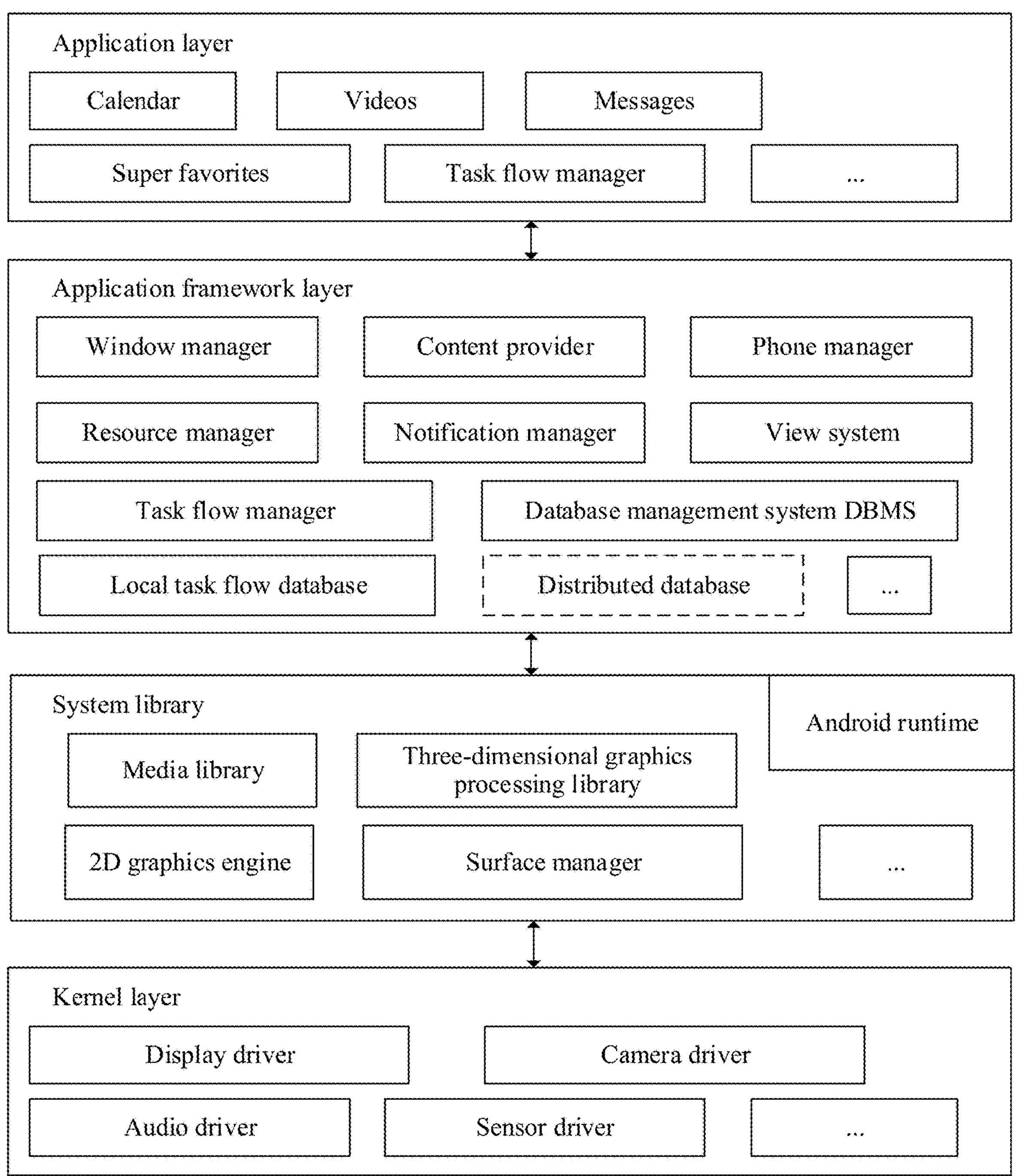
FIG. 18 is a block diagram of an example of a software structure of a terminal device according to an embodiment of this application.

FIG. 18 is a block diagram of a software structure of a terminal device according to an embodiment of this application.

In a layered architecture, software is divided into several layers, and each layer has a clear role and task. The layers communicate with each other through a software interface. In some embodiments, an Android system is divided into five layers, namely, an application layer, an application framework layer, an Android runtime and a system library, a hard abstraction layer (HAL) (which is not shown in FIG. 18), and a kernel layer from top to bottom.

The application layer may include a series of application packages.

As shown in FIG. 18, application packages may include applications such as Camera, Gallery, Calendar, Phone, Maps, Navigation, WLAN, Bluetooth, Music, Videos, Game, Shopping, Travel, and Instant messaging (such as messages). In addition, application packages may further include system applications such as a home screen (namely, a desktop), a leftmost screen, a control center, and a notification center. In this embodiment of this application, the application package may further include a super favorites application, and the super favorites application may be a system application or a third-party application. The application package may further include an application of a task flow manager, configured to invoke and manage the task flow manager.

The super favorites application provides a service or function, and may support the terminal device in collecting task data into a distributed database, and another electronic device synchronizes the task data into a local task flow database of the another electronic device based on the distributed database.

The application framework layer provides an application programming interface (API) and a programming framework for applications at the application layer. The application framework layer includes some predefined functions.

As shown in FIG. 18, the application framework layer may include the task flow manager, a database management system DBMS, a local task flow database, a distributed database, a window manager, a content provider, a view system, a phone manager, a resource manager, a notification manager, and the like.

The task flow manager is configured to manage a task flow in each application, generate task data, and publish a task.

The database management system DBMS is a type of software for operating and managing databases (including the local task flow database and the distributed database), and is configured to establish, use, and maintain the databases, including invoking database interfaces. The DBMS manages and controls the databases in a unified manner to ensure the security and integrity of the databases. A user accesses data in the databases by using the DBMS, and a database administrator also maintains the databases by using the DBMS. The DBMS provides a plurality of functions to enable a plurality of applications and users to create, modify, and query the databases at the same time or at different times by using different methods. The DBMS enables the user to define and manipulate data conveniently, maintain data security and integrity, and perform concurrent control and database recovery for a plurality of users.

The local task flow database is configured to store local task data.

The distributed database is a logically unified database that is formed by connecting a plurality of physically dispersed database units by using a computer network. Each connected database unit is called a site or node. The distributed database is managed by a unified database management system, which is called a distributed database management system.

In some embodiments, the distributed database is an optional module in the terminal device, and the distributed database of the terminal device may be carried on another server or a cloud.

In this embodiment of this application, the super favorites application of the terminal device invokes a client of the task flow manager (an application of the task flow manager) to register a task listening service with the local task flow database. The client of the task flow manager invokes an interface of the database management system DBMS to register the task listening service with the task flow manager. The task listening service indicates that when the task flow manager detects that task data in the local task flow database is changed (for example, added, deleted, or changed), the task flow manager synchronizes changed task data to the super favorites application.

An input manager is configured to receive an instruction or a request reported by a lower layer such as the kernel layer or a hardware abstraction layer.

The window manager is configured to manage a window program. The window manager may obtain a size of a display, to determine whether there is a status bar, perform screen locking, take a screenshot, and the like.

The activity manager is configured to manage activities that are running in the system, including a process (process), an application, a service (service), task (task) information, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface of the application may include one or more views. For example, a display interface including an SMS notification icon may include a text display view and an image display view.

A display manager is configured to transmit displayed content to the kernel layer.

The phone manager is configured to provide a communication function of the terminal device, for example, management of a call status (including answering, hanging up, or the like).

The resource manager provides, for an application, various resources such as a localized character string, an icon, a picture, a layout file, and a video file.

The notification manager enables an application to display notification information in a status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: One part is a performance function that needs to be invoked by the java language, and the other part is an Android kernel library.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer HAL layer is an interface layer between operating system software and hardware components, and provides an interface for interaction between upper-layer software and lower-layer hardware. The HAL layer abstracts underlying hardware as software that includes a corresponding hardware interface. An underlying hardware device may be set by accessing the HAL layer. For example, a related hardware component may be enabled or disabled at the HAL layer. In some embodiments, a core architecture of the HAL layer includes at least one of C++ or C.

The kernel layer is a layer between hardware and software. The kernel layer includes at least a display driver, a camera driver, an audio driver, a sensor driver, a touch chip driver, an input (input) system, and the like. For ease of description, in FIG. 18, an example in which the kernel layer includes the input system, the touch chip driver, the display driver, and a storage driver is used for illustration. The display driver and the storage driver may be jointly disposed in a drive module.

It may be understood that the structure shown in this application does not constitute a specific limitation on the terminal device. In some other embodiments, the terminal device may include more or fewer components than those shown in the figure, or combine some components, or split some components, or have a different component arrangement. The components shown in the figure may be implemented by hardware, software, or a combination of software and hardware. This is not limited in this application.

Based on the foregoing application scenario, the system architecture shown in FIG. 1, and the foregoing examples, the following describes a step procedure of a method for displaying and controlling a task of a remote device according to this application. FIG. 19 is a step flowchart of a method for displaying and controlling a task of a remote device according to this application. Devices in the flowchart of the method include a first terminal and a second terminal, where the first terminal and the second terminal are mutually trusted devices.

As shown in FIG. 19, this embodiment includes the following steps.

S1010: The first terminal displays a recent tasks screen, where icons of N devices and at least one task card are displayed on the recent tasks screen, and the N devices include the first terminal and the second terminal.

S1020: When a task card of the second terminal is displayed on the recent tasks screen of the first terminal, the task card of the second terminal is arranged on the recent tasks screen of the first terminal based on a status of using the second terminal by a user.

Optionally, the status of using the second terminal by the user includes any one of a landscape-mode use state, a portrait-mode use state, a portrait-mode use state in an unfolded state of a foldable screen, a landscape-mode use state in an unfolded state of a foldable screen, a landscape-mode use state in a folded state of a foldable screen, and a portrait-mode use state in a folded state of a foldable screen.

In a possible implementation, the first terminal displays the task card of the second terminal in a single row or a plurality of rows on the recent tasks screen of the first terminal according to any one of the following: when the second terminal is used in landscape mode, when the second terminal is used in portrait mode, when the second terminal is used in portrait mode in an unfolded state of a foldable screen, when the second terminal is used in landscape mode in an unfolded state of a foldable screen, when the second terminal is used in landscape mode in a folded state of a foldable screen, or when the second terminal is used in portrait mode in a folded state of a foldable screen. For example, refer to specific descriptions corresponding to FIG. 4(*a*), FIG. 4(*b*), and Example 1 (FIG. 5(*a*)) to Example 3 (FIG. 6(*e*)). For brevity, details are not described herein again. In this implementation, the task card of the second terminal is displayed in the single row or the plurality of rows on the recent tasks screen of the first terminal based on the status of using the second terminal by the user, the status of using the first terminal by the user, and the screen size of the first terminal. This can improve the efficiency of displaying the task card of the second terminal, help the user view and manage the historical task of another device on the one device, and improve user experience.

In a possible implementation, when the task card of the second terminal is displayed on the recent tasks screen of the first terminal, the task card of the second terminal includes a task card of a first home screen snapshot of the second terminal. In this implementation, a home screen snapshot of the second terminal may be displayed on the recent tasks screen of the first terminal, to help the user view the home screen snapshot and improve user experience.

In a possible implementation, the method further includes: The first terminal receives a first operation performed by the user on the task card of the first home screen snapshot of the second terminal; and the first terminal displays a task card of a second home screen snapshot of the second terminal on the recent tasks screen of the first terminal based on the first operation of the user. For example, refer to specific descriptions corresponding to Example 5. For brevity, details are not described herein again. In this implementation, the user may view different home screen snapshots of the second terminal, thereby improving user experience.

In a possible implementation, the method further includes: The first terminal receives a second operation performed by the user on the task card of the first home screen snapshot of the second terminal or the task card of the second home screen snapshot of the second terminal; and the first terminal displays an interface of a first home screen of the second terminal or an interface of a second home screen of the second terminal based on the second operation, or the first terminal runs an application on the interface of the first home screen of the second terminal or an application on the interface of the second home screen of the second terminal. For example, refer to specific descriptions corresponding to Example 5. In this implementation, the user may operate applications on the different home screen snapshots of the second terminal, to quickly display or open the applications on the first terminal. The operations are simple, and user experience is improved.

In a possible implementation, there is at least one of an FA card, a floating window, or a floating bubble on the task card of the first home screen snapshot of the second terminal and/or the task card of the second home screen snapshot of the second terminal. For example, refer to specific descriptions corresponding to Example 4, Example 6, and Example 7. For brevity, details are not described herein again. In this implementation, the FA card, the floating window, or the floating bubble may be displayed on the home screen snapshot of the second terminal, and the task card of the second terminal may be flexibly displayed on the recent tasks screen of the first terminal in different manners. This improves user experience.

In a possible implementation, the method further includes: The first terminal receives a third operation performed by the user on the FA card, the floating window, or the floating bubble; and based on the third operation, the first terminal displays the interface of the first home screen of the second terminal or the interface of the first home screen of the second terminal on the first terminal, or runs an application corresponding to the FA card, the floating window, or the floating bubble on the first terminal. In this implementation, the user may perform an operation on the FA card, the floating window, or the floating bubble on the home screen snapshot of the second terminal, to quickly display or open the application on the first terminal. The operations are simple, and user experience is improved.

In a possible implementation, when the task card of the second terminal is displayed on the recent tasks screen of the first terminal, the task card of the second terminal includes a snapshot of a control device configured to control the second terminal. In this implementation, a task card related to the second terminal may be flexibly displayed on the recent tasks screen of the first terminal. This improves user experience.

In a possible implementation, the method further includes: The first terminal receives a fourth operation performed by the user on the snapshot of the control device; and based on the fourth operation, the first terminal displays a details interface of the control device on the first terminal, or remotely controls the second terminal. For example, refer to specific descriptions in Example 8. For brevity, details are not described herein again. In this implementation, the user may view, on the first terminal, a task card of the control device configured to control the second device, and may perform an operation on the task card, to quickly control the second terminal device on the first terminal. The operations are simple, and user experience is improved.

For example, the second terminal is a large-screen device, and the control device is a remote control.

In a possible implementation, when the task card of the second terminal is displayed on the recent tasks screen of the first terminal, the task card of the second terminal includes a task card of a home screen application of the second terminal.

In a possible implementation, the method further includes: The first terminal receives a fifth operation performed by the user on the task card of the home screen application of the second terminal; and the first terminal manages the home screen application of the second terminal on the first terminal based on the fifth operation. For example, refer to specific descriptions in Example 10. For brevity, details are not described herein again. In this implementation, the user may view an icon of the home screen application of the second terminal on the first terminal, and may perform an operation on the icon of the home screen application. This helps the second terminal manage applications (sorting, creating a folder, deleting, and the like), and quickly help the second terminal manage the applications on the first terminal. The operations are simple, and user experience is improved.

In a possible implementation, the N devices include a lite device. The lite device includes a wearable device or a smart home device used by the user. When a task card of the lite device is displayed on the recent tasks screen of the first terminal, the task card of the lite device includes task cards respectively corresponding to ongoing tasks of different lite devices. In this implementation, the task card of the lite device can be displayed on the recent tasks screen of the first terminal. This enriches types of task cards displayed on the recent tasks screen of the first terminal, and is user-friendly.

For example, the lite device is a general term for devices such as an IoT device, a wearable device, and a smart home device. For example, the lite device may include a smart refrigerator, a smart air conditioner, a smart cooking pot, a smart range hood, a smart sound box, a smartwatch, and the like.

In a possible implementation, the method further includes: The first terminal receives a sixth operation performed by the user on the task card of the device; and on the first terminal based on the sixth operation, the first terminal displays a details interface of an ongoing task of the lite device, or remotely controls an ongoing task of the lite device. For example, refer to specific descriptions in Example 9 and FIG. 7(*g*) to FIG. 7(*o*). For brevity, details are not described herein again. In this implementation, the user may view, on the first terminal, a task card corresponding to an ongoing task of a related lite device, and may perform an operation on the card corresponding to the ongoing task of the lite device, to remotely control the ongoing task of the lite device. The operations are simple, and user experience is improved.

In a possible implementation, the N devices include a third terminal, and the method further includes: The first terminal receives a seventh operation performed by the user on the task card of the lite device; the first terminal shares the task card of the lite device with the third terminal based on the seventh operation; and the third terminal displays the task card of the lite device on a recent tasks screen. In this implementation, the task card of the lite device may be pushed to the third terminal for display, so that the user can control the ongoing task of the lite device on the third terminal. This improves user experience.

In a possible implementation, the method further includes: A task card corresponding to an ongoing task of a second lite device is displayed on a display interface of a first lite device, where the lite device includes the first lite device and the second lite device; the first lite device receives an eighth operation performed by the user on the task card corresponding to the ongoing task of the second lite device; and the first lite device remotely controls the ongoing task of the second lite device based on the eighth operation. For example, refer to specific descriptions in Example 11. For brevity, details are not described herein again. In this implementation, the user may remotely control an ongoing task of another lite device on a lite device. The operations are simple, and user experience is improved.

In a possible implementation, the method further includes: verifying an identity of the user by using the first lite device and/or a device related to the first lite device; and after verification on the identity of the user succeeds, displaying a task card of the first terminal and/or the second terminal on the display interface of the first lite device.

In a possible implementation, the method further includes: The first lite device receives a ninth operation performed by the user on the task card of the first terminal and/or the second terminal; and the first lite device remotely controls, based on the ninth operation, an application corresponding to the task card of the first terminal and/or the second terminal. For example, refer to specific descriptions shown in Example 12. For brevity, details are not described herein again. In this implementation, the user may remotely control a historical task card and a foreground task card of another smart terminal on the lite device. The operations are simple, and user experience is improved.

In a possible implementation, the method further includes: When the task card of the second terminal is displayed on the recent tasks screen of the first terminal, the first terminal receives a tenth operation performed by the user on a first task card in the task card of the second terminal, where the tenth operation is used to start a first application corresponding to the first task card on the first terminal; the first terminal runs the first application on the first terminal based on the tenth operation; and the first terminal and the second terminal determine a running status of the first application based on different modes of migrating the first application to the first terminal. For example, refer to specific descriptions corresponding to FIG. 8(*a*)-1 and FIG. 8(*a*)-2. For brevity, details are not described herein again. In this implementation, after starting an application of another terminal, the first terminal may determine, based on different modes of migrating the application to the first terminal, to display a running status of the application on the first terminal. This ensures efficiency of running the application on the first terminal, and improves user experience.

In a possible implementation, that the first terminal and the second terminal determine a running status of the first application based on different modes of migrating the first application to the first terminal includes: When the first application is migrated to the first terminal in a copying mode, the first terminal and the second terminal separately and independently run the first application, where data and operation statuses of the first application on the first terminal and the second terminal are synchronized; and the first terminal and the second terminal separately adaptively display the first application based on respective screens. For example, refer to specific descriptions corresponding to Example 13. For brevity, details are not described herein again.

In a possible implementation, the method further includes: The second terminal receives an eleventh operation performed by the user on the first application, where the eleventh operation is used to pull back the first application from the first terminal; and after the second terminal receives the eleventh operation, the first terminal continues to run the first application. For example, refer to specific descriptions corresponding to Example 16. For brevity, details are not described herein again. In this implementation, normal running of the first application can be ensured.

In a possible implementation, that the first terminal and the second terminal determine a running status of the first application based on different modes of migrating the first application to the first terminal includes: When the first application is migrated to the first terminal in a window projection technology-based migration mode, and the first application supports a plurality of instances, the first terminal and the second terminal separately and independently run the first application, where data of the first application on the first terminal and the second terminal is synchronized, but operation statuses are not synchronized; and the first terminal and the second terminal separately adaptively display the first application based on respective screens. For example, refer to specific descriptions corresponding to Example 14. For brevity, details are not described herein again.

In a possible implementation, the method further includes: The second terminal receives a twelfth operation performed by the user on the first application, where the twelfth operation is used to pull back the first application from the first terminal; and after the second terminal receives the twelfth operation, the first terminal continues to run the first application. For example, refer to descriptions corresponding to Example 15. For brevity, details are not described herein again.

In a possible implementation, that the first terminal and the second terminal determine a running status of the first application based on different modes of migrating the first application to the first terminal includes: When the first application is migrated to the first terminal in a window projection technology-based migration mode, and the first application does not support a plurality of instances, the first terminal or the second terminal runs the first application in a same time period.

In a possible implementation, the method further includes: The second terminal receives a thirteenth operation performed by the user on the first application, where the thirteenth operation is used to pull back the first application from the first terminal; and after the second terminal receives the thirteenth operation, the first terminal exits running of the first application, and the second terminal runs the first application. For example, refer to descriptions corresponding to Example 15. For brevity, details are not described herein again.

In a possible implementation, that the first terminal and the second terminal determine a running status of the first application based on different modes of migrating the first application to the first terminal includes: When the first application is migrated to the first terminal in an FA technology-based migration mode, before the terminal runs the first application, the first terminal installs the first application or an FA of the first application; the first terminal and the second terminal separately and independently run the first application, where data of the first application on the first terminal and the second terminal is synchronized, but operation statuses are not synchronized; and the first terminal and the second terminal separately adaptively display the first application based on respective screens. For example, refer to descriptions corresponding to Example 14. For brevity, details are not described herein again.

In a possible implementation, the method further includes: The second terminal receives a fourteenth operation performed by the user on the first application, where the fourteenth operation is used to pull back the first application from the first terminal; and after the second terminal receives the fourteenth operation, the first terminal continues to run the first application. For example, refer to descriptions corresponding to Example 16. For brevity, details are not described herein again. In this implementation, normal running of the first application can be ensured, and user experience is improved.

In a possible implementation, an area of a screen of the first terminal is greater than an area of a screen of the second terminal, and the running the first application on the first terminal after the first application is started on the first terminal includes: automatically displaying and running the first application on the first terminal in a floating window or in a full-screen manner. For example, refer to descriptions corresponding to Example 20. For brevity, details are not described herein again. In this implementation, the first application may be displayed and run on the first terminal in a floating window or in a full-screen manner. This improves user experience. For example, the first terminal may be a PC device.

In a possible implementation, the area of the screen of the first terminal is greater than the area of the screen of the second terminal, and after the first application is started on the first terminal, the method further includes: Prompt information is displayed on an interface of the first terminal, where the prompt information is used to prompt the user to display the first application in a floating window or in a full-screen manner; and the first terminal displays the first application on the first terminal in a floating window or in a full-screen manner based on a selection of the user. For example, refer to descriptions corresponding to Example 21. For brevity, details are not described herein again. In this implementation, the first application may be displayed and run on the first terminal in a floating window or in a full-screen manner based on the selection of the user. This improves user experience. For example, the first terminal may be a PC device.

In a possible implementation, after the first application is started on the first terminal, the method further includes: when a screen width of the first terminal is greater than a screen width of the second terminal, displaying the first application on the first terminal in an APP Multiplier manner, and displaying the first application on the second terminal in a manner different from the APP Multiplier manner; or when a screen width of the first terminal is less than a screen width of the second terminal, displaying the first application on the first terminal in a manner different from an APP Multiplier manner, and displaying the first application on the second terminal in the APP Multiplier manner; or when the first application is displayed on the second terminal in landscape mode, displaying the first application on the first terminal in landscape mode; or when the first application is displayed on the second terminal in portrait mode, displaying the first application on the second terminal in portrait mode. For example, refer to specific descriptions corresponding to Example 17 to Example 19. For brevity, details are not described herein again. In this implementation, the first application may be flexibly displayed and run in different modes based on screen sizes of the first terminal and the second terminal, to improve user experience.

In a possible implementation, in a process in which the first terminal runs the first application, the method further includes: After a distance between the first terminal and the second terminal is greater than a preset first distance, displaying first prompt information and second prompt information on an interface of the first terminal, where the first prompt information notifies the user that the first terminal and the second terminal are to release a communication connection, and the second prompt information notifies the user that the first application is from the second terminal. For example, refer to specific descriptions corresponding to Example 28. For brevity, details are not described herein again. In this implementation, the prompt information is displayed to the user, so that the user can learn of a communication connection status. In this way, user experience is improved.

In a possible implementation, in the process in which the first terminal runs the first application, the method further includes: After the communication connection between the first terminal and the second terminal is released, the first terminal displays the first application by using a mask, and displays one piece of third prompt information, fourth prompt information, and fifth prompt information on an interface of the first terminal, where the third prompt information prompts the user that the communication connection between the first terminal and the second terminal is released, the fourth prompt information prompts the user to exit the first application, and the fifth prompt information prompts the user to reconnect the first terminal to the second terminal.

In a possible implementation, the method further includes: After the first terminal and the second terminal meet a preset condition, the first terminal is automatically reconnected to the second terminal; and after reconnection succeeds, the first terminal restores normal display and runs the first application. For example, refer to specific descriptions corresponding to Example 29. For brevity, details are not described herein again. In this implementation, connection status prompt information, automatic reconnection prompt information, and application exit prompt information are displayed to the user, and automatic reconnection is performed after the condition is met, thereby ensuring that tasks are migrated in sequence and improving user experience.

In a possible implementation, the method further includes: The first terminal receives a fifteenth operation performed by the user on a second task card on the recent tasks screen of the first terminal, where the fifteenth operation is used to migrate a second application corresponding to the second task card to a target device for running, and the N devices include the target device; the first terminal determines the target device based on the fifteenth operation; and the target device runs the second application. In this implementation, the user can conveniently determine the target device to which the task card needs to be migrated. Operations are simple and easy to implement, and user experience is improved.

In a possible implementation, that the first terminal determines the target device based on the fifteenth operation includes: When the user touches and holds the second task card, a task card other than the second task card and an icon of a device that cannot run the second application are hidden on the recent tasks screen of the first terminal; and the first terminal determines, based on an operation of the user, the target device from device icons displayed on the recent tasks screen of the first terminal. For example, refer to specific descriptions corresponding to Example 30. For brevity, details are not described herein again. In this implementation, an icon of an unavailable device and another task card are hidden, so that the user determines the target device to which the task card needs to be migrated, and efficiency of determining the target device by the user is improved.

In a possible implementation, that the first terminal determines the target device based on the fifteenth operation includes: when the user drags the second task card, and the second task card overlaps an identifier of a fourth terminal, determining that the fourth terminal is the target device, where the N devices include the fourth terminal. For example, refer to specific descriptions corresponding to Example 32. For brevity, details are not described herein again.

In a possible implementation, that the first terminal determines the target device based on the fifteenth operation includes: when the user drags the second task card, and the second task card overlaps identifiers of both a fourth terminal and a fifth terminal, determining a terminal device indicated by a device icon having a largest overlapping area as the target device, where the N devices include the fourth terminal and the fifth terminal. For example, refer to specific descriptions corresponding to Example 33. For brevity, details are not described herein again. In this implementation, operations are simple and easy to implement, and accuracy of determining the target device can be improved.

In a possible implementation, that the first terminal determines the target device based on the fifteenth operation includes: after the user drags the second task card to slide up, and a movement distance of the second task card is greater than a preset distance, determining a device indicated by a device icon right above the second task card as the target device. For example, refer to specific descriptions corresponding to Example 34. For brevity, details are not described herein again. In this implementation, operations are simple and easy to implement, and accuracy of determining the target device can be improved.

In a possible implementation, that the first terminal determines the target device based on the fifteenth operation includes: after the user drags the second task card to slide up, and a distance between the second task card and the top of the screen of the first terminal is less than a preset distance, determining a device indicated by a device icon right above the second task card as the target device. For example, refer to specific descriptions corresponding to Example 35. For brevity, details are not described herein again. In this implementation, operations are simple and easy to implement, and accuracy of determining the target device can be improved.

In a possible implementation, after the target device is determined, in a process in which the user drags the second task card to slide up to the target device, an area of the second task card decreases as a distance between the second task card and an icon of the target device decreases. For example, refer to specific descriptions corresponding to Example 31. For brevity, details are not described herein again. In this implementation, operations are simple and easy to implement, and accuracy of determining the target device can be improved.

In a possible implementation, after the target device is determined, the method further includes: when the second task card does not overlap the icon of the target device, moving the icon of the target device downward by a preset distance, or changing a display status of the icon of the target device to a selected state. For example, refer to specific descriptions corresponding to Example 37. For brevity, details are not described herein again. In this implementation, it may be convenient for the user to view the selected target device, and user experience is improved.

In a possible implementation, after the target device is determined, the method further includes: When the second task card dragged by the user does not overlap the icon of the target device, the user releases the second task card, so that the second task card automatically migrates to the target device; and the target device runs the second application. For example, refer to specific descriptions corresponding to Example 36. For brevity, details are not described herein again. In this implementation, after the target device is determined, but a task card does not reach an icon touch target of the target device, if the user releases the task card, the task card automatically fly to the device icon, to complete cross-device interaction. This improves cross-device interaction efficiency of the task.

In a possible implementation, after the target device is determined, the method further includes: The first terminal receives a sixteenth operation performed by the user on the second task card on the recent tasks screen of the first terminal, where the sixteenth operation is used to select a new target device. For example, refer to specific descriptions corresponding to Example 39 to Example 42. For brevity, details are not described herein again. In this implementation, the selected target device is changed by performing an operation on the task card by the user. This improves efficiency of changing the target device.

In a possible implementation, before the target device runs the second application when a screen of the target device is off, the method further includes: The target device automatically turns on the screen; the target device displays an unlock interface after the target device automatically turns on the screen; and the target device receives an unlock operation of the user. For example, refer to specific descriptions corresponding to Example 43. For brevity, details are not described herein again. In this implementation, the target device automatically turns on the screen, and triggers unlocking after the screen is turned on, and then the user manually unlocks the screen, so that the target device can normally run a migration task, and task migration efficiency is ensured.

In a possible implementation, before the target device runs the second application when a screen of the target device is off, the method further includes: The target device automatically turns on the screen and displays an unlock interface; and the target device receives an unlock operation of the user. For example, refer to specific descriptions corresponding to Example 44. For brevity, details are not described herein again. In this implementation, the target device automatically turns on the screen, and after the screen is turned on, the target device automatically triggers the user to manually unlock the screen. This improves task migration efficiency in the premise of ensuring that the target device can normally run a migration task.

In a possible implementation, before the target device runs the second application when a screen of the target device is off, the method further includes: The target device automatically turns on the screen and automatically unlocks the screen. For example, refer to specific descriptions corresponding to Example 45. For brevity, details are not described herein again. In this implementation, the target device automatically turns on the screen and automatically unlocks the screen. This improves task migration efficiency in the premise of ensuring that the target device can normally run a migration task.

In a possible implementation, a source device corresponding to the second application is the first terminal, and that the target device runs the second application includes: The target device runs the second application on the target device by using a hardware capability of the first terminal; or the target device runs the second application on the target device by using hardware capabilities of the first terminal and the target device; or the target device runs the second application on the target device by using a hardware capability of the target device, and the first terminal releases a hardware capability occupied by the first terminal; or the target device runs the second application on the target device by using a hardware capability of the target device, and the first terminal does not release a hardware capability occupied by the second application. For example, refer to specific descriptions corresponding to Example 46 to Example 48. For brevity, details are not described herein again. In this implementation, different allocation rules are used for the hardware capability of the first terminal and the hardware capability of the target device, to ensure that a migrated task can be normally run on the target device, and improve task migration efficiency.

In a possible implementation, the method further includes: In a process in which the target device runs the second application by using the hardware capability of the target device, the target device receives an instruction for running a third application, where a hardware capability used to run the third application on the target device conflicts with the hardware capability used to run the second application; the target device runs the third application by using the hardware capability of the target device; and the second application is switched back to the first terminal device, and the second application continues to be run by using the hardware capability of the first terminal. For example, refer to specific descriptions corresponding to Example 49. For brevity, details are not described herein again. In this implementation, after a task is migrated from a source device to a target device, when a new task from the target device preempts hardware, a hardware capability of the source device may be used through coordination, to ensure that the task of the target device is preferentially executed. This can ensure that the task of the target device is preferentially executed.

In a possible implementation, the method further includes: In a process in which the target device runs the second application by using the hardware capability of the target device, the target device receives an instruction for running a third application, where a hardware capability used to run the third application on the target device conflicts with the hardware capability used to run the second application; and the target device simultaneously runs the second application and the third application by using the hardware capability of the target terminal. For example, refer to specific descriptions corresponding to Example 50. For brevity, details are not described herein again. In this implementation, after a task is migrated from a source device to a target device, when a new task from the target device preempts hardware, a hardware capability of the target device may be separated based on the tasks to support a plurality of tasks at the same time. This can ensure that both the task of the target device and the migrated task can be run normally, and improve running efficiency of the task of the target device.

In a possible implementation, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; the target device suspends running the second application; the first terminal runs the fourth application by using the hardware capability of the first terminal; and after the first terminal finishes running the fourth application, the target device continues to run the second application by using the hardware capability of the first terminal. For example, refer to specific descriptions corresponding to Example 52. For brevity, details are not described herein again. In this implementation, after a task is migrated from a source device to a target device, when a new task from the source device preempts hardware, the migrated task on the target device is suspended. After the new task is ended on the source device, the migrated task on the target device automatically continues. This can ensure that a new task on the source device is preferentially executed.

In a possible implementation, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; and the target device switches to continue to run the second application by using the hardware capability of the target device, and the first terminal runs the fourth application by using the hardware capability of the first terminal. For example, refer to specific descriptions corresponding to Example 53. For brevity, details are not described herein again. In this implementation, after a task is migrated from a source device to a target device, when a new task from the source device preempts hardware, the source device executes the new task by using a hardware capability of the source device, and the target device executes, by using a hardware capability of the target device, the task migrated from the source device. This can ensure that both the task on the source device and the migrated task can be run normally, and improve task running efficiency.

In a possible implementation, the method further includes: In a process in which the target device runs the second application by using the hardware capability of the first terminal, the first terminal receives an instruction for running a fourth application, where the hardware capability used to run the second application on the target device conflicts with a hardware capability used by the first terminal to run the fourth application; and the target device continues to run the second application by using the hardware capability of the first terminal, and the first terminal runs the fourth application by using the hardware capability of the first terminal. For example, refer to specific descriptions corresponding to Example 53. For brevity, details are not described herein again. In this implementation, after a task is migrated from a source device to a target device, when a new task from the source device preempts hardware, a hardware capability of the source device may be separated based on the tasks to support a plurality of tasks at the same time. This can ensure that both the task of the source device and the migrated task can be run normally, and improve running efficiency of the task of the source device.

In a possible implementation, the method further includes: The first terminal receives a seventeenth operation performed by the user on a fifth task card on the recent tasks screen of the first terminal, where the seventeenth operation is used to install a fifth application corresponding to the fifth task card on the first terminal or another device in the N devices; and the first terminal or the another device in the N devices installs the fifth application based on the seventeenth operation. For example, refer to specific descriptions corresponding to Example 22 and Example 23. For brevity, details are not described herein again. In this implementation, a multi-device task center is used to help the another device or the first terminal install an application. Operations are convenient, application installation efficiency is improved, and user experience is improved.

In a possible implementation, the method further includes: The first terminal receives an eighteenth operation performed by the user on a sixth task card and a seventh task card on the recent tasks screen of the first terminal, where the eighteenth operation is used to display applications corresponding to the sixth task card and the seventh task card on the first terminal or another device in the N devices in a first display manner; and the first terminal or the another device in the N devices displays the applications corresponding to the sixth task card and the seventh task card in the first display manner.

Optionally, the first display manner is a split-screen display manner; or the application corresponding to the sixth task card is displayed in full screen, and the application corresponding to the seventh task card is displayed in a floating window; or the application corresponding to the sixth task card is displayed in a floating window, and the application corresponding to the seventh task card is displayed in a floating window. For example, refer to specific descriptions corresponding to Example 24 to Example 27. For brevity, details are not described herein again. In this implementation, by using a multi-device task center, the user quickly performs split-screen viewing or establishes a floating window on the first terminal or cross devices. Operations are convenient, and a new task card is convenient to form. In addition, the new task card may be displayed in different manners. This improves diversity and flexibility of the task card.

It should be further understood that the foregoing descriptions are merely intended to help a person skilled in the art better understand embodiments of this application, but are not intended to limit the scope of embodiments of this application. It is clear that a person skilled in the art may make various equivalent modifications or changes based on the foregoing examples. For example, some steps in each of the foregoing methods may be unnecessary, or some steps may be newly added. Alternatively, any two or more of the foregoing embodiments are combined. A modified, changed, or combined solution also falls within the scope of embodiments of this application.

It should be further understood that parameter code in the foregoing embodiments is merely an example, and should not be construed as any limitation on a format of the parameter code carried in the information in embodiments of this application. In some other embodiments of this application, the parameter code format carried in the information in embodiments of this application may alternatively be another format or the like. This is not limited in embodiments of this application.

It should be further understood that division into the manners, cases, categories, and embodiments in embodiments of this application is merely intended for ease of description, and should not constitute a particular limitation. The features in the manners, categories, cases, and embodiments may be combined without contradiction.

It should be further understood that numerals used in embodiments of this application are differentiated merely for ease of description, but are not used to limit the scope of embodiments of this application. The sequence numbers of the foregoing processes do not mean execution sequences. The execution sequences of the processes should be determined according to functions and internal logic of the processes, and should not be construed as any limitation on the implementation processes of embodiments of this application.

It should be further understood that the foregoing descriptions of embodiments of this application emphasize differences between the embodiments. For same or similar parts that are not mentioned, refer to the embodiments. For brevity, details are not described herein again.

An embodiment of this application further provides a chip system. As shown in FIG. 20, the chip system includes at least one processor 1301 and at least one interface circuit 1302. The processor 1301 and the interface circuit 1302 may be interconnected through a line. For example, the interface circuit 1302 may be configured to receive a signal from another apparatus (for example, a memory of any one of the foregoing terminal devices). For another example, the interface circuit 1302 may be configured to send a signal to another apparatus (for example, the processor 1301). For example, the interface circuit 1302 may read instructions stored in the memory, and send the instructions to the processor 1301. When the instructions are executed by the processor 1301, the chip system is enabled to perform the steps performed by any terminal device (for example, the mobile phone, the large-screen device, the tablet computer, the head unit, or the PC) in the foregoing embodiments. Certainly, the chip system may further include another discrete device. This is not specifically limited in this embodiment of this application.

An embodiment of this application further provides an apparatus. The apparatus is included in an electronic device or a terminal device, and has a function of implementing behavior of the terminal device in any one of the foregoing embodiments. The function may be implemented by hardware, or may be implemented by hardware executing corresponding software. The hardware or the software includes at least one module or unit corresponding to the foregoing function.

An embodiment of this application further provides a computer storage medium, including computer instructions. When the computer instructions are run on a terminal device, the terminal device is enabled to perform the steps performed by the terminal device in any one of the foregoing embodiments.

An embodiment of this application further provides a computer program product. When the computer program product runs on a terminal device, the terminal device is enabled to perform the steps performed by the terminal device in any one of the foregoing embodiments.

An embodiment of this application further provides a graphical user interface on a terminal device. The terminal device includes a display, a camera, a memory, and one or more processors. The one or more processors are configured to execute one or more computer programs stored in the memory; and the graphical user interface includes a graphical user interface displayed when the terminal device performs the steps performed by the terminal device in any one of the foregoing embodiments.

An embodiment of this application further provides a system for a method for displaying and controlling a task of a remote device. The system includes the first terminal and the second terminal provided in the foregoing method embodiments. Optionally, the system may further include a third terminal, a fourth terminal, and the like.

It may be understood that, to implement the foregoing functions, the terminal and the like include a corresponding hardware structure and/or a corresponding software module for performing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, function module division may be performed on the electronic device and the like based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

The foregoing descriptions about implementations allow a person skilled in the art to understand that, for the purpose of convenient and brief description, division of the foregoing functional modules is taken as an example for illustration. During actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in each of embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in embodiments of this application essentially, or the part contributing to conventional technologies, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A system comprising N devices, wherein N is greater than one, the N devices comprise a first terminal and a second terminal, and the first terminal is configured to:

display, on the first terminal, a recent tasks screen, wherein icons of the N devices and at least two task cards are displayed on the recent tasks screen;

when at least two task cards of the second terminal are displayed on the recent tasks screen of the first terminal, display the task cards of the second terminal in a single row or a plurality of rows on the recent tasks screen of the first terminal;

receive, on the first terminal, an operation on a displayed icon of the second terminal;

displaying, on the second terminal, an application interface corresponding to the task card in response to the operation;

receive, on the first terminal, a tap operation performed on an application icon corresponding to the task card or an operation performed on the task card, and in response pull back the task card on the first terminal such that a continuing application interface corresponding to the task card is displayed on the first terminal and the second terminal stops displaying the application interface.

2. The system according to claim 1, wherein the at least two task cards of the second terminal comprise a task card of a first home screen snapshot of the second terminal and a task card of a second home screen snapshot of the second terminal.

3. The system according to claim 2, wherein there is at least one of a feature ability (FA) card, a floating window, or a floating bubble on the task card of the first home screen snapshot of the second terminal or the task card of the second home screen snapshot of the second terminal.

4. The system according to claim 1, wherein the N devices comprise a lite device, the lite device comprises a wearable device or a smart home device used by a user, and the first terminal is further configured to:

display task cards of the lite device on the recent tasks screen of the first terminal, wherein the task cards of the lite device comprise task cards respectively corresponding to ongoing tasks of different lite devices.

5. The system according to claim 4, wherein the N devices further comprises a third terminal, and the first terminal is further configured to:

receive an operation performed on a task card of the task cards of the lite device;

share the at least two task cards of the lite device with the third terminal based on the operation; and the third terminal is configured to display the task card of the lite device on a recent tasks screen of the third terminal.

6. The system according to claim 1, wherein a source device corresponding to a first application is the second terminal, and in a process of migrating the first application to the first terminal for running, the first terminal and the second terminal are further configured to determine a running status of the first application based on different modes of migrating the first application to the first terminal, wherein the different modes of migrating the first application to the first terminal comprise a copying mode, a window projection technology-based migration mode, and a feature ability (FA) technology-based migration mode.

7. The system according to claim 1, wherein a source device corresponding to a second application is the first terminal, and in a process of migrating the second application to the second terminal for running, the second terminal is further configured to:

run the second application on the second terminal by using a hardware capability of the first terminal; or run the second application on the second terminal by using hardware capabilities of the first terminal and the second terminal; or run the second application on the second terminal by using a hardware capability of the second terminal, wherein the first terminal releases a hardware capability occupied by the second application; or run the second application on the second terminal by using a hardware capability of the second terminal, wherein the first terminal does not release a hardware capability occupied by the second application.

8. A method comprising:

displaying, by a first terminal, a recent tasks screen, wherein icons of N devices and at least two task cards are displayed on the recent tasks screen, and the N devices comprise the first terminal and a second terminal, and wherein N is greater than one;

when at least two task cards of the second terminal is displayed on the recent tasks screen of the first terminal, displaying, by the first terminal, the two task cards of the second terminal in a single row or a plurality of rows on the recent tasks screen of the first terminal;

receiving, on the first terminal, an operation on a displayed icon of the second terminal;

displaying, on the second terminal, an application interface corresponding to the task card in response to the operation; and receiving, on the first terminal, a tap operation performed on an application icon corresponding to the task card or an operation performed on the task card, and in response pulling back the task card on the first terminal such that a continuing application interface corresponding to the task card is displayed on the first terminal and the second terminal stops displaying the application interface.

9. The method according to claim 8, wherein the at least two task cards of the second terminal comprises a task card of a first home screen snapshot of the second terminal and a task card of a second home screen snapshot of the second terminal.

10. The method according to claim 9, wherein there is at least one of a feature ability (FA) card, a floating window, or a floating bubble on the task card of the first home screen snapshot of the second terminal or the task card of the second home screen snapshot of the second terminal.

11. The method according to claim 8, wherein the N devices comprise a lite device, the lite device comprises a wearable device or a smart home device used by a user, and the method further comprises:

displaying, by the first terminal, task cards of the lite device on the recent tasks screen of the first terminal, wherein the task cards of the lite device comprise task cards respectively corresponding to ongoing tasks of different lite devices.

12. The method according to claim 11, further comprising:

receiving, by the first terminal, an operation performed on a task card of the task cards of the lite device;

sharing, by the first terminal, the task card of the lite device with the third terminal based on the operation.

13. The method according to claim 8, wherein a source device corresponding to a first application is the second terminal, and in a process of migrating the first application to the first terminal for running, the method further comprises:

determining, by the first terminal, a running status of the first application based on different modes of migrating the first application to the first terminal, wherein the different modes of migrating the first application to the first terminal comprise a copying mode, a window projection technology-based migration mode, and a feature ability (FA) technology-based migration mode.

14. The method according to claim 8, wherein a source device corresponding to a second application is the first terminal, and in a process of migrating the second application to the second terminal for running, the method further comprises:

releasing, by the first terminal, a hardware capability that is of the first terminal and that is occupied by the second application; or skipping, by the first terminal, releasing a hardware capability that is of the first terminal and that is occupied by the second application.

15. A first terminal, comprising:

a memory configured to store program instructions;

a processor configured to execute the program instructions to cause the first terminal to:

display a recent tasks screen, wherein icons of N devices and at least two task cards are displayed on the recent tasks screen, wherein the N devices comprise the first terminal and a second terminal, and wherein N is greater than one;

when at least two task cards of the second terminal is displayed on the recent tasks screen of the first terminal, display the at least two task cards of the second terminal in a single row or a plurality of rows on the recent tasks screen of the first terminal;

receive an operation on a displayed icon of the second terminal;

cause an application interface corresponding to the task card to be displayed on the second terminal in response to the operation; and receive, on the first terminal, a tap operation performed on an application icon corresponding to the task card or an operation performed on the task card, and in response pull back the task card on the first terminal such that a continuing application interface corresponding to the task card is displayed on the first terminal and the second terminal stops displaying the application interface.

16. The first terminal according to claim 15, wherein the at least two task cards of the second terminal comprises a task card of a first home screen snapshot of the second terminal and a task card of a second home screen snapshot of the second terminal.

17. The first terminal according to claim 16, wherein there is at least one of a feature ability (FA) card, a floating window, or a floating bubble on the task card of the first home screen snapshot of the second terminal or the task card of the second home screen snapshot of the second terminal.

18. The first terminal according to claim 15, wherein the N devices comprise a lite device, the lite device comprises a wearable device or a smart home device used by a user, and the processor further configured to execute the program instruction to cause the first terminal to:

display task cards of the lite device on the recent tasks screen of the first terminal, wherein the task cards of the lite device comprise task cards respectively corresponding to ongoing tasks of different lite devices.

19. The first terminal according to claim 15, wherein a source device corresponding to a first application is the second terminal, and in a process of migrating the first application to the first terminal for running, the processor is further configured to execute the program instructions to cause the first terminal to determine a running status of the first application based on different modes of migrating the first application to the first terminal, wherein the different modes of migrating the first application to the first terminal comprise a copying mode, a window projection technology-based migration mode, and a feature ability (FA) technology-based migration mode.

20. The first terminal according to claim 15, wherein a source device corresponding to a second application is the first terminal, and in a process of migrating the second application to the second terminal for running, the processor is further configured to execute the program instruction to cause the first terminal to:

release a hardware capability that is of the first terminal and that is occupied by the second application; or skip releasing a hardware capability that is of the first terminal and that is occupied by the second application.

* * * * *